(12) United States Patent
Chen et al.

(10) Patent No.: US 11,481,215 B2
(45) Date of Patent: Oct. 25, 2022

(54) CALCULATION METHOD AND RELATED PRODUCT

(71) Applicant: Shanghai Cambricon Information Technology Co., Ltd., Pudong New Area (CN)

(72) Inventors: Tianshi Chen, Pudong New Area (CN); Shaoli Liu, Pudong New Area (CN); Zai Wang, Pudong New Area (CN); Shuai Hu, Pudong New Area (CN)

(73) Assignee: Cambricon (Xi'an) Semiconductor Co., Ltd., Xi'an (CN)

( * ) Notice: Subject to any disclaimer, the term of this patent is extended or adjusted under 35 U.S.C. 154(b) by 0 days.

(21) Appl. No.: 16/745,743

(22) Filed: Jan. 17, 2020

(65) Prior Publication Data
US 2021/0224069 A1 Jul. 22, 2021

Related U.S. Application Data

(63) Continuation of application No. PCT/CN2018/095706, filed on Jul. 13, 2018.

(51) Int. Cl.
*G06F 9/30* (2018.01)
*G06F 9/38* (2018.01)
*G06N 3/04* (2006.01)

(52) U.S. Cl.
CPC ........ *G06F 9/30079* (2013.01); *G06F 9/3001* (2013.01); *G06F 9/3802* (2013.01); *G06N 3/04* (2013.01)

(58) Field of Classification Search
CPC .. G06F 9/30079; G06F 9/3001; G06F 9/3802; G06F 9/30032; G06F 9/30043;
(Continued)

(56) References Cited

U.S. PATENT DOCUMENTS

| 5,717,891 A | 2/1998 | Potts et al. |
| 5,889,985 A | 3/1999 | Babaian et al. |

(Continued)

FOREIGN PATENT DOCUMENTS

| CN | 101399977 A | 4/2009 |
| CN | 101916180 A | 12/2010 |

(Continued)

OTHER PUBLICATIONS

CN201710927267.9, Official Action dated Oct. 11, 2019, 13 pages.
(Continued)

*Primary Examiner* — Corey S Faherty
(74) *Attorney, Agent, or Firm* — Getech Law LLC; Jun Ye

(57) ABSTRACT

The present disclosure provides a computing method that is applied to a computing device. The computing device includes: a memory, a register unit, and a matrix computing unit. The method includes the following steps: controlling, by the computing device, the matrix computing unit to obtain a first operation instruction, where the first operation instruction includes a matrix reading instruction for a matrix required for executing the instruction; controlling, by the computing device, an operating unit to send a reading command to the memory according to the matrix reading instruction; and controlling, by the computing device, the operating unit to read a matrix corresponding to the matrix reading instruction in a batch reading manner, and executing the first operation instruction on the matrix. The technical solutions in the present disclosure have the advantages of fast computing speed and high efficiency.

14 Claims, 64 Drawing Sheets

(58) Field of Classification Search
CPC ...... G06F 9/30036; G06N 3/04; G06N 3/082; G06N 3/084; G06N 3/0454; G06N 3/063; G06N 7/005
See application file for complete search history.

(56) References Cited

U.S. PATENT DOCUMENTS

| | | | | |
|---|---|---|---|---|
| 2011/0040821 | A1* | 2/2011 | Eichenberger | G06F 9/3887 708/607 |
| 2015/0324427 | A1 | 11/2015 | Barber et al. | |
| 2017/0063378 | A1 | 3/2017 | Tate et al. | |
| 2017/0337156 | A1* | 11/2017 | Yadavalli | G06F 9/30149 |
| 2018/0329868 | A1* | 11/2018 | Chen | G06F 9/30036 |
| 2019/0250915 | A1* | 8/2019 | Yadavalli | G06F 9/30036 |
| 2020/0026494 | A1* | 1/2020 | Langhammer | G06F 7/5443 |
| 2020/0050918 | A1* | 2/2020 | Chen | G06F 7/533 |
| 2020/0225947 | A1* | 7/2020 | Nagi | G06F 7/4806 |

FOREIGN PATENT DOCUMENTS

| | | |
|---|---|---|
| CN | 102510282 A | 6/2012 |
| CN | 102880341 A | 1/2013 |
| CN | 103377033 A | 10/2013 |
| CN | 103699360 A | 4/2014 |
| CN | 103999059 A | 8/2014 |
| CN | 104778026 A | 7/2015 |
| CN | 105468331 A | 4/2016 |
| CN | 105512723 A | 4/2016 |
| CN | 105844330 A | 8/2016 |
| CN | 105930281 A | 9/2016 |
| CN | 106066783 A | 11/2016 |
| CN | 106355246 A | 1/2017 |
| CN | 106570559 A | 4/2017 |
| CN | 106845631 A | 6/2017 |
| EP | 2801912 A1 | 11/2012 |
| WO | 2016105841 A1 | 6/2016 |
| WO | 2017105517 A1 | 6/2017 |

OTHER PUBLICATIONS

CN201710927336.6, Official Action dated Nov. 22, 2019, 10 pages.
Soliman, et al., "A Shared Matrix Unit for a Chip Multi-Core Processor", J. Parallel Distrib. Comput, 2013, 11 pages.
EP 18835662.0—Rules 70(2) and 70a(2), mailed Aug. 6, 2021, 1 page.
EP 18835662.0—Extended European Search Report, dated Jul. 20, 2021, 10 pages.
Tianshi Chen, et al., "DianNao: A Small-Footprint High-Throughput Accelerator for Ubiquitous Machine-Learning", ASPLOS '14, Mar. 2014, 17 pages.
CN 201710595951.1—First Office Action, dated May 11, 2020, 9 pages, (with brief English explanation).
CN 201710928261.3—Office Action, dated May 25, 2020, 25 pages, (with brief English explanation).
CN 201710927307.X—Office Action, dated May 7, 2020, 8 pages, (with brief English explanation).
CN 201710927144.5—Office Action, dated May 28, 2020, 12 pages, (with brief English explanation).
EP 18835662.0—Communication pursuant to Article 94(3) EPC, dated Jun. 30, 2022, 9 pages.

* cited by examiner

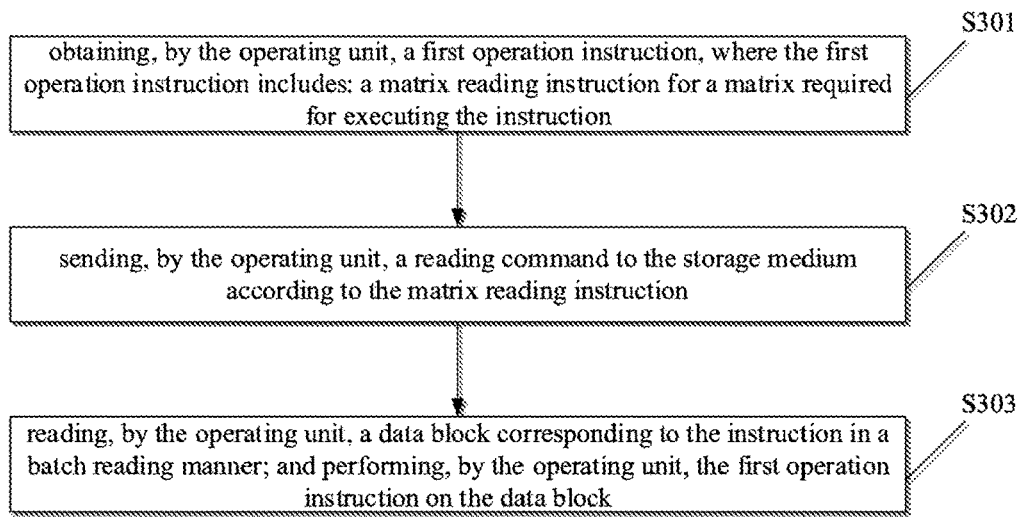
Fig. 3
| Operation code | Register or immediate number | Register/immediate number | ... |
Fig. 4
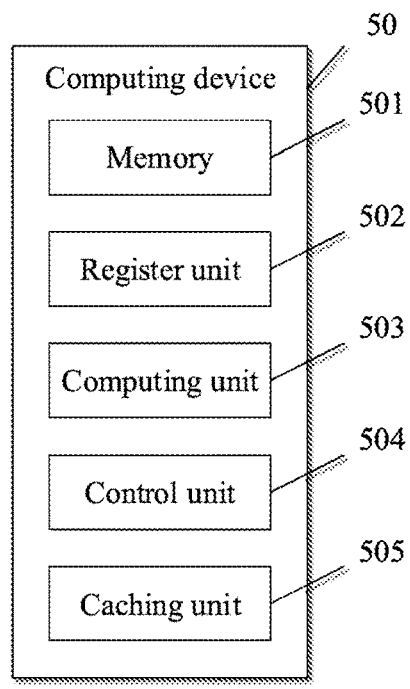
Fig. 5

Image     Convolution kernel     Convolution result

| power-bit data | 00000 | 00001 | 00010 | 00011 | 00100 |
|---|---|---|---|---|---|
| exponential value | 0 | 3 | 4 | 1 | set to zero |

Fig. 49.1

| power-bit data | 00000 | 00001 | 00010 | 00011 | 11111 |
|---|---|---|---|---|---|
| exponential value | 0 | 1 | 2 | 3 | set to zero |

Fig. 49.2

| power-bit data | 00000 | 00001 | 00010 | 00011 | 11111 |
|---|---|---|---|---|---|
| exponential value | 0 | 2 | 4 | 6 | set to zero |
Fig. 49.3
| power-bit data | 11111 | 11110 | 11101 | 11100 | 00000 |
|---|---|---|---|---|---|
| exponential value | 0 | 1 | 2 | 3 | set to zero |
Fig. 49.4
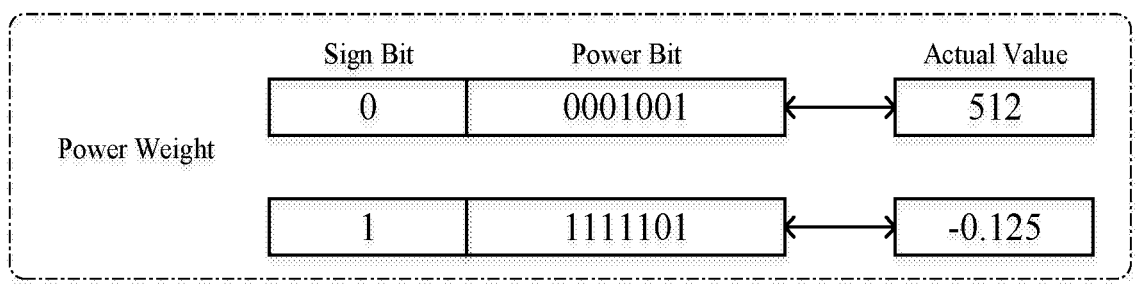
Fig. 49.5

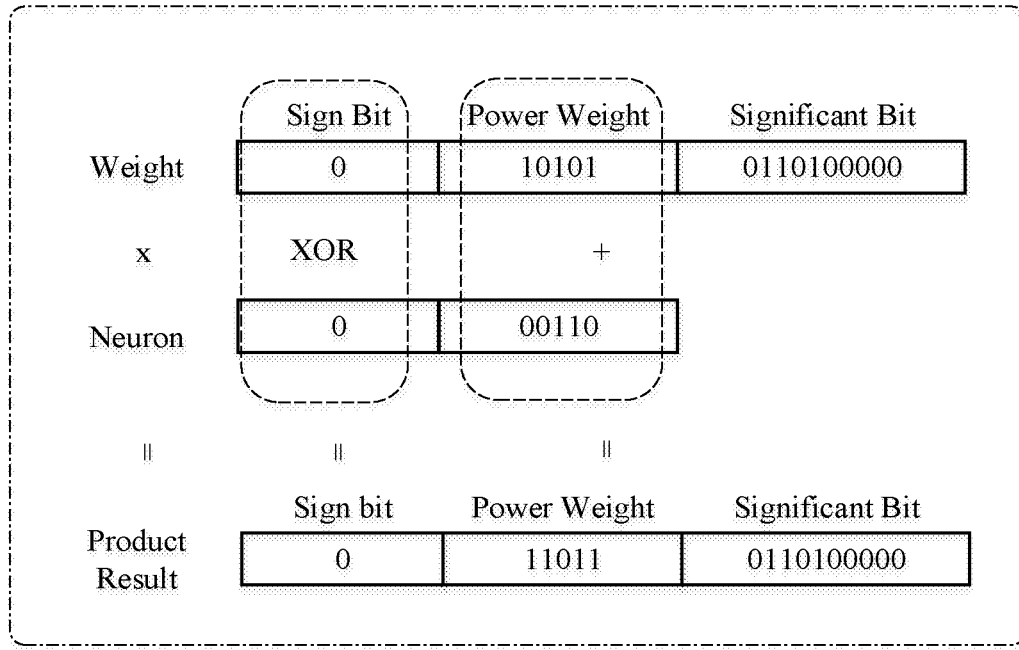
Fig. 49.6
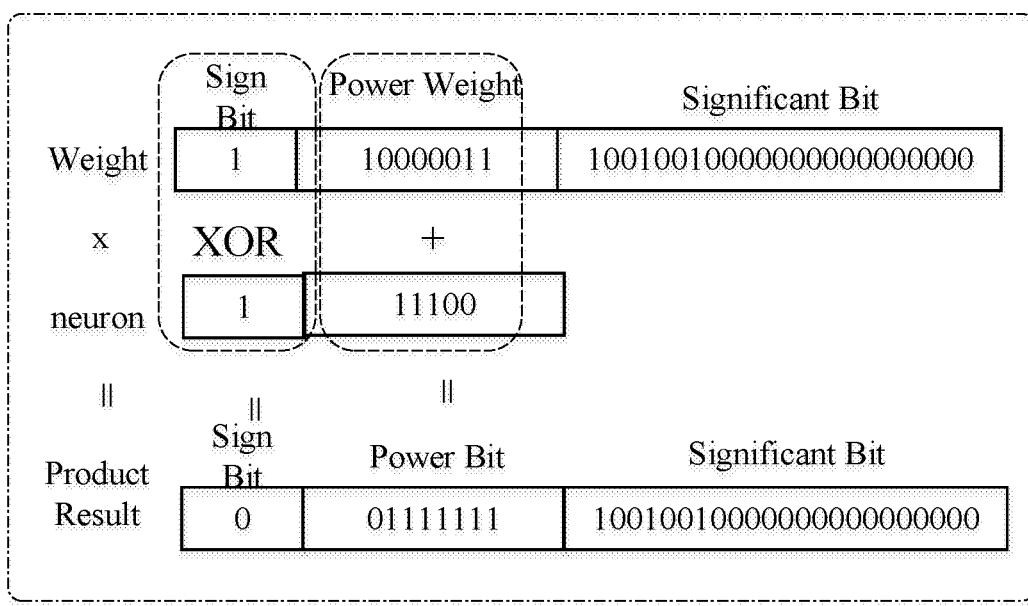
Fig. 49.7

```
┌─────────────────────────────────────────┐
│ acquiring instructions, power neuron    │       ⌒
│ data and power weight data.             │──────╲  S4
└─────────────────────────────────────────┘
                    │
                    ▼
┌─────────────────────────────────────────┐
│ subjecting the power neuron data and    │
│ the power weight data to the neural     │       ⌒
│ network operation in accordance with    │──────╲  S5
│ the operational instructions.           │
└─────────────────────────────────────────┘
```

Fig. 50

| power-bit data | 00000 | 00001 | 00010 | 00011 | 00100 |
|---|---|---|---|---|---|
| exponential value | 0 | 3 | 4 | 1 | set to zero |

Fig. 50.1

| power-bit data | 00000 | 00001 | 00010 | 00011 | 11111 |
|---|---|---|---|---|---|
| exponential value | 0 | 1 | 2 | 3 | set to zero |

Fig. 50.2

| power-bit data | 00000 | 00001 | 00010 | 00011 | 11111 |
|---|---|---|---|---|---|
| exponential value | 0 | 2 | 4 | 6 | set to zero |
Fig. 50.3
| power-bit data | 11111 | 11110 | 11101 | 11100 | 00000 |
|---|---|---|---|---|---|
| exponential value | 0 | 1 | 2 | 3 | set to zero |
Fig. 50.4
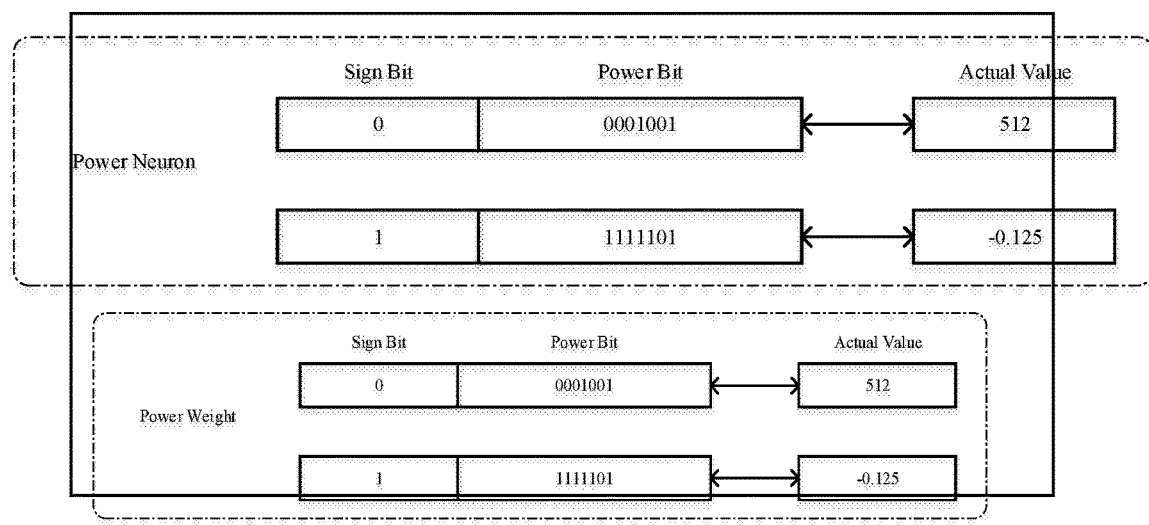
Fig. 50.5

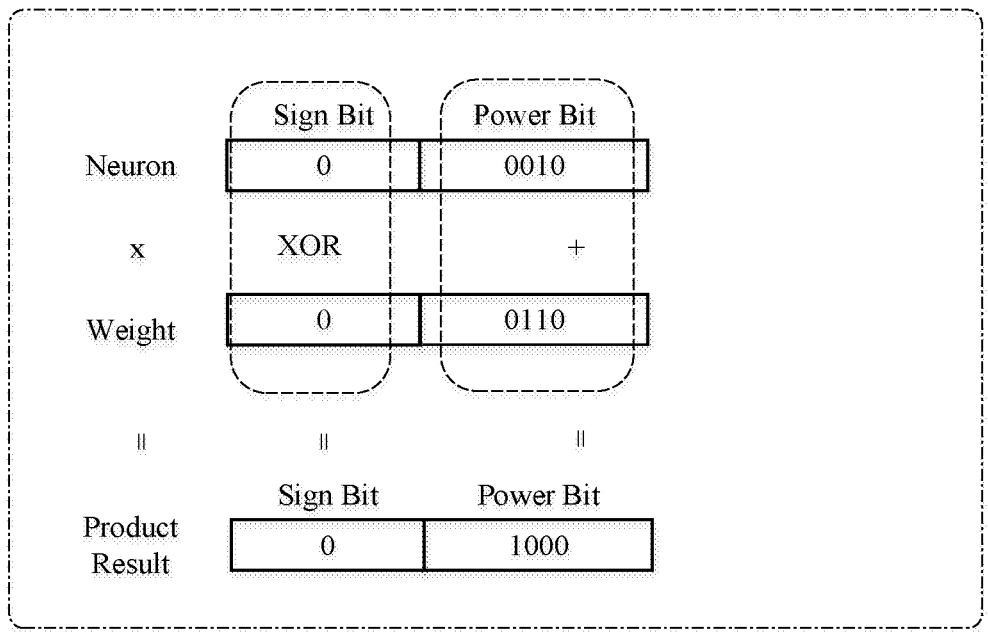
Fig. 50.6
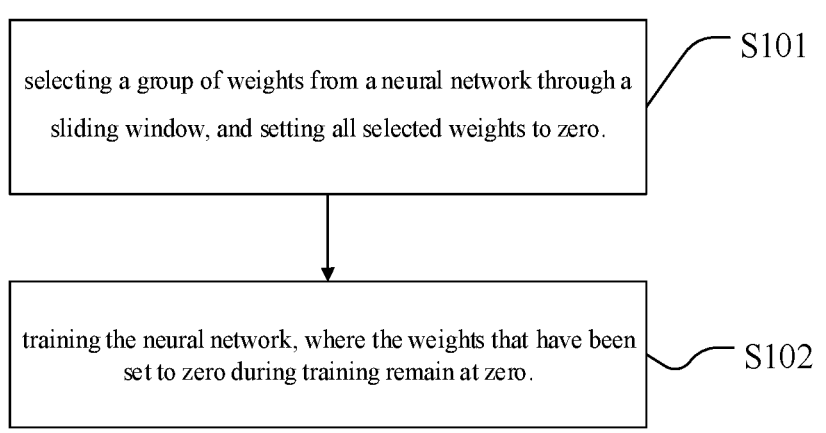
Fig. 51

CALCULATION METHOD AND RELATED PRODUCT

TECHNICAL FIELD

The present disclosure relates to the field of data processing, and specifically relates to a computing method and related products.

BACKGROUND

Data processing is a step or a stage that is needed by most algorithms. After computers are introduced into the field of data processing, a larger amount of data processing is implemented by computers. However, in the existing algorithms, some computing devices perform data computations of neural networks slowly and inefficiently.

SUMMARY

Examples of the present disclosure provide a computing method and related products, which may improve processing speed and efficiency of a computing device.

In a first aspect, an example of the present disclosure provides a computing method. The method is applied to a computing device, where the computing device includes: a memory, a register unit, and a computing (matrix computing) unit. The method includes following steps:

controlling, by the computing device, the matrix computing unit to obtain a first operation instruction, where the first operation instruction includes a matrix reading instruction for a matrix required for executing the instruction, and the required matrix includes at least one matrix with a same length or different lengths;

controlling, by the computing device, the computing unit to send a reading command to the memory according to the matrix reading instruction; and controlling, by the computing device, the computing unit to read a matrix corresponding to the matrix reading instruction in a batch reading manner, and executing the first operation instruction on the matrix.

Optionally, the matrix reading instruction includes: a storage address of a matrix required by the instruction or an identifier of a matrix required by the instruction.

Optionally, when the matrix reading instruction is the identifier of the matrix required by the instruction, the controlling the computing unit to send a reading command to the memory by the computing device according to the matrix reading instruction includes:

controlling, by the computing device, the computing unit to read a storage address corresponding to the identifier from the register unit according to the identifier in a unit reading manner; and controlling, by the computing device, the computing unit to send a reading command of reading the storage address to the memory and obtain the matrix in a batch reading manner.

Optionally, the executing the first operation instruction on the matrix includes:

controlling, by the computing device, the computing unit to perform a first pipeline stage computation on the matrix to obtain a first result, inputting the first result to a second pipeline stage for computation to obtain a second result, inputting the second result to a third pipeline stage for computation to obtain a third result, and inputting the third result to the memory for storage.

Optionally, the computing device further includes a caching unit. The method further includes: caching, by the computing device, an operation instruction to be executed in the caching unit.

Optionally, before the computing device controls the matrix computing unit to obtain the first operation instruction, the method further includes:

determining, by the computing device, whether there is an association relationship between the first operation instruction and a second operation instruction before the first operation instruction; if there is an association relationship, caching the first operation instruction in the caching unit, and after the second operation instruction is executed, fetching the first operation instruction from the caching unit and sending the first operation instruction to the computing unit.

The determining whether there is an association relationship between the first operation instruction and the second operation instruction before the first operation instruction includes:

fetching a first storage address interval of a matrix required by the first operation instruction according to the first operation instruction, and fetching a second storage address interval of a matrix required by the second operation instruction according to the second operation instruction; if the first storage address interval and the second storage address interval have an overlapped area, determining that there is an association relationship between the first operation instruction and the second operation instruction; and if the first storage address interval and the second storage address interval have no overlapped area, determining that there is no association relationship between the first operation instruction and the second operation instruction.

Optionally, the matrix is an m*n matrix, a 1*n matrix, or an m*1 matrix, where m and n are integers greater than or equal to 2.

In a second aspect, a computing device is provided. The computing device includes: a memory, a register unit, a computing (matrix computing) unit, and a control unit; where the memory is configured to store a matrix, where the matrix includes at least one matrix with a same length or different lengths;

the register unit is configured to store scalar data, where the scalar data includes at least: a storage address of the matrix in the memory;

the control unit is configured to control the matrix computing unit to obtain a first operation instruction, where the first operation instruction includes a matrix reading instruction for a matrix required for executing the instruction, and the required matrix includes at least one matrix with the same length or different lengths; and the computing unit is configured to send a reading command to the storage medium memory according to the matrix reading instruction, read a matrix corresponding to the matrix reading instruction in a batch reading manner, and execute the first operation instruction on the matrix.

Optionally, the matrix reading instruction includes: a storage address of a matrix required by the instruction or an identifier of a matrix required by the instruction.

Optionally, when the matrix reading instruction is the identifier of the matrix required by the instruction, the control unit is configured to control the computing unit to read a storage address corresponding to the identifier from the register unit according to the identifier in a unit reading manner, and control the computing unit to send a reading command of reading the storage address to the memory and obtain the matrix in a batch reading manner.

Optionally, the computing unit is configured to perform a first pipeline stage computation on the matrix to obtain a first result, input the first result to a second pipeline stage for computation to obtain a second result, input the second result to a third pipeline stage for computation to obtain a third result, and input the third result to the memory for storage.

Optionally, the computing device further includes:

a caching unit configured to cache an operation instruction to be executed; and the control unit configured to cache the operation instruction to be executed in the caching unit.

Optionally, the control unit is configured to determine whether there is an association relationship between the first operation instruction and a second operation instruction before the first operation instruction; if there is an association relationship between the first operation instruction and the second operation instruction, the control unit is configured to cache the first operation instruction in the caching unit, and after the second operation instruction is executed, fetch the first operation instruction from the caching unit and send the first operation instruction to the computing unit.

The determining whether there is an association relationship between the first operation instruction and the second operation instruction before the first operation instruction includes:

fetching a first storage address interval of a matrix required by the first operation instruction according to the first operation instruction, and fetching a second storage address interval of a matrix required by the second operation instruction according to the second operation instruction; if the first storage address space and the second storage address space have an overlapped area, determining that there is an association relationship between the first operation instruction and the second operation instruction; and if the first storage address space and the second storage address space have no overlapped area, determining that there is no association relationship between the first operation instruction and the second operation instruction.

In a third aspect, a computer readable storage medium is provided, in which a computer program for electronic data exchange is stored. The computer program enables a computer to execute the method of the first aspect.

In a fourth aspect, a computer program product is provided. The computer program product includes a non-transitory computer readable storage medium that stores a computer program, where the computer program enables a computer to execute the method of the first aspect.

Implementations of the examples of the present disclosure have the following beneficial effects:

it can be seen that according to the examples of the present disclosure, the computing device includes a register unit which stores scalar data and a memory which stores matrix data. In the present disclosure, a unit reading manner and a batch reading manner are assigned to the above two types of memories. For the matrix data, by allocating a data reading manner that matches characteristics of the matrix data, bandwidths may be fully utilized, and impacts of bandwidth bottlenecks on the matrix computing speed may be avoided. In addition, for the register unit which stores the scalar data, by setting a scalar data reading manner, a utilization rate of bandwidths may be improved. To summarize, technical solutions provided in the present disclosure may improve the utilization rate of bandwidths and avoid the impacts of bandwidths on the computing speed, which can improve the computing speed and efficiency.

BRIEF DESCRIPTION OF THE DRAWINGS

In order to explain the examples of the present disclosure or the technical solutions in the prior art more clearly, accompanied drawings used in the descriptions of the examples or the prior art will be briefly introduced below. Obviously, the accompanied drawings in the following descriptions are merely some examples of the present disclosure. For those of ordinary skill in the art, other drawings can be obtained based on these accompanied drawings without creative efforts.

FIG. 3 is a schematic flowchart of a matrix computing method according to an example of the present disclosure;

FIG. 4 is a schematic diagram of a format of an instruction set according to an example of the present disclosure;

FIG. 5 is a schematic structural diagram of another computing device according to an example of the present disclosure;

FIG. 49.1 is a schematic diagram of a coding table according to an example of the present disclosure;

FIG. 49.2 is another schematic diagram of a coding table according to an example of the present disclosure;

FIG. 49.3 is another schematic diagram of a coding table according to an example of the present disclosure;

FIG. 49.4 is another schematic diagram of a coding table according to an example of the present disclosure;

FIG. 49.5 is a schematic diagram of a representation method of power data according to an example of the present disclosure;

FIG. 49.6 is a schematic diagram of a multiplication operation of a neuron and a power weight according to an example of the present disclosure;

FIG. 49.7 is a schematic diagram of a multiplication operation of a neuron and a power weight according to an example of the present disclosure;

FIG. 50 is a flowchart of a neural network operating method according to an example of the present disclosure;

FIG. 50.1 is a schematic diagram of a coding table according to an example of the present disclosure;

FIG. 50.2 is another schematic diagram of a coding table according to an example of the present disclosure;

FIG. 50.3 is another schematic diagram of a coding table according to an example of the present disclosure;

FIG. 50.4 is another schematic diagram of a coding table according to an example of the present disclosure;

FIG. 50.5 is a schematic diagram of a representation method of power data method according to an example of the present disclosure;

FIG. 50.6 is a schematic diagram of a multiplication operation of a power neuron and a power weight according to an example of the present disclosure;

FIG. 51 is a flowchart of a processing method according to an example of the present disclosure;

FIG. 88 is a schematic structural diagram of a computing system in which computing processors share a storage unit according to an example of the present disclosure;

FIG. 89 is a schematic structural diagram of a neural network computing system in which computing processors and control processors share a storage unit according to an example of the present disclosure;

FIG. 90 is an exemplary block diagram of a system for complex neural network tasks according to an example of the present disclosure.

DETAILED DESCRIPTIONS OF THE EXAMPLES

In order to make purposes, technical solutions, and advantages of the present disclosure more clear, the present disclosure will be further described in detail below with reference to specific examples and accompanied drawings.

It should be noted that a matrix in a specific implementation of the present disclosure may be an m*n matrix, a 1*n matrix, or an m*1 matrix, where m and n are integers greater than or equal to 2. When the matrix is a 1*n matrix or an m*1 matrix, the matrix can be called a vector. The following matrices may be any of the three types of matrices described above, which will not be described further below. In machine learning algorithms, for instance, in artificial neural network algorithms, various neural network algorithms contain a large number of matrix operations. In a neural network, an operation formula of an output neuron is y=f (wx+b), where w is a first matrix, x is a second matrix, and b is a third matrix. A process of calculating an output matrix y includes: multiplying the matrix w and the matrix x, and then adding the matrix b. Therefore, the matrix operation needs to be considered in the design of various computing devices. The slow speed and low efficiency of existing matrix computations cannot meet users' requirements for computing devices.

Figure 1A:
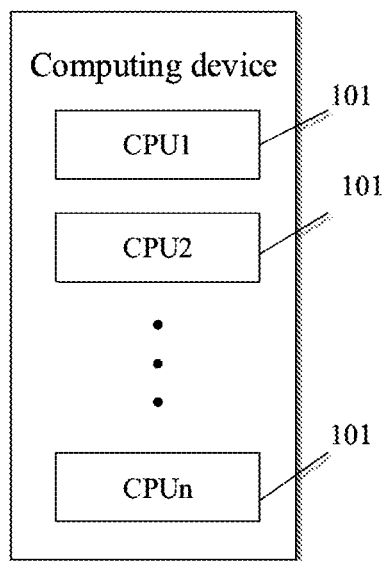
FIG. 1A is a schematic structural diagram of a computing device.

FIG. 1A is a diagram of a computing device. The computing device of a matrix shown in FIG. 1A includes a plurality of general-purpose processors 101 (CPUs), and each CPU includes its own memory. A processing method may be: performing, by the plurality of CPUs, matrix operations in a parallel processing manner. However, in this technical solution, performing the matrix operations in the parallel processing manner may not effectively improve efficiency because for the matrix operation, the result of the second matrix operation may require the result of the first matrix operation. Specifically, the first matrix operation is f (1)=A+B, and the second matrix operation is: f (2)=f (1)+C. When performing the second matrix operation, the device needs to fetch the result f (1) of the first matrix operation to perform an actual matrix operation. This situation is particularly prominent in neural network computations. Since the plurality of CPUs perform the matrix operations in the parallel processing manner, during allocation of the matrix operations, CPU1 may perform the first matrix operation, and CPU2 may perform a second matrix operation. CPU2 needs to fetch a result f (1) of a first matrix operation from CPU 1. Therefore, when a matrix is processed by multiple CPUs in parallel, communication among the multiple CPUs is a bottleneck of a matrix operation, and may affect the speed of the matrix operation.

Figure 1B:
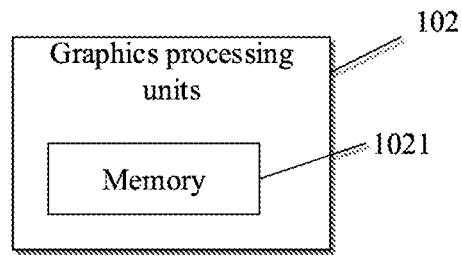
FIG. 1B is a schematic structural diagram of another computing device.

FIG. 1B is a diagram of another computing device. The computing device shown in FIG. 1B includes a graphics processing unit (GPU) 102 for performing a matrix operation. The GPU also includes a memory 1021. When the GPU 102 performs the matrix operation, the GPU 102 needs to fetch a matrix required for the matrix operation from the memory 1021. Due to a large amount of data of the matrix, a storage space occupied by a single matrix is greater than that of a scalar. Although the GPU 102 has strong operation capabilities, a memory capacity of GPU 102 is not enough to store a large number of matrices. To solve this problem, FIG. 1B is configured with an off-chip database 103, and the GPU 102 can read the matrix in the database 103. A specific reading method includes: fetching, by the GPU 102, a matrix to be computed from the off-chip database 103; storing the matrix in the memory 1021; performing a matrix instruction decoding processing when the matrix operation is performed; and fetching the matrix from the memory 1021 for computation. In this technical solution, when the matrix operation is performed, the matrix instruction decoding processing performed by the GPU 102 may occupy a large part of computing capabilities of the GPU, which may affect the speed and efficiency of the matrix computation.

Input neurons and output neurons mentioned in the present disclosure do not refer to neurons in an input layer and an output layer of an entire neural network, but refer to neurons in any two adjacent layers in the network. Neurons in a lower layer of a network feed forward operation are the input neurons, and neurons in the upper layer of the network feed forward operation are the output neurons. For instance, in a convolutional neural network, if a convolutional neural network has L layers and K=1, 2, ..., L−1, a $K^{th}$ layer is called an input layer and neurons in the $K^{th}$ layer are input neurons, while a $K+1^{th}$ layer is called an output layer and neurons in the $K+1^{th}$ layer are output neurons. In other words, except for a top layer, each layer can be an input layer, and a next layer is a corresponding output layer.

Figure 2:
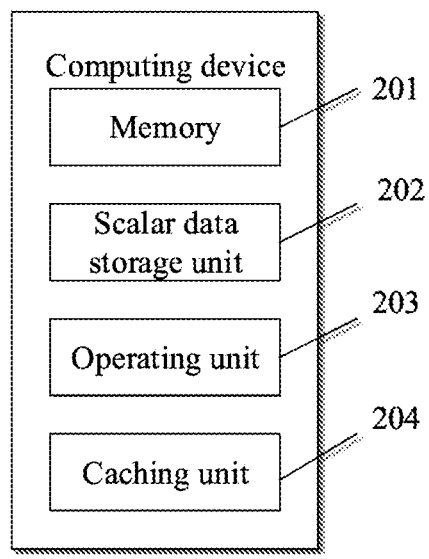
FIG. 2 is a schematic structural diagram of a computing device according to an example of the present disclosure.
Figure 2A:
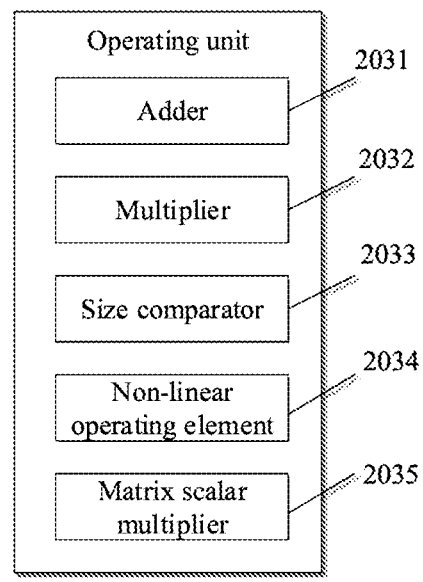
FIG. 2A is a schematic structural diagram of a matrix computing unit according to an example of the present disclosure.

A specific example of the present disclosure provides a matrix computing method which is executed in a computing device shown in FIG. 2. As shown in FIG. 2, the computing device includes:

a memory 201 configured to store a matrix, where the memory may be a scratchpad memory which can support matrix data of different lengths; in the present disclosure, necessary computation data is temporarily stored in a memory (preferably a scratchpad memory) to enable the computing device to flexibly and effectively support data of different lengths in a process of matrix operation; and the memory may also be an off-chip database, a database, or other storage medium;

a scalar data storage unit 202 (such as a scalar register unit) configured to store scalar data, where the scalar data includes, but is not limited to, an address of matrix data in the storage medium 201 and a scalar involved in an operation of matrix and scalar; in an example, a scalar register unit may be a scalar register file which provides a scalar register required during an operation, where the scalar register not only stores a matrix address, but also stores scalar data; and in the operation of matrix and scalar, an operating unit needs to obtain both a matrix address and a corresponding scalar from the register unit; and an operating unit 203 configured to obtain and execute a first operation instruction. As shown in FIG. 2A, the operating unit includes a plurality of operating elements, where the operating elements include, but are not limited to, a matrix adder 2031, a matrix multiplier 2032, a size comparator 2033, a non-linear operating element 2034, and a matrix scalar multiplier 2035.

As shown in FIG. 3, the matrix computing method includes following steps:

a step S301, obtaining, by the operating unit 203, a first operation instruction, where the first operation instruction includes: a matrix reading instruction for a matrix required for executing the instruction.

In the step S301, there may be multiple types of the matrix reading instruction for a matrix required for executing the instruction. For instance, in an optional technical solution of the present disclosure, the matrix reading instruction for a matrix required for executing the instruction may be a storage address of the required matrix. In another optional technical solution, the matrix reading instruction required for executing the instruction may be an identifier of the required matrix, where the identifier may have multiple representations, such as a name of the matrix, an identification number of the matrix, or a register serial number or an address of the matrix in the register unit. The identifier may also include a size of the matrix.

A practical instance is described below to illustrate the matrix reading instruction for a matrix required for executing the instruction which is included in the first operation instruction. If a matrix operation formula is f(x)=A+B, where A and B are both matrices, the first operation instruction may not only carry the matrix operation formula, but may also carry a storage address of a matrix required by the matrix operation formula, such as a storage address of A: 0000-0FFF and a storage address of B: 1000-1FFF. For another instance, the first operation instruction may also carry identifiers of A and B, such as an identifier of A: 0101 and an identifier of B: 1010.

The matrix computing method further includes:

a step S302, sending, by the operating unit 203, a reading command to the memory 201 according to the matrix reading instruction.

An implementation of the step S302 may specifically include:

if the matrix reading instruction is a storage address of a required matrix, sending, by the operating unit 203, the reading command of reading the storage address to the memory 201; and obtaining, by the operating unit 203, a corresponding matrix in a batch reading manner; and if the matrix reading instruction is an identifier of a required matrix, reading, by the operating unit 203, a storage address corresponding to the identifier from a scalar data storage unit in a single reading manner according to the identifier; sending, by the operating unit 203, the reading command of reading the storage address to the memory 201; and obtaining, by the operating unit 203, a corresponding matrix in a batch reading manner.

The single reading manner may specifically be: reading single data for each time, such as data of 1 bit, multiple bits, 1 byte, 4 bytes, or 8 bytes. A reason for setting the single reading manner is that an occupied capacity of scalar data is small, while in the batch reading manner, an amount of read data is likely to be larger than a capacity of required data, which may lead to waste of bandwidths. Therefore, for scalar data, a single reading manner is used here to reduce waste of bandwidths.

The matrix computing method further includes:

a step S303, reading, by the operating unit 203, a matrix corresponding to the instruction in a batch reading manner; and performing, by the operating unit 203, the first operation instruction on the matrix.

The batch reading method in the step S303 may specifically be: reading multiple pieces of data for each time regardless of the amount of required data. This batch reading data manner is suitable for reading big data. For a matrix which occupies a large capacity, the single reading manner may lead to a slow reading speed. Therefore, the batch reading method used to obtain multiple pieces of data can facilitate more rapid matrix data reading, which may avoid the slow speed of matrix data reading from affecting matrix computing speed.

The computing device of the technical solution provided by the present disclosure includes a register unit which stores scalar data and a memory which stores matrix data. In the present disclosure, a unit reading manner and a batch reading manner are assigned to the two memories. For the matrix data, by allocating a data reading manner that matches characteristics of the matrix data, bandwidths may be fully utilized, and impacts of bandwidth bottlenecks on the matrix computing speed may be avoided. In addition, for the register unit which stores the scalar data, by setting a scalar data reading manner, the utilization rate of bandwidths may be improved. To summarize, technical solutions provided in the present disclosure may improve the utilization rate of bandwidths and avoid the impacts of bandwidths on the computing speed, which can improve the computing speed and efficiency.

Optionally, the performing the first operation instruction on the matrix may specifically be:

performing an n-stage pipeline computation on the matrix, specifically, performing a first pipeline stage computation on the matrix to obtain a first result, inputting the first result to a second pipeline stage for performing a second pipeline stage computation to obtain a second result, inputting a second result to a third pipeline stage for performing a third pipeline stage computation to obtain a third result, and after this process is repeated stage by stage, inputting an $n-1^{th}$ result to the $n^{th}$ pipeline stage for performing an $n^{th}$ pipeline stage computation to obtain an $n^{th}$ result, and inputting the $n^{th}$ result to the memory, where n may be an integer greater than or equal to 2. For instance, if n=3, an operation flowchart of the above pipeline stage is shown as FIG. 2B.

The first pipeline stage includes, but is not limited to, a matrix adder, a matrix multiplier, and the like.

The second pipeline stage includes, but is not limited to, a size comparator and the like.

The third pipeline stage includes, but is not limited to, a non-linear operating element, a matrix scalar multiplier, and the like.

A main purpose of dividing the matrix computation into three pipeline stages is to improve the computing speed. For matrix computations, for instance, a computing process of a general-purpose processor shown in FIG. 1A may include:

performing, by the processor, a computation on the matrix to obtain a first result, and storing the first result in the memory; reading, by the processor, the first result from the memory for performing a second computation to obtain a second result, and storing the second result in the memory; and reading, by the processor, the second result from the memory for performing a third computation to obtain a third result, and then storing the third result in the memory. From the above steps, it can be seen that during the matrix computation, the general-purpose processor does not divide the matrix computation into pipelines, so computed data needs to be stored after each computation, and then be read again in a next computation. In this case, this solution requires repetitive storage and reading of data. For the technical solution of this present disclosure, the first result of the first pipeline stage computation is directly input into the second pipeline for computation, and the second result of the second pipeline stage computation is directly input to the third pipeline stage for computation. The first result and the second result obtained by computations in the first pipeline stage and the second pipeline stage do not need to be stored, which may reduce an occupied space of the memory, avoid multiple storage and reading of the results, and improve the utilization rate of bandwidth, thus the computing efficiency may be further improved.

In another example, various pipeline components may be freely combined or the first pipeline stage may be adopted. For instance, the second pipeline stage may be combined with the third pipeline stage, or the first, the second, and the third pipeline stage may be combined, or each pipeline stage may be responsible for different operations. For instance, the first stage pipeline is responsible for comparison operations and partial multiplication operations, while the second stage pipeline is responsible for operation combinations such as non-linear operations and matrix scalar multiplication.

Optionally, the computing device may further include: a caching unit 204 configured to cache a first operation instruction. During execution, the instruction is also cached in the caching unit. After an instruction is executed, if the instruction is an earliest one of unsubmitted instructions in the caching unit, the instruction is submitted. Once the instruction is submitted, changes in the status of the device caused by operations of the instruction cannot be withdrew. In an example, the instruction caching unit may be a reordering cache.

Optionally, before the step S301, the method may further include:

determining whether there is an association relationship between the first operation instruction and a second operation instruction before the first operation instruction; if there is an association relationship between the first operation instruction and the second operation instruction, after the second operation instruction is executed, fetching the first operation instruction from the caching unit and sending the first operation instruction to the operating unit 203; and if there is no association relationship between the first operation instruction and the second operation instruction, directly sending the first operation instruction to the operating unit.

An implementation of the determining whether there is an association relationship between the first operation instruction and the second operation instruction before the first operation instruction may include:

fetching a first storage address interval of a matrix required by the first operation instruction according to the first operation instruction, and fetching a second storage address interval of a matrix required by the second operation instruction according to the second operation instruction; if the first storage address interval and the second storage address interval have an overlapped area, determining that there is an association relationship between the first operation instruction and the second operation instruction; and if the first storage address interval and the second storage address interval have no overlapped area, determining that there is no association relationship between the first operation instruction and the second operation instruction.

Presence of an overlapped area in the storage address intervals indicates that the first operation instruction and the second operation instruction access a same matrix. Since a storage space of a matrix is relatively large, if, for instance, a same storage area is used as a condition to determine whether there is an association relationship, a possible situation is that a storage area accessed by the second operation instruction includes a storage area accessed by the first operation instruction. For instance, the second operation instruction accesses the storage area of an A matrix, the storage area a B matrix, and the storage area of a C matrix, if the storage area of A is adjacent to the storage area of B or the storage area of C, the storage area accessed by the second operation instruction is the storage areas of A and B, and the storage area of C, or the storage areas of A and C, and the storage area of B. In this situation, if the first operation instruction accesses storage areas of the A matrix and a D matrix, the storage area of the matrix accessed by the first operation instruction cannot be the same as the storage area of the matrix accessed by the second operation instruction. If the same condition is used to determine there is an association relationship, it is determined that there is no association relationship between the first operation instruction and a second operation instruction, however, in practice there is an association relationship between the first operation instruction and the second operation instruction. Therefore, in the present disclosure, whether there is an overlapped area is used as a condition to determine whether there is an association relationship, which may avoid misjudgment of the above situation.

A practical instance is described below to explain which situations belong to the association relationship and which situations belong to the non-association relationship. For instance, the matrices required by the first operation instruction are the A matrix and the D matrix, the storage areas of which are [0001, 0FFF] and [A000, AFFF] respectively; and the matrices required by the second operation instruction are the A matrix, the B matrix, and the C matrix, the corresponding storage areas of which are [0001, 0FFF], [1000, 1FFF], and [B000, BFFF] respectively. For the first operation instruction, the corresponding storage areas are: [0001, 0FFF] and [A000, AFFF], while for the second operation instruction, the corresponding storage areas are: [0001, 1FFF] and [B000, BFFF], so the storage areas of the second operation instruction and the storage areas of the first operation instruction have an overlapped area [0001, 0FFF]. Therefore, the first operation instruction and the second operation instruction have an association relationship.

For another instance, the matrices required by the first operation instruction are an E matrix and the D matrix, the storage areas of which are [C000, CFFF] and [A000, AFFF] respectively; and the matrices required by the second operation instruction are the A matrix, the B matrix, and the C matrix, the corresponding storage areas of which are [0001, 0FFF], [1000, 1FFF], and [B000, BFFF] respectively. For the first operation instruction, the corresponding storage areas are: [C000, CFFF] and [A000, AFFF], while for the second operation instruction, the corresponding storage areas are: [0001, 1FFF] and [B000, BFFF], so the storage areas of the second operation instruction and the storage areas of the first operation instruction have no overlapped area. Therefore, the first operation instruction and the second operation instruction have no association relationship.

FIG. 4 is a schematic diagram of a format of an instruction set according to an example of the present disclosure. An ellipsis in FIG. 4 indicates that multiple registers or immediate numbers may be included. As shown in FIG. 4, an operation instruction includes an operation code and at least one operation field. The operation code is configured to indicate a function of the operation instruction, and an operating unit can perform different matrix operations by identifying the operation code. The operation field is configured to indicate data information of the operation instruction, where the data information may be an immediate value or a register serial number. For instance, to obtain a matrix, the start address and the length of the matrix may be obtained in a corresponding register according to the register number, and then a matrix stored at a corresponding address is obtained from a storage medium according to the matrix start address and the matrix length.

The instruction set includes operation instructions with different functions:

a Matrix-Mult-Vector instruction (MMV): according to this instruction, a device fetches matrix data and vector data of a set length from a specified address of a memory (preferably a scratchpad memory or a scalar register file), performs a matrix-multiply-vector operation in the operating unit, and writes a result back, preferably, writes the result back to the specified address of the memory (preferably the scratchpad memory or the scalar register file); it is worth noting that the vector can be stored in the memory (preferably the scratchpad memory or the scalar register file) as a special form of matrix (a matrix with only one row of elements);

a Vector-Mult-Matrix instruction (VMM): according to this instruction, the device fetches vector data and matrix data of a set length from a specified address of a memory (preferably a scratchpad memory or a scalar register file), performs a vector-multiply-matrix operation in the operating unit, and writes a result back, preferably, writes the result back to the specified address of the memory (preferably the scratchpad memory or the scalar register file); it is worth noting that the vector can be stored in the memory (preferably the scratchpad memory or the scalar register file) as a special form of matrix (a matrix with only one row of elements);

a Matrix-Mult-Scalar instruction (MMS): according to this instruction, the device fetches matrix data of a set length from a specified address of a memory (preferably a scratchpad memory or a scalar register file), fetches matrix data of a specified size from a specified address of the scalar register file, performs a vector—multiply-matrix operation in the operating unit, and writes a result back, preferably, writes the result back to the specified address of the memory (preferably the scratchpad memory or the scalar register file); it is worth noting that the scalar register file not only stores the address of the matrix, but also stores scalar data;

a Tensor Operation instruction (TENS): according to this instruction, the device fetches two pieces of matrix data of a set length from two specified addresses of a memory (preferably a scratchpad memory or a scalar register file), performs a tensor operation on the two pieces of matrix data in the operating unit, and writes a result back, preferably, writes the result back to the specified address of the memory (preferably the scratchpad memory or the scalar register file);

a Matrix-Add-Matrix instruction (MA): according to this instruction, the device fetches two pieces of matrix data of a set length from two specified addresses of a memory (preferably a scratchpad memory or a scalar register file), performs an addition operation on the two pieces of matrix data in the operating unit, and writes a result back, preferably, writes the result back to the specified address of the memory (preferably the scratchpad memory or the scalar register file);

a Matrix-Sub-Matrix instruction (MS): according to this instruction, the device fetches two pieces of matrix data of a set length from two specified addresses of a memory (preferably a scratchpad memory or a scalar register file), performs a subtraction operation on the two pieces of matrix data in the operating unit, and writes a result back, preferably, writes the result back to the specified address of the memory (preferably the scratchpad memory or the scalar register file);

a Matrix-Retrieval instruction (MR): according to this instruction, the device fetches vector data of a set length from a specified address of a memory (preferably a scratchpad memory or a scalar register file), fetches matrix data of a specified size from a specified address of the memory (preferably the scratchpad memory or the scalar register file); in the operating unit, the vector is an index vector; an $i^{th}$ element in an output vector is a number found in an $i^{th}$ column of the matrix with an $i^{th}$ element of the index vector as an index, and the output vector is written back to the specified address of the memory (preferably the scratchpad memory or the scalar register file);

a Matrix-Load instruction (ML): according to this instruction, the device loads data of a set length from a specified external source address to a specified address of a memory (preferably a scratchpad memory or a scalar register file);

a Matrix-Store instruction (MS): according to this instruction, the device stores matrix data of a set length in a specified address of a memory (preferably the scratchpad memory or the scalar register file) into an external target address; and a Matrix-Move instruction (MMOVE): according to this instruction, the device stores matrix data of a set length in a specified address of a memory (preferably a scratchpad memory or a scalar register file) to another specified address of the memory (preferably the scratchpad memory or the scalar register file).

The set length in the above instructions can be determined by a user. In an optional example, the user may set the length to a value. In practical applications, the user may also set the length to multiple values. A specific value and the number of the set length are not limited in specific implementations of the present disclosure. In order to make purposes, technical solutions, and advantages of the present disclosure more clear, the present disclosure will be further described in detail below with reference to specific examples and the accompanied drawings.

FIG. 5 is another computing device 50 according to an example of the present disclosure. Specific implementations, refinement schemes, or technical effects of the example shown in FIG. 5 will not be further described herein. For details, please refer to FIG. 2 or FIG. 3. As shown in FIG. 5, the computing device 50 includes: a memory 501, a scalar data storage unit 502 (preferably a scalar register unit), a computing (matrix computing) unit 503, and a control unit 504; where the memory 501 is configured to store a matrix;

the scalar data storage unit 502 is configured to store scalar data, where the scalar data includes at least: a storage address of the matrix in the memory;

the control unit 504 is configured to control the matrix computing unit to obtain a first operation instruction, where the first operation instruction includes a matrix reading instruction for a matrix required for executing the instruction; and the computing unit 503 is configured to send a reading command to the memory according to the matrix reading instruction, read a matrix corresponding to the matrix reading instruction in a batch reading manner, and execute the first operation instruction on the matrix.

Optionally, the matrix reading instruction includes: a storage address of a matrix required by the instruction or an identifier of a matrix required by the instruction.

Optionally, when the matrix reading instruction is the identifier of the matrix required by the instruction, the control unit 504 is configured to control the computing unit to read a storage address corresponding to the identifier from the register unit according to the identifier in a unit reading manner, and control the computing unit to send a reading command of reading the storage address to the memory and obtain the matrix in a batch reading manner.

Optionally, the computing unit 503 is configured to perform a first pipeline stage computation on the matrix to obtain a first result, input the first result to a second pipeline stage for performing a second pipeline stage computation to obtain a second result, input a second result to a third pipeline stage for performing a third pipeline stage computation to obtain a third result, and after this process is repeated stage by stage, input an $n-1^{th}$ result to the $n^{th}$ pipeline stage for performing an $n^{th}$ pipeline stage computation to obtain an $n^{th}$ result, and input the $n^{th}$ result to the memory, where n may be an integer greater than or equal to 2.

Optionally, the computing device further includes:

a caching unit 505 configured to cache an operation instruction to be executed; and the control unit 504 configured to cache the operation instruction to be executed in the caching unit 505.

Optionally, the control unit 504 is configured to determine whether there is an association relationship between the first operation instruction and a second operation instruction before the first operation instruction; if there is an association relationship between the first operation instruction and the second operation instruction, the control unit is configured to cache the first operation instruction in the caching unit, and after the second operation instruction is executed, fetch the first operation instruction from the caching unit and send the first operation instruction to the computing unit.

The determining whether there is an association relationship between the first operation instruction and the second operation instruction before the first operation instruction by the control unit 504 includes:

the control unit 504 fetches a first storage address interval of a matrix required by the first operation instruction according to the first operation instruction, and fetches a second storage address interval of a matrix required by the second operation instruction according to the second operation instruction; if the first storage address interval and the second storage address interval have an overlapped area, the control unit 504 determines that there is an association relationship between the first operation instruction and the second operation instruction; and if the first storage address space and the second storage address space have no overlapped area, the control uni 504 determines that there is no association relationship between the first operation instruction and the second operation instruction.

Optionally, the control unit 503 may be configured to obtain an operation instruction from an instruction caching unit, process the operation instruction, and provide a processed operating instruction to the computing unit. The control unit 503 may be divided into three modules: an instruction fetching module 5031, a decoding module 5032, and an instruction queue module 5033; where the instruction fetching module 5031 is configured to obtain operation instructions from the instruction caching unit;

the decoding module 5032 is configured to decode obtained operation instructions; and the instruction queue nodule 5033 is configured to sequentially store decoded operation instructions. Since different instructions may have dependency relationships in terms of registers included by the instruction, the instruction queue module is configured to cache the decoded instructions, and issue the instructions after the dependency relationships are satisfied.

Figure 6:
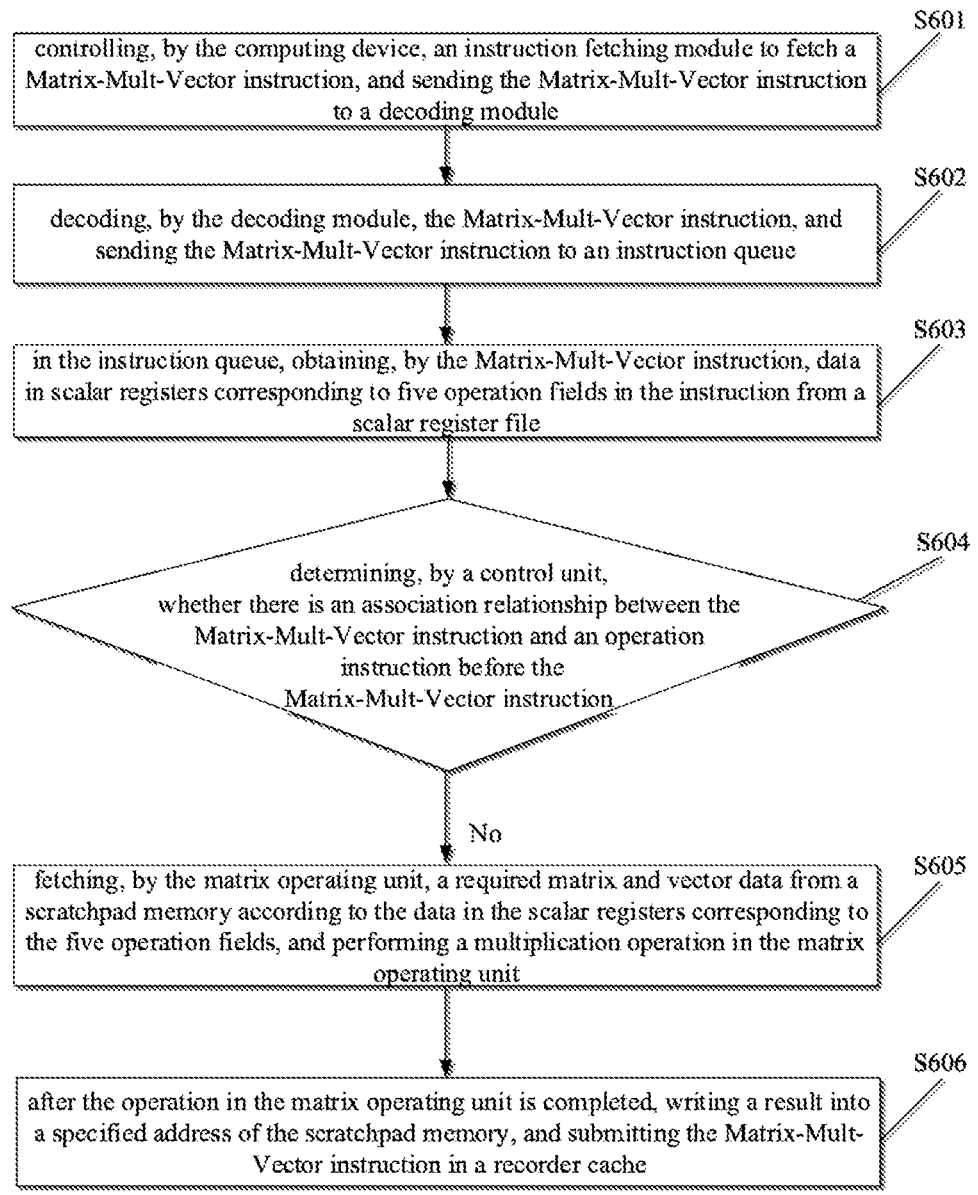
FIG. 6 is a flowchart of executing a Matrix-Mult-Vector instruction by a computing device according to an example of the present disclosure.

FIG. 6 is a flowchart of executing a Matrix-Mult-Vector instruction by a computing device according to an example of the present disclosure. For a hardware structure of the computing device shown in FIG. 6, please refer to the structure shown in FIG. 5. As an instance, the memory shown in FIG. 5 uses a scratchpad memory, and the process of executing a matrix multiply vector instruction includes:

a step S601, controlling, by the computing device, an instruction fetching module to fetch a Matrix-Mult-Vector instruction, and sending the Matrix-Mult-Vector instruction to a decoding module;

a step S602, decoding, by the decoding module, the Matrix-Mutt-Vector instruction, and sending the Matrix-Mult-Vector instruction to an instruction queue;

a step S603, in the instruction queue, obtaining, by the Matrix-Mult-Vector instruction, data in scalar registers corresponding to five operation fields in the instruction from a scalar register file, where the data includes an input vector address, an input vector length, an input matrix address, an output vector address, and an output vector length;

a step S604, determining, by a control unit, whether there is an association relationship between the Matrix-Mult-Vector instruction and an operation instruction before the Matrix-Mutt-Vector instruction; if there is an association relationship, storing the Matrix-Mult-Vector instruction in a caching unit; if there is no association relationship, sending the Matrix-Mult-Vector instruction to an operating unit;

a step S605, fetching, by the operating unit, a required matrix and vector data from the scratchpad memory according to the data in the scalar registers corresponding to the five operation fields, and performing a multiplication operation in the operating unit; and a step S606, after the operation in the operating unit is completed, writing a result into a specified address of a memory (preferably a scratchpad memory or a scalar register file), and submitting the Matrix-Mult-Vector instruction in a reorder cache.

The above matrix computation instructions in FIG. 6 use the Matrix-Mult-Vector instruction as an instance. In practical applications, the Matrix-Mult-Vector instruction in the example shown in FIG. 6 may be replaced by the Vector-Mult-Matrix instruction, the Matrix-Mult-Scalar instruction, the Tensor Operation instruction, the Matrix-Add-Matrix instruction, the Matrix-Sub-Matrix instruction, the Matrix-Retrieval instruction, the Matrix-Load instruction, the Matrix-Store instruction, or the Matrix-Move instruction, all of which are not described further herein.

Figure 6A:
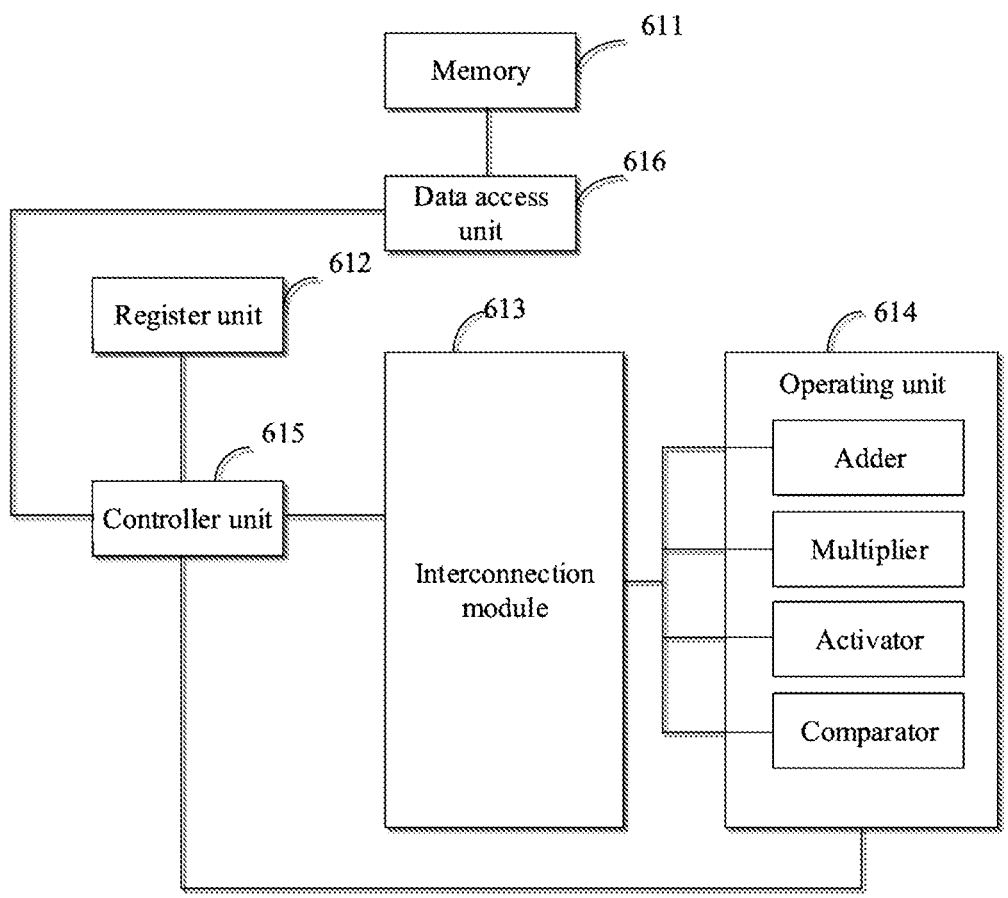
FIG. 6A is another schematic structural diagram of a computing device according to an example of the present disclosure.

FIG. 6A illustrates a computing device which includes a memory 611 (optional), a register unit 612, an interconnection module 613, an operating unit 614, a control unit 615, and a data access unit 616; where the operating unit 614 includes at least two of an adder, a multiplier, a comparator, and an activator;

the interconnection module 613 is configured to control a connection relationship of computing elements in the operating unit 614 to enable the at least two of the computing elements to form different computing topologies; and an instruction storage unit (which may be a register unit, an instruction cache, or a scratchpad memory) 612 is configured to store the operation instruction, an address of a data block in a storage medium, and a computing topology corresponding to an operation instruction.

The operation instruction may include an operation field and an operation code. For instance, in a convolutional operating instruction, as shown in Table 1, a register 0, a register 1, a register 2, a register 3, and a register 4 may be operation fields, where the register 0, the register 1, the register 2, the register 3, and the register 4 may be one or more registers.

data block to obtain an operation result. The operating unit 614 then transfers the operation result to the data access unit, and stores the operation result in the memory. In an example, the execution instruction calls the computing elements to perform an operation on the data block according to the first computing topology to obtain an operation result, transfers the operation result to the data access unit, and stores the operation result in the memory.

In an optional example, the first computing topology may be: the multiplier—the adder—the adder—the activator.

A specific computing method of the computing device shown in FIG. 6A is described below through different operation instructions. A convolutional computation instruction is used as an instance of the operation instructions. The convolutional computation instruction can be applied to a neural network, so the convolution computation instruction can also be called a convolutional neural network. For a convolution computation instruction, an actual formula to be executed may be: $S=s(\Sigma wx, +b)$, which can be viewed as multiplying a convolution kernel W and input data $x_i$, performing a summation, adding a bias b, and then performing an activation operation to obtain a final output result S. According to the formula, the computing topology may be obtained as: the multiplier—the adder—(optional) the activator.

| Operation code | Register 0 | Register 1 | Register 2 | Register 3 | Register 4 |
|---|---|---|---|---|---|
| COMPUTE | Start address of input data | Length of input data | Start address of a convolution kernel | Length of a convolution kernel | Address of an activation function interpolation table |
| IO | Address of a data external memory | Length of data | Address of a data internal memory | | |
| NOP | | | | | |
| JUMP | Target address | | | | |
| MOVE | Input address | Size of data | Output address | | |

The memory 611 may be an off-chip memory. In actual applications, referring to FIG. 6D, if the memory 611 is an on-chip memory, the on-chip memory may be a cache, and may specifically be a scratchpad memory for storing a data block. The data block may be n-dimensional data, where n is an integer greater than or equal to 1. For instance, if n=1, the data block is one-dimensional data (a vector), if n=2, the data block is two-dimensional data (a matrix), and if n=3 or n>3, the data block is multi-dimensional data.

The control unit 615 is configured to fetch an operation instruction, an operation field corresponding to the operation instruction, and a first computing topology corresponding to the operation instruction from the register unit 612, and decode the operation instruction into an execution instruction, where the execution instruction is configured to control the operating unit to perform an operation and transmit the operation field to the data access unit 616.

The data access unit 616 is configured to fetch a data block corresponding to the operation field from the memory 611 and transfer the data block to the interconnection module 613.

The interconnection module 613 is configured to receive a data block and send the data block to the operating unit 614.

The execution instruction calls the computing elements of the operating unit 614 for performing an operation on the The convolutional computing instruction may include an instruction set, where the instruction set includes a convolutional neural network instruction, a convolutional neural network COMPUTE instruction with different functions and a CONFIG instruction, an IO instruction, an NOP instruction, a JUMP instruction, and an MOVE instruction. In an example, the COMPUTE instruction includes:

a convolutional neural network instruction: according to this instruction, a device fetches input data and a convolution kernel of a specified size from a specified address of a memory (preferably a scratchpad memory or a scalar register file), and performs a convolution operation in a convolutional operation component to obtain an output result directly; in other words, the device, according to the instruction, does not perform subsequent operations, but directly performs a convolution operation to obtain an output result;

a convolutional neural network sigmoid instruction: according to this instruction, the device fetches input data and a convolution kernel of specified sizes respectively from a specified address of a memory (preferably a scratchpad memory or a scalar register file), performs a convolution operation in the convolutional operation component, and then outputs a result for a sigmoid activation;

a convolutional neural network TanH instruction: according to this instruction, the device fetches input data and a convolution kernel of specified sizes respectively from a specified address of a memory (preferably a scratchpad memory), performs a convolution operation in the convolutional operation component, and optionally, outputs a result for a TanH activation;

a convolutional neural network ReLU instruction: according to this instruction, the device fetches input data and a convolution kernel of specified sizes respectively from a specified address of a memory (preferably a scratchpad memory), performs a convolution operation in the convolution operation component, and optionally, outputs a result for a ReLU activation; and a convolutional neural network group instruction: according to this instruction, the device fetches input data and a convolution kernel of specified sizes respectively from a specified address of a memory (preferably a scratchpad memory), performs a convolution operation in the convolution operation component after grouping the input data and the convolution kernel into groups, and optionally, outputs a result for activation.

The CONFIG instruction configures various constants required for an operation of a current layer before the operation for each layer of artificial neural network starts.

The IO instruction is responsible for reading input data required for an operation from an external memory space and storing the data back to the external space after the operation is completed.

The NOP instruction is responsible for clearing control signals in all control signal caching queues in a current device to ensure that all instructions before the NOP instruction are executed. The NOP instruction itself does not contain any operations.

The JUMP instruction is responsible for controlling jump of a next instruction address to be read from an instruction storage unit for the jump of a control flow.

The MOVE instruction is responsible for moving data at a certain address space in the device's internal address space to another address in the device's internal address space. This process is independent of the operating unit and does not occupy the resources of the operating unit during execution.

As shown in FIG. 6A, the method for executing the convolutional computation instruction by the computing device may specifically be:

fetching, by the control unit 615, the convolutional computation instruction and an operation field corresponding to the convolutional computation instruction from the register unit 612; and transferring, by the control unit, the operation field to the data access unit;

fetching, by the data access unit, the convolution kernel w and the bias b corresponding to the operation field from the memory (if b=0, the bias b does not need to be fetched); and transferring the convolution kernel w and the bias b to the operating unit; and performing, by the multiplier of the operating unit, a multiplication operation on the convolution kernel w and the input data Xi to obtain a first result, inputting the first result to the adder for performing an addition operation to obtain a second result, performing an addition operation on the second result and the bias b to obtain a third result, inputting the third result to the activator for performing an activation operation to obtain an output result S, transferring the output result S to the data access unit, and storing the output result in the memory. After each step, the output result can be directly transferred to the data access unit and stored in the memory. In addition, the step of performing the addition operation on the second result and the bias b to obtain the third result is an optional step, in other words, this step is not needed when b=0.

In the technical solutions provided in the present disclosure, the convolution operation is implemented by an instruction, namely, the convolution computation instruction. Intermediate data (such as the first result, the second result, and the third result) in the convolution operation does not need to be stored or fetched, which may reduce storage and fetchion operations of the intermediate data. Therefore, the technical solutions may have the technical effects of reducing corresponding operation steps and improving the computing effect of convolution.

Figure 6B:
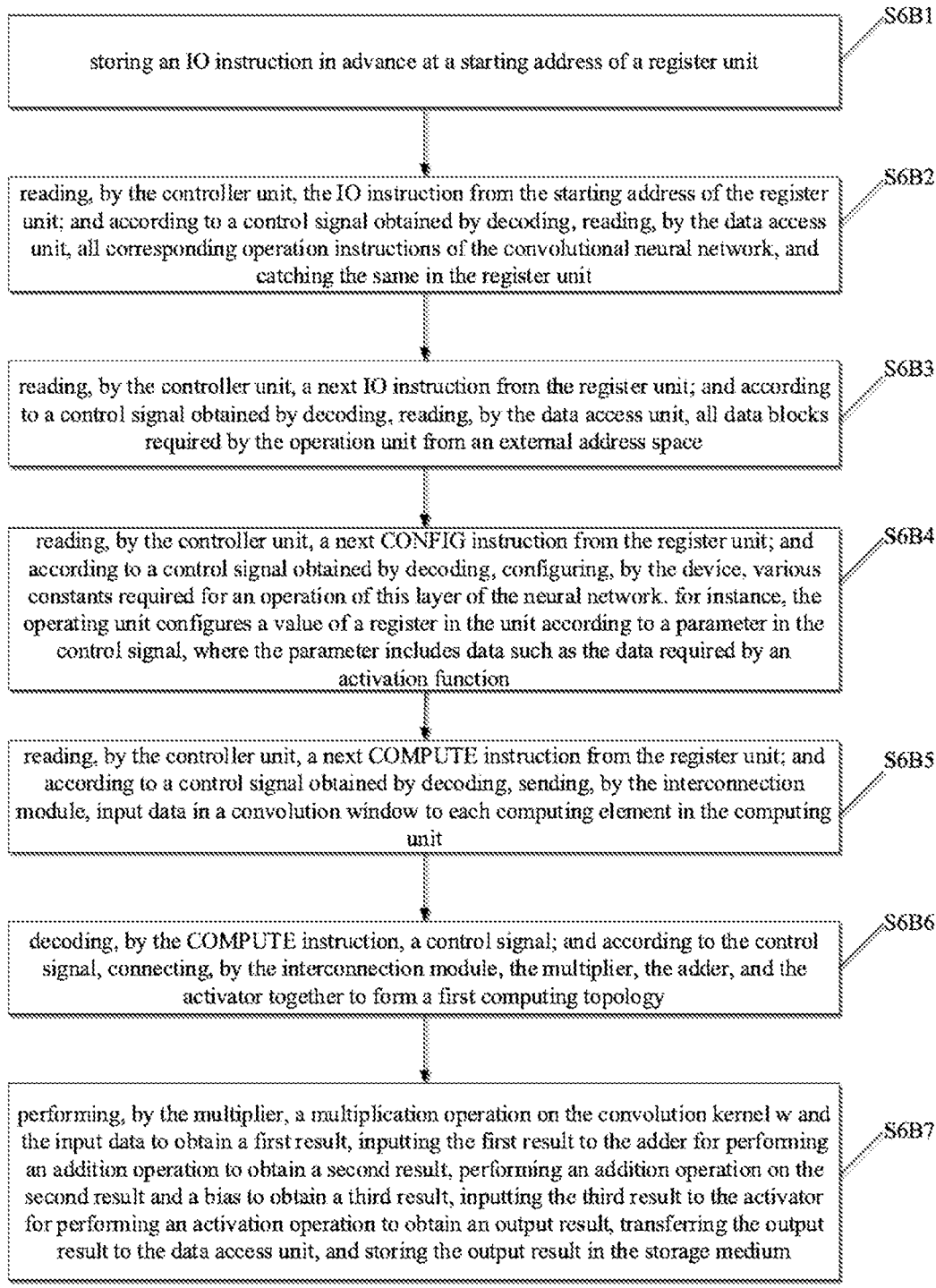
FIG. 6B is a schematic flowchart of a convolution computation instruction according to an example of the present disclosure.

FIG. 6B is a flowchart of executing a convolutional neural network by a convolutional neural network operation device according to an example of the present disclosure. As shown in FIG. 6B, a process of executing the convolutional neural network instruction includes:

a step S6B1, storing an IO instruction in advance at a starting address of an instruction storage unit;

a step S6B2, reading, by the controller unit, the IO instruction from the starting address of the instruction storage unit; and according to a control signal obtained by decoding, reading, by the data access unit, all corresponding operation instructions of the convolutional neural network, and caching the same in the instruction storage unit;

a step S6B3, reading, by the controller unit, a next IO instruction from the instruction storage unit; and according to a control signal obtained by decoding, reading, by the data access unit, all data blocks (such as input data, an interpolation table for quickly performing an activation function operation, a constant table for configuring operation device parameters, bias data, etc.) required by the operating unit from the memory;

a step S6B4, reading, by the controller unit, a next CONFIG instruction from the instruction storage unit; and according to a control signal obtained by decoding, configuring, by the device, various constants required for an operation of this layer of the neural network. For instance, the operating unit configures a value of a register in the unit according to a parameter in the control signal, where the parameter includes data such as the data required by the activation function.

The process of executing the convolutional neural network instruction further includes:

a step S6B5, reading, by the controller unit, a next COMPUTE instruction from the instruction storage unit; and according to a control signal obtained by decoding, sending, by the interconnection module, input data in a convolution window to each computing element in the computing unit;

a step S6B6, decoding, by the COMPUTE instruction, a control signal; and according to the control signal, connecting, by the interconnection module, the multiplier, the adder, and the activator together to form the first computing topology; and a step S6B7, performing, by the multiplier, a multiplication operation on the convolution kernel w and the input data Xi to obtain a first result, inputting the first result to the adder for performing an addition operation to obtain a second result, performing an addition operation on the second result and the bias b to obtain a third result, inputting the third result to the activator for performing an activation operation to obtain an output result S, transferring the output result S to the data access unit, and storing the output result S in the storage medium. In addition, the step of performing the addition operation on the second result and the bias b to obtain the third result is an optional step, in other words, this step is not needed when b=0.

A specific computing method of the computing device shown in FIG. 6A is described below through different operation instructions. A forward operation instruction of a fully connected layer is used as an instance of the operation instructions. The forward operation instruction of a fully connected layer can be applied to a neural network. For a forward operation instruction of a fully connected layer, an actual formula to be executed may be: out=f (w1*in+b), where output refers to an output neuron vector, in refers to an input neuron vector, b refers to a bias vector, w1 refers to a weight, and f refers to an activation function. According to the formula, the computing topology may be obtained as: the multiplier—the adder—the activator. In practical applications, the bias b may also be 0, and a specific value of the bias b may be determined by the forward operation instruction of a fully connected layer.

An instruction set for the forward operation of an artificial neural network fully connected layer includes: a CONFIG instruction, a COMPUTE instruction, an IO instruction, a NOP instruction, a JUMP instruction, a MOVE instruction, and the like.

Before the operation for each layer of the artificial neural network starts, the CONFIG instruction configures various constants required for a current layer operation.

For the forward operation instruction of a fully connected layer, according to the CONFIG instruction, the device fetches weight data and bias data from a specified address of the memory, performs a fully connected operation in the computing unit, and writes a result back. Preferably, the result is written back to a specified address of the memory (preferably a scratchpad memory or a scalar register file). The IO instruction reads input data required for the computation from the memory and stores data back to an external space after the computation is completed.

The NOP instruction is responsible for clearing control signals in all control signal caching queues in a current device to ensure that all instructions before the NOP instruction are instructed. The NOP instruction itself does not contain any operations.

The JUMP instruction is responsible for controlling jump of a next instruction address to be read from the instruction storage unit for the jump of a control flow.

The MOVE instruction is responsible for moving the data at a certain address of the device's internal address space to another address in the device's internal address space. This process is independent of the operating unit and does not occupy resources of the operating unit during execution.

A specific method for executing the forward operation instruction of a fully connected layer by the computing device shown in FIG. 6A may include:

fetching, by the control unit 615, the forward operation instruction of a fully connected layer and an operation field corresponding to the forward operation instruction of a fully connected layer from the register unit 612, and transferring, by the control unit, the operation field to the data access unit;

fetching, by the data access unit, the weight w1 and the bias b corresponding to the operation field from the storage medium, and transferring the weight w1 and the bias b to the operating unit; and performing, by the operating unit, the operation according to a second computation topology (the multiplier—the adder—(optional) the activator), which specifically includes: performing, by the multiplier, a multiplication operation on the weight w1 and the input data in to obtain a first result, inputting the first result and the bias to the adder for performing an addition operation to obtain a second result, inputting the second result to the activator for performing an activation operation on the second result to obtain an output result, transferring the output result to the data access unit, and storing the output result in the memory. After each step, the output result can be directly transferred to the data access unit and stored in the memory, so the subsequent steps are not needed. In addition, the step of performing the addition operation on the first result and the bias to obtain the second result is not needed when the bias b=0.

Figure 6C:
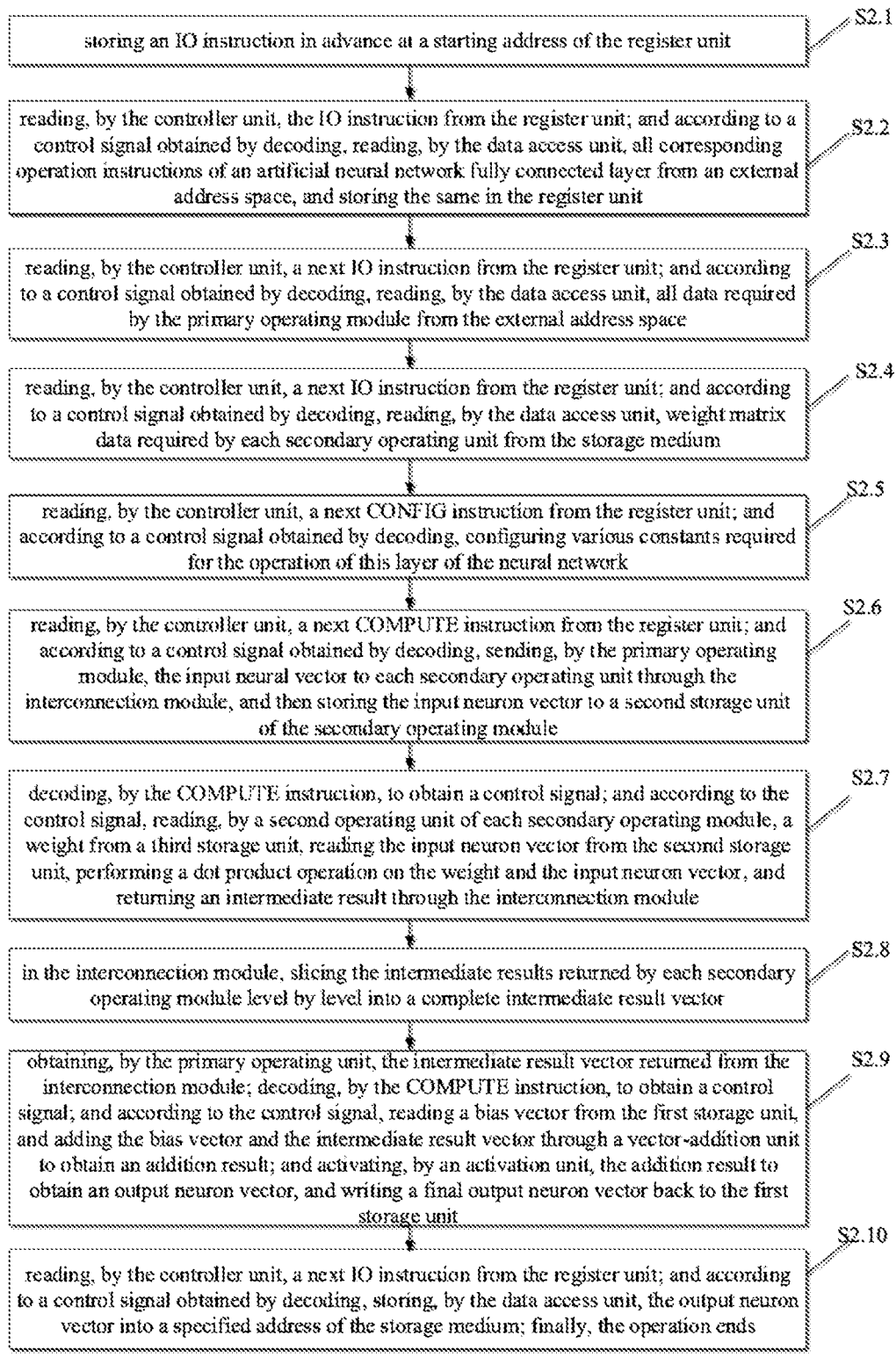
FIG. 6C is a schematic flowchart of a forward operation instruction of a fully connected layer according to an example of the present disclosure.

FIG. 6C illustrates another detailed implementation for a forward operation process of a single fully connected layer of an artificial neural network. The method shown in FIG. 6C is implemented in a computing device. The operating unit in the computing device includes a primary operating unit and one or more secondary operating units. In the method shown in FIG. 6C, a plurality of secondary operating units are used as an instance to illustrate the computing device. The above interconnection module is connected to the primary operating unit and the plurality of secondary operating units, and may be a tree structure, a ring structure, a grid structure, a hierarchical interconnection, or a bus structure. The method includes:

a step S2.1, storing a first IO instruction in advance in the instruction storage unit;

a step S2.2, reading, by the controller unit, the first IO instruction from the instruction storage unit; and according to a control signal obtained by decoding, reading, by the data access unit, all corresponding operation instructions of an artificial neural network fully connected layer from the memory, and storing the same in the instruction storage unit;

a step S2.3, reading, by the controller unit, a second IO instruction from the instruction storage unit; and according to a control signal obtained by decoding, reading, by the data access unit, all data (such as an input neuron vector, an interpolation table, a constant table, bias, etc.) required by the primary operating unit from the memory to a first storage unit of the primary operating unit;

a step S2.4, reading, by the controller unit, a third IO instruction from the instruction storage unit; and according to a control signal obtained by decoding, reading, by the data access unit, weight matrix data required by each secondary operating unit (the adder or the multiplier) from the memory;

a step S2.5 (optional), reading, by the controller unit, the CONFIG instruction from the instruction storage unit; and according to a control signal obtained by decoding, configuring various constants required for the operation of this layer of the neural network;

a step S2.6, reading, by the controller unit, the forward operation instruction of a fully connected layer from the instruction storage unit; and according to a control signal obtained by decoding, sending, by the primary operating unit, the input neuron vector to each secondary operating unit through the interconnection module, and then storing the input neuron vector to a second storage unit of the secondary operating unit;

a step S2.7, decoding, by the COMPUTE instruction, to obtain a control signal; and according to the control signal, reading, by a second operating unit of each secondary operating unit, the weight from the third storage unit, reading the input neuron vector from the second storage unit, performing a dot product operation on the weight and the input neuron vector, and returning an intermediate result through the interconnection module;

a step S2.8, in the interconnection module, slicing the intermediate results returned by each secondary operating unit level by level into a complete intermediate result vector;

a step S2.9, obtaining, by the primary operating unit, the intermediate result vector returned from the interconnection module; decoding, by the COMPUTE instruction, to obtain a control signal; and according to the control signal, reading a bias vector from the first storage unit, and adding the bias vector and the intermediate result vector through a vector-addition unit to obtain an addition result; and activating, by an activation unit, the addition result to obtain an output neuron vector, and writing a final output neuron vector back to the first storage unit; and a step S2.10, reading, by the controller unit, a fourth next IO instruction from the instruction storage unit; and according to a control signal obtained by decoding, storing, by the data access unit, the output neuron vector into a specified address of the memory; finally, the operation ends.

A specific computing method of the computing device shown in FIG. 6A is described below through different operation instructions. A pooling operation instruction is used as an instance of the operation instructions. The pooling operation instruction can be applied to machine learning such as a neural network. The pooling operation refers to a downsampling operation of local features in a feature layer of the neural network to reduce dimensions of the feature layer. The pooling operation includes, but is not limited to, three types: maxpooling, which refers to using a maximum value as a result in a kernel; avgpooling, which refers to using an average value as a result in a kernel; minpooling, which refers to using a minimum value as a result in a kernel. The kernel here refers to a pooling kernel, a size of which is specified by parameters. The kernel slides on the feature layer according to a stride for performing a pooling operation to obtain a result. For a pooling operation instruction, an actual formula that needs to be calculated can be: out=avg (in)=$\Sigma$in*1/kernel_area, where out refers to an output neuron vector, in refers to all the input neuron vectors in each kernel, and kernel_area refers to an area of the pooling kernel (a total count of the numbers in the kernel). The above pooling may be average pooling according to actual algorithm needs. In actual applications, the pooling may also be max pooling, min pooling, or other forms of pooling. According to this actual operation, the computing topology may be obtained as: (optional) the multiplier—the adder/comparator—(optional) the activator.

A pooling instruction set includes a CONFIG instruction, a COMPUTE instruction, an IO instruction, an NOP instruction, a JUMP instruction, and a MOVE instruction.

The CONFIG instruction configures various constants required for an operation of a current layer before performing an operation of each layer of an artificial neural network; for instance, 1/kernel_area can be obtained by configuring the CONFIG instruction.

The COMPUTE instruction includes a pooling operation instruction, where the pooling operation instruction includes:

a Maxpooling forward operation instruction: according to this instruction, a device fetches input data of a specified size from a specified address of a memory (preferably a scratchpad memory or a scalar register file), performs a Maxpooling forward operation in a pooling component, and writes an output result back to the specified address of the memory (preferably the scratchpad memory or the scalar register file);

a Maxpooling backward training instruction: according to this instruction, a device fetches input data of a specified size from a specified address of a memory (preferably a scratchpad memory or a scalar register file), performs a Maxpooling backward training operation in pooling component, and writes an output result back to the specified address of the memory (preferably the scratchpad memory or the scalar register file);

an Avgpooling forward operation instruction: according to this instruction, a device fetches input data of a specified size from a specified address of a memory (preferably a scratchpad memory or a scalar register file), performs an Avgpooling forward operation in pooling component, and writes an output result back to the specified address of the memory (preferably the scratchpad memory or the scalar register file);

an Avgpooling backward training instruction: according to this instruction, a device fetches input data of a specified size from a specified address of a memory (preferably a scratchpad memory or a scalar register file), performs an Avgpooling backward training operation in pooling component, and writes an output result back to the specified address of the memory (preferably the scratchpad memory or the scalar register file);

a Mingpooling forward operation instruction: according to this instruction, a device fetches input data of a specified size from a specified address of a memory (preferably a scratchpad memory or a scalar register file), performs a Minpooling forward operation in pooling component, and writes an output result back to the specified address of the memory (preferably the scratchpad memory or the scalar register file); and a Minpooling backward training instruction: according to this instruction, a device fetches input data of a specified size from a specified address of a memory (preferably a scratchpad memory or a scalar register file), performs a Minpooling backward training operation in pooling component, and writes an output result back to the specified address of the memory (preferably the scratchpad memory or the scalar register file).

The IO instruction is responsible for reading in input data required for the operation from the storage medium and storing the data back to an external space after the operation is completed.

The NOP instruction is responsible for clearing microinstructions in all microinstruction caching queues of a current device, and ensuring that all the instructions before the NOP instruction are completely executed. The NOP instruction itself does not contain any computations.

The JUMP instruction is responsible for controlling jump of a next instruction address to be read from the instruction storage unit for the jump of a control flow.

The MOVE instruction is responsible for moving the data at a certain address of the device's internal address space to another address in the device's internal address space. This process is independent of the operating unit and does not occupy resources of the operating unit during execution.

A method for performing a pooling operation in the present disclosure includes following stages:

for the maxpooling (or minpooling) forward operation instruction, before the operating unit performs the forward operation, fetching, by the data access unit, the in (all the numbers in the kernel) from the memory according to a value of kernel_area stored in the instruction storage unit; transferring 1/kernel_area and in a to the operating unit for forward computation; and comparing, by the operating unit, a size of each input vector, and then performing a maximum value (or the minimum value) fetchion operation to obtain an output vector; or for the maxpooling (or minpooling)

backward training instruction, simultaneously storing corresponding index vectors; cyclically reading an input vector of a new pooling kernel and performing the above size comparison operation to obtain an output vector of the new kernel until the pooling operation of this layer ends; during the backward training, outputting, by the operating unit, an input gradient vector to a corresponding storage location through the data access unit according to an index vector stored during the forward operation, so as to obtain an output gradient vector; or for the avgpooling forward operation instruction, fetching, by the data access unit, the in (all the numbers in the kernel) from the memory according to kernel_area stored in the instruction storage unit; transferring the 1/kernel_area and the in to the operating unit for forward operation; performing, by an operation module 4, a summation on each input vector, and then multiplying by 1/kernel_area to obtain an output vector; cyclically reading an input vector of a new kernel; and performing the above summation and multiplication operations to obtain an output vector of the new kernel until the pooling operation of this layer ends; or for the avgpooling backward training instruction, multiplying, by the operation module 4, an input gradient vector by 1/kernel_area; and outputting the input gradient vector to a corresponding storage location through a data access unit 3 to obtain an output gradient vector;

fetching, by the control unit 615, the pooling operation instruction, the operation field corresponding to the pooling operation instruction, and a third computing topology ((optional) the multiplier—the adder/the comparator—(optional) the activator) corresponding to the pooling operation instruction from the register unit 612; transferring, by the control unit, the operation field to the data access unit; and transferring, by the control unit, the third computing topology to the interconnection module;

fetching, by the data access unit, the in and 1/kernel_area corresponding to the operation field from the storage medium; and transferring, by the data access unit, the in and 1/kernel_area to the computing unit; and receiving, by the computing unit, the data for executing the pooling instruction.

In an example, a method for performing the avgpooling forward operation instruction includes: multiplying, by the multiplier of the operating unit, the input data in and 1/kernel_area to obtain a first result; inputting the first result to the adder for performing an addition operation to obtain a second result; and optionally, inputting the second result to the activator for performing an activation operation. The other instructions will not be described further here.

It should be noted that an order of the above addition operation (or the comparison operation) and the multiplication operation may be exchanged.

Figure 6D:
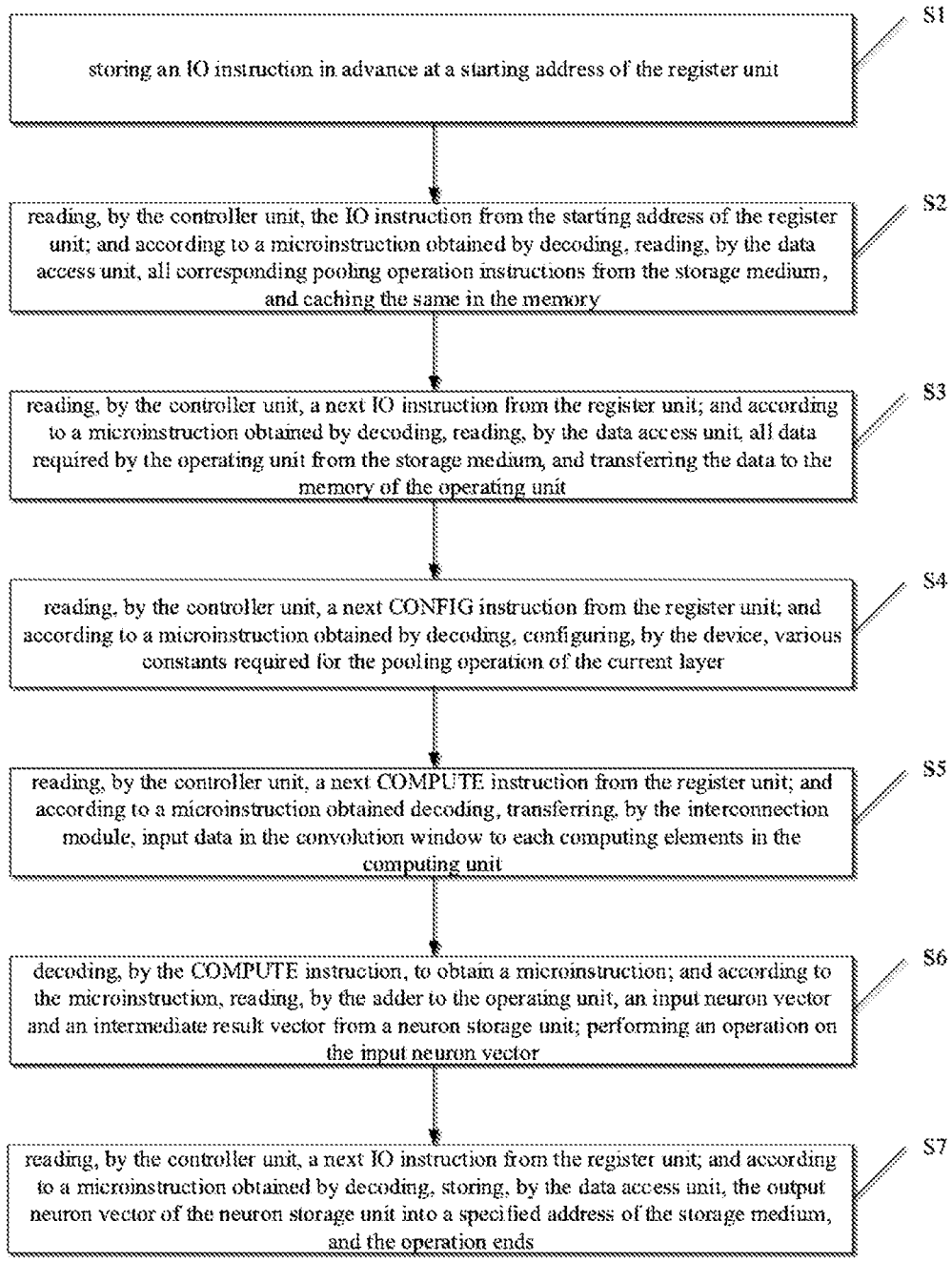
FIG. 6D is a flowchart of a forward operation of a pooling operation according to an example of the present disclosure.

FIG. 6D is a flowchart of a pooling forward operation according to an example of the present disclosure. The flowchart describes a process of performing the pooling forward operation by using the device and the instruction set of the present disclosure. The process includes:

a step S1, storing an IO instruction in advance at a starting address of the instruction storage unit;

a step S2, at the beginning of the operation, reading, by the controller unit, the IO instruction from the starting address of the instruction storage unit; and according to a microinstruction obtained by decoding, reading, by the data access unit, all corresponding pooling operation instructions from the storage medium, and caching the same in the memory;

a step S3, reading, by the controller unit, a next IO instruction from the instruction storage unit; and according to a microinstruction obtained by decoding, reading, by the data access unit, all data (such as an input neuron vector, an interpolation table, a constant table, etc.) required by the operating unit from the storage medium, and transferring the data to the memory of the operating unit;

a step S4, reading, by the controller unit, a next CONFIG instruction from the instruction storage unit; and according to a microinstruction obtained by decoding, configuring, by the device, various constants required for the pooling operation of the current layer; for instance, configuring, by the operating unit, a value of a register in the operating unit according to parameters in the microinstruction, where the parameter includes: a precision setting of the operation of the current layer, data (such as a precision bit of the operation of the current layer, the reciprocal 1/kernel_area of a size of the pooling kernel in the avgpooling operation, etc.) of the activation function;

a step S5, decoding, by the COMPUTE instruction, to obtain a microinstruction; and according to the microinstruction, reading, by the adder of the operating unit, an input neuron vector and an intermediate result vector from a neuron storage unit; performing an operation on the input neuron vector (in the avgpooling operation, the input neuron vectors are accumulated and then multiplied by 1/kernel_area; while in the maxpooling operation, the sizes of the input neuron vectors are compared to obtain the maximum value); and writing a final output neuron vector back to the neuron storage unit; and a step S6, reading, by the controller unit, a next IO instruction from the instruction storage unit; and according to a microinstruction obtained by decoding, storing, by the data access unit, the output neuron vector of the neuron storage unit into a specified address of the storage medium, and the operation ends.

Figure 6E:
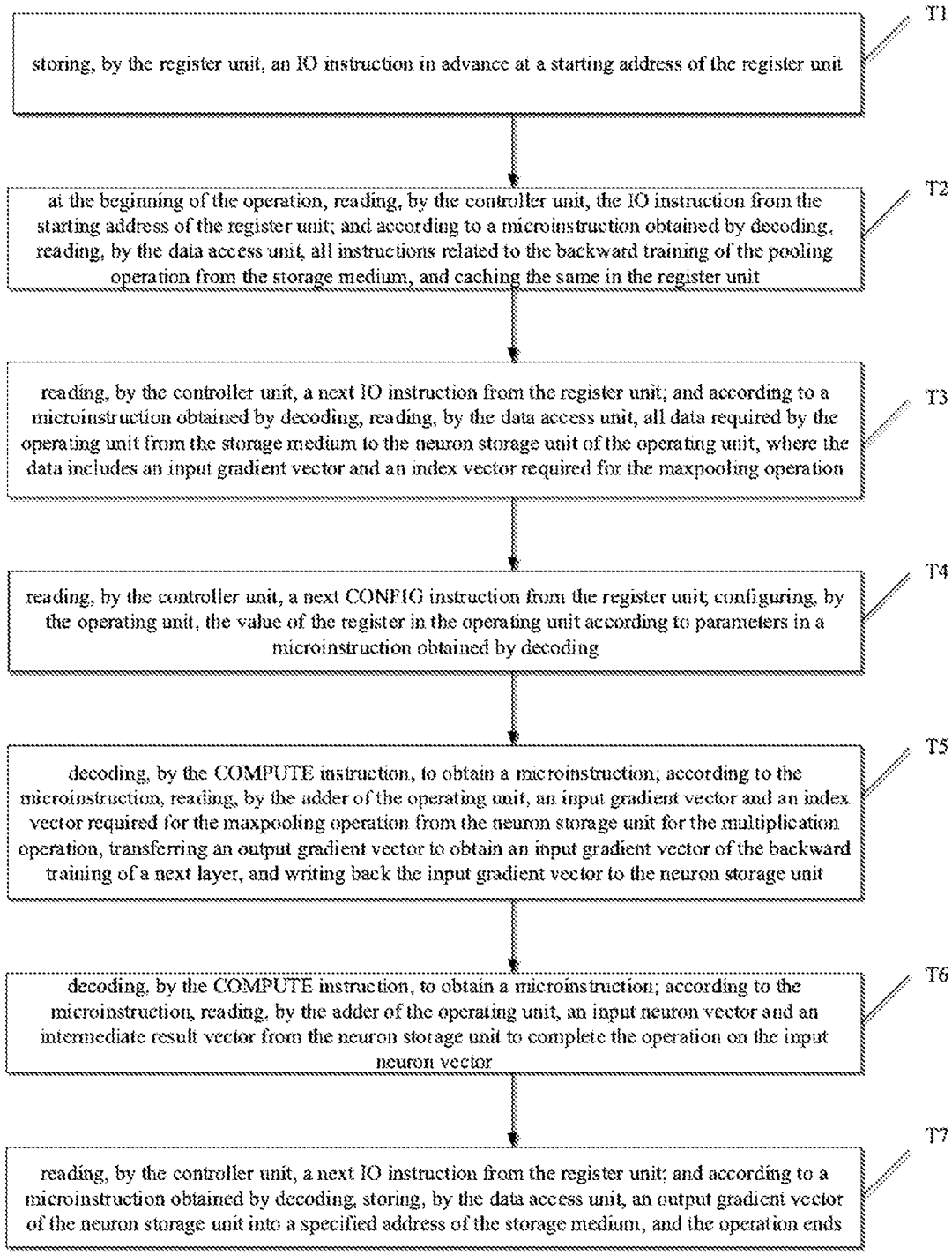
FIG. 6E is a flowchart of a backward operation of a pooling operation according to an example of the present disclosure.

FIG. 6E is a flowchart of a backward training of a pooling operation according to an example of the present disclosure. The flowchart describes a process of performing a backward training of a pooling operation by using the device and the instruction set of the present disclosure. The process includes:

a step T1, storing, by the instruction storage unit, an IO instruction in advance at a starting address of the instruction storage unit;

a step T2, at the beginning of the operation, reading, by the controller unit, the IO instruction from the starting address of the instruction storage unit; and according to a microinstruction obtained by decoding, reading, by the data access unit, all instructions related to the backward training of the pooling operation from the storage medium, and caching the same in the instruction storage unit;

a step T3, reading, by the controller unit, a next IO instruction from the instruction storage unit; and according to a microinstruction obtained by decoding, reading, by the data access unit, all data required by the operating unit from the storage medium to the neuron storage unit of the operating unit, where the data includes an input gradient vector and an index vector required for the maxpooling operation;

a step T4, reading, by the controller unit, a next CONFIG instruction from the instruction storage unit; configuring, by the operating unit, the value of the register in the operating unit according to parameters in a microinstruction obtained by decoding, where the parameters include, various constants required for the pooling operation of the current layer, the reciprocal 1/kernel_area of the size of the pooling kernel in the avgpooling operation, the precision setting of the operation of the current layer, a learning rate during weight update, etc.;

a step T5, decoding, by the COMPUTE instruction, to obtain a microinstruction; according to the microinstruction, reading, by the adder of the operating unit, an input gradient vector and an index vector required for the maxpooling operation from the neuron storage unit for the multiplication operation (the input gradient vector and the index vector are multiplied by 1/kernel_area in the avgpooling operation, and multiplied by the index vector in the maxpooling operation), transferring an output gradient vector to obtain an input gradient vector of the backward training of a next layer, and writing back the input gradient vector to the neuron storage unit; and a step T6, reading, by the controller unit, a next IO instruction from the instruction storage unit; and according to a microinstruction obtained by decoding, storing, by the data access unit, the output gradient vector of the neuron storage unit into a specified address of the storage medium, and the operation ends.

An implementation process of the pooling operation of a multi-layer artificial neural network is similar to that of the pooling operation of a single-layer neural network. When the the operation of a previous layer of the artificial neural network is completed, operation instructions of the next layer use output neuron vectors or output gradient vectors obtained by the operation unit as input neuron vectors or input gradient vectors for the training of the next layer to perform the above computation process. Weight addresses and weight gradient addresses in the instructions are also changed to corresponding addresses of this layer.

By using a device and an instruction set for the pooling operation, the problems of insufficient CPU and GPU computing performance and large front-end decoding overhead may be solved, which may effectively improve support for the pooling operation of the multi-layer artificial neural network.

By using a special-purpose on-chip cache for the pooling operation, input neurons and weight data are fully reused, which may avoid repetitively reading the data from a memory, reduce memory access bandwidth, and prevent the memory bandwidth from becoming a performance bottleneck of the pooling forward operation and the backward training of the pooling operation.

A computation method of the computation device shown in FIG. 6A is described below through different operation instructions. A batch normalization operation instruction, which can be applied to a neural network, is taken as an instance here. An operation formula of the batch normalization operation instruction may be: out=(in-middle1)/middle2, where out denotes an output neuron vector, in denotes an input neuron vector, middle1 and middle2 are middle values of an operation, and the value of middle1 and middle2 may be the same or different. According to the operation, a topological structure of the operation may be: the adder—the multiplier. Alternatively, an operation formula may also be: out=(in/middle2-middle1/middle2. In this case, a topological structure of the operation may be: the multiplier—the adder.

A batch normalization instruction set includes a CONFIG instruction, a batch normalization instruction, an IO instruction, an NOP instruction, a JUMP instruction, and a MOVE instruction.

The CONFIG instruction is for configuring constants required for a current layer before a batch normalization computation begins.

The batch normalization instruction is for finishing a batch normalization computation.

The IO instruction is for reading-in input data required for a computation from an external address space, and saving data to the external address space after the computation finishes.

The NOP instruction is for emptying micro-instructions in all micro-instruction storage queues in a current device, and ensuring that all instructions before the NOP instruction are finished. The NOP instruction does not include any computation operation.

The JUMP instruction is for controlling the jumping of a next instruction address to be read from an instruction storage unit, so that the jumping of control flow can be realized.

The MOVE instruction is for moving data of an address in an internal address space of the device to another address in the internal address space of the device. This process is independent of an operating unit and does not occupy the resources of the operating unit during execution.

The method of performing batch normalization by the computation device shown in FIG. 6A includes:

fetching, by the control unit 615, a batch normalization operation instruction and a corresponding operation field of the batch normalization operation instruction from the register unit 612, and transferring, by the control unit, the operation field to the data access unit;

fetching, by the data access unit, −middle1 and 1/middle2 corresponding to the operation field from the storage medium, and transferring middle to the operating unit; and performing, by the operating unit, the batch normalization operation instruction to obtain an output result, and transferring the output result to the data access unit and saving the result in the memory.

Specifically, a method of performing the batch normalization operation instruction by the operating unit to obtain the output result may include: adding, by the adder of the operating unit, the input data in and −middle1 to obtain a first result, and inputting the first result and 1/middle2 to the multiplier for multiplication to obtain the output result.

Figure 6F:
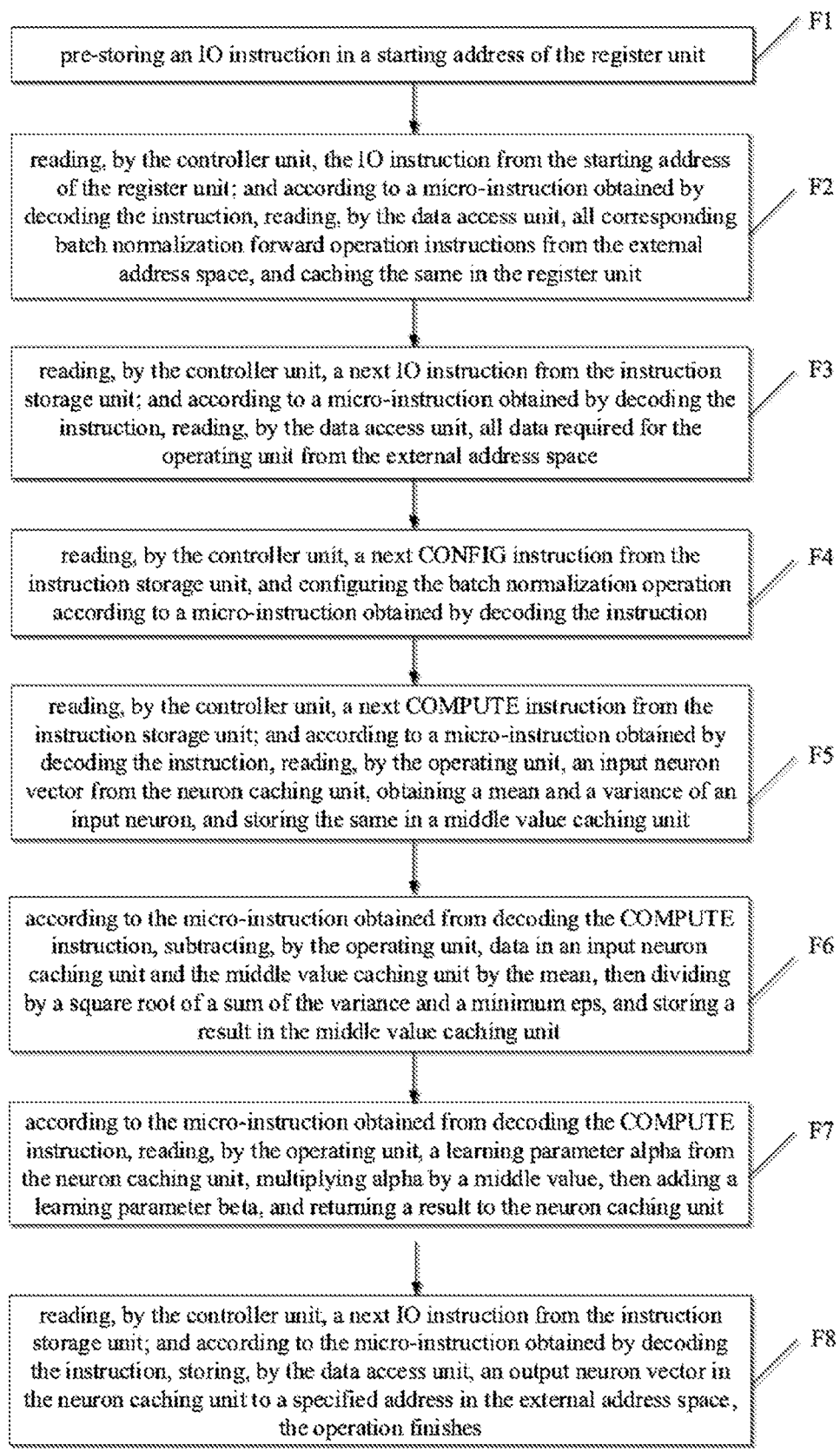
FIG. 6F is a flowchart of a forward operation of a batch normalization operation according to an example of the present disclosure.

FIG. 6F is a flowchart of a batch normalization forward operation during a training process according to an example. This flowchart describes the process of implementing the forward operation of the batch normalization operation shown in FIG. 6F by using the device and the instruction set shown in FIG. 6A. The flowchart includes:

a step F1, pre-storing an IO instruction in a starting address of the instruction storage unit;

a step F2, the operation starts, reading, by the controller unit, the IO instruction from the starting address of the instruction storage unit; and according to a micro-instruction obtained by decoding the instruction, reading, by the data access unit, all corresponding batch normalization forward operation instructions from the external address space, and caching the batch normalization forward operation instructions in the instruction storage unit;

a step F3, reading, by the controller unit, a next IO instruction from the instruction storage unit; and according to a micro-instruction obtained by decoding the instruction, reading, by the data access unit, all data (for instance, the data includes an input neuron vector, a batch size, learning parameters alpha and beta, a minimum eps, a mean, a variance, etc.) required for the operating unit from the external address space, and storing the data in the neuron caching unit of the operating unit;

a step F4, reading, by the controller unit, a next CONFIG instruction from the instruction storage unit, and configuring the batch normalization operation according to a microinstruction obtained by decoding the instruction, for instance, determining whether a current forward operation uses a mean and a variance that are already obtained from computation, or uses a mean and a variance that are to be obtained from computing input;

a step F5, reading, by the controller unit, a next COMPUTE instruction from the instruction storage unit; and according to a micro-instruction obtained by decoding the instruction, reading, by the operating unit, an input neuron vector from the neuron caching unit, obtaining a mean and a variance of an input neuron, and storing the mean and the variance in a middle value caching unit a step F6, according to the micro-instruction compiled from the COMPUTE instruction, the operating unit subtracting data in an input neuron caching unit and the middle value caching unit by the mean, then dividing the result by a square root of a sum of the variance and a minimum eps, and storing a result of the division in the module value caching unit;

a step F7, according to the micro-instruction obtained from decoding the COMPUTE instruction, reading, by the operating unit, a learning parameter alpha from the neuron caching unit, multiplying alpha by a middle value, then adding a learning parameter beta, and returning a result to the neuron caching unit; and a step F8, reading, by the controller unit, a next IO instruction from the instruction storage unit; and according to the micro-instruction obtained by decoding the instruction, storing, by the data access unit, an output neuron vector in the neuron caching unit to a specified address in the external address space, the operation finishes.

The difference between the forward process of the batch normalizaiton operation in the process above and the forward process of the batch normalization operation in a training process is that a constant mean and a constant variance are configured in the step F4, so that dynamic computation is not required each time. In other words, the step F5 is removed. Other steps are the same as those of FIG. 6F.

A backward process of the batch normalization operation is similar to the forward process above. The difference between the two is that data for operating is different. It is assumed that a gradient introduced by a pixel is d1/dY, a gradient output by the backward process is d1/dx, an output of the forward process is Y, and other parameters denote the similar things as those of the forward process. A gradient that is output after the batch normalization backward propagation is d1/dx=(alpha/sqrt(var(x)+eps))*(d1/dY−mean(d1/dY)−mean(d1/dY*Y)*Y), where mean denotes an operation of finding a mean. A gradient of the learning parameter alpha is: d1/dalpha=(Σd1/dY)*Y. A gradient of the learning parameter beta is: d1/dbeta=Σd1/dY. The values of the learning parameters can be updated according to the two gradients above. During the back operation of the batch normalization operation, the operating unit may performs normalization operations to obtain gradient data such as mean and variance. Then the operating unit performs the remaining operations of the formula in parallel.

By using the device and the instruction set for performing batch normalization operations, the problems of insufficient CPU and GPU computation performance and large front-end decoding overhead may be solved, which may effectively improve the support for the batch normalization forward and backward operations.

By using a dedicated on-chip cache for batch normalization operations, input neurons and middle data may be fully reused, which may avoid repeated reading of these data from the memory, reduce the memory access bandwidth, and prevent the memory bandwidth from becoming a performance bottleneck of the forward operation of a multi-layer artificial neural network.

By using a dedicated operating unit for batch normalization operations, a better balance between parallel and serial operations may be achieved. The problems that the CPU architecture is only for serial operations and is slow in speed when processing large data, and the GPU architecture is only for parallel operations and cannot overcome the weakness of normalized operations may be avoided. In the present disclosure, the data storage unit and the operating unit can cooperate with each other to achieve a better balance between parallel and serial operations of normalization.

It should be explained that the computation instruction of the computation device above may be one or plural. In other words, the computation device can execute one or a plurality of the computation instructions. The computation instructions include, but are not limited to, the above-mentioned convolution instruction, a fully connected instruction, a batch normalization instruction, or a pooling instruction. The structure and application method of the instructions above can be found in the description of the examples shown in FIG. 6A, FIG. 6B, FIG. 6C, FIG. 6D, FIG. 6E, and FIG. 6F. Alternatively, in addition to the instructions above, the computation device can also execute the following instructions:

a Vector-Inner-Product instruction (VP): according to the instruction, the device fetches vector data with a specified size from a specified address in a memory (preferably a scratchpad memory or a scalar register file), computes an inner product (a scalar) between two vectors in a vector computing unit, and writes the result back; preferably, the result is written back to a specified address of the memory (preferably the scratchpad memory or the scalar register file);

a vector cross product instruction (TENS): according to the instruction, the device fetches vector data with a specified size from a specified address in a memory (preferably a scratchpad memory or a scalar register file), computes a cross product between two vectors in a vector computing unit, and writes the result back; preferably, the result is written back to a specified address of the memory (preferably the scratchpad memory or the scalar register file);

a vector elementary arithmetic operation including a Vector-Add-Scalar instruction (VAS): according to the instruction, the device fetches vector data with a specified size from a specified address in a memory (preferably a scratchpad memory or a scalar register file), fetches scalar data from a specified address of a scalar register file of the memory, adds the scalar to each element of the vector in a scalar computing unit, and writes the result back; preferably, the result is written back to a specified address of the memory (preferably the scratchpad memory or the scalar register file);

a Scalar-Sub-Vector instruction (SSV): according to the instruction, the device fetches scalar data from a specified address in the scalar register file of a memory (preferably a scratchpad memory or a scalar register file), fetches vector data from a specified address of the memory (preferably the scratchpad memory or the scalar register file), subtracts corresponding elements of the vector from the scalar in a vector computing unit, and writes the result back; preferably, the result is written back to a specified address of the memory (preferably the scratchpad memory or the scalar register file);

a vector-Dev-Vector instruction (VD): according to the instruction, the device fetches vector data with a specified size from a specified address in a memory (preferably a scratchpad memory or a scalar register file), performs an element-wise division of two vectors in a vector computing unit, and writes the result back; preferably, the result is written back to a specified address of the memory (preferably the scratchpad memory or the scalar register file); and a Scalar-Dev-Vector instruction (SDV): according to the instruction, the device fetches scalar data from a specified address in the scalar register file of a memory (preferably a scratchpad memory or a scalar register file), fetches vector data from a specified address of the memory (preferably the scratchpad memory), divides the scalar by corresponding elements in the vector in a vector computing unit, and writes the result back; preferably, the result is written back to a specified address of the memory (preferably the scratchpad memory or the scalar register file).

The computation device can also execute a vector logic instruction, including:

a Vector-AND-Vector instruction (VAV): according to the instruction, the device fetches vector data of a specified size from a specified address in a memory (preferably a scratchpad memory or a scalar register file), performs an element-wise AND operation on two vectors in a vector computing unit, and writes the result back; preferably, the result is written back to a specified address of the memory (preferably the scratchpad memory or the scalar register file);

a Vector-AND instruction (VAND): according to the instruction, the device fetches vector data of a specified size from a specified address in a memory (preferably a scratchpad memory or a scalar register file), performs an AND operation on each element of the vector in a vector computing unit, and writes the result back; preferably, the result is written back to a specified address of the scalar register file of the memory (preferably the scratchpad memory or the scalar register file);

a Vector-OR-Vector instruction (VOV): according to the instruction, the device fetches vector data of a specified size from a specified address in a memory (preferably a scratchpad memory), performs an element-wise OR operation on two vectors in a vector computing unit, and writes the result back; preferably, the result is written back to a specified address of the memory (preferably the scratchpad memory or a scalar register file);

a Vector-OR instruction (VOR): according to the instruction, the device fetches vector data of a specified size from a specified address in a memory (preferably a scratchpad memory or a scalar register file), performs an OR operation on each element of the vector in a vector computing unit, and writes the result back; preferably, the result is written back to a specified address of the scalar register file of the memory (preferably the scratchpad memory or the scalar register file); and a transcendental function instruction: according to the instruction, the device fetches vector data of a specified size from a specified address in a memory (preferably a scratchpad memory or a scalar register file), performs a transcendental function operation on the vector data in an operating unit, and writes the result back. Back and write the results back; preferably, the result is written back to a specified address of a storage unit of the memory (preferably the scratchpad memory or the scalar register file); preferably, the result is written back to a specified address of the memory (preferably the scratchpad memory or the scalar register file).

The computation device can also execute a vector comparison operation instruction, including:

a Greater-Equal operation instruction (GE): according to the instruction, the device may obtain parameters of the instruction, including a length of a vector, a starting address of two vectors, and a storage address of an output vector, directly from the instruction or by accessing the number of the register of a memory (preferably a scratchpad memory or a scalar register file) provided by the instruction, then read the data of the two vectors, and compare the elements at all positions in the vectors in a vector comparison operating unit; at the position of a row, if the value of a previous vector is greater than or equal to the value of a subsequent vector, the value of the comparison result vector at that position is set to 1, otherwise it is set to 0; finally, the comparison result is written back to a specified storage address in the memory (preferably the scratchpad memory or the scalar register file);

a Less-Equal operation instruction (LE): according to the instruction, the device may obtain the parameters of the instruction, including the length of a vector, the starting address of the two vectors, and the storage address of the output vector, directly from the instruction or by accessing the number of the register of a memory (preferably a scratchpad memory or a scalar register file) provided by the instruction, then read the data of the two vectors, and compare the elements at all positions in the vectors in a vector comparison operating unit; at the position of a row, if the value of a previous vector is less than or equal to the value of a subsequent vector, the value of the comparison result vector at that position is set to 1, otherwise it is set to 0; finally, the comparison result is written back to a specified storage address in the memory (preferably the scratchpad memory or the scalar register file);

a Greater-Than operation instruction (GT): according to the instruction, the device may obtain the parameters of the instruction, including the length of a vector, the starting address of the two vectors, and the storage address of the output vector, directly from the instruction or by accessing the number of the register of a memory (preferably a scratchpad memory or a scalar register file) provided by the instruction, then read the data of the two vectors, and compare the elements at all positions in the vectors in a vector comparison operating unit; at the position of a row, if the value of a previous vector is greater than the value of a subsequent vector, the value of the comparison result vector at that position is set to 1, otherwise it is set to 0; finally, the comparison result is written back to a specified storage address in the memory (preferably the scratchpad memory or the scalar register file);

a Less than operation instruction (LT): according to the instruction, the device may obtain the parameters of the instruction, including the length of a vector, the starting address of the two vectors, and the storage address of the output vector, directly from the instruction or by accessing the number of the register of a memory (preferably a scratchpad memory or a scalar register file) provided by the instruction, then read the data of the two vectors, and compare the elements at all positions in the vectors in a vector comparison operating unit; at the position of a row, if the value of a previous vector is less than the value of a subsequent vector, the value of the comparison result vector at that position is set to 1, otherwise it is set to 0; finally, the comparison result is written back to a specified storage address in the memory (preferably the scratchpad memory or the scalar register file);

an Equal operation instruction: according to the instruction, the device may obtain the parameters of the instruction, including the length of a vector, the starting address of the two vectors, and the storage address of the output vector, directly from the instruction or by accessing the number of the register of a memory (preferably a scratchpad memory or a scalar register file) provided by the instruction, then read the data of the two vectors, and compare the elements at all positions in the vectors in a vector comparison operating unit; at the position of a row, if the value of a previous vector is equal to the value of a subsequent vector, the value of the comparison result vector at that position is set to 1, otherwise it is set to 0; finally, the comparison result is written back to a specified storage address in the memory (preferably the scratchpad memory or the scalar register file);

an Unequal operation instruction (UEQ): according to the instruction, the device may obtain the parameters of the instruction, including the length of a vector, the starting address of the two vectors, and the storage address of the output vector, directly from the instruction or by accessing the number of the register of a memory (preferably a scratchpad memory or a scalar register file) provided by the instruction, then read the data of the two vectors, and compare the elements at all positions in the vectors in a vector comparison operating unit; at the position of a row, if the value of a previous vector is not equal to the value of a subsequent vector, the value of the comparison result vector at that position is set to 1, otherwise it is set to 0; finally, the comparison result is written back to a specified storage address in the memory (preferably the scratchpad memory or the scalar register file);

a Vector Max instruction (VMAX): according to the instruction, the device fetches vector data of a specified size from a specified address in a scratchpad memory of a memory (preferably a scratchpad memory or a scalar register file), selects a largest element from the vector data as a result, and writes the result back; preferably, the result is written back to a specified address of the scalar register file of the memory (preferably the scratchpad memory or the scalar register file);

a Vector Min instruction (VMIN): according to the instruction, the device fetches vector data of a specified size from a specified address in a scratchpad memory of a memory (preferably a scratchpad memory or a scalar register file), selects a minimum element from the vector data as a result, and writes the result back; preferably, the result is written back to a specified address of the scalar register file of the memory (preferably the scratchpad memory or the scalar register file);

a Cyclic Shift operation instruction: according to the instruction, the device may obtain the parameters of the instruction directly from the instruction or by accessing the number of the register of a memory (preferably a scratchpad memory or a scalar register file) provided by the instruction, then cyclically shift vectors in a vector shift unit (which may be a separate vector shift unit or a computing unit), and then write the result of the shift back to a specified storage address in the scratchpad memory of the memory (preferably the scratchpad memory or the scalar register file), where the format of the cyclic shift operation instruction format, which is shown in FIG. 3, contains four operation fields, a starting address and length of a vector, a shift stride, and a storage address of an output vector; and a Random-Vector generation instruction: according to the instruction, the device reads one or more randomly distributed parameters, and the size and storage address of a random vector to be generated from the instruction or from the register file of a memory (preferably a scratchpad memory or a scalar register file), generates the random vector that is in line with the random distribution in a random vector generation unit, and then writes the result of the random vector back to the specified storage address in the memory (preferably the scratchpad memory or the scalar register file).

The random vector generation instruction may be:

a Uniform distribution instruction (UNIF): according to the instruction, the device reads uniformly distributed upper and lower bound parameters, and the size and storage address of the random vector to be generated from the instruction or from the register file of a memory (preferably a scratchpad memory or a scalar register file), generates the random vector that is in line with the uniform distribution in a random vector generation unit, and then writes the result of the random vector back to the specified storage address in the memory (preferably the scratchpad memory or the scalar register file); and a Gaussian distribution instruction (GAUS): according to the instruction, the device reads Gaussian distributed mean and variance parameters, and the size and storage address of the random vector to be generated from the instruction or from the register file of a memory (preferably a scratchpad memory or a scalar register file), generates the random vector that is in line with the Gaussian distribution in a random vector generation unit, and then writes the result of the random vector back to the specified storage address in the memory (preferably the scratchpad memory or the scalar register file).

Figure 7:
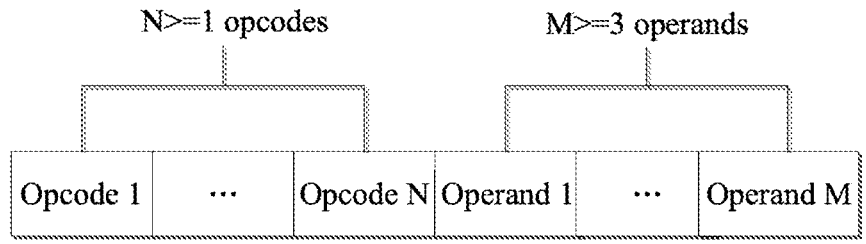
FIG. 7 is a schematic diagram of a format of an instruction set according to an example of the present disclosure.
Figure 7A:
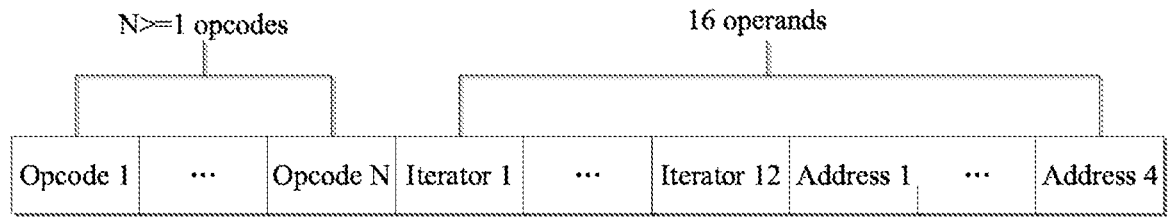
FIG. 7A is a schematic diagram of a format of a neural network operation instruction according to an example of the present disclosure.
Figure 7B:
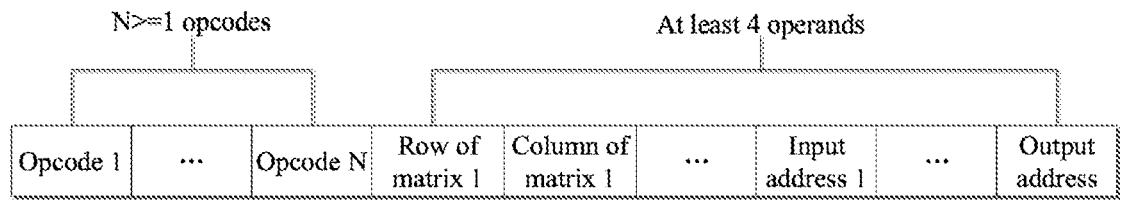
FIG. 7B is a schematic diagram of a format of a matrix operation instruction according to an example of the present disclosure.
Figure 7C:
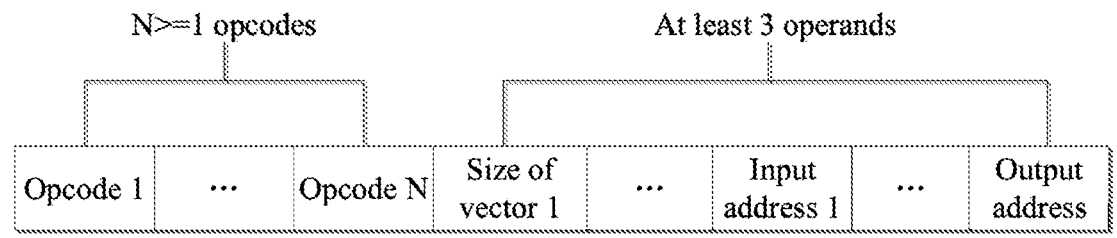
FIG. 7C is a schematic diagram of a format of a vector operation instruction according to an example of the present disclosure.
Figure 7D:
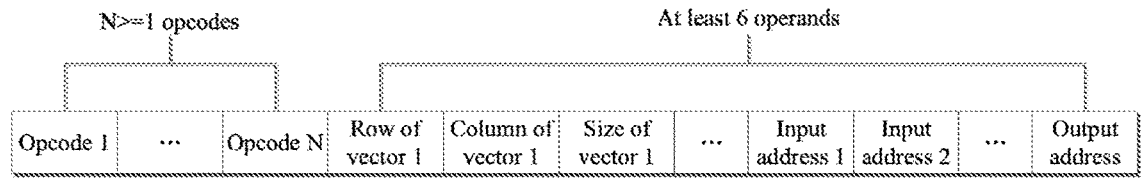
FIG. 7D is a schematic diagram of a format of a matrix-vector operation instruction according to an example of the present disclosure.
Figure 7E:
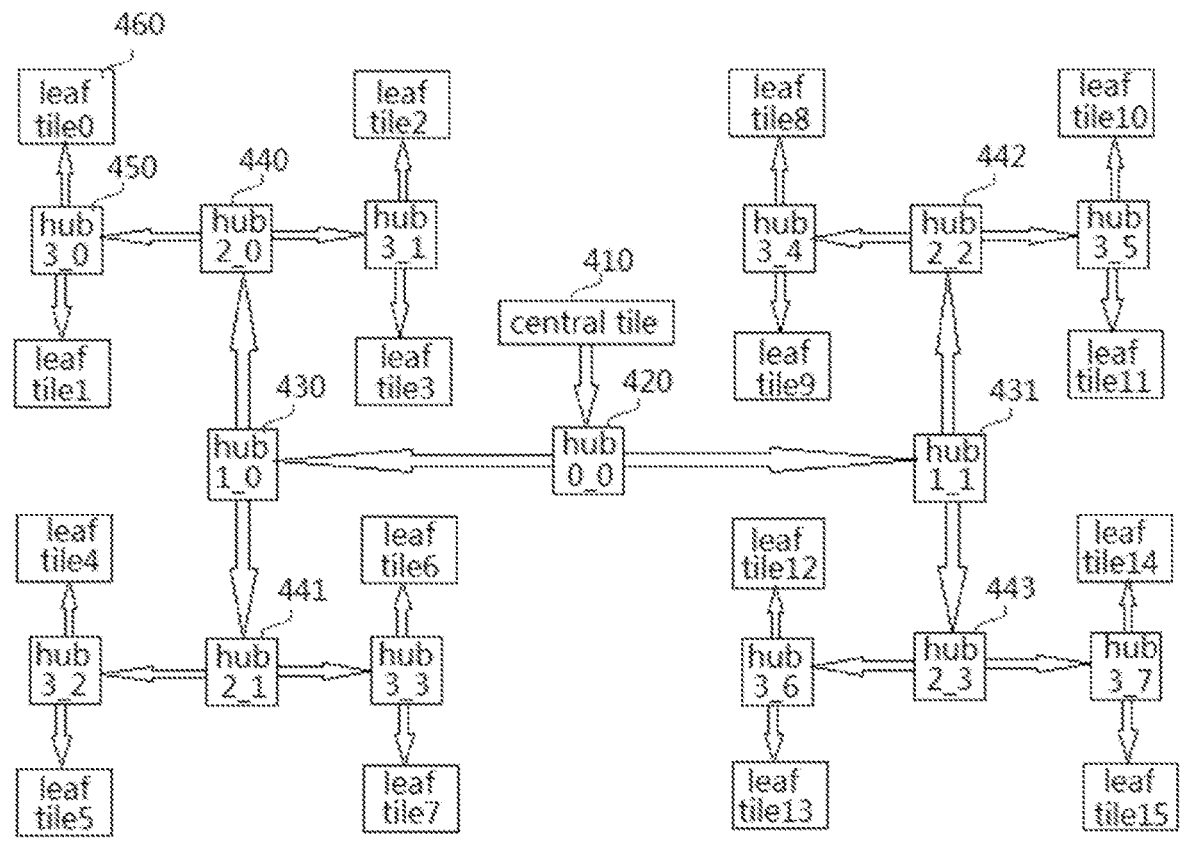
FIG. 7E is a schematic structural diagram of hub_one_to_two according to an example of the present disclosure.

The format of the above-mentioned instruction is shown in FIG. 7A. The format of the neural network operation instruction is shown in FIG. 7B. The format of the matrix operation instruction is shown in FIG. 7C. The format of the vector operation instruction is shown in FIG. 7D. The format of the matrix-vector operation instruction is shown in FIG. 7E. It should be noted that the above-mentioned figures of the instruction format are merely possible examples. The format of these instructions in this disclosure is not limited to the possible examples shown in the figures.

An example of the present disclosure further provides a computer storage medium. The computer storage medium stores a computer program for electronic data exchange. The computer program may cause a computer to perform part or all of the steps of any of the matrix computation methods described in the foregoing method examples.

An example of the present disclosure further provides a computer program product. The computer program product includes a non-transitory computer-readable storage medium storing a computer program. The computer program may cause a computer to perform part or all of the steps of any of the matrix computation methods described in the foregoing method examples.

The artificial neural network computation device in the example above may be a general-purpose computation component integrated with a DMA and a control unit. The artificial neural network computation device may further include a general-purpose computation component, such as a general-purpose processor. An embodiment of the storage medium may be a storage device, an on-chip storage medium, a memory, or a storage unit. An embodiment of the instruction storage unit may be a DMA. An embodiment of the operating unit may be a primary operation module, a secondary operation module, a discrete data operating unit, or a continuous data operating unit. An embodiment of the caching unit may be an instruction cache, an input neuron cache, a weight cache, and an output neuron cache, an instruction caching unit, a neuron caching unit that supports discrete data representations, or a weight caching unit that supports discrete data representations, etc. The examples of the present disclosure does not limit the above-mentioned device, medium and unit.

The present disclosure provides a data distribution device including:

one or a plurality of central nodes which serve as a communication data center of an on-chip network and are configured to broadcast or multicast communication data to a plurality of leaf nodes;

the plurality of leaf nodes which serve as communication data nodes of the on-chip network and are configured to transfer communication data to the central nodes; and a repeater module configured to connect the central nodes and the plurality of leaf nodes and retransmit communication data.

The plurality of leaf nodes are divided into N groups. The central nodes are communicatively connected to each group of leaf nodes via the repeater module separately.

Alternatively, each group includes a same count of leaf nodes. A person having ordinary skill in the art can understand that the count of leaf nodes in each group may also be different.

Alternatively, a communication structure formed by each group of leaf nodes have self-similarity. In this case, the data distribution device has a network structure of a fractal tree. A person having ordinary skill in the art can understand that in addition to a structure with self-similarity, each group of leaf nodes may also form another communication structure.

Alternatively, the plurality of leaf nodes and the central node are communicatively connected as a complete n-ary tree through a plurality of levels of the repeater module.

In an example of the present disclosure, the central node or the leaf nodes may be computing devices shown in FIG. 6A. In other technical scenarios, the central node or the leaf nodes may be referred to as computing units.

Each node includes a local cache configured to store a subset of distribution data of the central node.

Each leaf node has an id as identifier. The serial number of the id increases sequentially from the topology side of the complete n-ary tree.

The data distribution device shares a clock signal.

The repeater module includes a local cache configured to store data.

The present disclosure further provides a data distribution method which uses the data distribution device. The method includes: distributing communication data to the plurality of leaf nodes through the central node. In the step above, after a data sender is ready to send data, the sender sends a data valid signal and places data in a bus; after a data receiver is ready to receive data, the receiver sends a signal indicating being ready to receive data; and after the data valid signal and the signal indicating being ready to receive data are detected by the other side, the data sender acknowledges that the data is already sent and received by the data receiver.

When communication data is broadcast from the central node to the plurality of leaf nodes, first, according to a handshake protocol, the data is transferred from the central node and is temporarily stored in a local cache of the repeater module directly connected to the central node. After each successful handshake, the data is transferred to a local cache of an intermediate repeater module of a subsequent level for temporarily storage. Finally, the data is input to the repeater module directly connected to the leaf nodes, and is distributed to a group of leaf nodes connected to the repeater module by the repeater module respectively.

At a next clock tick, if a data sender successfully shakes hands with a data receiver, data is input by means of pipelining to a local cache of the data receiver for storing. If the data sender fails to shake hands with the data receiver, data is stored in a local cache of a current level, the current level serves as a data receiver of a previous level and stops sending a signal indicating being ready to receive data, and then the data in the local cache of the current level stopped being updated. The data remains in the current level until a handshake succeeds.

When communication data is multicast from the central node to the plurality of leaf nodes, first, according to the handshake protocol, the data is transferred from the central node and is temporarily stored in the local cache of the repeater module directly connected to the central node. After each successful handshake, the data is transferred to the local cache of the intermediate repeater module of the subsequent level for temporarily storage. Finally, the data is input to the repeater module directly connected to the leaf nodes, and is distributed to the group of leaf nodes connected to the repeater module by the repeater module respectively.

When receiving data, the leaf nodes select data of preset bandwidth according to id corresponding to the leaf nodes.

The present disclosure further provides a control device including the data distribution device.

The present disclosure further provides a smart chip including the control device.

The present disclosure is further described in detail below with reference to the drawings, so that those skilled in the art can implement the present disclosure with reference to this specification.

FIG. 7 is a structural diagram showing an on-chip multi-core structure of which 16+1 cores are connected by an h-tree. "16" and "1" are given for the purpose of illustrating rather than limiting the present disclosure. A person having ordinary skill in the art may understand that the structure has 2n+m cores or yn+m cores. A root node of the h tree is a central tile, which serves as a start of data distribution. A leaf node of the h tree is a leaf tile, which serves as a terminus of data distribution. Other intermediate nodes are hubs, which are configured to transfer and distribute data.

The 16 leaf tiles are divided into 8 groups. Each group includes 2 leaf tiles. Each of the hubs is communicatively connected to a group of leaf tiles through the repeater module separately. A communication structure composed by each group of leaf tiles has self-similarity. The plurality of leaf tiles and the central tile are connected as a complete binary tree through a plurality of levels of the repeater module. The device realize a scenario where data is distributed to processing units from a data center by broadcasting or multicasting.

Figure 8:
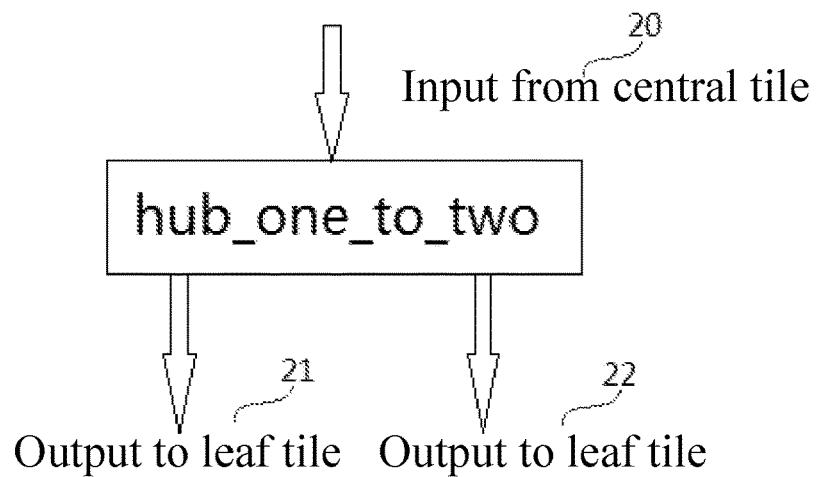
FIG. 8 is a schematic diagram of a handshake behaviour between hub_one_to_two and a data receiver according to an example of the present disclosure.

FIG. 8 is a structural diagram of a hub. The hub includes a hub_one_to_two module which divides input data 20 that is full bandwidth into two groups of full bandwidth data: data 21 and data 22 for outputting. The hub_one_to_two module is configured to transfer data from the central tile to a leaf tile.

Figure 9:
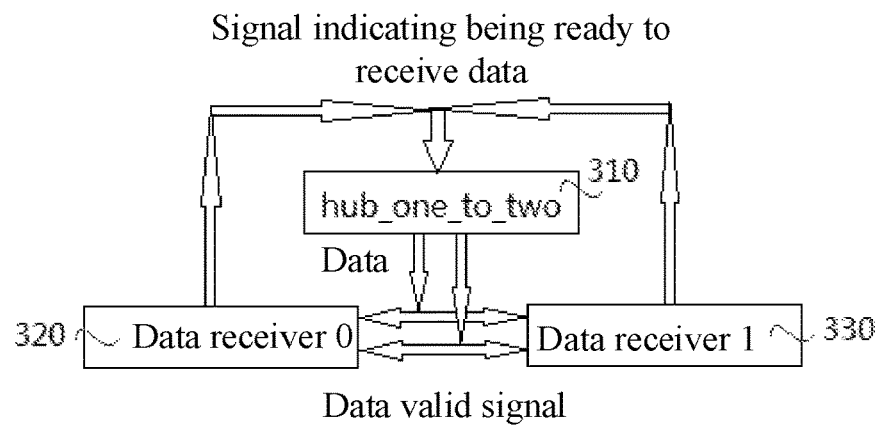
FIG. 9 is a schematic diagram of an on-chip multi-core structure of 16+1 cores connected by an h-tree according to an example of the present disclosure.

As shown in FIG. 9, when the hub_one_to_two module marked as 310 has sent data and a data valid signal to a bus, and a data receiver 0 marked as 320 and a data receiver 1 marked as 330 has sent signals indicating being ready to receive data to the bus, a handshake succeeds. At this tick, 310 acknowledges that the data receivers 320 and 330 have received data, and the data in the bus at this tick is to be stored in caches of 320 and 330 at a next tick.

As shown in FIG. 7, broadcasting data of the central tile 410 is from initializing all the leaf tiles. At this time, local caches of all the hubs and leaf tiles are empty, signals indicating being ready to receive data of the hubs and leaf tiles are high, and the signal indicating being ready to receive data of hub0_0 marked as 420 that is directly connected to 410 is also high. At a first tick, 410 prepares data and sets the data valid signal to high. Since the signal indicating being ready to receive data of the hub0_0 420 at this time is high, 410 and 420 shake hands successfully. At a second tick, 420 fetches the data from the bus and saves the data in its local cache. Since at the second tick, there is data stored in the local cache of 420, 420 transfers the data and the valid signal to the bus in the direction of 430 and 432. At this time, the signals indicating being ready to receive data of hub1_0 430 and hub1_1 431 are high, 420 successfully shakes hands with 430 and 431 of a next level at this tick. At a third tick, 430 and 431 fetch the data from the bus and store the data in their local caches, and execute in order. At each tick, the data is transferred from a previous level to a next level. The hub1_0 430 to the leaf tile0 460 are described in this example. At a fourth tick, the data is transferred to and temporarily stored in the local cache of the hub2_0 440. At a fifth tick, the data is transferred to and temporarily stored in the local cache of the hub3_0 450. At a sixth tick, after a successful handshake, 450 transfers the data of full bandwidth via the two input ports to the local caches of the group of leaf tiles connected to 450. The data is then stored in the local caches. At this time, the data arrives at the leaf tile0 460. In this way, in a case of a smooth data path, the pipeline transfer of data level by level is realized.

Figure 10:
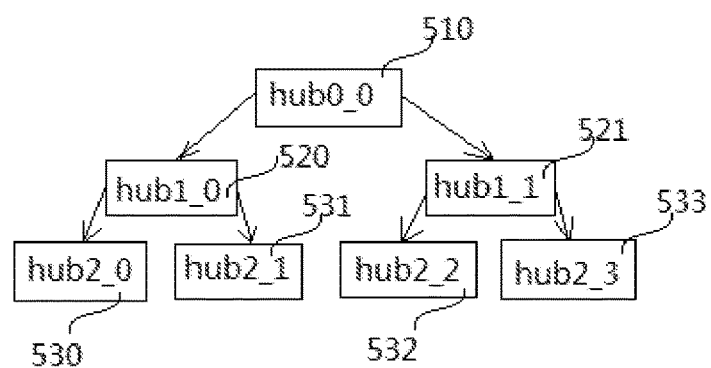
FIG. 10 is a schematic diagram of a data transfer behavior in a hub according to another example of the present disclosure.

As shown in FIG. 10, the hub1_0 is described in this example. In the following situation, data remains in the hub. At a first tick, the hub1_0 520 receives data from the hub0_0 510. At this time, 520 places the data and the data valid signal in the bus in the direction of 530 and 531 of a next level. The situation is set as follows: the hub2_0 530 and the hub2_1 531 have not sent data preparation signals, and 530 and 531 remain in this status for the rest of the time. Since 520 fails to shake hands with 530 and 531 of a next level, the data of 520 cannot be transferred to 530 and 531 of the next level and remains in the local cache of 520. At this time, 520 cannot send the signal indicating being ready to receive data. Then, since the local cache of 510 is empty, 510 can receive new data. However, 520 has not sent the signal indicating being ready to receive data, which leads to the handshake failure between 520 and 510. In other words, the data of 510 cannot be transferred to 520, which ensures the security of the data in the local cache of 520, and may thus realize the reliability of data transfer.

As shown in FIG. 10, the hub1_0 is described in this example. In the following situation, the hub can perform pipeline transfer of data. At a first tick, the hub1_0 520 receives data from the hub0_0 510. At this time, 520 places the data and the data valid signal in the bus in the direction of 530 and 531 of a next level. The situation is set as follows: the hub2_0 530 and the hub2_1 531 send data preparation signals, and 530 and 531 remain in this status for the rest of the time. At this time, 520 successfully shakes hands with 530 and 531 of a next level, and 520 is prepared to send the signal indicating being ready to receive data. If the local cache of 510 has already prepared new data and placed the data and the data valid signal in the bus in the direction of 520, at this tick 520 sends the signal indicating being ready to receive data, and 520 successfully shakes hands with 510. At a second tick, 520 stores the data transferred from 510 in the local cache, and placed the data and the valid signal in the bus in the direction of 530 and 310 of the next level. In this way, in a case of a smooth data path and a sufficient source of data, the hub can perform pipeline transfer of data.

Figure 11:
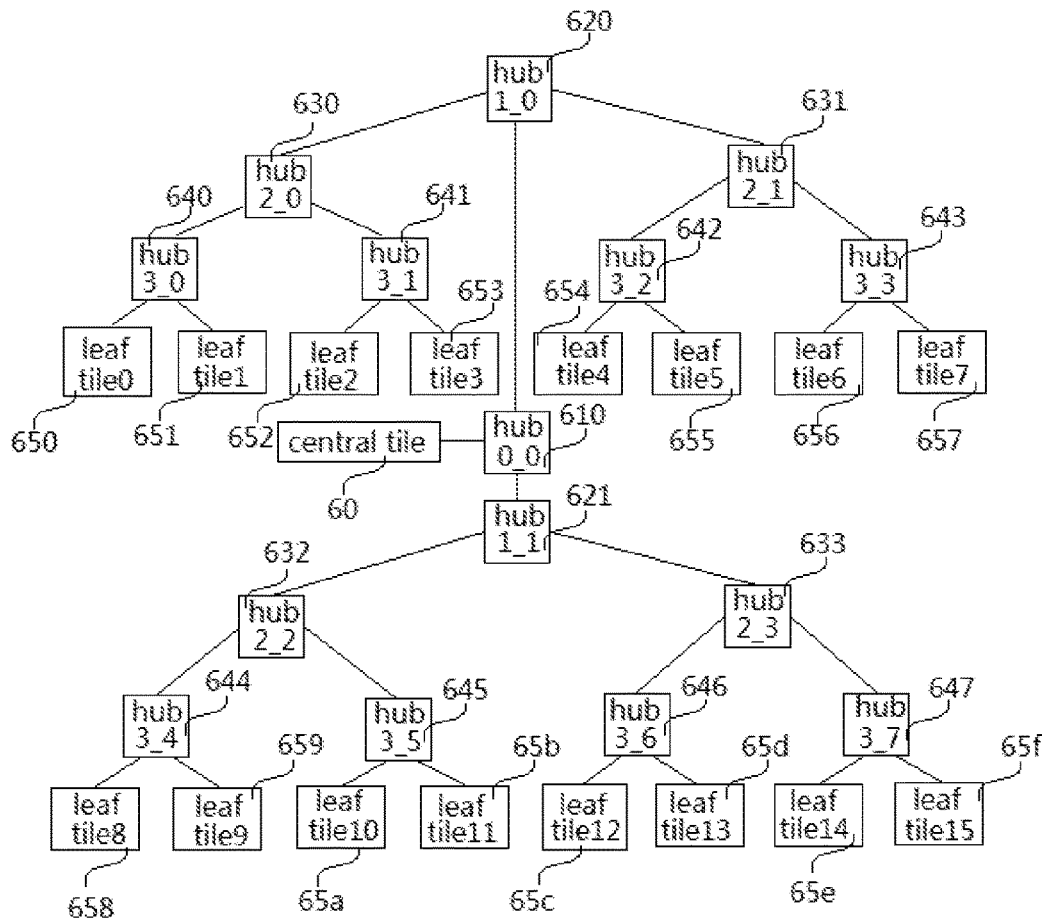
FIG. 11 is a schematic structural diagram of an h-tree structure expanded into a full binary tree topology according to an example of the present disclosure.

As shown in FIG. 11, it is assumed that the structure includes 16 leaf tiles. The h tree is expanded as a complete binary tree topology, in which a hub is a non-leaf node and a leaf tile is a leaf node. In the tree, nodes at the same height are sorted from left to right in an ascending order. The hubs are named according to their level and serial number. For instance, hub0_0 is named as 610 as it is a zero-th node at a first level; hub1_0 is named as 620 as it is a zero-th node at a second level; and hub1_1 is named as 621 as it is a first node at the second level.

As shown in FIG. 11, in an example, multicasting data of the central tile 60 is from initializing all the leaf tiles. At this time, since local caches of all the hubs and leaf tiles are empty, and signals indicating being ready to receive data of the hubs and leaf tiles are high, the data path is smooth. According to the pipeline transfer of data, at a first tick 60 and 610 shake hands successfully. At a second tick, 610 fetches data from the bus and stores the data in its local cache, and 610 successfully shakes hands with 620 and 621 of a next level. At a third tick, 620 and 621 fetch the data from the bus and store the data in their local caches, and 620 successfully shakes hands with 630 and 631 of a next level, 621 successfully shakes hands with 632 and 633 of a next level. At a fourth tick, 630, 631, 632, and 633 fetch the data from the bus and store the data in their local caches, and 630 successfully shakes hands with 640 and 641 of a next level, 631 successfully shakes hands with 642 and 643 of a next level, 632 successfully shakes hands with 644 and 645 of a next level, and 633 successfully shakes hands with 646 and 647 of a next level. At a fifth tick, 640, 641, 642, 643, 644, 645, 646 and 647 fetch the data from the bus and store the data in their local caches, and 640 successfully shakes hands with 650 and 651 of a next level, 641 successfully shakes hands with 652 and 653 of a next level, 642 successfully shakes hands with 654 and 655 of a next level, 643 successfully shakes hands with 656 and 657 of a next level, 644 successfully shakes hands with 658 and 659 of a next level, 645 successfully shakes hands with 65a and 65b of a next level, 646 successfully shakes hands with 65c and 65d of a next level, and 647 successfully shakes hands with 65e and 65f of a next level. At a sixth tick, the data is stored in the local caches all the leaf tiles (650, 651, 652, 653, 654, 655, 656, 657, 658, 659, 65a, 65b, 65c, 65e, 650 at the same time. It can be seen from the above that in a case of a smooth data path, data that is broadcast from a central node can arrive at leaf nodes at the same time, thereby realizing the synchronism of data.

Figure 12:
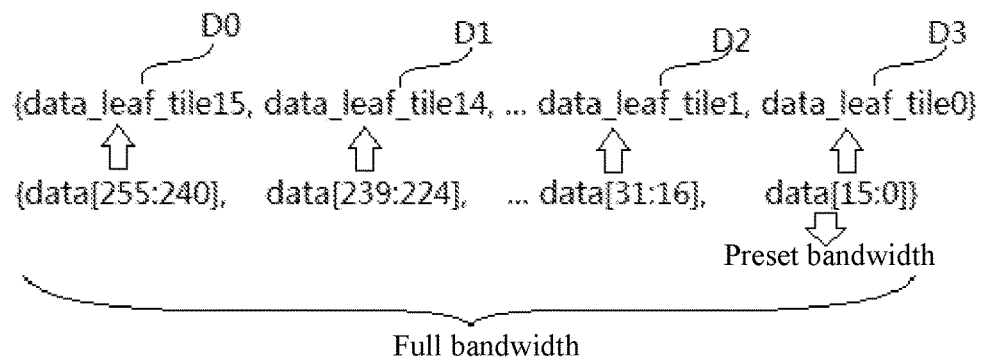
FIG. 12 is a schematic diagram of full bandwidth data and data segments corresponding to each leaf tile of the h-tree according to another example of the present disclosure.

In the example above, when arriving at each leaf tile, the data is full bandwidth. Assuming that as shown in FIG. 12, the preset bandwidth of each leaf tile is 16-bit data, each leaf tile fetches data that is multicast to the leaf tile from the data of full bandwidth according to a data id. The position of data in full bandwidth is [id*16: id*16+15]. For instance, data D0 with the id 15 is located at data[255:240], and data D0 with the id 0 is located at data[15:0].

Figure 13:
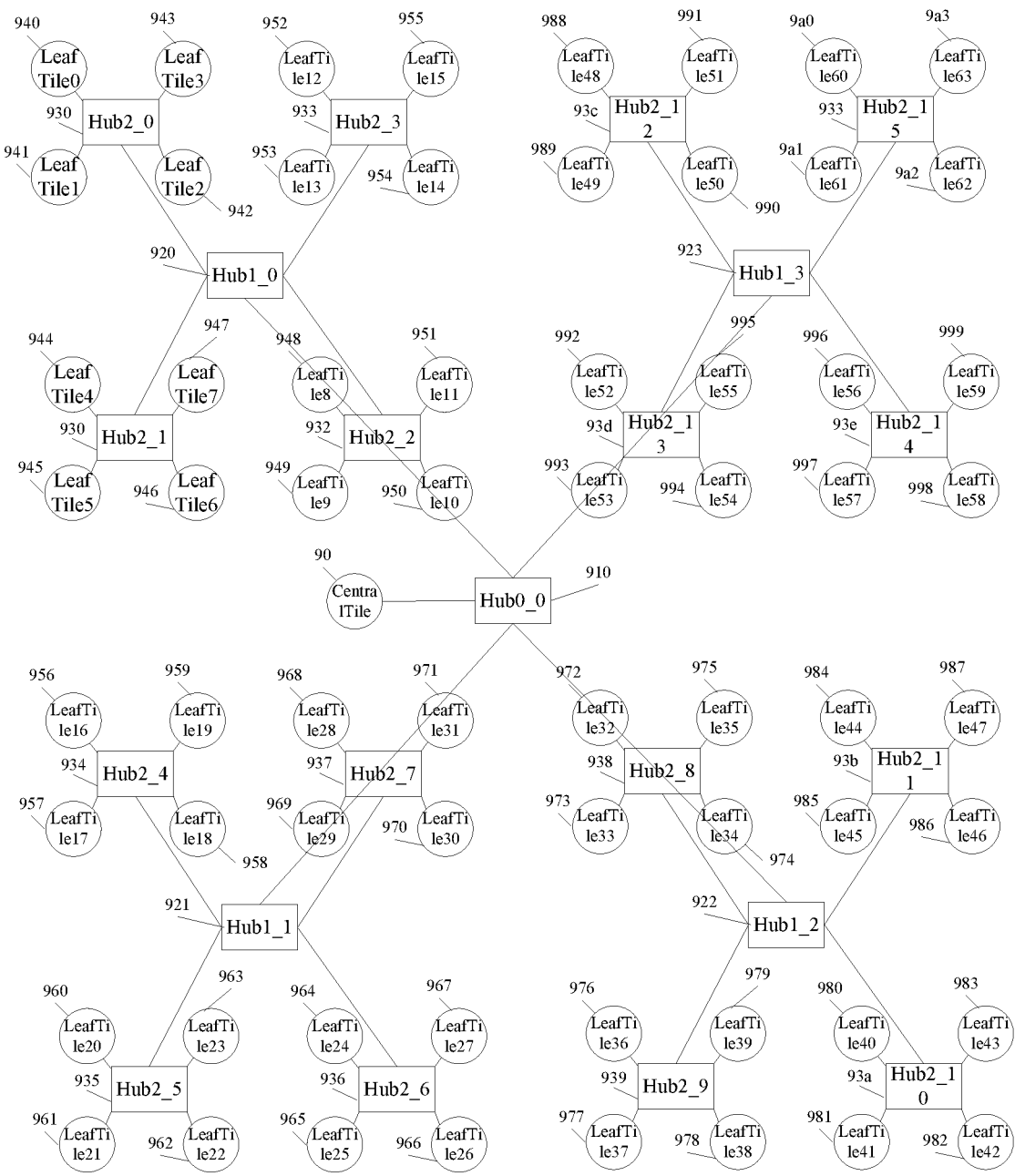
FIG. 13 is a schematic diagram of an on-chip multi-core structure of 64+1 cores connected by an x-tree in an example of the present disclosure.

FIG. 13 is a diagram of an on-chip multi-core structure where 64+1 cores are connected as an x-tree. The structure is used in an example of the present disclosure. A root node of the x-tree is central tile which serves as the start of data distribution. A leaf node of the x-tree is a leaf tile which serves as the terminal of data distribution. Other intermediate nodes are hubs for transferring and distributing data. 64 leaf tiles in FIG. 13 are divided into 16 groups. Each group has 4 leaf tiles. Each of the hubs is communicatively connected to a group of leaf tiles through the repeater module separately. A communication structure composed by each group of leaf tiles has self-similarity. The plurality of leaf tiles and the central tile are connected as a complete quad-tree through a plurality of levels of the repeater module. The device realizes a scenario where data is distributed to processing units from a data center by broadcasting or multicasting.

Figure 14:
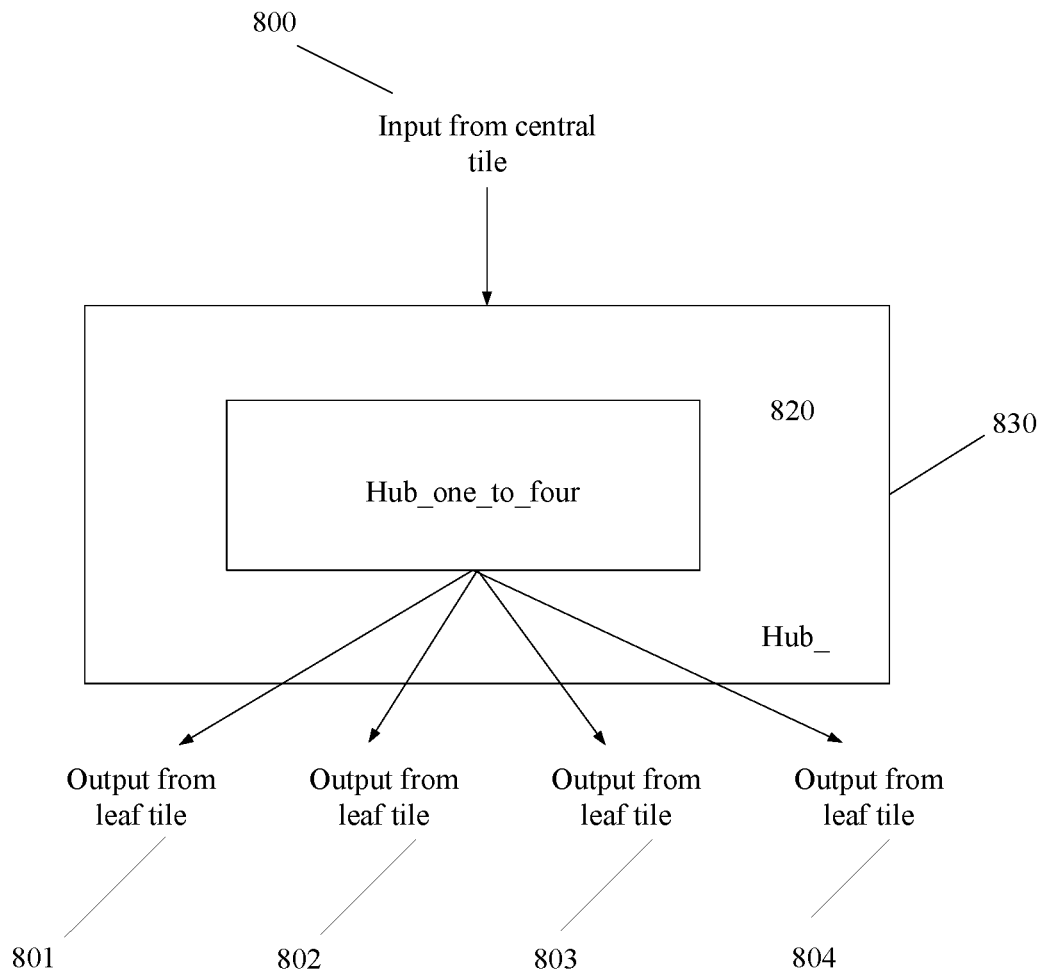
FIG. 14 is a schematic diagram of a data transfer behavior in a hub according to another example of the present disclosure.

FIG. 14 shows a structural diagram of a hub. A hub includes a hub_one_to_four module. Hub_one_to_four divides a group of input data 800, which is full bandwidth, into four groups of full bandwidth data: 801, 802, 803, and 804 for outputting. The four groups of full bandwidth data are to be transferred from the central tile to leaf tiles.

Figure 15:
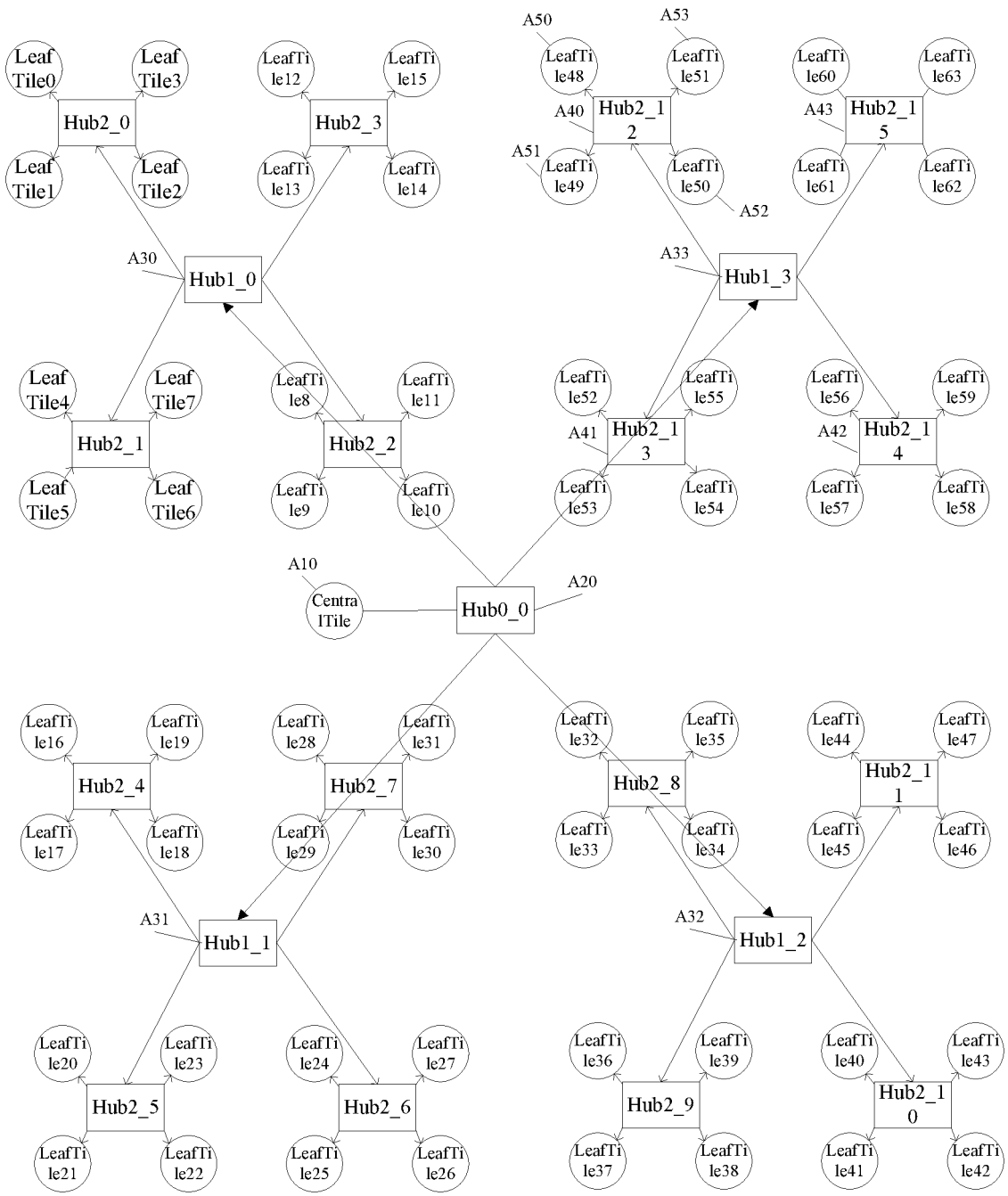
FIG. 15 is a schematic structural diagram of a full quad-tree topology of an x-tree structure according to an example of the present disclosure.

As shown in FIG. 15, broadcasting data of the central tile A10 is from initializing all the leaf tiles. At this time, local caches of all the hubs and leaf tiles are empty, signals indicating being ready to receive data of the hubs and leaf tiles are high, and the signal indicating being ready to receive data of hub0_0 marked as A20 that is directly connected to A10 is also high. At a first tick, A10 prepares data and sets the data valid signal to high. Since the signal indicating being ready to receive data of the hub0_0 A20 at this time is high, A10 and A20 shake hands successfully. At a second tick, A20 fetches the data from the bus and saves the data in its local cache. Since at the second tick, there is data stored in the local cache of A20, A20 transfers the data and the valid signal of the data to the bus in the direction of A30, A31, A32, and A33. At this time, the signals indicating being ready to receive data of hub1_0 A30, hub1_1 A31, hub1_2 A32, and hub1_3 A33 are high, A20 successfully shakes hands with A30, A31, A32, and A33 of a next level at this tick. At a third tick, A30, A31, A32, and A33 fetch the data from the bus and store the data in their local caches, and execute in order. At each tick, the data is transferred from a previous level to a next level. The hub1_3 A33 to the leaf tile 48 A50 are described in this example. At a fourth tick, the data is transferred to and temporarily stored in the local cache of the hub2_12 A40. At a fifth tick, after a successful handshake, A40 transfers the data of full bandwidth via the four input ports to the local caches of the group of four leaf tiles connected to A40, which includes A50, A51, A52, and A53. At this time, the data arrives at the leaf tile 48 A50. In this way, in a case of a smooth data path, the pipeline transfer of data level by level is realized.

As shown in FIG. 13, it is assumed that the structure includes 64 leaf tiles and 1 central tile. The 64 leaf tiles and 1 central tile are topologically connected by the x-tree as a complete quad-tree. A hub is a non-leaf node and a leaf tile is a leaf node. In the tree, nodes at the same height are sorted anticlockwise in the ascending order. The hubs are named according to their level and serial number. For instance, hub0_0 is named as 910 as it is a zero-th node at a first level; hub1_0 is named as 920 as it is a zero-th node at a second level; and hub1_1 is named as 921 as it is a first node at the second level.

As shown in FIG. 13, in an example, multicasting data of the central tile 90 is from initializing all the leaf tiles. At this time, since local caches of all the hubs and leaf tiles are empty, and signals indicating being ready to receive data of the hubs and leaf tiles are high, the data path is smooth. According to the pipeline transfer of data, at a first tick 90 and 910 shake hands successfully. At a second tick, 910 fetches data from the bus and stores the data in its local cache, and 910 successfully shakes hands with 920, 921, 922, and 923 of a next level. At a third tick, 920, 921, 922, and 923 fetch the data from the bus and store the data in their local caches, and 920 successfully shakes hands with 930, 931, 932, and 933 of a next level, 921 successfully shakes hands with 934, 935, 936, and 933 of a next level, 922 successfully shakes hands with 938, 939, 93*a*, and 93*b* of a next level, 923 successfully shakes hands with 93*c*, 93*d*, 93*e*, and 93*f* of a next level. At a fourth tick, 930, 931, 932, 933, 934, 935, 936, 937, 938, 939, 93*a*, 93*b*, 93*c*, 93*d*, 93*e* and 93*f* fetch the data from the bus and store the data in their local caches, and 930 successfully shakes hands with 940, 941, 942, and 943 of a next level, 931 successfully shakes hands with 944, 945, 946, and 947 of a next level, 932 successfully shakes hands with 948, 949, 950, and 951 of a next level, 933 successfully shakes hands with 952, 953, 954, and 955 of a next level, 934 successfully shakes hands with 956, 957, 958, and 959 of a next level, 935 successfully shakes hands with 960, 961, 962, and 963 of a next level, 936 successfully shakes hands with 964, 965, 966, and 967 of a next level, 937 successfully shakes hands with 968, 969, 970, and 971 of a next level, 938 successfully shakes hands with 972, 973, 974, and 975 of a next level, 939 successfully shakes hands with 976, 977, 978, and 979 of a next level, 93*a* successfully shakes hands with 980, 981, 982, and 983 of a next level, 93*b* successfully shakes hands with 984, 985, 986, and 988 of a next level, 93*c* successfully shakes hands with 988, 989, 990, and 991 of a next level, 93*d* successfully shakes hands with 992, 993, 994, and 995 of a next level, 93*e* successfully shakes hands with 996, 997, 998, and 999 of a next level, and 93*f* successfully shakes hands with 9*a*0, 9*a*1, 9*a*2, and 9*a*3 of a next level. At a fifth tick, the data is stored in the local caches all the leaf tiles (940-9*a*3) at the same time. It can be seen from the above that in a case of a smooth data path, data that is broadcast from a central node can arrive at leaf nodes at the same time, thereby realizing the synchronism of data.

Figure 16:
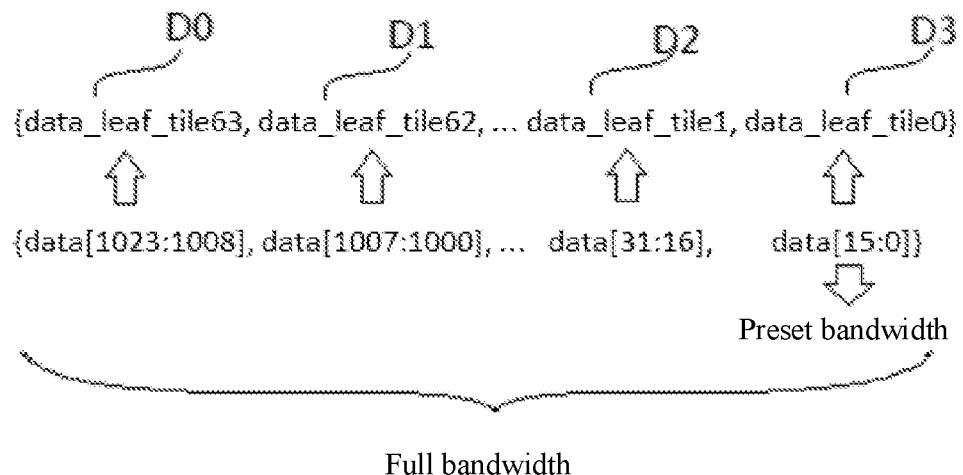
FIG. 16 is a schematic diagram of full bandwidth data and data segments corresponding to each leaf tile on an x-tree according to another example of the present disclosure.

In the example above, when arriving at each leaf tile, the data is full bandwidth. Assuming that as shown in FIG. 16, the preset bandwidth of each leaf tile is 16-bit data, each leaf tile fetches data that is multicast to the leaf tile from the data of full bandwidth according to a data id. The position of data in full bandwidth is [id*16: id*16+15]. For instance, data D0 with the id 63 is located at data[1023:1008], and data D0 with the id 0 is located at data[15:0].

The present disclosure provides a machine learning computing device for sparse connection. Specifically, the machine learning may include an artificial neural network. The device includes:

a mapping unit configured to convert input data into input neurons, weights, and connection data, filter the input neurons according to the connection data to obtain computation neurons, and store the computation neurons in a storage device or a cache;

a storage device configured to store computation neurons, weights, and computation instructions; and an operating unit configured to execute a corresponding operation on the computation neurons and weights according to the computation instructions stored in the storage device, where the operating unit mainly performs a three-step operation: step 1, multiplying the computation neurons and the weights to obtain a first result; step 2, executing an adder tree operation to obtain a second result, where specifically, the first result obtained in the step 1 is subject to a stage-by-stage summation in an adder tree to obtain the second result, or a bias is added to the first result to obtain the second result; and step 3, executing an activation function operation on the second result to obtain a final output neuron.

Figure 2B:
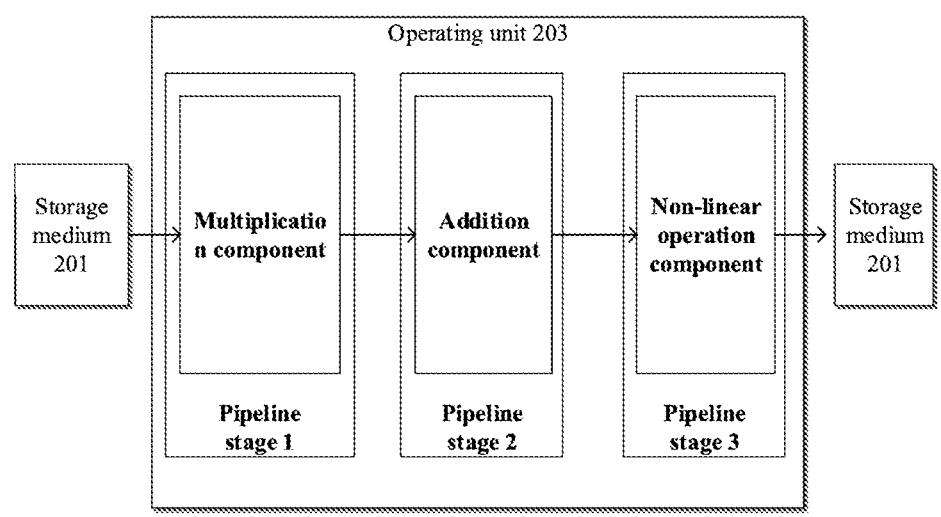
FIG. 2B is a schematic structural diagram of a pipeline stage according to an example of the present disclosure.

The operating unit may include an adder, a multiplier, and an activation computing element. FIG. 2B shows a connection between those computing elements. Each computing element corresponds a pipeline stage. This computing method may save computing time and speed up computation. In an alternative example, components of different pipeline stages may be combined freely, or a one-stage pipeline stage may be adopted. For instance, a second pipeline stage and a third pipeline stage may be combined; a first pipeline stage, a second pipeline stage, and a third pipeline stage may all be combined; or each pipeline stage may perform different operations, and may be permuted and combined. For instance, a first pipeline stage is configured to perform comparison operations and some multiplication; and a second pipeline stage is configured to perform a combination of operations such as a combination of nonlinear operations and matrix-scalar multiplication.

The connection data is expressed as follows.

The first instance:

using 1 to represent connection, 0 to represent connectionless, and a character string of 0 and 1 formed with the connection status between each output neuron and all input neurons to represent connection relations of the output neurons; or using 1 to represent connection, 0 to represent connectionless, and a character string of 0 and 1 formed with the connection status between each input neuron and all output neurons to represent connection relations of the input neurons.

The second instance:

using a distance from a position of a first connection of an output neuron to a first input neuron, a distance from a second input neuron of the output neuron to a previous input neuron, a distance from a third input neuron of the output neuron to a previous input neuron . . . in a similar fashion, until all input neurons of the output neuron are exhausted, so as to represent connection relations of the output neuron.

Alternatively, the computing device of the artificial neural network further includes: a DMA configured to read/write data or instructions in the storage device and cache.

Alternatively, the computing device of the artificial neural network further includes:

an instruction cache configured to store special instructions; and a control unit configured to read the special instructions from the instruction cache and decode the special instructions into various operating unit instructions.

Alternatively, the computing device of the artificial neural network further includes:

an input neuron cache configured to cache input neuron data that is input into the operating unit; and a weight cache configured to cache weight data.

Alternatively, the computing device of the artificial neural network further includes:

an output neuron cache configured to cache output neurons that is output from the operating unit.

Preferably, the mapping unit is configured to convert the input data into a storage mode in which the input neurons correspond to the weights one-by-one, and output the neurons to the operating unit rather than storing the same in the storage device.

Preferably, the computing device of the artificial neural network further includes an input neuron cache and/or a weight cache. The input neuron cache is configured to cache the input neuron data that is input into the operating unit. The weight cache is configured to cache weight data. The mapping unit is configured to convert the input data into a storage mode in which the input neurons correspond to the weights one-by-one, and output the neurons into the input neuron cache and/or the weight cache.

Preferably, an activation function executed by the operating unit in the step 3 may be a sigmoid function, a tanh function, or a ReLU function.

The present disclosure further discloses a computing method for a sparsely connected artificial neural network. The method may be applied to the device of FIG. 26, FIG. 28, or FIG. 30. The method includes:

a step 1, converting input data into input neurons, weights, and connection data, where the connection data is expressed as:

the first instance:

using 1 to represent connection, 0 to represent connectionless, and a character string of 0 and 1 formed with the connection status between each output neuron and all input neurons to represent connection relations of the output neurons; or using 1 to represent connection, 0 to represent connectionless, and a character string of 0 and 1 formed with the connection status between each input neuron and all output neurons to represent connection relations of the input neurons.

the second instance:

using a distance from a position of a first connection of an output neuron to a first input neuron, a distance from a second input neuron of the output neuron to a previous input neuron, a distance from a third input neuron of the output neuron to a previous input neuron . . . in a similar fashion, until all input neurons of the output neuron are exhausted, so as to represent connection relations of the output neuron.

The method includes: a step 2, filtering the input neurons according to the connection data to obtain computation neurons, and multiplying the computation neurons and the weight data to obtain a first result.

The input data includes: input neurons, weights, and connection data. The input neurons, the weights, and the connection data are included in the input data directly, and can be fetched from the input data directly. The computation neurons can be obtained by filtering the input neurons according to the connection data.

Figure 18:
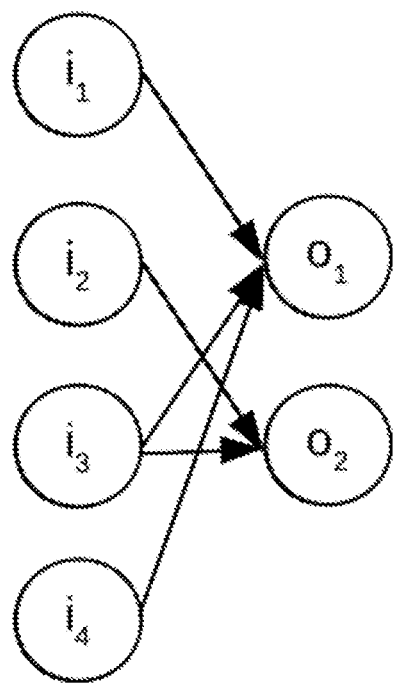
FIG. 18 is a schematic structural diagram of nodes of a sparsely connected neural network according to an example of the present disclosure.

A method of filtering input neurons may be: it is assumed that there are 4 input neurons, connection data being 1 denotes connection; as shown in FIG. 18, if connection data is 1011, then input neurons are $i_1$, $i_2$, $i_3$, and $i_4$, the second neuron $i_2$ which does not have connection is deleted to obtain computation neurons $i_1$, $i_3$, and $i_4$. Connection data being 1 may also denote connectionless. In this case, $i_1$, $i_3$, and $i_4$ which do not have connections are deleted to obtain a computation neuron $i_2$.

The method includes: a step 3, performing an adder tree operation on the first result to obtain a second result.

The step 3 can be realized in various ways. For instance, the first result can be added by an adder tree stage-by-stage to obtain the second result; or a bias can be added to the first result to obtain the second result.

The method includes: a step 4, executing an activation function operation on the second result to obtain final output neurons, where the activation function may be a sigmoid function, a tanh function, or a ReLU function.

The technical solution of the present disclosure is further explained below with reference to the drawings and examples.

Figure 17:
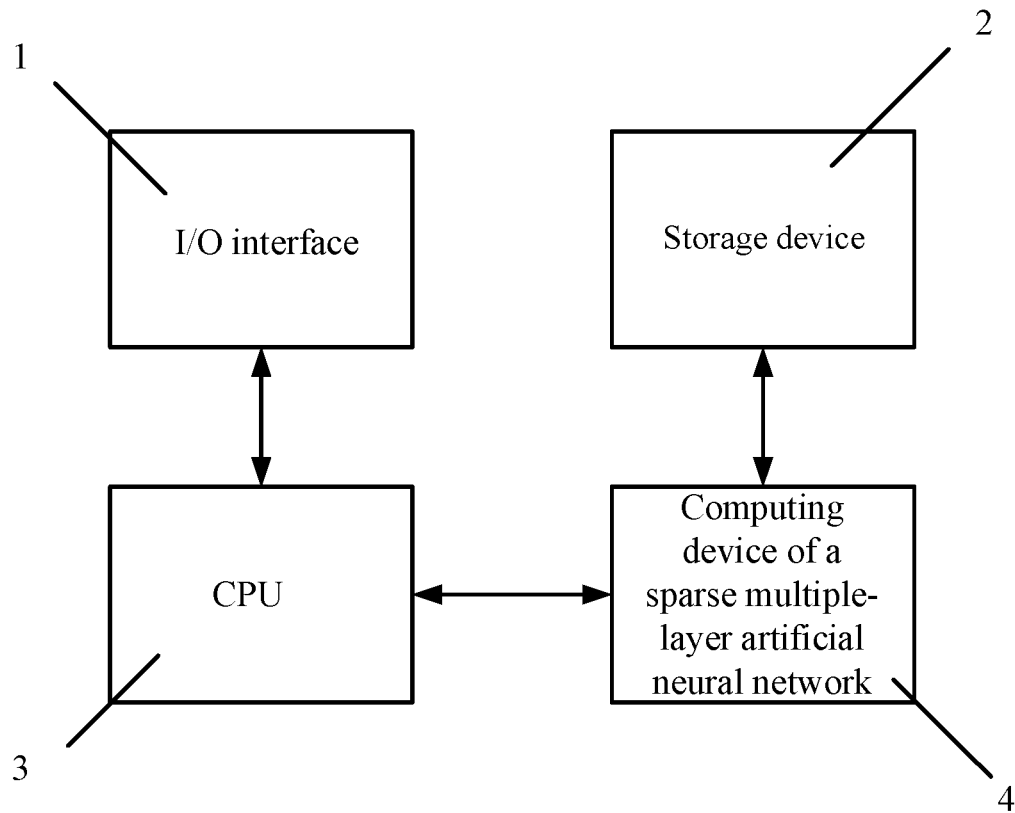
FIG. 17 is a schematic block diagram of an overall structure according to an example of the present disclosure.

FIG. 17 is a block diagram of an overall structure of an example of the present disclosure.

The structure includes an I/O interface 1 which is used when I/O data needs to be sent to a computing device of a sparse multiple-layer artificial neural network through a CPU 3, and then to be written into a storage device 2 by a computing device 4 of the sparse multiple-layer artificial neural network. Programs as needed by the computing device 4 of the sparse multiple-layer artificial neural network are transmitted by the CPU 3 to the device 4.

The structure includes the storage device 2 which is configured to temporarily store models and neuron data of the sparse multiple-layer artificial neural network, especially when not all of the models can be put in the cache of the computing device 4 of the sparse multiple-layer artificial neural network.

The structure includes the CPU 3 which is configured to perform basic controls such as data transportation and start/stop of the computing device 4 of the sparse multiple-layer artificial neural network. The CPU 3 acts as an interface between the computing device 4 and an external control.

The structure includes the computing device 4 of the sparse artificial neural network which is a unit configured to execute operations of the sparse multiple-layer artificial neural network, receive data and programs from the CPU 3, and execute computing algorithms of the sparse multiple-layer artificial neural network. Execution results of the computing device 4 of the sparse artificial neural network are transmitted back to the CPU 3.

A general-purpose system structure uses the computing device 4 of the sparse artificial neural network as a co-processor of the CPU 3 or a GPU to execute the computing algorithms of the sparse multiple-layer artificial neural network.

A system structure of multiple interconnected computing devices of the sparse artificial neural network may be formed in a way that multiple computing devices 4 of the sparse artificial neural network are interconnected through a PCIE bus. The multiple computing devices 4 are capable of supporting a larger scale of sparse multiple-layer artificial neural network operation, may share the same host CPU or have their own host CPU respectively, may share the memory or have their own memory for each processor. Besides, the interconnection mode of the multiple computing devices 4 can be any interconnection topology.

In respect of a sparsely connected neural network as shown in FIG. 18, there are four input neurons: $i_1, i_2, i_3, i_4$, and two output neurons: $o_1, o_2$. $o_1$ is connected to $i_1, i_3$, and $i_4$. The weights of the connections are respectively expressed as $w_{11}, w_{31}, w_{41}$. $o_2$ is connected to $i_2$ and $i_3$. The weights of the connections are respectively expressed as $w_{22}$ and $w_{32}$.

There are two ways to show the connection relations in the sparse neural networks above: one is to use one digit between each input neuron and each output neuron to represent whether or not there is connection therebetween, and the other is to use a distance between connections to represent the position of each connection.

Figure 19:
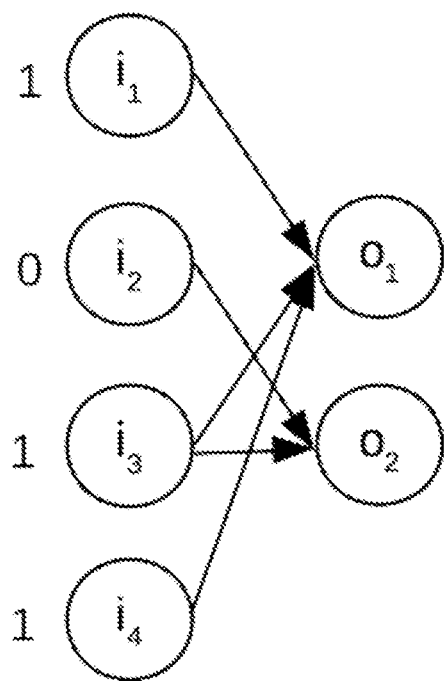
FIG. 19 is a schematic diagram of a connection relationship of the neural network in FIG. 4.

The first representation of connections:

Regarding the neural network in FIG. 18, as shown in FIG. 19, the connection relation of the output neuron $o_1$ is 1011. Each digit represents whether or not there is connection with the input neuron. 1 represents connection, and 0 represents connectionless. Then the connection relation of the output neuron $o_2$ is 0110. In the process of operation, the input neuron corresponding to a connection relation of 0 will be filtered out and not be computed. Specifically, for the input neuron $o_1, i_2$ will be filtered out; and for $o_2, i_1$ and $i_4$ will be filtered out. In this way, input neurons that are filtered out will not be computed during operation.

When storing connection relations, the connection relations may be stored in an order of input neurons first or output neurons first. The storage format includes:

Format I: place all input neurons of each output neuron in turn, for instance, the order in the instance above is 10110110.

Format II: place all output neurons of each input neuron in turn, for instance, the order in the instance above is 10011110.

Figure 20:
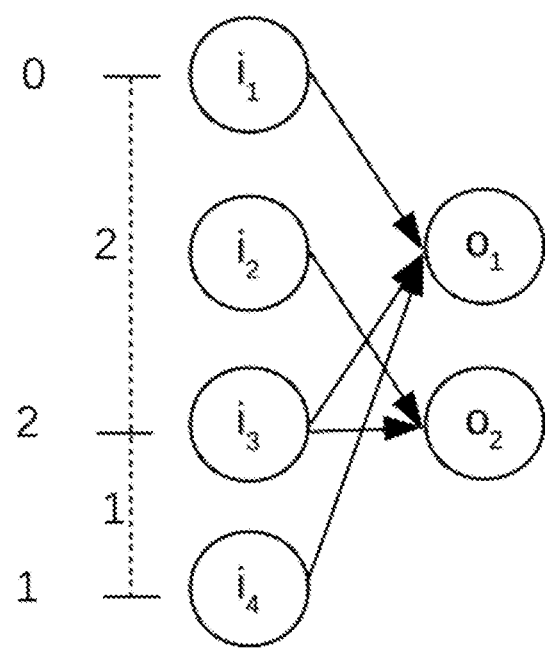
FIG. 20 is a schematic diagram of a connection relationship of a sparsely connected neural network according to another example of the present disclosure.

The second representation of connections:

For instance, regarding the neural network in FIG. 20, the output neuron $o_1$ is connected to the input neurons $i_1, i_3$, and $i_4$, and then the connection relations are 0, 2, 1. 0 indicates that the distance between the position of the first connection and the first input neuron is 0, i.e. the first input neuron. 2 indicates that the distance between the second input neuron and the previous input neuron is 2, i.e. representing the third input neuron. 1 indicates that the distance between the third input neuron and the previous input neuron is 1, i.e. representing the fourth input neuron. Likewise, the connection relations of $o_2$ are 1, 1.

The mapping unit of the present disclosure includes, but is not limited to, the connection relations above.

A convolutional neural network is one type of artificial neural networks. A convolution layer includes multiple filters which are convolution kernels. Such convolution kernels repeatedly act on all input images, and extract local features. Different convolution kernels can extract local features of different types. After passing through the convolution layer, one input image becomes some abstract features that can be better understood.

Natural images have their own inherent properties. In other words, the statistical property of a part of an image is the same as the rest part, which means features learned from this part can be applied to another part, so the same learned feature can be applied to all the positions of the image. When a small block, for instance an 8*8 block, is randomly selected as a sample from a large image, and some features are learned from this small block sample, then the features learned in the 8*8 sample can serve as a detector to be applied to any position in the image. Particularly, a convolution operation can be performed on the large image according to the features learned in the 8*8 sample, thereby obtaining an activation value of a different feature from any position of the large image. Features of the 8*8 sample are regarded as convolution kernels. A method of the above-mentioned convolution operation is similar to the method shown in FIG. 6B, and is thus omitted here.

Figure 21:
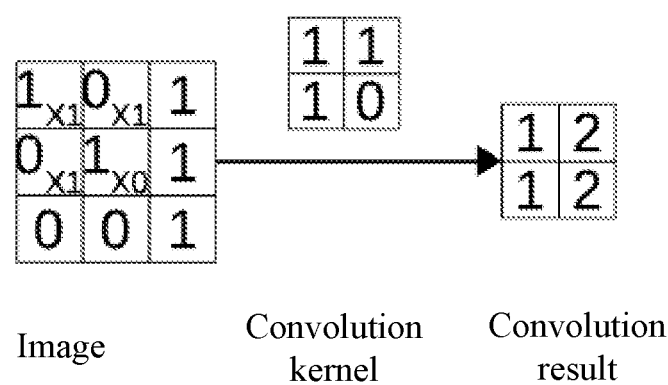
FIG. 21 is a schematic diagram of a convolution operation according to an example of the present disclosure.

FIG. 21 is an instance of a convolution operation. The convolution kernel is a 2*2 matrix and slides on the input image.

Provided that the convolution kernel slides by one pixel each time, then there will be four convolution operations in total. For each convolution operation, multiplication and addition operations are performed on the convolution kernel matrix and the corresponding input image data.

Figure 22:
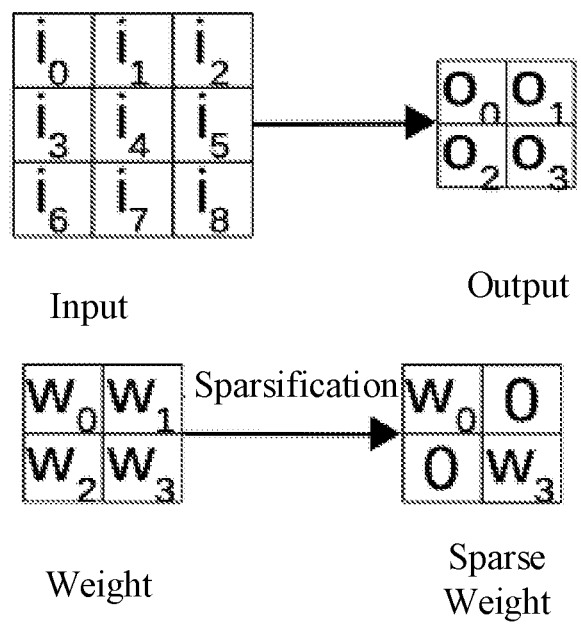
FIG. 22 is a diagram illustrating changes of input, output, and weights when a convolutional neural network becomes sparse.

Provided that weights of the convolution kernel become sparse. For instance, the weights change from the previous 2*2 into two parameters only, see FIG. 22. Then, for the output neuron $o_0$, the needed input neurons will be $i_0, i_1, i_3$, and $i_4$, the input weights will be $w_0$ and $w_3$, and the connection relation will be 1001 or 0, 2.

For the output neuron $o_3$, the needed input neurons will be $i_3, i_5, i_7$, and $i_8$, the input weights will be $w_0$ and $w_3$, and the connection relation will be 1001 or 0, 2.

Accordingly, for different output neurons in the same output neuron feature map, the needed input neurons are different while their weights and connection relations are the same.

The computing device of the artificial neural network that can execute a sparse connection can handle various sparsely connected artificial neural networks expressed by sparse connections. The computing device includes a unit configured to handle sparse connections which is named as a mapping unit herein. For different sparse connection relations and handling methods, the structures of the computing devices of the sparsely connected artificial neural network are slightly different. Below is an explanation of different structures and methods.

Figure 23:
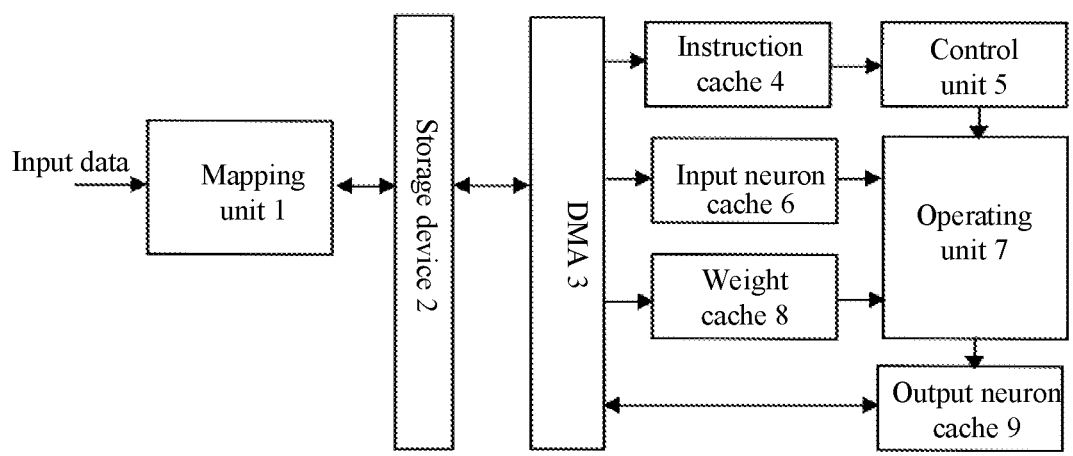
FIG. 23 is a schematic structural diagram of a computing device of a sparsely connected artificial neural network according to an example of the present disclosure.

Structure & Method I:

as shown in FIG. 23, a mapping unit 1 is configured to convert input data into input neurons, weights, and connection data;

a storage device 2 is configured to store data and instructions, especially when a scale of a neural network is large, and an instruction cache 4, an input neuron cache 6, an output neuron cache 9, and a weight cache 8 cannot accommodate so much data, the data has to be temporarily stored in the storage device 2;

a DMA 3 is configured to move data or instructions in the storage device to respective caches;

an instruction cache 4 is configured to store special instructions;

a control unit 5 is configured to read the special instructions from the instruction cache 4, and decode the same into various instructions for operating unit;

an input neuron cache 6 is configured to store the input neuron data to be computed; and an operating unit 7 is configured to execute specific operations. The operating unit acts in three stages. A first stage is to execute multiplication operations in which the input neurons are multiplied by the weight data. A second stage is to execute an adder tree operation. The first stage and the second stage form a vector inner-product operation in combination. A third stage is to execute an activation function operation, where a activation function may be a sigmoid function, a tanh function, etc. The output neurons obtained in the third stage are written back into the output neuron cache.

A weight cache 8 is configured to store weight data.

An output neuron cache 9 is configured to store the output neurons of computation.

Figure 24:
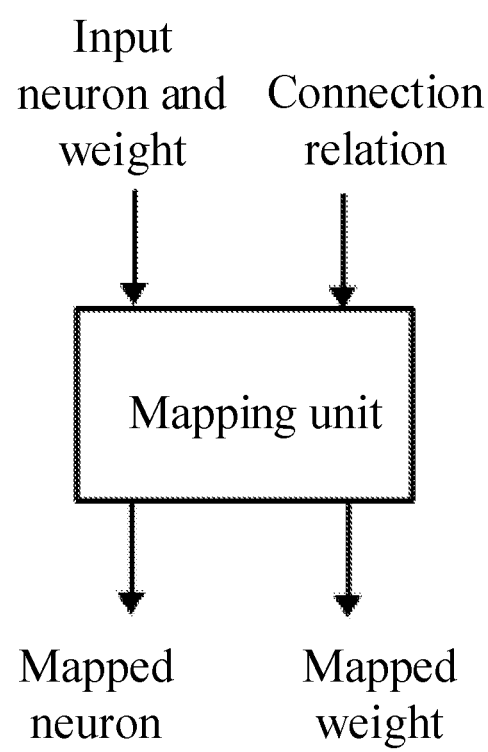
FIG. 24 is a schematic structural diagram of a mapping unit according to an example of the present disclosure.

The structure of the mapping unit is illustrated in FIG. 24.

By taking the above sparsely connected neural network as an instance, the connection relation may be either of the two sparse expressions as stated above. According to the connection relation, the mapping unit will map the input neurons and input weights into mapped neurons and weights, and output the mapped neurons and weights. The mapped neurons and weights may be directly used in the computation without considering the connection relation. A process of mapping the output neuron $o_1$ is as follows:

The input neurons are $i_1$, $i_2$, $i_3$, and $i_4$. The input weights are $w_{11}$, $w_{31}$, and w41. The connection relation is 1011 or 0, 2, 1. According to the connection relation, the mapping unit changes the input neurons and weights into a corresponding relation. There are two circumstances of the output: one is to remove connectionless input neurons, then the mapped neurons are $i_1$, $i_3$, and $i_4$, and the mapped weights are $w_{11}$, $w_{31}$, and $w_{41}$; and the other is to complement a weight of 0 in a connectionless position, then the mapped neurons are $i_1$, $i_2$, $i_3$, and $i_4$, and the mapped weights are $w_{11}$, 0, $w_{31}$, and $w_{41}$.

The operating unit is mainly divided into three parts: a first part is a multiplier; a second is an adder tree; and a third is a linear function unit. The first part multiplies the input neurons (in) by the weights (w) to obtain weighted output neurons (out), and the process is expressed as out=w*in. The second part adds the weighted output neurons stage-by-stage in the adder tree, or may add a bias (b) to the output neurons (out) to obtain biased output neurons (out), and the process is expressed as out=in+b. The third part applies an activation function (active) to the output neurons (in) to obtain activated output neurons (out), and the process is expressed as out=active(in), where the activation function (active) may be sigmoid, tanh, relu, softmax, etc. In addition to the activation operation, the third part can perform other nonlinear functions. For instance, the third part may apply an operation (f) to the input neurons (in) to obtain output neurons (out), and the process is expressed as out=f(in).

Figure 25:
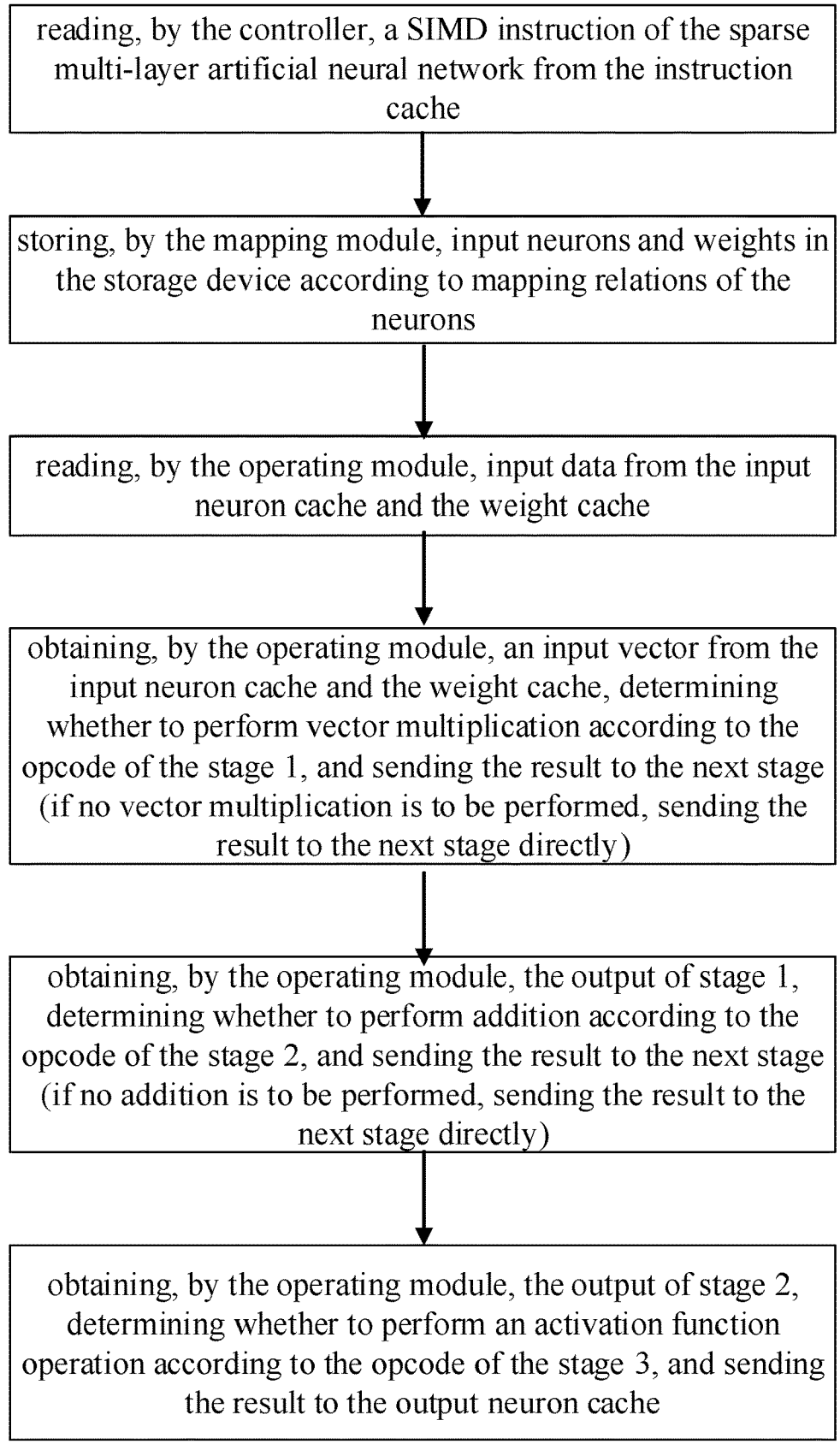
FIG. 25 is a flowchart illustrating an operation process of a sparsely connected artificial neural network according to an example of the present disclosure.

The operation process is shown in FIG. 25.

Structure & Method II

Figure 26:
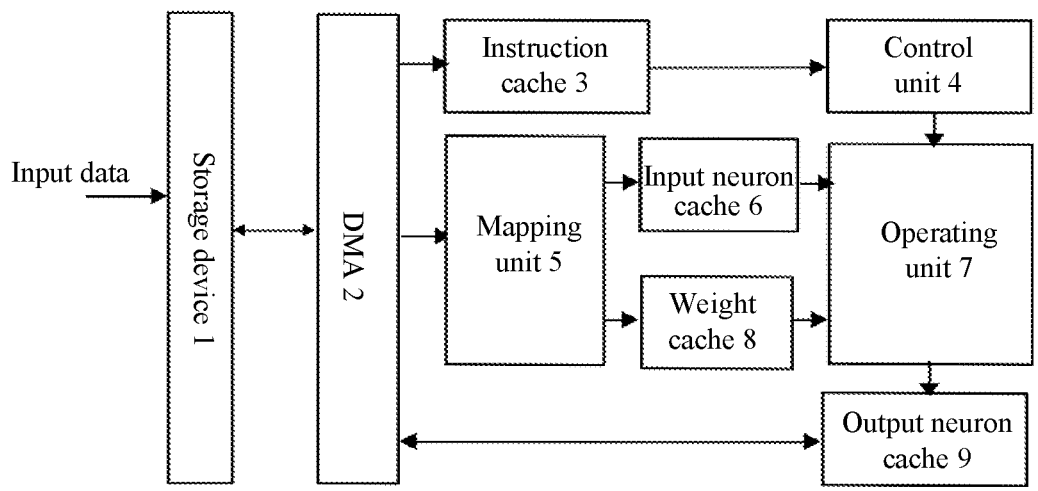
FIG. 26 is a schematic structural diagram of a computing device of a sparsely connected artificial neural network according to another example of the present disclosure.

As show in FIG. 26, a storage device 1 is configured to store data and instructions, especially when the scale of a neural network is large, and an instruction cache 3, an input neuron cache 6, an output neuron cache 9, and a weight cache 8 cannot accommodate so many data, the data has to be temporarily stored in the storage device 1;

a DMA 2 is configured to move data or instructions in the storage device to respective caches;

an instruction cache 3 is configured to store special instructions;

a control unit 4 is configured to read the special instructions from the instruction cache 3, and decode the same into various instructions for operating unit;

a mapping unit 5 is configured to convert input data into a storage mode in which input neurons correspond to weights one-by-one;

an input neuron cache 6 is configured to store the input neuron data to be computed; and an operating unit 7 is configured to execute specific operations. The operating unit acts in three stages. A first stage is to execute multiplication operations in which the input neurons are multiplied by the weight data. A second stage is to execute an adder tree operation. The first stage and the second stages form a vector inner-product operation in combination. A third stage is to execute an activation function operation, where an activation function may be a sigmoid function, a tanh function, etc. The output neurons obtained in the third stage are written back into the output neuron cache.

A weight cache 8 is configured to store weight data.

An output neuron cache 9 is configured to store the output neurons of computation.

Figure 27:
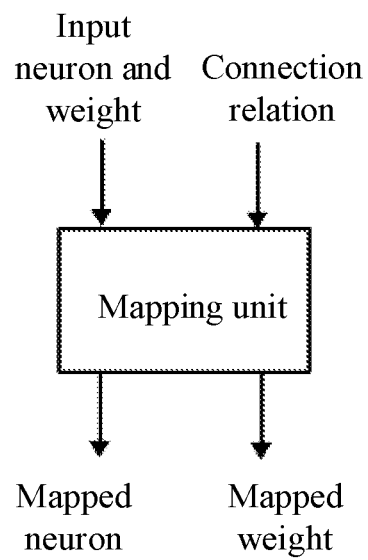
FIG. 27 is a schematic structural diagram of a mapping unit according to another example of the present disclosure.

The structure of the mapping unit is illustrated in FIG. 27.

By taking the above sparsely connected neural network as an example, the connection relation may be either of the two sparse expressions as stated above. According to the connection relation, the mapping unit will map the input neurons and input weights into mapped neurons and weights, and output the mapped neurons and weights. The mapped neurons and weights may be directly used in the computation, without considering the connection relation. A process of mapping the output neuron $o_1$ is as follows:

The input neurons are $i_1$, $i_2$, $i_3$, and $i_4$. The input weights are $w_{11}$, $w_{31}$, and $w_{41}$. The connection relation is 1011 or 0, 2, 1. According to the connection relation, the mapping unit changes the input neurons and weights into a corresponding relation. There are two circumstances of the output: one is to remove connectionless input neurons, then the mapped neurons are $i_1$, $i_3$, and $i_4$, and the mapped weights are $w_{11}$, $w_{31}$, and $w_{41}$; and the other is to complement a weight of 0 in a connectionless position, then the mapped neurons are $i_1$, $i_2$, $i_3$, and $i_4$, and the mapped weights are $w_{11}$, 0, $w_{31}$, and $w_{41}$.

A main distinction between the mapping units in Structure & Method I and Structure & Method II is that before computation, the mapping unit of the former one maps the input neurons and weights, and then stores them in the storage device; while Structure & Method II performs mapping during computation, and directly sends the mapped data to the operating unit for computation.

Structure & Method III

Figure 28:
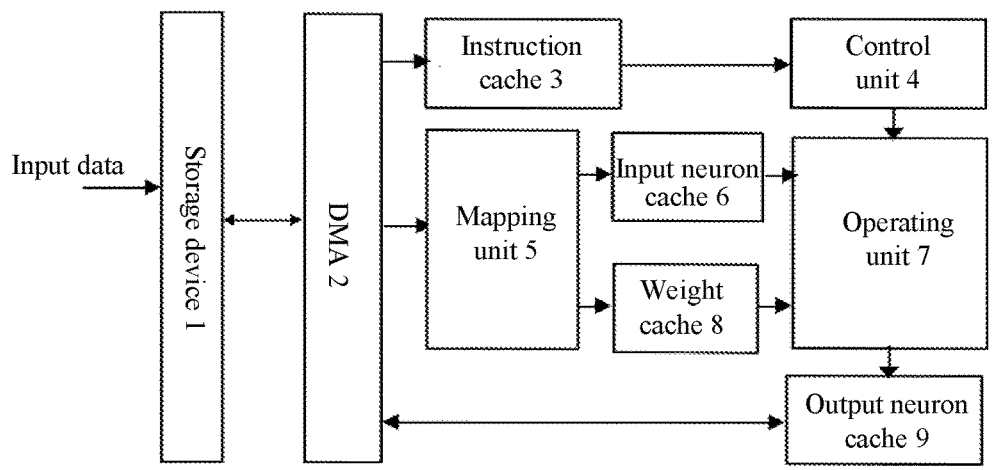
FIG. 28 is a schematic structural diagram of a computing device of a sparsely connected artificial neural network according to another example of the present disclosure.

Based on Structure & Method II, a slight modification may be made so as to obtain a structure as shown in FIG. 28, where the mapping unit performs mapping only on the input neurons.

Figure 29:
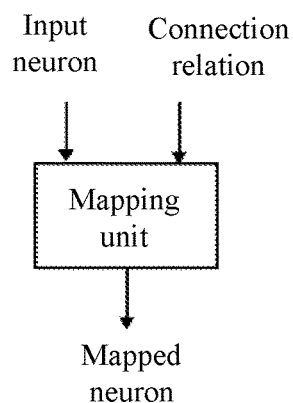
FIG. 29 is a schematic structural diagram of a mapping unit according to another example of the present disclosure.

A structure diagram of the mapping unit is shown in FIG. 29.

A process of mapping the output neuron $o_1$ is described as below:

The input neurons are $i_1$, $i_2$, $i_3$, and $i_4$, and the connection relation is 1011 or 0, 2, 1. According to the connection relation, the mapping unit changes the input neurons and weights into a corresponding relation, and removes those connectionless input neurons, so that the mapped neurons are $i_1$, $i_3$, and $i_4$.

Structure & Method IV

Figure 30:
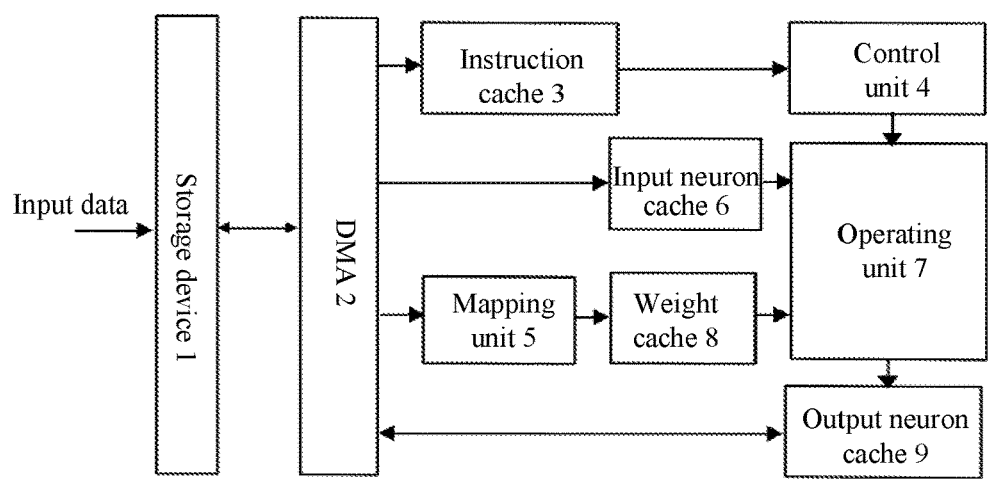
FIG. 30 is a schematic structural diagram of a computing device of a sparsely connected artificial neural network according to still another example of the present disclosure.

Based on Structure & Method-II, a slight modification may be made so as to obtain a structure as shown in FIG. 30, where the mapping unit performs mapping only on the input weights.

Figure 31:
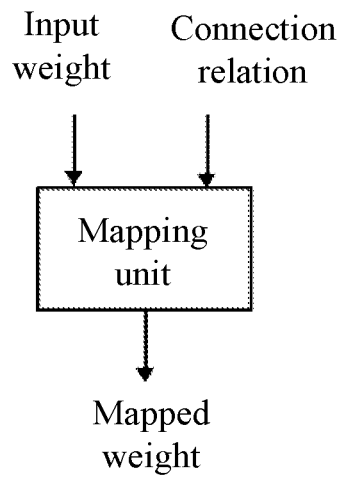
FIG. 31 is a schematic structural diagram of a mapping unit according to still another example of the present disclosure.

A structure diagram of the mapping unit is shown in FIG. 31.

A process of mapping the output neuron $o_1$ is described as below:

The input weights are $w_{11}$, $w_{31}$, and $w_{41}$; and the connection relation is 1011 or 0, 2, 1. According to the connection relation, the mapping unit changes the input neurons and weights into a corresponding relation, so that the mapped weights are $w_{11}$, 0, $w_{31}$, and $w_{41}$.

Figure 32:
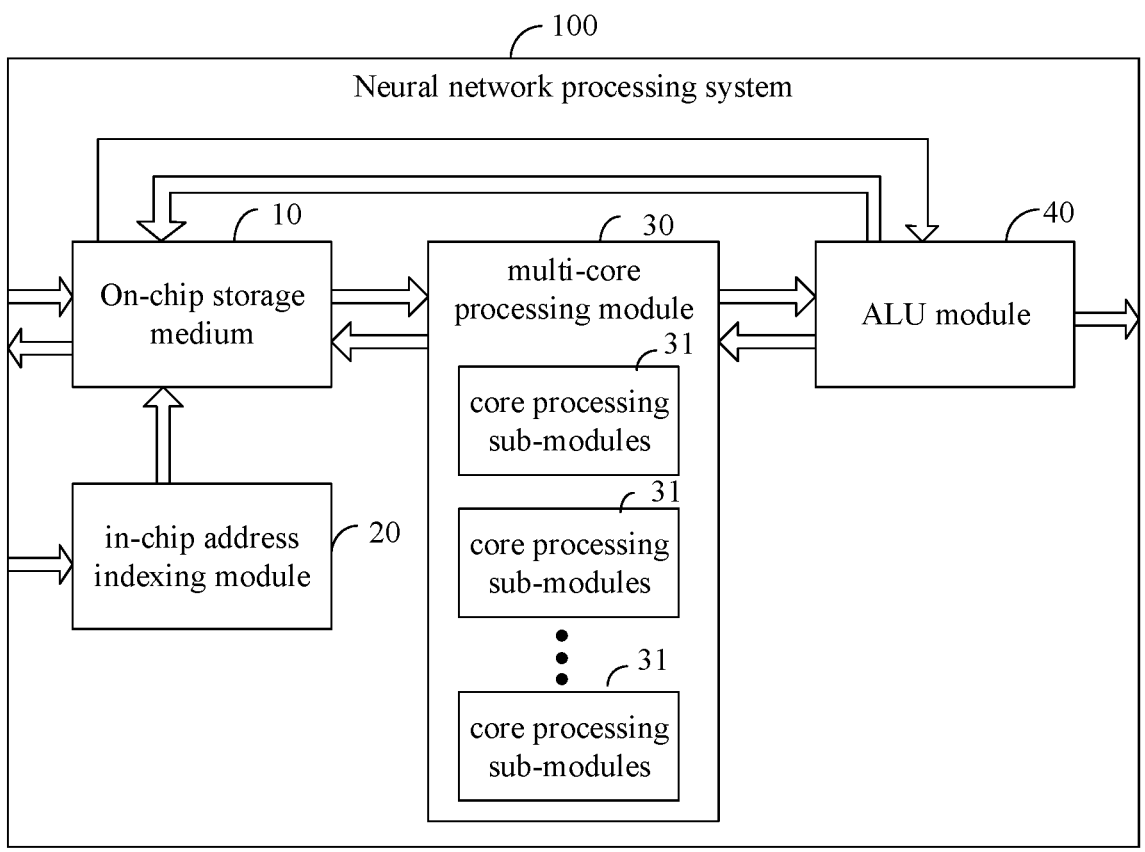
FIG. 32 is a structural block diagram of an example of a neural network processing system in the present disclosure.

As shown in FIG. 32, the present disclosure provides a neural network processing system 100. In an alternative example, the neural network processing system 100 may be a computing device as shown in FIG. 6A. Compared with the computing device of FIG. 6A, one or more arithmetic logic units are added. The plurality of arithmetic logic units are configured to perform nonlinear operations. In an alternative example, the computing device of FIG. 6A may also be used to extend the units or modules in the neural network processing system of FIG. 32. In another example, the system includes at least one on-chip storage medium 10, at least one in-chip address indexing module 20, a multi-core processing module 30, and one or more arithmetic logic unit (ALU) modules 40. The multi-core processing module 30 includes a plurality of core processing sub-modules 31. The in-chip address indexing module 20 is connected to the on-chip storage medium 10. The internal address indexing module 20, the multi-core processing module 30, and the ALU module 40 are interconnected respectively. The multi-core processing module 30 is configured to perform vector multiply-add operations in neural network operations. The plurality of ALU modules 40 are configured to obtain input data from the multi-core processing module 30 or on-chip storage medium 10 to perform nonlinear operations that the multi-core processing module 30 cannot complete. In this example, the plurality of core processing sub-modules 31 share the on-chip storage medium 10 and the ALU modules 40.

The on-chip storage medium 10 is configured to store data transferred from the external of the neural network processing system or data generated during processing. The data generated during processing includes processing results or intermediate results generated during processing. Those results may be from an on-chip core operation module, and may be from other operation components, such as the ALU module 40 of the present disclosure. The on-chip storage medium 10 may be a common storage medium such as a static random access memory (SRAM), a dynamic random access memory (DRAM), an enhanced dynamic random access memory (e-DRAM), and a register file (RF), or may be a new storage medium such as a non-volatile memory (NVM) or a 3D storage device, or the like.

The in-chip address indexing module 20 is configured to map to a correct storage address according to an input index when performing operation, so as to send correct data to the multi-core processing module 30 for processing. In this case, the data and the on-chip storage medium can interact correctly. An address mapping process includes direct mapping, arithmetic transformation, and so on. The indexing module may be realized in a form of a hardware circuit (including but not limited to FPGA, CGRA, ASIC, analog circuit, memristor, etc.).

The multi-core processing module 30 includes the plurality of core processing sub-modules 31 for performing vector multiply-add operations in neural network operations Specifically, the multi-core processing module 30 is configured to complete most of the operations in neural network algorithms, which are all linear operations, i.e., multiply-add operations. There may be various structures for each of the core processing sub-modules 31, such as an embodiment of one-dimensional processing element (PE), an embodiment of two-dimensional PE, or an embodiment of multi-dimensional PE. The structure of each of the core processing sub-modules 31 is not restricted to a specific implementing principle, and may be implemented with different methods such as a systolic scheme, a matrix-vector multiply-add operator. The plurality of core processing sub-modules 31 of the multi-core processing module 30 may be homogeneous or heterogeneous. The processing module may be realized in a form of a hardware circuit (including but not limited to FPGA, CGRA, ASIC, analog circuit, memristor, etc.).

The ALU module 40 is configured to obtain input data from the multi-core processing module 30 or the on-chip storage medium to perform nonlinear operations that cannot be performed by the core processing module. The module may be realized in a form of a hardware circuit (including but not limited to FPGA, CGRA, ASIC, analog circuit, memristor, etc.). In the present disclosure, a data path of the multi-core processing module 30, the ALU module 40, and the on-chip storage medium 10 includes, but is not limited to, an h-tree, fat-tree, or another interconnection technique.

In the present disclosure, the plurality of core processing sub-modules 31 reuse part of input together to reduce bandwidth requirements. When the neural network processing system 100 works, the neural network processing system 100 sends the same input neuron to the plurality of core processing sub-modules 31 of the multi-core processing module 30, allocates different input weights to different core processing sub-module 31. The plurality of core processing sub-modules 31 perform vector inner product (sums of multiply-add operations) operations on input neurons and input weights to obtain different output neurons. Different output neurons correspond to different weights. In other words, when processing different output neurons, input neurons are the same while weights are different. In the present disclosure, in most cases, weights cannot be reused by a plurality of cores. However, in some cases, such as a case where a plurality of cores jointly process a feature map, weights can also be reused.

Aiming at the core processing part of the neural network processing system, the present disclosure uses more on-chip core processing modules to improve the processing speed of the core operation part of neural network algorithms, so that the processor may have better performance. The core processing refers to vector multiply-add operations in neural network algorithms that take up most of the processing time. In this way, the present disclosure may improve the operation speed of the neural network processing system, making the performance of the neural network processing system better and more efficient.

Figure 33:
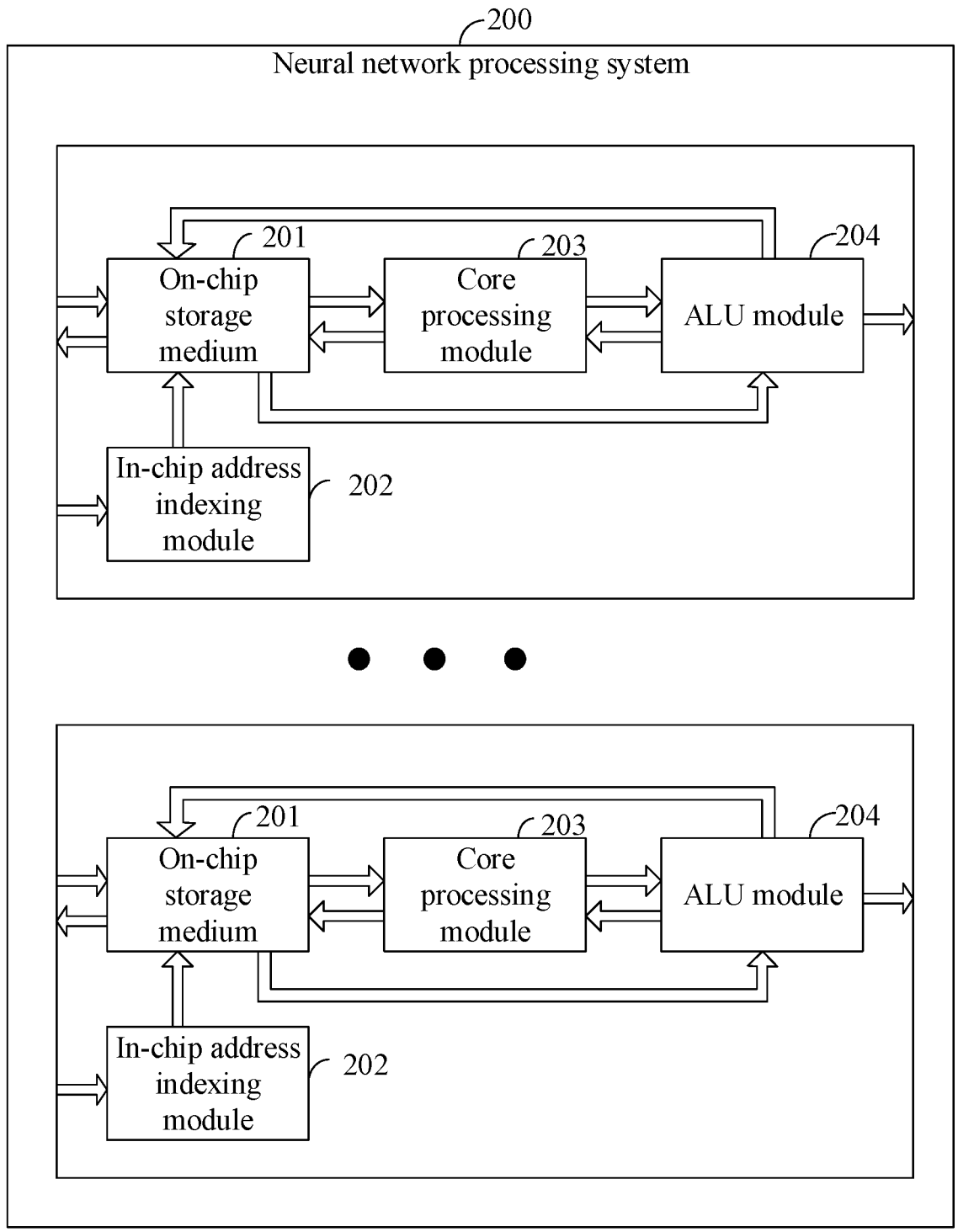
FIG. 33 is a structural block diagram of another example of a neural network processing system in the present disclosure.

FIG. 33 is a block diagram of another example of a neural network processing system provided by the present disclosure. The difference between the system of FIG. 33 and the system of FIG. 32 is that the latter uses a loose coupling design while the former uses a tight coupling design. As shown in FIG. 33, the neural network processing system 200 includes a plurality of on-chip storage media 201, a plurality of in-chip address indexing modules 202, a plurality of core processing modules 203, and a plurality of ALU modules 204. Each of the core processing modules 203 has a separate input interface and an input structure. The ALU modules 204 may be divided and placed in each core.

As shown in FIG. 32, the plurality of core processing sub-modules 31 only perform specific core operations and do not have more functions. The multi-core processing cores share the on-chip storage medium 10 and the ALU module 40. In comparison, regarding the tight coupling design adopted by the system of FIG. 33, each of the core processing modules 203 has its own on-chip storage medium 201 and ALU module 204. With the loose coupling design adopted by the system of FIG. 32, the plurality of cores can work together to achieve higher performance, but each core lacks flexibility. With the tight coupling design adopted by the system of FIG. 33, each core has a certain degree of flexibility, however, since each core is independent, the complexity of multi-core collaboration may increase, which also increases the complexity of control. Loose coupling is more suitable for multi-core homogeneous designs while tight coupling is commonly used in multi-core heterogeneous designs.

In the present disclosure, the neural network can be partitioned according to the design of the multi-core processing mode, which includes partitioning according to input neurons, partitioning according to output neurons, and partitioning according to weight connections. Partitioning the neural network refers to partitioning the neural network processing mode rather than partitioning the neural network into independent subnets. In other words, the neural network is partitioned in an algorithm level. The partition is performed by software or a compiler with an aim of partitioning the processing of the neural network into multiple parts that can be performed by multiple cores.

Figure 34:
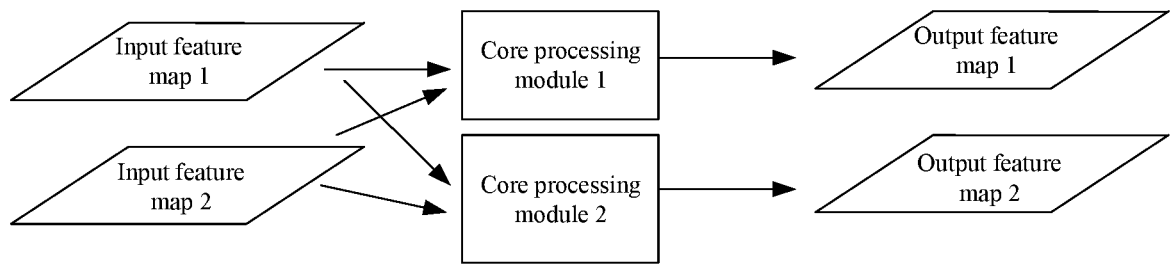
FIG. 34 is a schematic diagram of neural network partitioning according to an example of the present disclosure.
Figure 35:
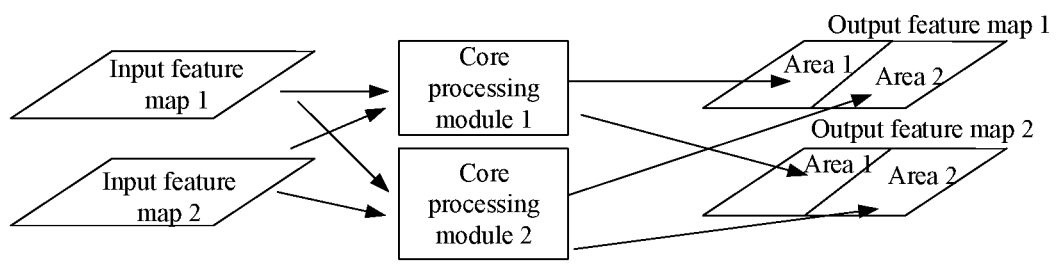
FIG. 35 is a schematic diagram of neural network partitioning according to another example of the present disclosure.
Figure 36:
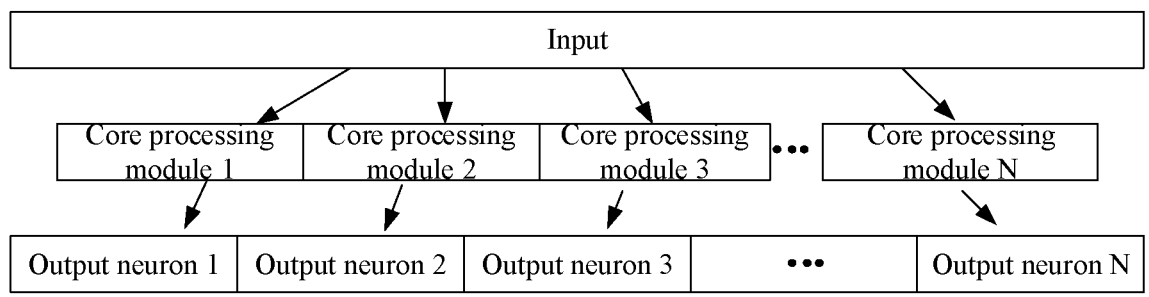
FIG. 36 is a schematic diagram of neural network partitioning according to another example of the present disclosure.

FIG. 34 is a schematic diagram of a neural network partitioning of an example. FIG. 35 is a schematic diagram of a neural network partitioning of another example. FIG. 36 is a schematic diagram of a neural network partitioning of yet another example.

During the processing of a neural network, convolution layers are organized according to feature maps. In other words, the input is a plurality of maps, and the output is also a plurality of maps. In FIG. 34, for a two-dimensional or multi-dimensional operation, from an aspect of output, a neural network may be partitioned in accordance with one layer of output feature maps being processed by a core. FIG. 34 includes an input feature map 1, an input feature map 2, a core processing module 1, a core processing module 2, an output feature map 1, and an output feature map 2. Each of the feature maps is a two-dimensional matrix. During processing, the input feature map 1 and the input feature map 2 are sent to the core processing module 1 and the core processing module 2. The core processing module 1 processes the output feature map 1. The core processing module 2 processes the output feature map 2. The core processing module 1 and the core processing module 2 process a layer of output feature maps respectively. In other words, during two-dimensional or multi-dimensional processing, input feature maps are sent to a plurality of core processing modules respectively, and the plurality of core processing modules process a layer of output feature maps respectively. After the plurality of core processing modules all finish processing current output feature maps, the plurality of core processing modules then process new output feature maps. In other words, new feature maps will only be processed after all the cores have finished processing the current output feature maps.

In certain applications, there may be a plurality of input feature maps, core processing modules, and output processing modules. A processing method of the multiple core processing modules is explained in the example below. The example includes 2 cores core #1, core #2), 4 output feature maps (output feature map #1, #2, #3, #4), and 4 input feature maps (input feature map #1, #2, #3, #4). After the processing begins, the core #1 processes the output feature map #1, the core #2 processes the output feature map #2, the input feature map #1 is sent to the core #1 and the core #2 (which means they share the input feature map #1), and corresponding weights are sent to the core #1 and the core #2 for processing at the same time. After the processing of the input feature map #1 is finished, the input feature map #2 is read from the on-chip memory and the sent to the core #1 and the core #2 for processing (similarly, corresponding weights are read). After the core #1 and the core #2 finish processing the output feature map #1 and the output feature map #2, the core #1 and the core #2 begin to process the output feature maps #3 and #4, i.e., repeating the operation above.

As shown in FIG. 35, for a two-dimensional or multi-dimensional operation, from an aspect of output, a neural network may be partitioned in accordance with one layer of output feature maps being processed by a core. Different cores process different areas of the same feature map. Correspondingly, input is sent to each core, and weights are read according to corresponding connections. The weights may be reused, such as convolution layers in a convolutional neural network. New feature maps will only be processed after all the cores have finished processing the current output feature maps. In FIG. 35, the input feature map 1 and the input feature map 2 are both sent to the core processing module 1 and the core processing module 2. The core processing module 1 processes an area 1 of the output feature map 1 and an area 1 of the output feature map 2. The core processing module 2 processes an area 2 of the output feature map 1 and an area 2 of the output feature map 2. In this way, when performing a two-dimensional or multi-dimensional operation, input feature maps are sent to the plurality of core processing modules respectively, the the plurality of core processing modules process different areas of the same output feature map. After the plurality of core processing modules all finish processing the current output feature maps, the plurality of core processing modules then process a new output feature map.

As shown in FIG. 36, for a one-dimensional operation, a neural network may be partitioned in accordance with a part of output being processed by a core processing module. Each core processes different neurons. A method of partitioning the neural network may vary and is not limited to the partitioning method shown in FIG. 36. Input is sent to each core processing module, and weights are read according to the corresponding connections. New feature maps will only be processed after all the core processing modules have finished processing the current output feature maps. In other words, when the neural network processing system performs a one-dimensional operation, the system sends the same input to plurality of core processing modules respectively, the plurality of core processing modules process different output neurons. After the plurality of core processing modules all finish processing the current output neurons, new input can then be processed.

The partitioning of a neural network includes partitioning according to input neurons, partitioning according to output neurons, and partitioning according to weight connections. The present disclosure partitions a neural network according to output neurons. The processing of output neurons requires the involvement of multiple or all input neurons, and the processing of output neurons is independent of each other in most cases. Partitioning a neural network according to output neurons can reuse input neurons and reduce bandwidth requirements, which may make the processor more efficient.

Figure 37:
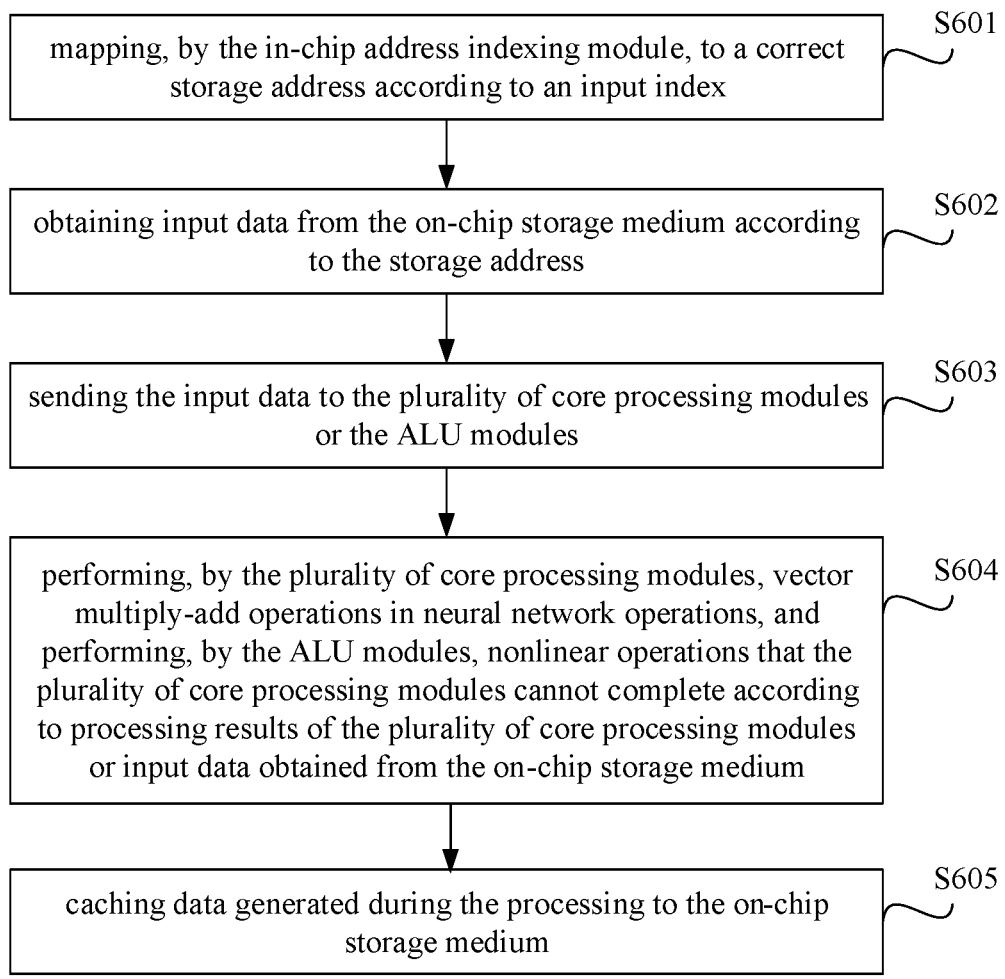
FIG. 37 is a flowchart of a neural network processing method according to an example of the present disclosure.

FIG. 37 is a flowchart of a neural network processing method provided by the present disclosure. The method is applied to the computing device of FIG. 2, FIG. 5, or FIG. 6A. In this case, the computing device includes a plurality of ALUs. The method includes:

S601, mapping, by the in-chip address indexing module, to a correct storage address according to an input index;

S602, obtaining input data from the on-chip storage medium according to the storage address;

S603, sending the input data to the plurality of core processing modules or the ALU modules;

S604, performing, by the plurality of core processing modules, vector multiply-add operations in neural network operations, and performing, by the ALU modules, nonlinear operations that the plurality of core processing modules cannot complete according to processing results of the plurality of core processing modules or input data obtained from the on-chip storage medium; and S605, caching data generated during the processing to the on-chip storage medium.

Alternatively, the method further includes: sending the same input neuron to the plurality of core processing modules, allocating different input weights to different core processing modules; and computing, by the plurality of core processing modules, vector inner products of the input neuron and input weights to obtain different output neurons.

In summary, aiming at the core processing part of the neural network processing system, the present disclosure uses more on-chip core processing modules to improve the processing speed of the core operation part of neural network algorithms, so that the processor may have better performance. The core processing refers to vector multiply-add operations in neural network algorithms that take up most of the processing time. In this way, the present disclosure may improve the operation speed of the neural network processing system, making the performance of the neural network processing system better and more efficient.

A forward operation of a multilayer artificial neural network supporting discrete data representation according to an example of the present disclosure includes two or more layers of neurons. For each layer, a dot product operation is first performed on an input neuron vector and a weight vector, and consequently an output neuron is obtained by an activation function. The activation function may be a sigmoid function, a tanh function, a relu function, a softmax function, etc., and may support discrete representation or successive representation of an activated output neuron.

For the dot product operation of the input neuron vector represented by discrete data or the weight vector represented by discrete data, the present device supports conversion of the dot product operation into a bitwise operation of the data, for instance, an arithmetic shift operation, a NOT operation, an exclusive-OR operation. For the representation of the data, the present device supports the discrete representation or non-discrete representation of the data. A user may customize which data of which layer adopts the discrete representation or non-discrete representation, and may customize the number of bits of the discrete data according to specific requirements, thereby replacing the number of represented real data. For instance, 1-bit, 2-bit, or 3-bit discrete data may represent 2, 4, or 8 pieces of real data, respectively.

Figure 38:
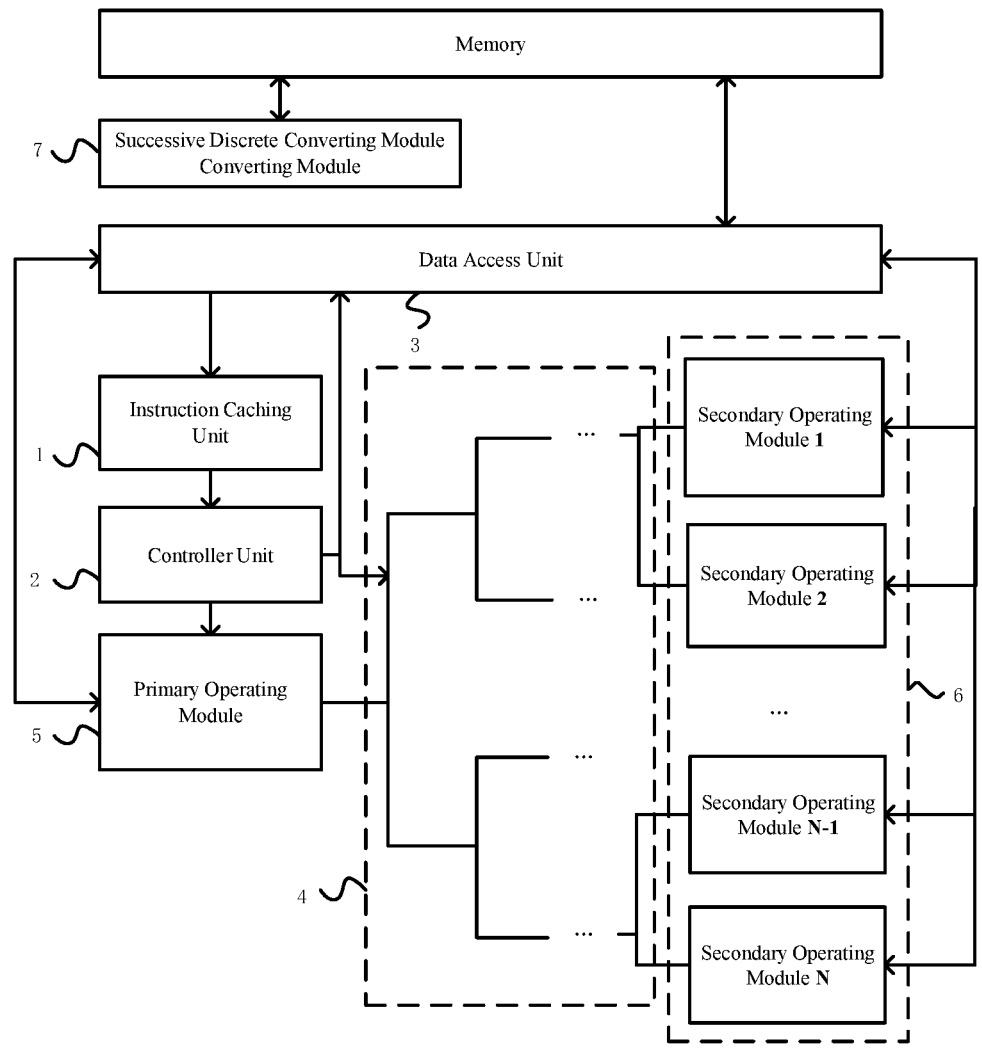
FIG. 38 is an exemplary block diagram of an overall structure of a device for performing a forward operation of an artificial network supporting discrete data representation according to an example of the present disclosure.

FIG. 38 illustrates an exemplary block diagram of an overall structure of a device configured to perform the forward operation of the artificial neural network supporting the discrete data representation according to an example of the present disclosure. As illustrated in FIG. 38, the device described in an optional example may be a computing device as shown in FIG. 6A. Optionally, the computing device shown in FIG. 6A may further add a successive discrete converting module configured to exchange successive data with discrete data, and the successive discrete converting module is connected to a data access unit to achieve data exchange. In an optional example, the computing device shown in FIG. 6A may also expand or add modules or units of the device shown in FIG. 38. In another optional example, the device includes an instruction caching unit 1, a controller unit 2, a data access unit 3, an interconnecting module 4, a primary operating module 5, and a plurality of secondary operating modules 6, and optionally includes a successive discrete converting module 7. The instruction caching unit 1, the controller unit 2, the data access unit 3, the interconnecting module 4, the primary operating module 5, the secondary operating modules 6, and the successive discrete converting module 7 may be achieved by hardware circuits (for instance, including but not limited to FPGAs, CGRAs, ASICs, analog circuits, and memristors). In particular, the present device may support storage and operations of the discrete data.

The instruction caching unit 1 is configured to read an instruction via the data access unit 3 and cache the read instruction.

The controller unit 2 is configured to read the instruction from the instruction caching unit 1, and decode the instruction into microinstructions configured to control operations of other modules. The other modules may include, for instance, the data access unit 3, the primary operating module 5, the secondary operating modules 6, and the like.

The data access unit 3 can access an external address space and directly read the data from and write the data in each caching unit in the device to load and store the data.

The data is discretely or non-discretely represented. The unit is designed to be capable of reading the data discretely represented.

The interconnecting module 4 is configured to interconnect the primary operating module and the secondary operating modules, and may be achieved in different interconnecting topologies (for instance, a tree structure, an annular structure, a grid structure, hierarchical interconnection, a bus structure, and the like).

Figure 39:
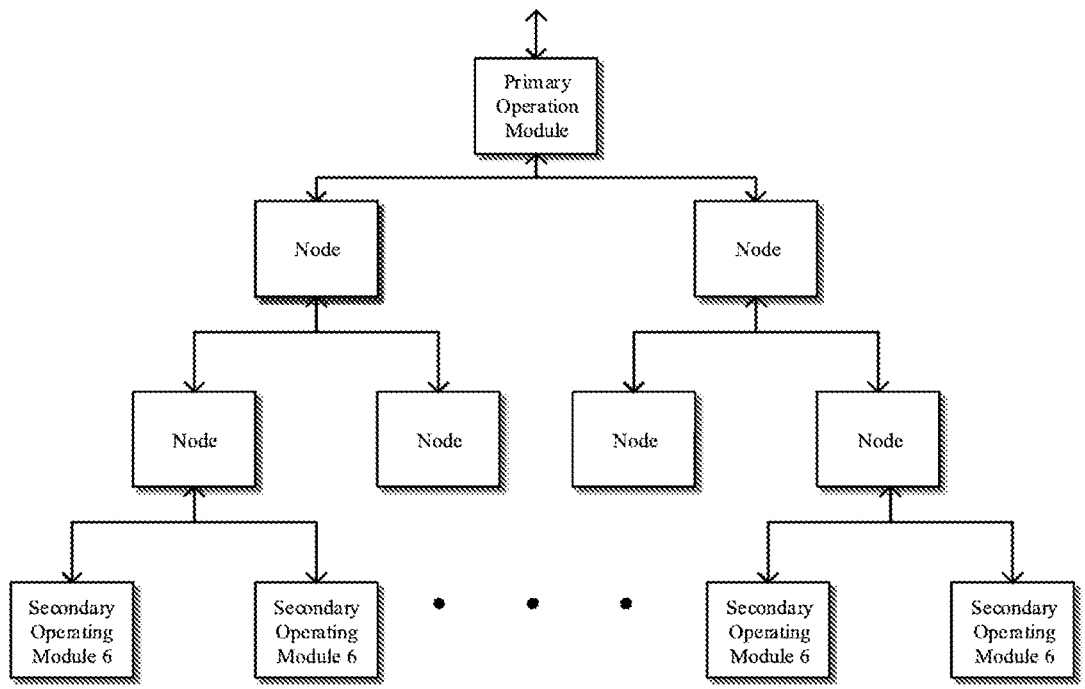
FIG. 39 is a schematic diagram of a structure of an H-tree module (an implementation of an interconnecting module) in a device for performing a forward operation of an artificial network supporting discrete data representation according to an example of the present disclosure.

FIG. 39 schematically illustrates an example of the interconnecting module 4: a tree module. The tree module 4 forms a data path between the primary operating module 5 and the plurality of secondary operating modules 6, and has a tree structure. Optionally, the tree module may be an n tree structure, for instance, a binary tree path shown in FIG. 39, where each node transfers upstream data to two downstream nodes, combines data returned from the two downstream nodes, and returns to the upstream node. For instance, when each layer in the artificial neural network starts operation, neuron data in the primary operating module 5 which may be discretely or non-discretely represented are transferred to each secondary operating module 6 via the tree module 4. After the secondary operating modules 6 finish computations, neuron values output by the secondary operating modules are combined stage by stage into a complete vector constituted by the neurons as an intermediate result vector in the tree structure. For an operation for the discrete data representation, an operating module dedicated to discrete data operation in the primary and secondary operating modules is specifically illustrated in FIG. 44. Taking a fully connected layer of the neural network for instance, if the device includes N secondary operating modules, then the intermediate result vector is divided into sections according to N, and each section includes N elements. The i-th secondary operating module computes the i-th element in each section. The N elements are combined into a vector in the tree structure, and the vector has a length of N and is returned to the primary operating module. Thus, if the network merely has N output neurons, then each secondary operating module merely needs to output a value of a single neuron; if the network has m*N output neurons, then each secondary operating module merely needs to output values of m neurons. The tree module supports the discrete data representation in processes of storing and transferring the data.

Figure 40:
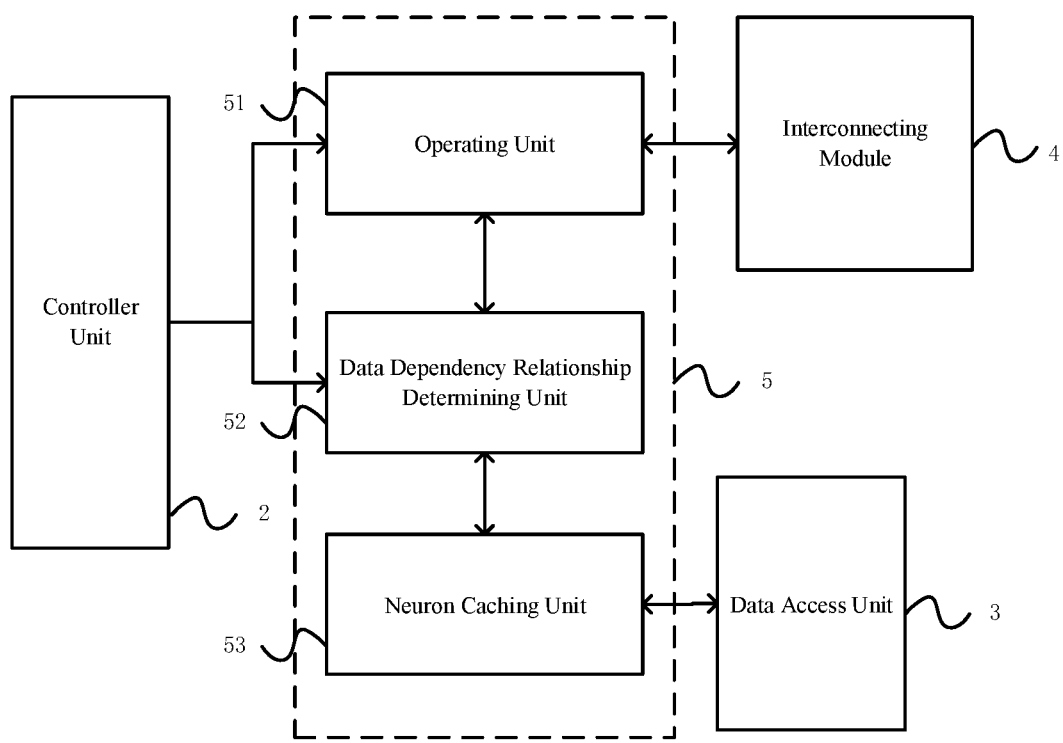
FIG. 40 is an exemplary block diagram of a structure of a primary operating module in a device for performing a forward operation of an artificial network supporting discrete data representation according to an example of the present disclosure.

FIG. 40 illustrates an exemplary block diagram of a structure of the primary operating module 5 in the device configured to perform the forward operation of the artificial neural network according to an example of the present disclosure. As illustrated in FIG. 40, the primary operating module 5 includes an operating unit 51, a data dependency relationship determining unit 52, and a neuron caching unit 53 supporting the discrete data representation.

The neuron caching unit 53 supporting the discrete data representation is configured to cache the input data and the output data used by the primary operating module 5 in a computation process.

The operating unit 51 performs various operating functions of the primary operating module 5. When operation factors are merely the discrete data, an addition operation, a subtraction operation, a multiplication operation, and a division operation of the discrete data may be achieved by table look-up. For instance, a 2-bit discrete data may represent 4 successive data values which may produce 4*4=16 combinations. For each of the addition operation, the subtraction operation, the multiplication operation, and the division operation, a 4*4 index table may be prepared and maintained, and a corresponding computed value may be found from the index table. 4 kinds of operations require four 4*4 index tables in total.

When the operation factors includes the discrete data and the successive data, corresponding bitwise operations may be preset for the addition operations, the subtraction operations, the multiplication operations, and the division operations of different discrete data. For instance, the dot product operation of the discrete data and the successive data may be replaced by means of performing a bitwise exclusive-OR operation, multiplying by a corresponding power of 2, and performing an accumulation and summation. For instance, in the case of the multiplication operations, if some of multiplication factor data are discretely represented, then corresponding operations (for instance, bitwise exclusive-OR operations, NOT operations, arithmetic shift operations operated on the corresponding data) may be indexed by the discrete data to replace the multiplication operations on the successive data represented by the discrete data, thereby reducing the number of the multiplier components. For instance, in the case of a multiplication operation of a successive data and a discrete data, multiplying $-\frac{1}{2}$ by 16, a traditional multiplier component may multiply $-\frac{1}{2}$ directly by 16. In the operating unit 51, the likelihood of the discrete data is low, and thus the function of the operating unit may be replaced with an on/off determining method, such as searching an index. For instance, the discrete data representation for $-\frac{1}{2}$ may be defined as 01, and if an operation factor is $-\frac{1}{2}$, then a discrete data received by the operating unit 51 is 01. The operating unit 51 performs an operation corresponding to the discrete data 01. The sign bit of a 8-bit fixed-point data 00010000 representing 16 is inverted, and then the 8-bit fixed-point data is arithmetically shifted to the right by 1 bit to obtain 10001000 which represents −8 in the decimal system. In the case of a division operation, dividing 16 by −2, where 16 is a successive data and −2 is a discrete data, if the binary representation for the discrete data −2 is defined as 10, then the operating unit performs a division operation corresponding to the discrete data 10. The 8-bit fixed-point data 00010000 representing 16 is arithmetically shifted to the right by 1 bit, and then the sign bit thereof is inverted to obtain 10001000 which represents −8 in the decimal system as a result. The addition operation and the subtraction operation are similar to the aforementioned processes. According to the binary representation for the discrete data as an index, the bitwise arithmetic left shift operations, arithmetic right shift operations, exclusive-OR operations, and the like are indexed. By means of the operations, the addition operations and the subtraction operations on the real data represented by the discrete data are achieved.

The data dependency relationship determining unit 52 is a port for the operating unit 51 to read from and write in the neuron caching unit 53, and can ensure reading and writing consistency of the data in the neuron caching unit. Moreover, the data dependency relationship determining unit 52 is also configured to transfer the read data to the secondary operating modules via the interconnecting module 4, and the data output by the secondary operating modules 6 are directly transferred to the operating unit 51 via the interconnecting module 4. The instruction output by the controller unit 2 is sent to the operating unit 51 and the data dependency relationship determining unit 52, to control their actions.

Figure 41:
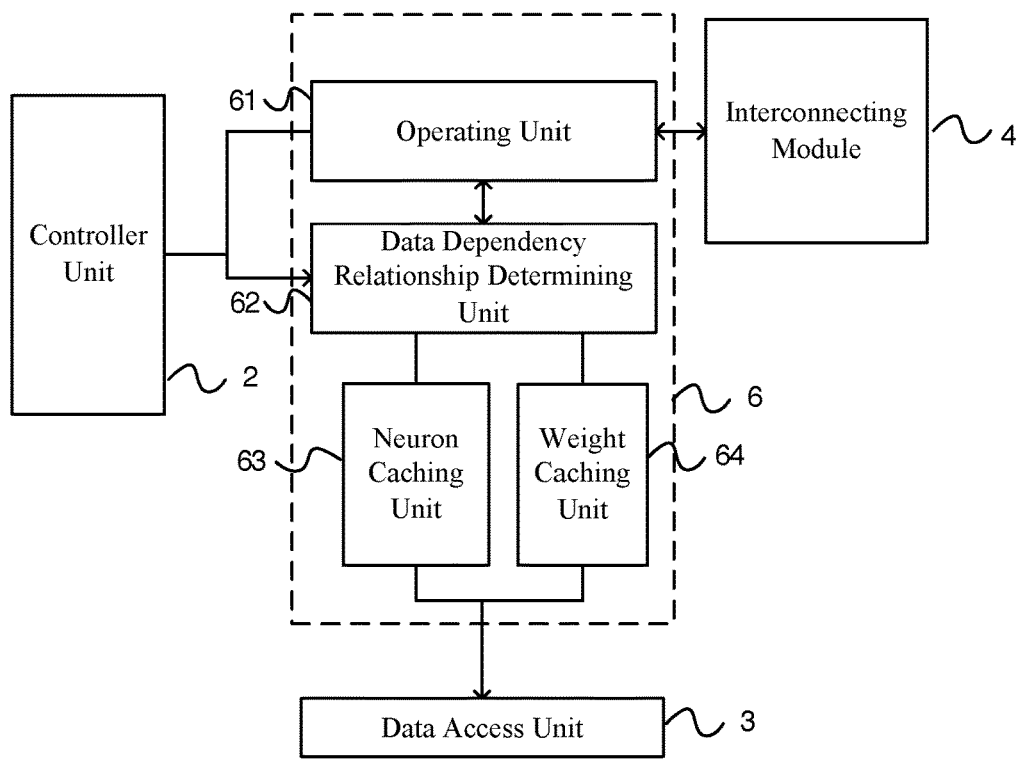
FIG. 41 is an exemplary block diagram of a structure of a secondary operating module in a device for performing a forward operation of an artificial network supporting discrete data representation according to an example of the present disclosure.

FIG. 41 illustrates an exemplary block diagram of a structure of one secondary operating module 6 in the device configured to perform the forward operation of the artificial neural network supporting the discrete data representation according to an example of the present disclosure. As illustrated in FIG. 41, each secondary operating module 6 includes an operating unit 61, a data dependency relationship determining unit 62, a neuron caching unit 63 supporting the discrete data representation, and a weight caching unit 64 supporting the discrete data representation.

The operating unit 61 is configured to receive the microinstructions sent by the controller unit 2 and perform arithmetic logic operations. When the operation factors are merely the discrete data, the addition operation, the subtraction operation, the multiplication operation, and the division operation of the discrete data may be achieved by table look-up. For instance, a 2-bit discrete data may represent 4 successive data values which may produce 4*4=16 combinations. For each of the addition operation, the subtraction operation, the multiplication operation, and the division operation, a 4*4 index table may be prepared and maintained, and a corresponding computed value may be found from the index table. 4 kinds of operations require four 4*4 index tables in total.

When the operation factors includes the discrete data and the successive data, corresponding bitwise operations may be preset for the addition operations, the subtraction operations, the multiplication operations, and the division operations of different discrete data. For instance, the dot product operation of the discrete data and the successive data may be replaced by means of performing a bitwise exclusive-OR operation, multiplying by a corresponding power of 2, and performing an accumulation and summation. For instance, in the case of the multiplication operations, if some of multiplication factor data are discretely represented, then corresponding operations (for instance, bitwise exclusive-OR operations, NOT operations, arithmetic shift operations operated on the corresponding data, and the like) may be indexed by the discrete data to replace the multiplication operations on the successive data represented by the discrete data, thereby reducing the number of the multiplier components. For instance, in the case of a multiplication operation of a successive data and a discrete data, multiplying −½ by 16, a traditional multiplier component may multiply −½ directly by 16. In the operating unit 51, the likelihood of the discrete data is low, and thus the function of the operating unit may be replaced with an on/off determining method, such as searching an index. For instance, the discrete data representation for −½ may be defined as 01, and if an operation factor is −½, then a discrete data received by the operating unit 51 is 01. The operating unit 51 performs an operation corresponding to the discrete data 01. The sign bit of a 8-bit fixed-point data 00010000 representing 16 is inverted, and then the 8-bit fixed-point data is arithmetically shifted to the right by 1 bit to obtain 10001000 which represents −8 in the decimal system. In the case of a division operation, dividing 16 by −2, where 16 is a successive data and −2 is a discrete data, if the binary representation for the discrete data −2 is defined as 10, then the operating unit performs a division operation corresponding to the discrete data 10. The 8-bit fixed-point data 00010000 representing 16 is arithmetically shifted to the right by 1 bit, and then the sign bit thereof is inverted to obtain 10001000 which represents −8 in the decimal system as a result. The addition operation and the subtraction operation are similar to the aforementioned processes. According to the binary representation for the discrete data as an index, the bitwise arithmetic left shift operations, arithmetic right shift operations, exclusive-OR operations, and the like are indexed. By means of the operations, the addition operations and the subtraction operations on the real data represented by the discrete data are achieved.

The data dependency relationship determining unit 62 is configured to perform reading and writing operations on the neuron caching unit in a computation process. The data dependency relationship determining unit 62 may ensure the data used by the instructions do not have reading and writing consistency violation before the read and write operations are performed. For instance, all the microinstructions sent to the data dependency relationship determining unit 62 may be stored in an instruction queue in the data dependency relationship determining unit 62. In this queue, if a scope of data read by a reading instruction conflicts with a scope of data written by a writing instruction which is previous in the queue, then the reading instruction may not be executed until the writing instruction depended on is executed.

The neuron caching unit 63 supporting the discrete data representation is configured to cache the data of the input neuron vector and the output neuron value of the secondary operating module 6. The data may be stored and transferred in the form of discrete data.

The weight caching unit 64 supporting the discrete data representation is configured to cache weight data required by the secondary operating module 6 in a computation process. The weight data may be discretely represented or not, depending on user definition. Each secondary operating module 6 may merely store the weight between all the input neurons and a part of the output neurons. Taking the fully connected layer for instance, the output neuron is divided into sections according to the number N of the secondary operating modules, the weight corresponding to the n-th output neuron in each section is stored in the n-th secondary operating module.

The secondary operating modules 6 achieve a former half of a forward operation process of each layer in the artificial neural network which can be performed in parallel. The data storage and operation in this module support the discrete data representation. Taking the fully connected layer (multilayer perceptron, MLP) of the artificial neural network for instance, the equation is y=f(wx+b), where a multiplication of a weight matrix w and an input neuron vector x may be divided into parallel computation sub-tasks unrelated to each other, and the output neuron vector and the input neuron vector are row vectors. Each secondary operating module 6 merely computes a product of a corresponding part of scalar elements in the input neuron vector and a row corresponding to the weight matrix w, and each obtained output vector is a partial sum to be accumulated into a final result. These partial sums are added together in pairs stage by stage in the interconnecting module 4 to obtain the final result. This result may be represented by the discrete data. Therefore, the computation process is changed into parallel processes of computing the partial sums and a subsequent accumulating process. Each secondary operating module 6 computes the output neuron value, and all the output neuron values are combined into the intermediate result vector in the interconnecting module 4. Each secondary operating module 6 merely needs to compute the output neuron value in the intermediate result vector y corresponding to the module. The interconnecting module 4 sums the neuron values output by all the secondary operating modules 6, to obtain the final intermediate result vector y. The primary operating module 5 performs subsequent operations based on the intermediate result vector y, for instance, biasing, pooling (for instance, maxpooling or avgpooling), activating, sampling, and the like.

Figure 45:
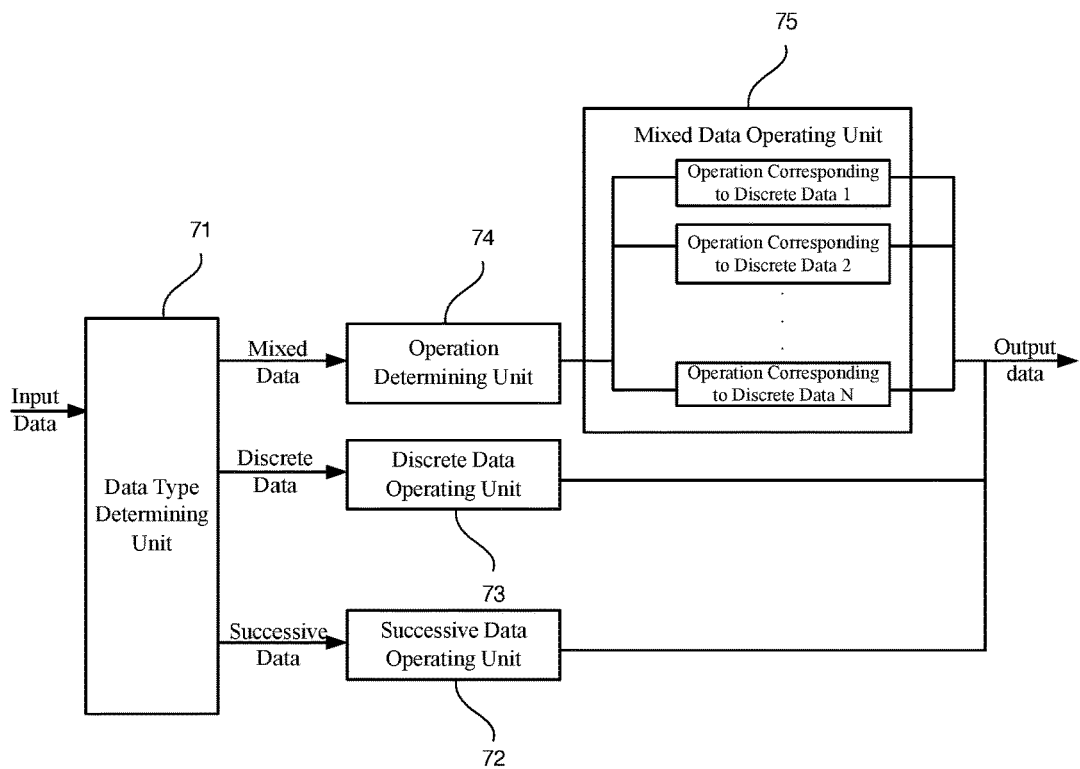
FIG. 45 is a structural diagram of an operating unit according to an example of the present disclosure.

FIG. 45 illustrates a structural block diagram of an operating unit which may be used as the operating unit 51 in the primary operating module or the operating unit 61 in the secondary operating module. The data input in the operation process may be the discrete data or the successive data. A data type determining unit 71 is configured to determine whether the input data are merely the successive data, or merely the discrete data, or mixed data including the successive data and the discrete data. When the input data are merely the successive data, a successive data operating unit 72 performs corresponding operations.

When the input data are merely the discrete data, a discrete data operating unit 73 performs corresponding operations. When the operation factors are merely the discrete data, the addition operation, the subtraction operation, the multiplication operation, and the division operation of the discrete data may be achieved by table look-up. For instance, a 2-bit discrete data may represent 4 successive data values which may produce 4*4=16 combinations. For each of the addition operation, the subtraction operation, the multiplication operation, and the division operation, a 4*4 index table may be prepared and maintained, and a corresponding computed value may be found from the index table. 4 kinds of operations require four 4*4 index tables in total.

When the input data are the mixed data, an operation determining unit 74 determines which operation is performed according to the discrete data included in the mixed data. Corresponding operations may be preset for different discrete data, respectively. Then, a mixed data operating unit 75 performs corresponding operations according to a result determined by the operation determining unit 74. When the operation factors includes the discrete data and the successive data, corresponding bitwise operations may be preset for the addition operations, the subtraction operations, the multiplication operations, and the division operations of different discrete data. For instance, the dot product operation of the discrete data and the successive data may be replaced by means of performing a bitwise exclusive-OR operation, multiplying by a corresponding power of 2, and performing an accumulation and summation. For instance, in the case of the multiplication operations, if some of multiplication factor data are discretely represented, then corresponding operations (for instance, bitwise exclusive-OR operations, NOT operations, arithmetic shift operations operated on the corresponding data) may be indexed by the discrete data to replace the multiplication operations on the successive data represented by the discrete data, thereby reducing the number of the multiplier components. For instance, in the case of a multiplication operation of a successive data and a discrete data, multiplying $-\frac{1}{2}$ by 16, a traditional multiplier component may multiply $-\frac{1}{2}$ directly by 16. In the operating unit 51, the likelihood of the discrete data is low, and thus the function of the operating unit may be replaced with an on/off determining method, such as searching an index. For instance, the discrete data representation for $-\frac{1}{2}$ may be defined as 01, and if an operation factor is $-\frac{1}{2}$, then a discrete data received by the operating unit 51 is 01. The operating unit 51 performs an operation corresponding to the discrete data 01. The sign bit of a 8-bit fixed-point data 00010000 representing 16 is inverted, and then the 8-bit fixed-point data is arithmetically shifted to the right by 1 bit to obtain 10001000 which represents −8 in the decimal system. In the case of a division operation, dividing 16 by −2, where 16 is a successive data and −2 is a discrete data, if the binary representation for the discrete data −2 is defined as 10, then the operating unit performs a division operation corresponding to the discrete data 10. The 8-bit fixed-point data 00010000 representing 16 is arithmetically shifted to the right by 1 bit, and then the sign bit thereof is inverted to obtain 10001000 which represents −8 in the decimal system as a result. The addition operation and the subtraction operation are similar to the aforementioned processes. According to the binary representation for the discrete data as an index, the bitwise arithmetic left shift operations, arithmetic right shift operations, exclusive-OR operations, and the like are indexed. By means of the operations, the addition operations and the subtraction operations on the real data represented by the discrete data are achieved.

Figure 46:
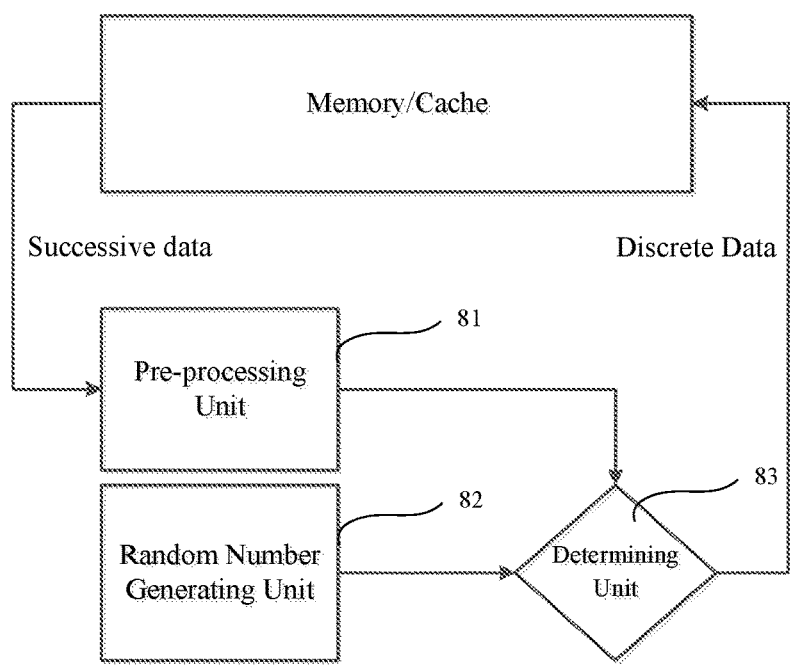
FIG. 46 is a structural diagram of a successive-discrete conversion module for conversion between successive data and discrete data according to an example of the present disclosure.

FIG. 46 illustrates the successive discrete converting module. The user may determine whether to adopt this module to convert the successive data into the discrete data or not. The successive data are input, and the discrete data are output. This module includes a random number generating unit, a determining unit, and an operating unit. The operating unit performs an operation on the input successive data to obtain an operation result, and the determining unit compares a random number with the operation result to determine which interval the random number is within, so as to determine the specific values of the output discrete data. For instance, binary discrete data are generated according to user definition. For any input successive data x, a result y=abs(clip(−1,1)) are computed by the operating unit. Then, the determining unit determines the output discrete data is 1 when the random number is greater than y, otherwise determines the output discrete data is 0. The discrete data 1 and 0 represent the successive data −1 and +1, respectively. The obtained discrete data are stored in the memory to be used by the operating units in the primary and secondary operating modules so as to cause corresponding operations.

The weight data, the output data, and the input data in the process of the forward operation may be represented by the discrete data or not. The multiplication operation on the successive data may be replaced with the exclusive-OR operation, the NOT operation, the arithmetic shift operation, etc., based on the discrete data. For instance, when the weights are represented by 1-bit discrete data, 0 represents +1 and 1 represents −1. The multiplication operation on the weights is achieved by means of the exclusive-OR operation performed on the sign bit of the data multiplied by the weights.

An instruction set configured to perform the forward operation of the artificial neural network in the aforementioned device is provided according to an example of the present disclosure. The instruction set includes a CONFIG instruction, a COMPUTE instruction, an IO instruction, a NOP instruction, a JUMP instruction, a MOVE instruction, and the like.

The CONFIG instruction is configured to, before each layer in the artificial neural network starts the operation, set various constants required by the operation of the layer.

The COMPUTE instruction is configured to perform the arithmetic logic operations of each layer in the artificial neural network.

The IO instruction is configured to read the input data required by the operation from the external address space and write the data into the external address space after the operation. The data supports the discrete representation.

The NOP instruction is configured to clear the microinstructions in all the microinstruction caching queues in the device, to ensure that all the instructions before the NOP instruction are completely executed. The NOP instruction does not include any operations.

The JUMP instruction is configured to perform a jump to the address of the next instruction to be read from the instruction caching unit by the controller, to achieve a jump of a controlling flow.

The MOVE instruction is configured to move the data at a certain address in an internal address space of the device to another address in the internal address space of the device. The instruction is independent of the operating unit, and does not occupy resources of the operating unit when it is executed.

Figure 42:
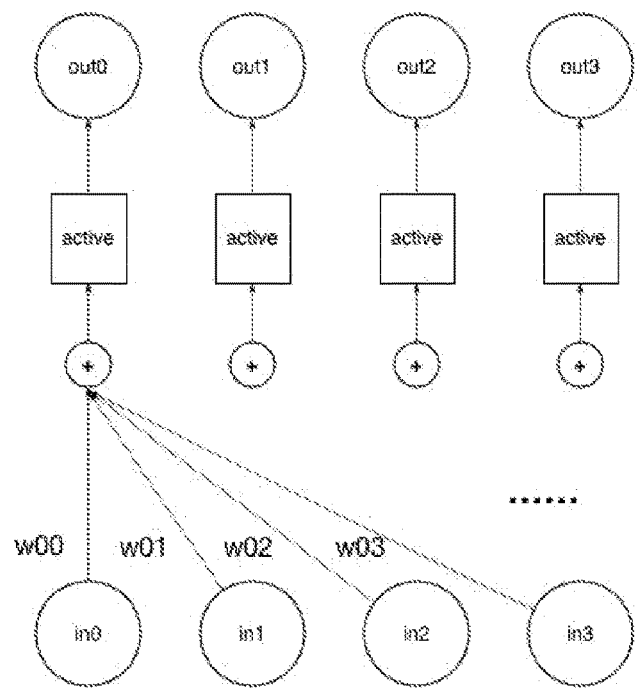
FIG. 42 is an exemplary block diagram of a neural network forward operation according to an example of the present disclosure.

FIG. 42 illustrates an exemplary block diagram of a forward operation process of the neural network according to an example of the present disclosure. In the secondary operating modules 6, dot product operations are performed on the input neuron vector and the weight vectors in the secondary operating modules 6, respectively, to obtain corresponding output neuron values which are all combined into an intermediate result vector. After a biasing vector is added to the intermediate result vector and an activating operation is performed on it, a final output neuron vector of the layer of the neural network is obtained. The equation is expressed as out=f(w*in+b), where out represents an output neuron vector, in represents an input neuron vector, b represents a biasing vector, w represents a weight matrix, and f represents an activation function. The weight vector in each secondary operating module 6 is a row vector in the weight matrix corresponding to the secondary operating module 6. The interconnecting module transfers the input neuron vector [in0, . . . , inN] to all the secondary operating modules, and temporarily stores in the neuron caching units. The i-th secondary operating module computes a dot product of the corresponding weight vector [w_i0, . . . , w_iN] and the input neuron vector. The results output by the secondary operating modules are combined into a complete output vector through the interconnecting module, and the output vector is returned to the primary operating module. The activating operation is performed in the primary operating module, to obtain the final output neuron vector [out0, out1, out2, . . . , outN].

Figure 43:
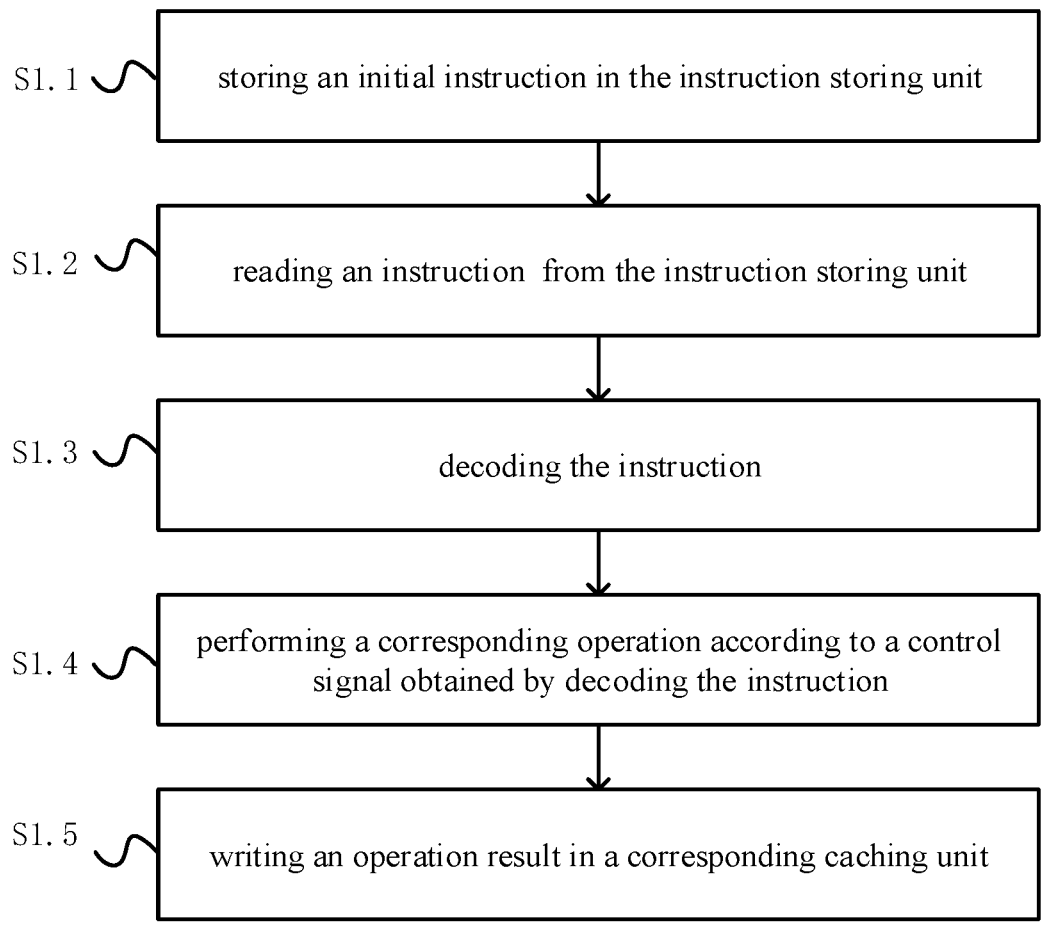
FIG. 43 is an exemplary block diagram of a backward training process of a neural network supporting discrete data representation according to an example of the present disclosure.

FIG. 43 illustrates a method for implementing a forward operation of a single-layer artificial neural network supporting the discrete data representation according to an example. This flowchart describes a process of achieving the forward operation of the single-layer artificial neural network supporting the discrete data representation as illustrated in FIG. 42 by means of using the device and the instruction set according to the present disclosure. This computation method is implemented in the computing device as shown in FIG. 2, FIG. 5 or FIG. 6A.

Step S1.1: storing an initial instruction in the instruction storing unit 1.

Step S1.2: reading an instruction from the instruction storing unit 1.

Step S1.3: decoding the instruction.

Step S1.4: performing a corresponding operation according to a control signal obtained by decoding the instruction.

Step S1.5: writing an operation result in a corresponding caching unit.

The step S1.1 further includes: storing an initialized IO instruction for moving subsequent instructions.

At step S1.2, the read instruction may include, but not be limited to, the CONFIG instruction, the COMPUTE instruction, the IO instruction, the NOP instruction, the JUMP instruction, the MOVE instruction, and the like.

The step S1.3 further includes: obtaining the control signal for a corresponding module by decoding according to an operation type of the instruction (CONFIG, COMPUTE, IO, NOP, JUMP, MOVE, and the like). The CONFIG instruction is decoded to obtain configuration information for other modules. The COMPUTE instruction is decoded into control signals for the primary and secondary operating modules which control various discrete data to perform corresponding operations. The IO instruction is decoded to obtain a control signal for the data access module. The NOP instruction does not produce any actual control signals, and is merely configured to clear the control signals in all the control signal caching queues in the device, to ensure that all the instructions before the NOP instruction are executed. The JUMP instruction is decoded into a control signal for a jump of an instruction flow. The MOVE instruction is decoded to obtain a control signal for moving the data in the device.

The step S1.4 further includes: performing, by the aforementioned units and modules 2 to 6, corresponding operations according to the control signals. Taking the COMPUTE instruction configured to perform the forward operation of the neural network supporting the discrete data representation for instance, the interconnecting module transfers the input neuron vector [in0, . . . , inN] to all the secondary operating modules, and temporarily caches in the neuron caching units. The i-th secondary operating module computes a dot product of a corresponding weight vector [w_i0, . . . , w_iN] and the input neuron vector. The results output by the secondary operating modules are combined into a complete output vector through the interconnecting module, and the output vector is returned to the primary operating module. The activating operation is performed in the primary operating module, to obtain the final output neuron vector [out0, out1, out2, outN].

At step S1.5, each module writes the operation result in the corresponding caching unit. Taking the forward operation of the neural network supporting the discrete data representation for instance, the output neuron vector obtained by the primary operating module is written in the neuron caching unit.

Figure 44:
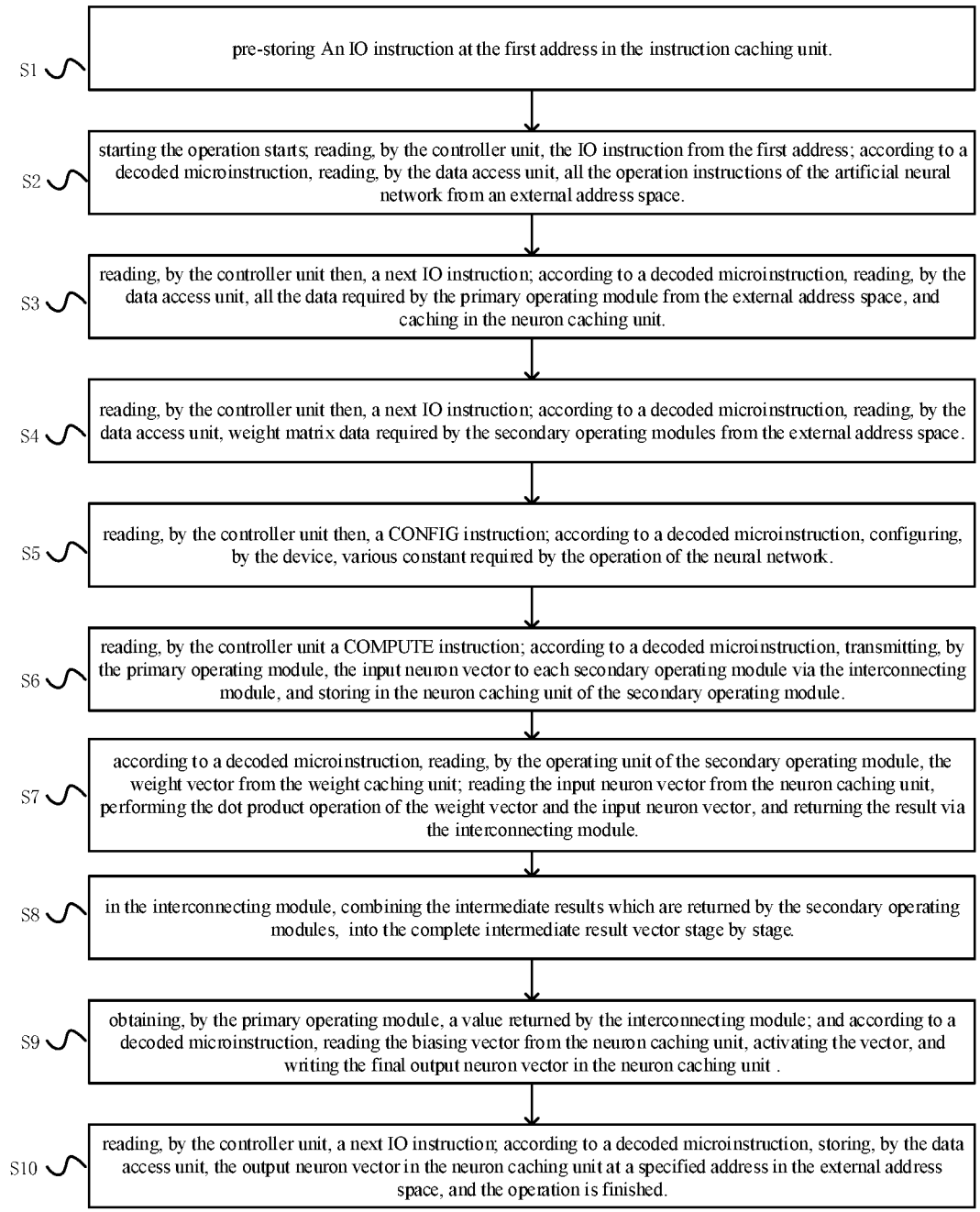
FIG. 44 is a flowchart of a single-layer artificial neural network operation according to an example of the present disclosure.

FIG. 44 illustrates another more detailed method for implementing a forward operation of a single-layer artificial neural network according to an example. The flowchart describes a process of implementing the forward operation of the single-layer neural network as illustrated in FIG. 42 by means of using the device and the instruction set according to the present disclosure.

Step S1: pre-storing an IO instruction at the first address in the instruction caching unit 1.

At step S2, the operation starts. Step S2 includes: reading, by the controller unit 2, the IO instruction from the first address in the instruction caching unit 1; and reading, by the data access unit 3, all the corresponding operation instructions of the artificial neural network from an external address space according to a decoded microinstruction, and caching, by the data access unit 3, all the corresponding operation instructions in the instruction caching unit 1.

Step S3: reading, by the controller unit 2, a next IO instruction from the instruction caching unit; according to a decoded microinstruction, reading, by the data access unit 3, all the data (for instance, including the input neuron vector, interpolation tables, constant tables, bias vectors, and the like) required by the primary operating module 5 from the external address space to the neuron caching unit 53 of the primary operating module 5. The data supports the discrete representation, and may be all or partially discrete.

Step S4: reading, by the controller unit 2, a next IO instruction from the instruction caching unit; according to a decoded microinstruction, reading, by the data access unit 3, weight matrix data required by the secondary operating modules 6 from the external address space. The data supports the discrete representation, and may be all or partially discrete.

Step S5: reading, by the controller unit 2, a CONFIG instruction from the instruction caching unit; according to a decoded microinstruction, configuring, by the device, various constant required by the operation of the neural network. For instance, the operating unit 51, 61 configures a value of a register in the unit, according to parameters in the microinstruction. The parameters, for instance, includes computation precision setting, data of an activation function (for instance, computation precision bit of the layer, rang parameters of the algorithm of the Lrn layer, reciprocal of the window size of the algorithm of the AveragePooling layer, and the like).

Step S6: reading, by the controller unit 2, a COMPUTE instruction from the instruction caching unit; according to a decoded microinstruction, transferring, by the primary operating module 5, the input neuron vector to each secondary operating module 6 via the interconnecting module 4, and storing, by the primary operating module 5, the input neuron vector in the neuron caching unit 63 of the secondary operating module 6.

Step S7: according to a microinstruction decoded from the COMPUTE instruction, reading, by the operating unit 61 of the secondary operating module 6, the weight vector (the row vector in the weight matrix corresponding to the secondary operating module 6) from the weight caching unit 64; reading, by the operating unit 61 of the secondary operating module 6, the input neuron vector from the neuron caching unit; performing, by the operating unit 61 of the secondary operating module 6, the dot product operation of the weight vector and the input neuron vector; and returning, by the operating unit 61 of the secondary operating module 6, the intermediate result via the interconnecting module. For the discrete data, the bitwise operations, such as the exclusive-OR operation, may be customizably used to replace the dot product operation or not. For instance, in the case of a 1-bit discrete data representation, 0 represents +1 and 1 represents −1. The multiplication operation on the weight is achieved by means of the exclusive-OR operation performed on the sign bit of the data multiplied by the weight.

Step S8: in the interconnecting module 4, combining the intermediate results returned by the secondary operating modules 6 into the complete intermediate result vector stage by stage.

Step S9: obtaining, by the primary operating module 5, a value returned by the interconnecting module 4; and according to a microinstruction decoded from the COMPUTE instruction, reading, by the primary operating module 5, the biasing vector from the neuron caching unit 53, adding, by the primary operating module 5, the biasing vector to the vector returned from the interconnecting module 4; and activating, by the primary operating module 5, the addition result. The device allows the user to customize whether the activated result is discretely represented or not. The final output neuron vector is written in the neuron caching unit 53.

Step S10: reading, by the controller unit, a next IO instruction from the instruction caching unit; according to a decoded microinstruction, storing, by the data access unit 3, the output neuron vector in the neuron caching unit 53 at a specified address in the external address space, and the operation is finished.

Steps of a batch normalization of the artificial neural network are similar to those in the aforementioned process. According to the provided instruction set, the controller completes the following process. The controller controls the data access unit to read the input data, then controls the primary and secondary operating modules to compute a mean value and a variance of each location according to the size of the batch or uses a preset mean value and a preset variance. Then, the controller subtracts the mean value from an input data of the corresponding location and divides by the variance. Finally, the controller multiplies the processed data by a learning parameter and adds another learning parameter.

The achieving process of the multilayer artificial neural network is similar to that of the single-layer neural network. After a first layer in the artificial neural network finishes the operation, the operation instruction of a second layer uses the output neuron address of the first layer stored in the primary operating module as an input neuron address of the second layer. Likewise, the weight address and the biasing address in the instruction are changed to the addresses corresponding to the second layer.

The present disclosure adopts the device configured to perform the forward operation of the artificial neural network and the instruction set, so as to solve the problems of insufficient operation performance of CPU and GPU, and high consumption in decoding at the front-end, thereby effectively improving the support for the forward operation of the multilayer artificial neural network.

The present disclosure adopts a dedicated on-chip cache for the forward operation of the multilayer artificial neural network to greatly optimize the reuse of the input neuron and the weight data, so as to avoid repeatedly reading these data from the memory, reduce the times of accessing the memory, and prevent the memory bandwidth from becoming a limitation to the performance of the forward operation of the multilayer artificial neural network.

The present disclosure adopts the discrete data representation, and thus greatly reduces consumption, such as storage energy consumption, of the device, compared to the floating-point data representation and the fixed-point data representation. A structural arrangement may be optimized in a limited area, so as to improve indicators, such as an operation speed or a ratio of performance to energy consumption.

Figure 47:
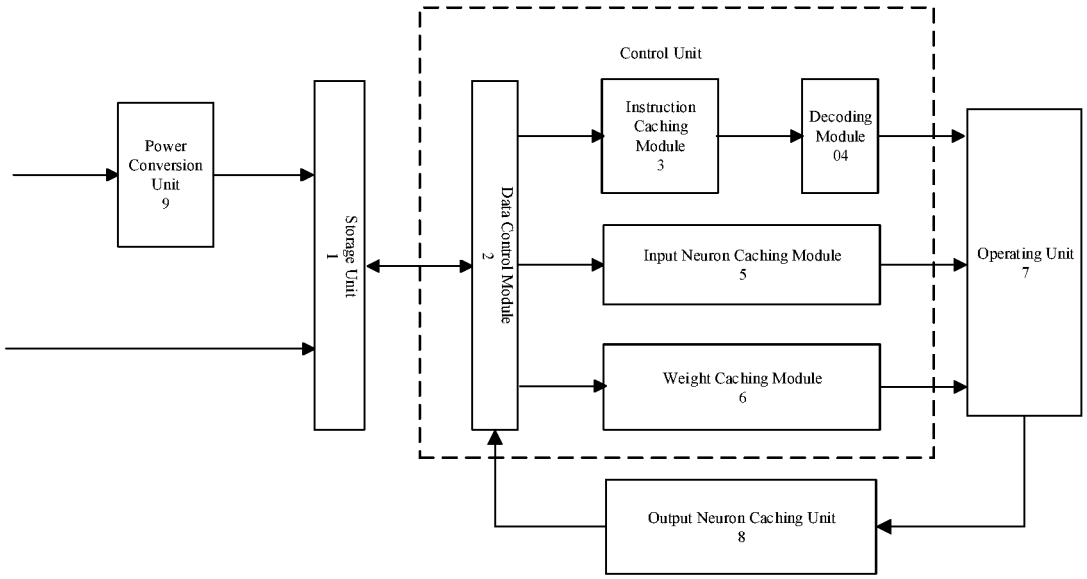
FIG. 47 is a schematic structural diagram of a neural network computing device according to an example of the present disclosure.

The present disclosure also provides a neural network operation device. FIG. 47 is a diagram for a neural network operation device according to an example of the present disclosure. In an optional example, the neural network operation device may be a computing device as shown in FIG. 6A. The computing device shown in FIG. 6A may further add a power conversion unit connected to a storage medium, which is configured to convert non-power neuron data of neural network input data into power neuron data. Optionally, the computing device may further include a control unit and an operating unit, and the like. For a detailed description of the control unit and the operating unit, please refer to the description of the example shown in FIG. 6A, which is not described herein. Moreover, the computing device shown in FIG. 6A may further add or expand the neural network operation device shown in FIG. 47. In another optional example, as shown in FIG. 47, the neural network operation device includes:

a storage unit 1 configured to store data and operation instructions;

a control unit connected to the storage unit for controlling interactions of data and operation instructions, where the control unit is configured to receive the data and the operation instructions sent by the storage unit and decode the operation instructions into operation microinstructions;

an operating unit 7 connected to the control unit for receiving data and operation microinstructions sent by the control unit, and performing a neural network operation on received neuron data and weight data according to the operation microinstructions; and a power conversion module 9 connected to the storage unit for converting input neuron data and/or output neuron data of the neural network operation into power neuron data.

Specifically, the control unit includes:

a data control module 2 connected to the storage unit for controlling interactions of data and operation instructions between the storage unit and each caching module;

an instruction caching module 3 connected to the data control module for receiving operation instructions sent by the data control module;

a decoding module 4 connected to the instruction caching module for reading operation instructions from the instruction caching unit and decoding the operation instructions into operation microinstructions;

an input neuron caching module 5 connected to the data control module for receiving neuron data sent by the data control module; and a weight caching module 6 connected to the data control module, for receiving weight data sent from the data control module.

Furthermore, the operating unit 7 is connected to the decoding module, the input neuron caching module, and the weight caching module, respectively, and is configured to receive operation microinstructions, neuron data, and weight data, and to perform corresponding operations on the received neuron data and weight data according to the operation microinstructions. The output neuron caching unit 8 is connected to the operating unit, and is configured to receive neuron data output by the operating unit and send the neuron data to the data control module 2 of the control unit. The neuron data can be used as input data for the next layer of neural network operations.

The storage unit receives data and instructions from an external address space, and the data includes neural network weight data, neural network input data, and the like.

Furthermore, there are several options for power conversions. The following lists three power conversions used in the example.

A first power conversion manner:

$$s_{out} = s_{in}$$

$$d_{out+} = \lfloor \log_2(d_{in+}) \rfloor$$

where $d_{in}$ is the input data of the power conversion unit, $d_{out}$ is the output data of the power conversion unit, $s_{in}$ is the sign of the input data, $s_{out}$ is the sign of the output data, $d_{in+}$ is a positive part of the input data with $d_{in+} = d_{in} \times s_{in}$, $d_{out+}$ is a positive part of the output data with $d_{out+} = d_{out} \times s_{out}$, $\lfloor x \rfloor$ represents a flooring operation on the data x.

A second power conversion manner:

$$s_{out} = s_{in}$$

$$d_{out+} = \lceil \log_2(d_{in+}) \rceil$$

where $$s_{out} = s_{in}$$

$$d_{out+} = \lfloor \log_2(d_{in+}) \rfloor$$

where $d_{in}$ is the input data of the power conversion unit, $d_{out}$ is the output data of the power conversion unit, $s_{in}$ is the sign of the input data, $s_{out}$ is the sign of the output data, $d_{in+}$ is a positive part of the input data with $d_{in+} = d_{in} \times s_{in}$, $d_{out+}$ is a positive part of the output data with $d_{out+} = d_{out} \times s_{out}$, $\lceil x \rceil$ represents a ceiling operation on the data x.

A third power conversion manner:

$$s_{out} = s_{in}$$

$$d_{out+} = [\log_2(d_{in+})]$$

where, $$s_{out} = s_{in}$$

$$d_{out+} = \lfloor \log_2(d_{in+}) \rfloor$$

where $d_{in}$ is the input data of the power conversion unit, $d_{out}$ is the output data of the power conversion unit, $s_{in}$ is the sign of the input data, $s_{out}$ is the sign of the output data, $d_{in+}$ is a positive part of the input data $d_{in+} = d_{in} \times s_{in}$, $d_{out+}$ is a positive part of the output data with $d_{out+} = d_{out} \times s_{out}$, $[x]$ represents a rounding operation on the data x.

Figure 48:
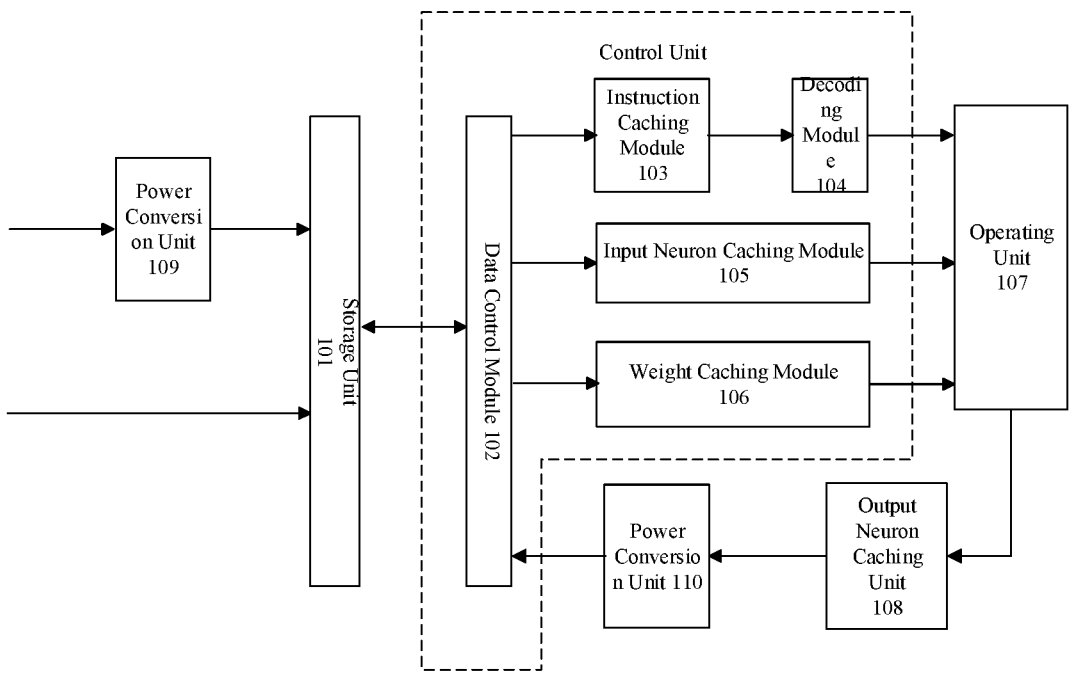
FIG. 48 is a schematic structural diagram of a neural network computing device according to an example of the present disclosure.

The present disclosure also provides another neural network operation device. FIG. 48 is a diagram for a neural network operation device according to an example of the present disclosure. As shown in FIG. 48, the neural network operation device in the example includes:

a storage unit 101 configured to store data and operation instructions, where the storage unit can receive data and operation instructions from an external address space, and the data includes neural network weight data, neural network input data, and the like;

a control unit connected to the storage unit for controlling interactions of data and operation instructions, where the control unit is configured to receive the data and the operation instructions sent by the storage unit and decode the operation instructions into operation microinstructions;

an operating unit 107 connected to the control unit for receiving data and operation microinstructions sent by the control unit, and performing a neural network operation on received neuron data and weight data according to the operation microinstructions;

an output neuron caching unit 108 connected to the operating unit for receiving neuron data output by the operating unit and sending the neuron data to the control unit;

a power conversion unit 109 connected to the storage unit for converting input neuron data and/or output neuron data of the neural network operation into power neuron data; and a power conversion unit 110 connected to the output neuron caching unit 108 for converting the neuron data obtained after the neural network operation into power neuron data and sending the power neuron data to the control unit.

Furthermore, the control unit includes:

a data control module 102 connected to the storage unit for controlling interactions of data and operation instructions between the storage unit and each caching module;

an instruction caching module 103 connected to the data control module for receiving operation instructions sent by the data control module;

a decoding module 104 connected to the instruction caching module for reading operation instructions from the instruction caching unit and decoding the operation instructions into operation microinstructions;

an input neuron caching module 105 connected to the data control module for receiving neuron data sent by the data control module; and a weight caching module 106 connected to the data control module for receiving weight data sent from the data control module.

Furthermore, the operating unit 107 is connected to the decoding module, the input neuron caching module, and the weight caching module, respectively, and is configured to receive operation microinstructions, neuron data, and weight data, and to perform corresponding operations on the received neuron data and weight data according to the operation microinstructions.

The power conversion unit 110 is connected to the data control module for converting the neuron data obtained after the neural network operation into power neuron data and sending the power neuron data to the data control module of the control unit. The power neuron data obtained by the power conversion unit 110 can be used as input data for the next layer of neural network operations.

Furthermore, the specific operations of the power conversion are the same as those in the preceding examples, and will not be repeated here.

Figure 49:
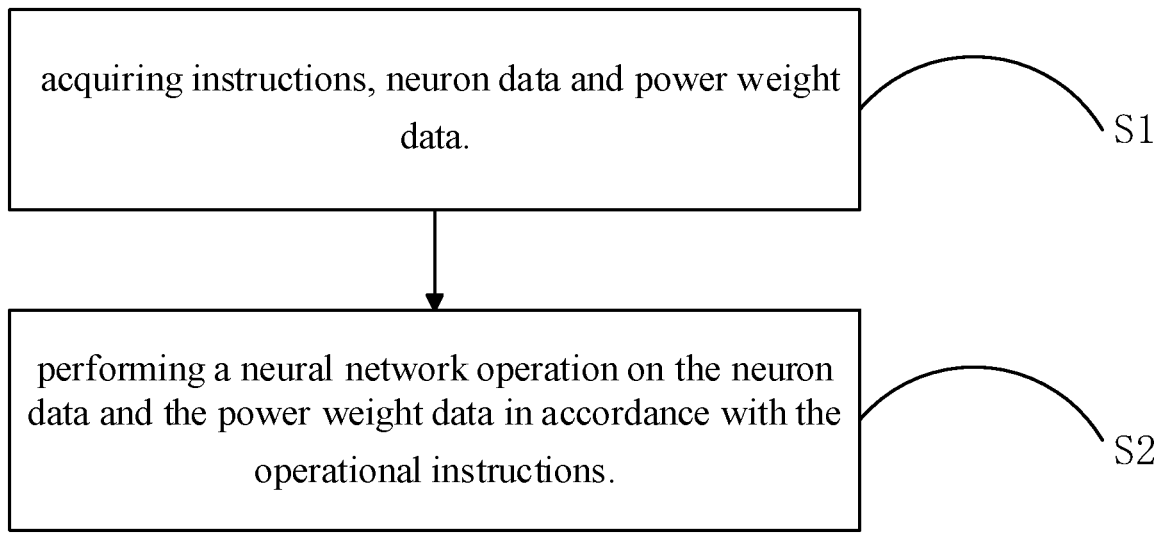
FIG. 49 is a flowchart of a neural network operating method according to an example of the present disclosure.

Furthermore, the present disclosure further provides a neural network operation method. FIG. 49 is a flowchart of a neural network operation method according to an example of the present disclosure. Specifically, the neural network in the examples of the present disclosure is a multi-layer neural network. For each layer of the neural network, operation can be performed according to the operation method as shown in FIG. 49, where the input power weight data for the first layer of the neural network can be read from the external address via the storage unit; if the data read from the external address is power weight data already, it can be directly transferred into the storage unit; or if the data read from the external address is not power weight data, the data has to be converted into power weight data by the power conversion unit. As shown in FIG. 49, the multi-layer neural network operation method in the example includes:

step S1: obtaining instructions, neuron data, and power weight data, where, the step S1 includes the following sub-steps:

S11: inputting the instructions, the neuron data, and the weight data to the storage unit, where the power weight data is directly input to the storage unit, and the non-power weight data is converted by the power conversion unit and then input to the storage unit;

S12: receiving, by the data control module, the instructions, the neuron data, and the power weight data sent by the storage unit;

S13: receiving, by the instruction caching module, the input neuron caching module, and the weight caching module respectively, the operation instructions, neuron data and power weight data sent by the data control module and distributing the operation instructions, neuron data and power weight data to the decoding module or the operating unit.

The power neuron data indicates that values of weight data are represented by exponential values thereof. Specifically, the power weight data include sign bits and power bits; the sign bits represent the sign of the weight data with one or more bits, and the power bits represent power-bit data of the weight data with m bits, m being a positive integer greater than 1. The storage unit is pre-stored with an encoding table that provides exponential values corresponding to each power-bit data of the power neuron data. The encoding table provides one or more power-bit data (i.e. zero setting power-bit data) to make the assigned corresponding power weight data 0. In other words, when the power-bit data of the power weight data is a zero setting power-bit data in the encoding table, the power weight data is 0; where, the encoding table may have a flexible storage manner, for instance, the encoding table may be stored in a table form, or may be mapped through a functional relationship.

The correspondence in the encoding table may be arbitrary.

For instance, the correspondence in the encoding table may be scrambled. A part of an encoding table with m being 5 is shown in FIG. 49.1. When the power-bit data is 00000, the corresponding exponential value is 0; when the power-bit data is 00001, the corresponding exponential value is 3; when the power-bit data is 00010, the corresponding exponential value is 4; when the power-bit data is 00011, the corresponding exponential value is 1; and when the power-bit data is 00100, the corresponding power neuron data is 0.

The correspondence in the encoding table may also be a positive correlation. The storage unit is pre-stored with an integer x and a positive integer y; the exponential value corresponding to a minimum power-bit data is x and the power neuron data corresponding to any other one or more power-bit data is 0, where x denotes a bias value and y denotes a stride. In one example, the exponential value corresponding to the minimum power-bit data is x, while the power neuron data corresponding to the maximum power-bit data is 0, and the exponential values corresponding to other power-bit data than the minimum and maximum power-bit data are (power-bit data+x)*y. By presetting different x and y as well as by changing the values of x and y, the range of representation by the power becomes configurable and is suitable for different application contexts requiring varied numerical ranges. Therefore, the neural network operation device can be applied in a wider range and its application is more flexible and adjustable according to user requirements.

In one example, y is 1, x equals $-2^{m-1}$, so the exponential range of the value represented by power neuron data is $-2^{m-1}$ to $2^{m-1-1}$.

In one example, a part of an encoding table with m being 5, x being 0, and y being 1 is shown in FIG. 49.2, when the power-bit data is 00000, the corresponding exponential value is 0; when the power-bit data is 00001, the corresponding exponential value is 1; when the power-bit data is 00010, the corresponding exponential value is 2; when the power-bit data is 00011, the corresponding exponential value is 3; and when the power-bit data is 11111, the corresponding power neuron data is 0. As another part of an encoding table as shown in FIG. 49.3, with m being 5, x being 0, and y being 2, when the power-bit data is 00000, the corresponding exponential value is 0; when the power-bit data is 00001, the corresponding exponential value is 2; when the power-bit data is 00010, the corresponding exponential value is 4; when the power-bit data is 00011, the corresponding exponential value is 6; when the power-bit data is 11111, the corresponding power neuron data is 0.

The correspondence in the encoding table may be a negative correlation. The storage unit is pre-stored with an integer x and a positive integer y; the exponential value corresponding to the maximum power-bit data is x and the power neuron data corresponding to any other one or more power-bit data is 0, where x denotes a bias value and y denotes a stride. In one example, the exponential value corresponding to the maximum power-bit data is x, while the power neuron data corresponding to the minimum power-bit data is 0, and the exponential values corresponding to the other power-bit data than the minimum and maximum power-bit data are (power-bit data−x)*y. By presetting different x and y as well as by changing the values of x and y, a range of representation by the power becomes configurable and is suitable for different application contexts requiring varied numerical ranges. Therefore, the neural network operation device can be applied in a wider range and its application is more flexible and adjustable according to user requirements.

In one example, y is 1, x equals to $2^{m-1}$, so the exponential range of the value represented by power neuron data is $-2^{m-1-1}$ to $2^{m-1}$.

As part of an encoding table as shown in FIG. 49.4 with m being 5, when the power-bit data is 11111, the corresponding exponential value is 0; when the power-bit data is 11110, the corresponding exponential value is 1; when the power-bit data is 11101, the corresponding exponential value is 2; when the power-bit data is 11100, the corresponding exponential value is 3; when the power-bit data is 00000, the corresponding power neuron data is 0.

The correspondence in the encoding table may be that the most significant bit of the power-bit data represents a zero setting bit, and the other m−1 bits of the power-bit data correspond to exponential values. When the most significant bit of the power-bit data is 0, the corresponding power neuron data is 0; when the most significant bit of the power-bit data is 1, the corresponding power neuron data is not 0. Vice versa, i.e., when the most significant bit of the power-bit data is 1, the corresponding power neuron data is 0; when the most significant bit of the power bit data is 0, the corresponding power neuron data is not 0. In other words, one bit is separated from the power bits of the power neuron data to indicate whether the power neuron data is 0 or not.

In one specific example as shown in FIG. 49.5, the sign bit has 1 bit, and the power-bit data has 7 bits, i.e., m is 7. In the encoding table, when the power-bit data is 11111111, the corresponding power neuron data is 0, and when the power-bit data is of other values, the power neuron data corresponds to a respective binary complement. When the sign bit of power neuron data is 0 and the power bits are 0001001, it represents a specific value of $2^9$, i.e., 512; when the sign bit of power neuron data is 1 and its power bits are 1111101, it represents a specific value of $-2^{-3}$, i.e., −0.125. Compared with floating-point data, the power data only retains the power bits of the data, which significantly reduces the storage space required for data storage.

The power data representation can reduce the storage space required for storing neuron data. In instances of the examples, the power data has 8 bits. It should be recognized that the data length is not constant, but on different occasions, different data lengths are adopted according to the range of the weight data.

The multi-layer neural network operation method in the example further includes: a step S2: performing a neural network operation on the neuron data and the power weight data in accordance with the operation instructions, where the step S2 includes the following sub-steps:

S21: reading, by the decoding module, operation instructions from the instruction caching module, and decoding the operation instructions into respective operation instructions; and S22: receiving, by the operating unit, the operation instructions, the power weight neuron data and the neuron data sent by the decoding module, the input neuron caching module and the weight caching module respectively, and performing the neural network operation on the neuron data and the power weight neuron data according to the operation instructions.

The multiplication of a neuron and a power weight is specifically as follows: the sign bit of the neuron data and the sign bit of the power weight data are subjected to an XOR operation; in the case where the correspondence in the encoding table is scrambled, search the encoding table to find out an exponential value corresponding to the power bits of the power weight data; in the case where the correspondence in the encoding table is a positive correlation, the minimum exponential value in the encoding table is recorded and an addition is performed to find out an exponential value corresponding to the power bits of the power weight data; in the case where the correspondence in the encoding table is a negative correlation, the maximum value in the encoding table is recorded and a subtraction is performed to find out an exponential value corresponding to the power bits of the power weight data; the exponential value and the power bits of the neuron data are added and the significant bits of the neuron data remain unchanged.

A specific instance I is shown in FIG. 49.6. If the neuron data is 16-bit floating-point data, with the sign bit being 0, the power bits being 10101, and the significant bits being 0110100000, the actual value represented is $1.40625*2^6$. The sign bit of a power weight data is 1-bit, and the power bits is 5-bit, that is, m is 5. In the encoding table, when the power-bit data is 11111, the corresponding power weight data is 0, and when the power-bit data is of other values, the power data corresponds to a respective binary complement. When the power weight is 000110, the actual value represented is 64, which is 26. The power bits of the power weight and the power bits of the neuron are added to get 11011, and the actual value of the result is $1.40625*2^{12}$, which is the product result of the neuron and the power weight. By this operation, the multiplication becomes an addition, which reduces the amount of operation required for the computations.

A specific instance II is shown in FIG. 49.7. If the neuron data is 32-bit floating-point data, with the sign bit being 1, the power bits being 10000011, and the significant bits being 10010010000000000000000, the actual value represented is $-1.5703125*2^4$. The sign bit of the power weight data is 1-bit, and the power-bits data is 5-bit, that is, m is 5. In the encoding table, when the power-bit data is 11111, the corresponding power weight data is 0, and when the power-bit data is of other values, the power data corresponds to a respective binary complement. If the power neuron is 111100, the actual value represented is $-2^{-4}$. If the result of adding the power bits of the neuron with the power bits of the power weight results is 01111111, the actual value of the result is $1.5703125*2^0$, which is the product result of the neuron and the power weight.

The multi-layer neural network operation method in the example further includes: a step S3: outputting the neuron data obtained after the neural network operation as the input data of the next layer of the neural network operation, where the step S3 includes the following sub-steps:

S31: receiving, by the output neuron caching unit, the neuron data sent by the operating unit after the neural network operation;

S2-32: transferring the neuron data received by the output neuron caching unit to the data control module; the neuron data obtained by the output neuron caching unit can serve as the input neurons of the next layer of the neural network operation, and steps S1 to S3 are repeated until the operation of the last layer of the neural network is finished.

In addition, the power neuron data obtained by the power conversion unit can serve as the input power neurons for the next layer of the neural network operation, and the steps S1 to S3 are repeated until the operation of the last layer of the neural network is finished. A range of the power neuron data representable by the neural network operation device can be adjusted by changing the integer x and the positive integer y pre-stored in the storage unit.

In addition, the specific method of power conversion is the same as that of the above-mentioned example, which is not described herein.

In addition, the example of the present disclosure also provides another neural network operation method. FIG. 50 is a flowchart of the neural network operation method according to an example of the present disclosure.

Specifically the neural network is a multi-layer neural network. For each layer of the neural network, operation can be performed according to the operation method as shown in FIG. 50, where the input power weight data for the first layer of the neural network can be read from the external address via the storage unit; if the data read from the external address is power weight data already, it can be directly transferred into the storage unit; or otherwise, the data has to be converted into power weight data by the power conversion unit. The input power neuron data for the first layer of the neuron network can be read from an external address by the storage unit, if the data read from the external address is power data already, it can be directly transferred into the storage unit; or otherwise, the data has to be converted into power neuron data by the power conversion unit. The input neuron data of each subsequent layer of the neuron network can be provided by the output power neuron data of one or more layers of the neural network prior to this layer. A mono-layer neural network operation method according to an example is shown in FIG. 50, including:

a step S4: obtaining instructions, power neuron data and power weight data, where, the step S4 includes the following sub-steps:

S41: inputting the instructions, the neuron data, and the weight data to the storage unit, where the power neuron data and the power weight data are directly input to the storage unit, and the non-power neuron data and the non-power weight data are converted by the first power conversion unit into the power neuron data and the power weight data, and then input to the storage unit;

S42: receiving, by the data control module, the instructions, the power neuron data, and the power weight data sent by the storage unit; and S43: receiving, by an instruction caching module, an input neuron caching module and a weight caching module respectively, the instructions, the power neuron data and the power weight data sent by the data control module and distributing them to the decoding module or the operating unit.

The power neuron data and the power weight data indicate that values of the neuron data and the weight data are represented by exponential values thereof. Specifically, both the power neuron data and the power weight data include sign bits and power bits; the sign bits represent the sign of the neuron data and the weight data with one or more bits, and the power bits represent power-bit data of the neuron data and the weight data with m bits, m being a positive integer greater than 1. The storage unit in the storage module is pre-stored with an encoding table that provides an exponential value corresponding to each power-bit data of the neuron data and the weight data. The encoding table provides one or more power-bit data (i.e. zero setting power-bit data) to make the assigned corresponding power neuron data and the assigned corresponding power weight data 0. In other words, when the power-bit data of the power neuron data and the power weight data are zero setting power-bit data in the encoding table, the power neuron data and the power weight data are 0.

The correspondence in the encoding table may be arbitrary.

For instance, the correspondence in the encoding table may be scrambled. A part of an encoding table with m being 5 is shown in FIG. 50.1, when the power-bit data is 00000, the corresponding exponential value is 0; when the power-bit data is 00001, the corresponding exponential value is 3; when the power-bit data is 00010, the corresponding exponential value is 4; when the power-bit data is 00011, the corresponding exponential value is 1; and when the power-bit data is 00100, the corresponding power neuron data and the power weight data is 0.

The correspondence in the encoding table may also be a positive correlation. The storage unit is pre-stored with an integer x and a positive integer y; the exponential value corresponding to the minimum power-bit data is x and the power neuron data corresponding to any other one or more power-bit data is 0, where x denotes a bias value and y denotes a stride. In one example, the exponential value corresponding to the minimum power-bit data is x, while the power neuron data corresponding to the maximum power-bit data is 0, and the exponential values corresponding to other power-bit data than the minimum and maximum power-bit data are (power-bit data+x)*y. By presetting different x and y as well as by changing the values of x and y, the range of representation by the power becomes configurable and is suitable for different application contexts requiring varied numerical ranges. Therefore, the neural network operation device can be applied in a wider range and its application is more flexible and adjustable according to user requirements.

In one example, y is 1, x equals so the exponential range of the value represented by power neuron data and power weight data is $-2^{m-1}$ to $2^{m-1-1}$.

In one example, a part of an encoding table with m being 5, x being 0 and y being 1 is shown in FIG. 50.2, when the power-bit data is 00000, the corresponding exponential value is 0; when the power-bit data is 00001, the corresponding exponential value is 1; when the power-bit data is 00010, the corresponding exponential value is 2; when the power-bit data is 00011, the corresponding exponential value is 3; and when the power-bit data is 11111, the corresponding power neuron data is 0. As another part of an encoding table as shown in FIG. 50.3, with m being 5, x being 0 and y being 2, when the power-bit data is 00000, the corresponding exponential value is 0; when the power-bit data is 00001, the corresponding exponential value is 2; when the power-bit data is 00010, the corresponding exponential value is 4; when the power-bit data is 00011, the corresponding exponential value is 6; when the power-bit data is 11111, the corresponding power neuron data and the power weight data is 0.

The correspondence in the encoding table may be a negative correlation. The storage unit is pre-stored with an integer x and a positive integer y; the exponential value corresponding to the maximum power-bit data is x and the power neuron data and the power weight corresponding to any other one or more power-bit data is 0, where x denotes a bias value and y denotes a stride. In one example, the exponential value corresponding to the maximum power-bit data is x, while the power neuron data corresponding to the minimum power-bit data is 0, and the exponential values corresponding to the other power-bit data than the minimum and maximum power-bit data are (power-bit data−x)*y. By presetting different x and y as well as by changing the values of x and y, a range of representation by the power becomes configurable and is suitable for different application contexts requiring varied numerical ranges.

Therefore, the neural network operation device can be applied in a wider range and its application is more flexible and adjustable according to user requirements.

In one example, y is 1, x equals to $2^{m-1}$, so the exponential range of the value represented by power neuron data and power weight data is $-2^{m-1-1}$ to $2^{m-1}$.

As part of an encoding table as shown in FIG. 50.4 with m being 5, when the power-bit data is 11111, the corresponding exponential value is 0; when the power-bit data is 11110, the corresponding exponential value is 1; when the power-bit data is 11101, the corresponding exponential value is 2; when the power-bit data is 11100, the corresponding exponential value is 3; when the power-bit data is 00000, the corresponding power neuron data and the power weight data is 0.

The correspondence in the encoding table may be that the most significant bit of the power-bit data represents a zero setting bit, and the other m−1 bits of the power-bit data correspond to exponential values. When the most significant bit of the power-bit data is 0, the corresponding power neuron data and the power weight data is 0; when the most significant bit of the power-bit data is 1, the corresponding power neuron data and the corresponding power weight data is not 0. Vice versa, i.e. when the most significant bit of the power-bit data is 1, the corresponding power neuron data and the corresponding power weight data is 0; when the most significant bit of the power bit data is 0, the corresponding power neuron data corresponding power weight data is not 0. In other words, one bit is separated from the power bits of the power neuron data to indicate whether the power neuron data and the power weight data is 0 or not.

In one specific instance as shown in FIG. 50.5, the sign bit has 1 bit, and the power-bit data has 7 bits, i.e., m is 7. In the encoding table, when the power-bit data is 11111111, the corresponding power neuron data and the corresponding weight data is 0, and when the power-bit data is of other values, the power neuron data and the power weight data correspond to a respective binary complement. When the sign bits of power neuron data and power weight data are 0 and the power bits are 0001001, it represents a specific value of $2^9$, i.e. 512; when the sign bits of power neuron data and power weight data is 1 and its power bits are 1111101, it represents a specific value of $-2^{-3}$, i.e. −0.125. Compared with floating-point data, the power data only retains the power bits of the data, which significantly reduces the storage space required for data storage.

The power data representation can reduce the storage space required for storing neuron data. In instances of the examples, the power data has 8 bits. It should be recognized that the data length is not constant, but on different occasions, different data lengths are adopted according to the range of the neuron data and the weight data.

A mono-layer neural network operation method according to an example is shown in FIG. 50, further including:

a step S5: subjecting the power neuron data and the power weight data to the neural network operation in accordance with the operation instructions, where the step S5 includes the following sub-steps:

S51: reading, by the decoding module, operation instructions from the instruction caching unit, and decoding the instructions into respective operation microinstructions;

S52: receiving, by the operating unit, the operation instructions, the power neuron data and the power weight data sent by the decoding module, the input neuron caching unit and the weight caching unit respectively, and performing the neural network operation on the power neuron data and the power weight data according to the operation microinstructions.

The multiplication of a power neuron and a power weight is specifically as follows: the sign bit of the power neuron data and the sign bit of the power weight data are subjected to an XOR operation; in the case where the correspondence in the encoding table is scrambled, searching the encoding table to find out exponential values corresponding to the power bits of the power neuron data and that of the power weight data; in the case where the correspondence in the encoding table is a positive correlation, the minimum exponential value in the encoding table is recorded and an addition is performed to find out exponential values corresponding to the power bits of the power neuron data and that of the power weight data; in the case where the correspondence in the encoding table is a negative correlation, the maximum value in the encoding table is recorded and a subtraction is performed to find out exponential values corresponding to the power bits of the power neuron data and that of the power weight data; the exponential value corresponding to the power neuron data and that corresponding to the power weight data are added.

A specific instance I is shown in FIG. 50.6. Sign bits of the power neuron data and the power weight data have 1 bit, and the power bits data have 4 bits, that is, m is 4. In the encoding table, when the power-bit data is 1111, the corresponding power weight data is 0; and when the power-bit data is of other values, the power data correspond to respective binary complements. If the power neuron data is 00010, the actual value represented is $2^2$. If the power weight data is 00110, the actual value represented is 64, i.e. $2^6$. If the product of the power neuron data and the power weight data is 01000, the actual value represented is $2^8$.

It can be seen that the multiplication of the power neuron data and the power weight data is simpler than the multiplication of floating-point data as well as the multiplication of floating-point data and power data.

The method according to this example can further include a step S6: outputting the neuron data obtained after the neural network operation as the input data of the next layer of the neural network operation, where the step S6 includes the following sub-steps:

S61: receiving, by the output neuron caching unit, the neuron data sent by the operating unit after the neural network operation;

S62: transferring the neuron data received by the output neuron caching unit to the data control module; the neuron data obtained by the output neuron caching unit can serve as the input neurons of the next layer of the neural network operation, and the steps S4 to S6 are repeated until the operation of the last layer of the neural network is finished.

Since the neuron data obtained after the neural network operation are also power data, the bandwidth required for transferring them to the data control unit is significantly reduced in comparison with that required by floating-point data, the overhead on neural network storage resources and computing resources is further reduced, and the operation speed of neural networks is improved.

In addition, the specific operations of the power conversion are the same as those in the preceding examples, and will not be repeated here.

All the modules in the disclosed examples can be hardware structures, and the physical example of the hardware structures includes, but are not limited to, physical devices. The physical devices include but not limited to transistors, memristors and DNA computers.

FIG. 51 is a flowchart of a processing method according to an example of the disclosure. In some examples of the present disclosure, the processing method is used for sparsification of machine learning, for instance, the sparsification of neural network. As shown in FIG. 51, the processing method is implemented in the computing device shown in FIG. 2, FIG. 5 or FIG. 6A, and the processing method includes:

S101: selecting a group of weights from a neural network through a sliding window, and setting all selected weights to zero; and S102: training the neural network, where the weights that have been set to zero during training remain at zero.

The step S101 is actually a process of pruning the neural network; and the step S102 is a process of retraining the pruned neural network by a back-propagation algorithm, where the weights that have been set to zero during training always remain at zero.

The methods of selecting a group of weights of from a neural network may include: an arithmetic mean of an absolute value of any of the weights in the group being less than a first threshold; or a geometric mean of an absolute value of any of the weights in the group being less than a second threshold; or a maximum of an absolute value of any of the weights in the group being less than a third threshold. The selection of the first threshold, the second threshold, and the third threshold may be preset by those skilled in the art according to circumstances, and the present disclosure is not limited thereto.

Figure 52:
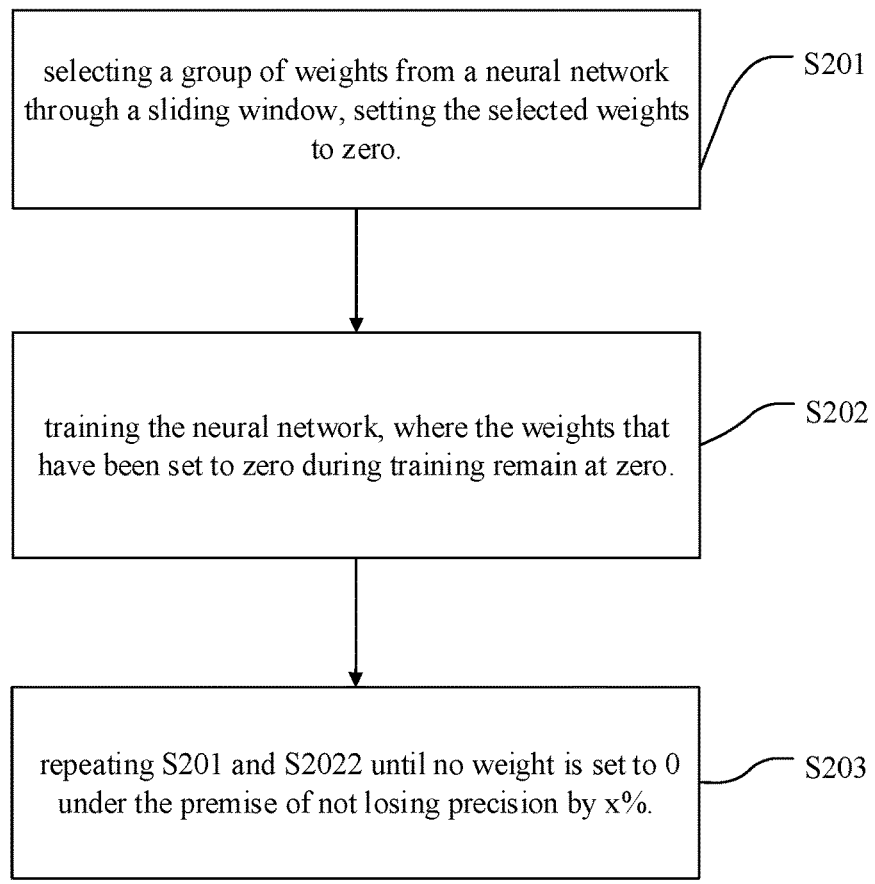
FIG. 52 is another flowchart of a processing method according to an example of the present disclosure.

FIG. 52 is another flowchart of a processing method according to an example of the disclosure. In addition to steps S201 and S202 corresponding to steps S1 and S2, the processing method further includes a step S203: repeating S201 and S2022 until no weight is set to 0 under the premise of not losing precision by x %, where x is a number greater than 0 and less than 100, and x can have different choices according to different neural networks and different applications. In an example, the value of x is 0-5.

In the example of the present disclosure, pruning the neural network may include: pruning the weights of a fully connected layer, a convolutional layer or a LSTM (long and short term memory) layer.

Figure 53:
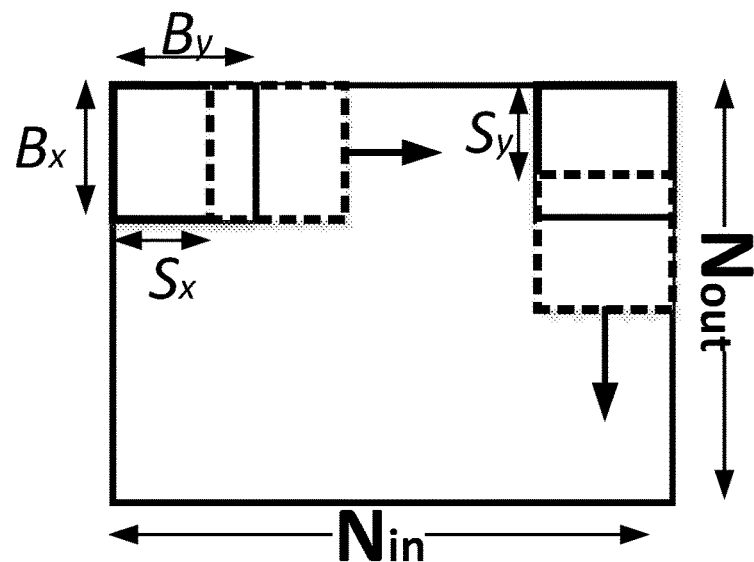
FIG. 53 illustrates a pruning method of a fully connected layer of a neural network according to an example of the present disclosure.

FIG. 53 shows a method of pruning a full connected layer of a neural network according to an example of the disclosure. As shown in FIG. 53, the fully connected layer of the neural network may be seen as a two-dimensional matrix (Nin, Nout), where Nin represents a count of input neurons and Nout represents a count of output neurons, and the fully connected layer has Nin*Nout weights. For performing the coarse-grained pruning, a sliding window with the size of Bin*Bout is preset, where Bin is a positive integer greater than 1 and less than or equal to Nin, and Bout is a positive integer greater than 1 and less than or equal to Nout. The sliding window may slide according to a stride Sin in the direction of Bin, or slide Sout stride in the direction of Bout, where Sin is a positive integer greater than 1 and less than or equal to Bin, and Sout is a positive integer greater than 1 and less than or equal to Bout. When a group of weights in the sliding window is selected, this group of weights will all be set to 0, that is, Bin*Bout weights will be set to 0 at the same time.

Figure 54:
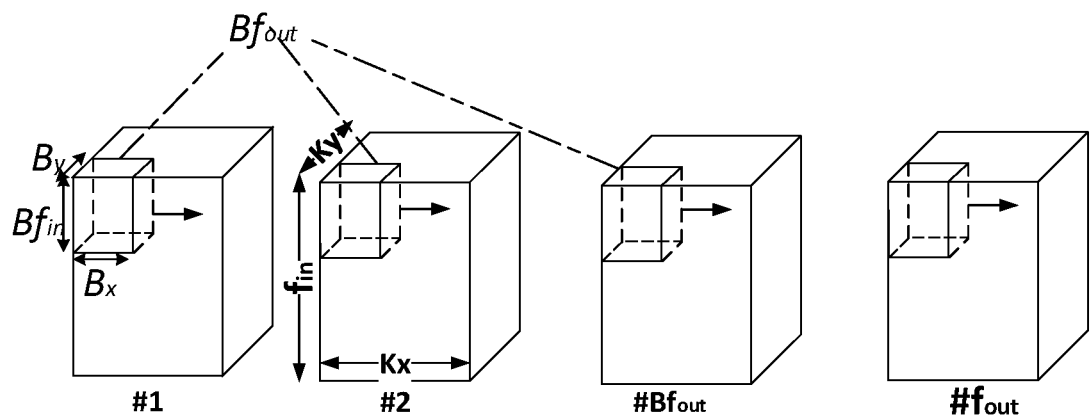
FIG. 54 illustrates a coarse-grained pruning method of a convolutional layer of a neural network according to an example of the present disclosure.

FIG. 54 is a schematic diagram of performing coarse-grained pruning on a convolutional layer of a neural network according to an example of the disclosure. As shown in FIG. 54, the convolutional layers of the neural network may be regarded as a four-dimensional matrix (Nfin, Nfout, Kx, Ky), where Nfin represents a count of input feature maps, and Nfout represents a count of output feature maps, and (Kx, Ky) represents the size of the convolution kernel. For performing the coarse-grained pruning, a sliding window with the size of Bfin*Bfout*Bx*By is preset, where Bfin is a positive integer greater than or equal to 1 and less than or equal to Nfin, Bfout is a positive integer greater than or equal to 1 and less than or equal to Nfout, Bx is a positive integer greater than or equal to 1 and less than or equal to Kx, and By is a positive integer greater than or equal to 1 and less than or equal to Ky. The sliding window may slide according to a stride Sin in the direction of Bin, or slide according to a stride Sfout in the direction of Bfout, or slide according to a stride Sx in the direction of Bx, or slide according to a stride Sy in the direction of By, where Sfin is a positive integer greater than or equal to 1 and less than Bfin, Sfout is a positive integer greater than or equal to 1 and less than Bfout, Sx is a positive integer greater than or equal to 1 and less than Bx, and Sy is greater than or equal to 1 A positive integer less than or equal to By. When a group of weights in the sliding window is selected, this group of weights will all be set to 0, that is, Bfin*Bfout*Bx*By weights will be set to 0 at the same time.

The weights of the LSTM layer are composed of a plurality of fully connected layer weights. It is assumed that the weights of the LSTM layer are composed of m weights of the fully connected layer, where m is a positive integer greater than 0. The weight of an $i^{th}$ fully connected layer is (Nin_i, Nout_i), where i is a positive integer greater than 0 and less than or equal to m, Nin_i represents a count of input neurons of the weight of an $i^{th}$ fully connected layer and Nout_i represents a count of output neurons of the weight of an $i^{th}$ fully connected layer. When performing the coarse-grained pruning, for the $i^{th}$ fully connected layer, a sliding window with the size of Bin_i*Bout_i is preset, where Bin_i is a positive integer greater than or equal to 1 and less than or equal to Nin_i, and Bout_i is a positive integer greater than or equal to 1 and less than or equal to Nout_i. The sliding window may slide according to a stride Sin_i in the direction of Bin_i, or slide according to a stride Sout_i in the direction of Bout_i, where Sin_i is a positive integer greater than or equal to 1 and less than Bin_i, and Sout_i is a positive integer greater than or equal to 1 and less than Bout_i. When a group of weights in the sliding window is selected, this group of weights will all be set to 0, that is, Bin_i*Bout_i weights will be set to 0 at the same time.

Figure 55:
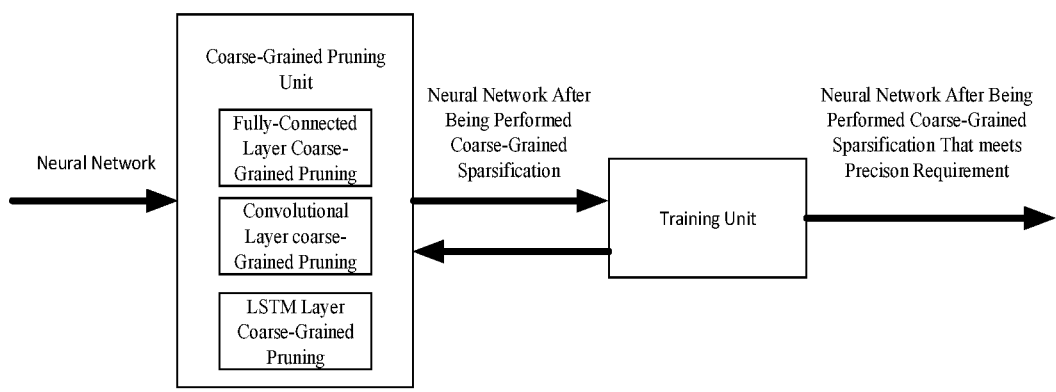
FIG. 55 is a schematic structural diagram of a processing device according to an example of the present disclosure.

The example of the present disclosure further provides a processing device. In an optional example, the processing method may be a computing device as shown in FIG. 6A. It should be noted that the computing device shown in FIG. 6A may add coarse-grained pruning units and neural network training units. In practical applications, the computing device shown in FIG. 6A can may also add modules or units of the processing device as shown in FIG. 55. In another optional example, the processing device is shown in FIG. 55 and is configured to perform coarse-grained pruning on a neural network. The processing device includes:

a memory configured to store executable instructions;

a coarse-grained pruning unit configured to perform pruning on the neural network, where the pruning process includes selecting a group of weights from the neural network through a sliding window setting the selected weights to zero; and a neural network training unit configured to train the pruned neural network, where the weights that have been set to zero during the training process remain at zero.

The training unit integrates a neural network backward training algorithm. The training unit receives the neural network after being performed the coarse-grained pruning operation, and uses the backward training algorithm for training. During the training process, the pruned weights always remain at zero. The training unit transfers the trained neural network to the coarse-grained pruning unit for further pruning operations, or outputs the trained neural network directly.

Furthermore, the coarse-grained pruning unit further includes a fully connected layer coarse-grained pruning unit, which implements a coarse-grained pruning operation on a fully connected layer of the neural network.

Furthermore, the coarse-grained pruning unit further includes a convolutional layer coarse-grained pruning unit, which implements a coarse-grained pruning operation on a convolutional layer of the neural network.

Furthermore, the coarse-grained pruning unit further includes an LSTM layer coarse-grained pruning unit, which implements a coarse-grained pruning operation on an LSTM layer of the neural network.

Figure 56:
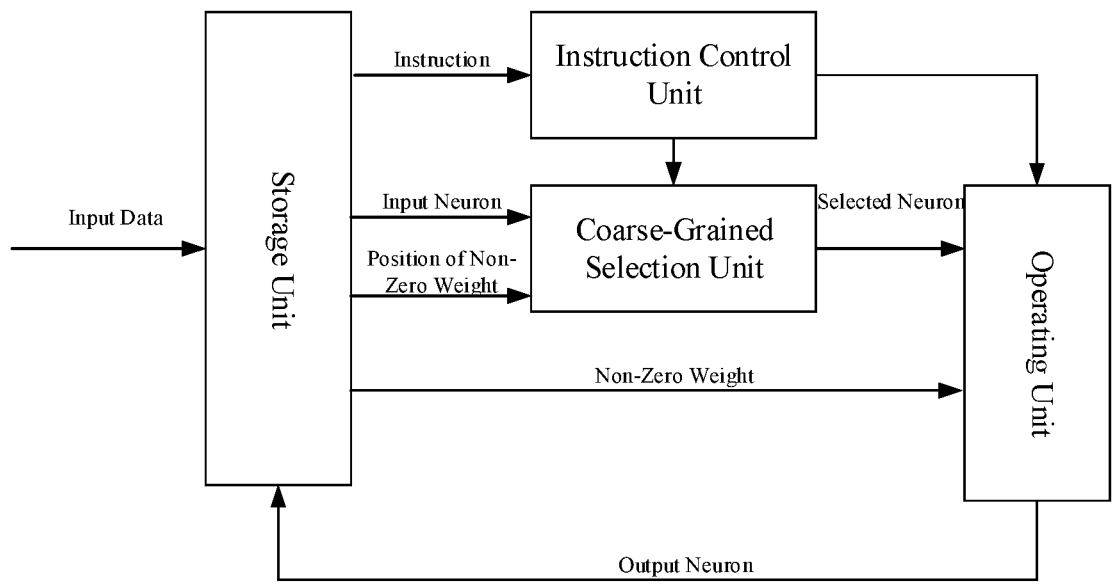
FIG. 56 is a schematic structural diagram of an accelerating device according to an example of the present disclosure.

The present disclosure provides a processing device, and an accelerating device may be added to the computing device as shown in FIG. 6A. FIG. 56 is a schematic structure diagram of a processing device according to an example of the disclosure. As shown in FIG. 56, the processing device may be capable of processing the neural network after being performed coarse-grained sparsification, fully exploring the characteristics of coarse-grained sparse, and reducing access and computation, so as to reduce operation time and energy consumption.

The processing device includes a storage unit, an instruction control unit, a coarse-grained selection unit, and an operating unit. The processing device may be configured to process the neural network.

The storage unit is configured to store neurons, weights, and instructions of the neural network.

The instruction control unit is configured to receive instructions in the storage unit, and decode the instructions to obtain the control information so as to control the coarse-grained selection unit to perform selection operation and the operating unit to perform computation.

In summary, the operating unit in this present disclosure can be used to execute neural network dedicated instructions. The neural network dedicated instructions may include but not be limited to all instructions dedicated to completing the operation of an artificial neural network. The neural network dedicated instruction may include but not be limited to a control instruction, a data transfer instruction, an operation instruction, and a logical instruction, where the control instruction may be configured to control the neural network execution process. The data transfer instruction may be configured to transfer data between different storage media, and the data format may include but not be limited to matrix, vector and scalar. The operation instruction may be configured to perform a neural network arithmetic operation, and the operation instruction may include but not be limited to a matrix operation instruction, a vector operation instruction, a scalar operation instruction, a convolutional neural network operation instruction, a fully connected neural network operation instruction, a pooling neural network operation instruction, an RBM neural network operation instruction, an LRN neural network operation instruction, an LCN neural network operation instruction, an LSTM neural network operation instruction, an RNN operation instruction, an ReLU neural network operation instruction, a PReLU neural network operation instruction, a SIGMOID neural network operation instruction, a TANH neural network operation instruction, and a MAXOUT neural network operation instruction. The logical instruction may be configured to perform a logical operation of the neural network, and the logical instruction may include but not be limited to a vector logical operation instruction and a scalar logical operation instruction.

The RBM neural network operation instruction may be configured to implement an RBM (Restricted Boltzmann Machine) neural network operation.

The LRN neural network operation instruction may be configured to implement an LRN (Local Response Normalization) neural network operation.

The LSTM neural network operation instruction may be configured to implement an LSTM (Long Short-Term Memory) neural network operation.

The RNN neural network operation instruction may be configured to implement an RNN (Recurrent Neural Networks) neural network operation.

The RELU neural network operation instruction may be configured to implement an RELU (Rectified linear unit) neural network operation.

The SIGMOID neural network operation instruction may be configured to implement a SIGMOID neural network operation, $y=\text{sigmoid}(x)=1/1+e^{-x}$, where x and y are real numbers.

The TANH neural network operation instruction may be configured to implement a TANH neural network operation.

The MAXOUT neural network operation instruction may be configured to implement a MAXOUT neural network operation. The expression that outputs a node using a maxout activation function is $\text{maxout}_i(x)=\max_{j\in[1,k]}(xTW\cdot ij+bij)$, where w represents the weight and b represents the bias.

Specifically, the neural network dedicated instructions include a Cambricon instruction set.

The Cambricon instruction set is characterized in that each instruction in the Cambircon instruction set has a fixed length (for instance, 64 bit or 128 bit), and the instruction may be composed of an operation code and an operand. The instruction set includes four types of instructions: control instructions, data transfer instructions, computational instructions, and logical instructions.

Furthermore, the control instructions may be configured to control the execution process, and include a jump instruction and a conditional branch instruction.

Furthermore, the data transfer instructions may be configured to transfer data between different storage media, and include a load instruction, a store instruction, and a move instruction. The load instruction may be configured to load data from a main memory to a cache; the store instruction may be configured to store data from the cache to the main memory; and the move instruction may be configured to move data from a cache to another cache or from a cache to a register or from a register to another register. The data transfer instruction may support three different ways of organizing data including matrix, vector, and scalar.

The operation instruction may be configured to perform a neural network arithmetic operation, and the operation instruction may include a matrix operation instruction, a vector operation instruction, and a scalar operation instruction.

Furthermore, the matrix operation instruction may be configured to complete a matrix operation in the neural network, including a matrix multiply vector operation, a vector multiply matrix operation, a matrix multiply scalar operation, an outer product operation, a matrix add matrix operation, and a matrix subtract matrix operation.

Furthermore, The vector operation instruction may be configured to complete a vector operation in the neural network, including a vector elementary operation, a vector transcendental function operation, a dot product operation, a random vector generation operation, and operation of maximum/minimum of a vector, where the vector elementary operation may include vector addition, subtraction, multiplication, and division; the vector transcendental function may refer to a function which does not meet any polynomial equation taking polynomials as coefficients, and the function may include an exponential function, a logarithmic function, a trigonometric function, and an anti-trigonometric function.

Furthermore, the scalar operation instruction may be configured to complete a scalar operation in the neural network, including a scalar elementary operation, and a scalar transcendental function operation. The scalar elementary operation may include scalar addition, subtraction, multiplication, and division; the scalar transcendental function operation may refer to a function which does not meet any polynomial equation taking polynomials as coefficients, and the scalar transcendental function may include an exponential function, a logarithmic function, a trigonometric function, and an anti-trigonometric function.

Furthermore, the logical instruction may be configured to complete the neural network logical operation, and the logical instruction may include a vector logical operation instruction and a scalar logical operation instruction.

Furthermore, the vector logical operation instruction may include a vector compare instruction, a vector logical operation, and a vector greater than merge operation. The vector compare operation may include but not be limited to greater than, smaller than, equal to, greater than or equal to ($\geq$), less than or equal to ($\leq$), and unequal to. The vector logical operation may include AND, OR, and NOT.

The scalar logical operation may include a scalar compare operation and a scalar logical operation. The scalar compare operation may include greater than, smaller than, equal to, greater than or equal to ($\geq$), less than or equal to ($\leq$), and unequal to. The scalar logical operation may include AND, OR, and NOT.

The coarse-grained selection unit is configured to receive input neurons and position information of non-zero weights, use a sliding window to select a group of weights of the neural network, set the selected weights to zero, and select the neurons corresponding non-zero weights.

The operating unit is configured to receive the selected neurons and non-zero weights, complete the neural network operation through a multiplication and addition operating unit, and transfer the output neurons to the storage unit again.

Furthermore, the storage unit only stores the non-zero weights and the position information of the non-zero weights.

Furthermore, the coarse-grained selection unit only selects neurons corresponding to the non-zero weights and transfers the neurons to the operating unit.

Figure 57:
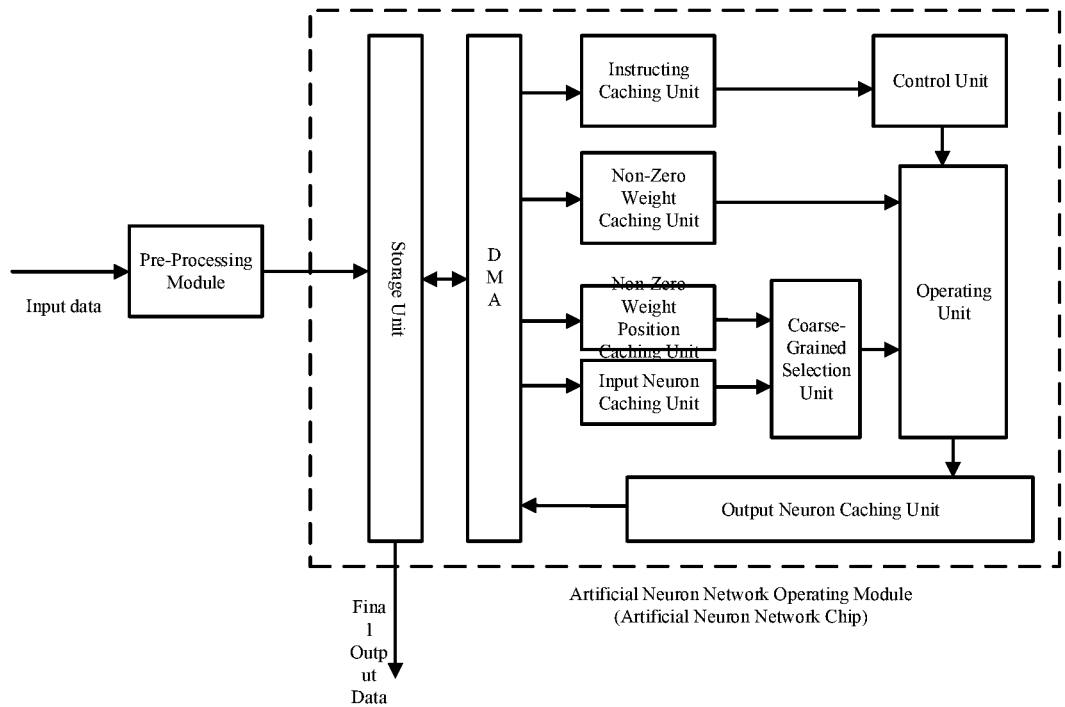
FIG. 57 is a schematic structural diagram of another accelerating device according to an example of the present disclosure.

Furthermore, the accelerating device further includes a pre-processing module. As shown in FIG. 57, the module pre-processes original data, where the pre-processing may include segmentation, Gaussian filter, binarization, regularization, normalization, and the like.

Furthermore, the accelerating device further includes a DMA (direct memory access) unit.

Furthermore, the accelerating device further includes an instruction caching unit, an input neuron caching unit, a non-zero weight caching unit, a non-zero weight position caching unit, and an output neuron caching unit.

Furthermore, the storage unit is mainly configured to store the neurons, weights, and instructions of the neural network. The storage unit only stores the non-zero weights and position information of the non-zero weights.

Specifically, the DMA unit may be configured to read/write data or instruction in the storage unit, the instruction caching unit, the non-zero weight caching unit, the non-zero weight position caching unit, the input neuron caching unit, and the output neuron caching unit.

The instruction caching unit is configured to store dedicated instructions.

The non-zero weight caching unit is configured to cache the non-zero weights.

The non-zero weight position caching unit is configured to cache the position of the non-zero weights.

The non-zero weight position caching unit maps each connection weight in the input data to the corresponding input neuron one by one.

In one case, a one-to-one correspondence method adopted by the non-zero weight position caching unit may be: 1 indicating that there is a connection relationship, 0 indicating that there is no connection relationship, and the connection status of each group of outputs and all inputs forming a string of 0 and 1 to indicate the connection relationship of the outputs. In another case, a one-to-one correspondence method adopted by the non-zero weight position caching unit may be: 1 indicating that there is a connection relationship, 0 indicating that there is no connection relationship, and the connection status of each group of inputs and all outputs forming a string of 0 and 1 to indicate the connection relationship of the inputs. In another case, a one-to-one correspondence method adopted by the non-zero weight position caching unit may be: listing a distance from the input neuron where a first connection is located in a first group to a first input neuron, a distance from the input neuron where a second connection is located to a previous connection in the input neuron, a distance from the input neuron where a third connection is located to the previous connection in the input neuron, . . . , until all the inputs of the outputs are exhausted to represent the connection relationships of the outputs.

The input neuron caching unit may be configured to cache the input neuron input to the coarse-grained selection unit.

The output neuron caching unit may be configured to cache the output neuron output by the operating unit.

The control unit may be configured to receive instructions in the instruction caching unit, and decode the instructions to obtain control information to control the operating unit to perform computation.

The coarse-grained selection unit may be configured to receive input neurons and position information of non-zero weights, and select neurons need to be operated. The coarse-grained selection unit only selects neurons corresponding to the non-zero weights and transfers the neurons to the operating unit.

The operating unit may be configured to perform a corresponding operation on the data according to instructions stored in the storage unit.

The operating unit may include but not be limited to three parts: a first part is one or more multipliers, a second part is one or more adders, where the one or more adders in the second part compose an adder tree, and a third part is an activation function unit. The first part may multiply first input data (in1) and second input data (in2) to get first output data (out1), where the process is: out=in1*in2. The second part may add third input data in3 through the adder tree to obtain second output data (out2), where in3 is a vector of length N, N is greater than 1, the process is: out2=in3[1]+In3[2]+ . . . +in3[N], and/or add third input data (in3) by the adder tree and add fourth input data (in4) to obtain the second output data (out2), where the process is: out=in3[1]+in3[2]+ . . . +in3[N]+in4, or add the third input data (in3) and the fourth input data (in4) to obtain the second output data (out2), where the process is: out2=in3+in4. The third part may perform the activation function on fifth input data (in5) to obtain active output data (out), where the process is out3=active(in5), and the activation function may include sigmoid, tanh, relu, softmax, and the like; in addition to the active operation, the third part may further implement other non-linear functions, for instance, the third part may perform an operation (f) on input data (in) to obtain the output data (out), where the process is: out=f(in).

The operating unit may further include a pooling unit, and the pooling unit obtains output data (out) after performing a pooling operation on input data (in), and the process is: out=pool(in), where pool represents the pooling operation, and the pooling operation may include but not be limited to: mean pooling, maximum pooling, or median pooling. The input data in is the data in a pooling core associated with the output data(out).

The operations performed by the operating unit may include the following steps. The first step: multiplying first input data and second input data to obtain a product; the second step: performing an adder tree operation, that is, adding, third input data through an adder tree step by step, or adding the third input data to fourth input data to obtain a sum; the third step: performing an activation function on fifth data to obtain output data. The above several steps of the operations can be freely combined, so as to achieve a variety of different functions of the operations.

The processing method of the present disclosure will be specifically described by exemplifying the examples of a neural network processor in the following, but it should be understood that it is not intended to limit the present disclosure. The equivalent structure or equivalent process transformations made by the specific examples, or directly or indirectly applied in other related technical fields, are equally included in the scope of protection of the present disclosure.

Figure 58:
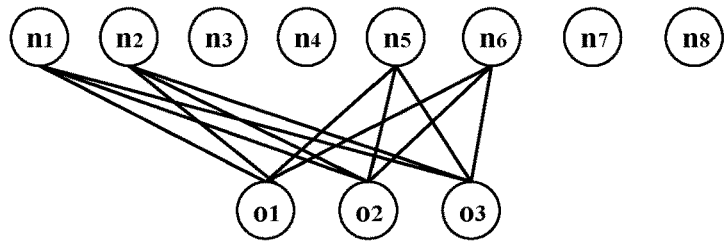
FIG. 58 illustrates a specific example of a processing method according to an example of the present disclosure.

FIG. 58 is a schematic diagram of a specific example of a processing method according to an example of the disclosure. FIG. 58 shows the result of a fully connected layer of a neural network after being coarse-grained pruned. The fully connected layer has a total of 8 input neurons n1~n8 and 3 output neurons o1~o3, where the weights between the 4 input neurons n3, n4, n7, n8 and the 3 output neurons of o1, o2, o3 are set to 0 by coarse-grained sparsification; n1 is connected with o1, o2 and o3 by 3 weights of s11, s12 and s13; n2 is connected with o1, o2, o3 by 3 weights of s21, s22, s23; n5 is connected with o1, o2, o3 by 3 weights of s31, s32, s33; n6 is connected with o1, o2, o3 by 3 weights of s41, s42, s43. The bit string of 11001100 may be used to represent the connection status between the input neuron and the output neuron, that is, the first case of indicating the position information of the target weight, 1 represents that the input neuron is connected with the three output neurons, and 0 represents that the input neuron is not connected with any one of the three output neurons. Table 1 describes the information of neurons and weights in the example, and Formula 1 describes an operation formula of the three output neurons of o1, o2, and o3. It can be seen from Formula 1 that o1, o2, and o3 will receive the same neuron for operation.

TABLE 1

| input neuron | output neuron | | | position of non-zero weights |
|---|---|---|---|---|
| | o1 | o2 | o3 | |
| n1 | s11 | s21 | s31 | 1 |
| n2 | s12 | s22 | s32 | 1 |
| n3 | 0 | 0 | 0 | 0 |
| n4 | 0 | 0 | 0 | 0 |
| n5 | s13 | s23 | s33 | 1 |
| n6 | s14 | s24 | s34 | 1 |
| n7 | 0 | 0 | 0 | 0 |
| n8 | 0 | 0 | 0 | 0 |

Formula 1—operation formula of the output neuron:

$$o1=n1*s11+n2*s12+n5*s13+n6*s14$$

$$o2=n1*s21+n2*s22+n5*s23+n6*s24$$

$$o3=n1*s31+n7*s32+n5*s33+n6*s34$$

The processing device may send the position information of the 8 input neurons, 12 weights, 8 bits, and corresponding instructions to the storage unit. The coarse-grained selection unit may receive the position of the 8 input neurons and the target weight, and may select 4 neurons of n1, n2, n5, n6 that need to participate in the operation. The operating unit may receive the 4 selected neurons and weights, complete the operation of the output neuron by Formula 1, and then transfer the output neuron back to the storage unit.

In the examples provided by the disclosure, it should be understood that the disclosed related devices and methods may be implemented in other manners. For instance, the device example described above is only schematic. For instance, the division of the units or the modules is only logical function partition, and another partition manner may be adopted during practical example. For instance, a plurality of components or modules may be combined or integrated into a system or some characteristics may be neglected or not executed.

The example of the present disclosure provides a coarse-grained sparsification processing method and corresponding processing device of the neural network, and provides a chip, a chip package structure, a board card, and an electronic device. The coarse-grained sparsification processing method may regularize the sparse neural network, facilitate accelerating by using hardware, and reduce the storage space of a target weight position. The neural network processor may fully exploit the characteristics of coarse-grained sparsification, reduce the memory access and the amount of computation, thereby obtaining an acceleration ratio and reducing energy consumption.

Figure 59:
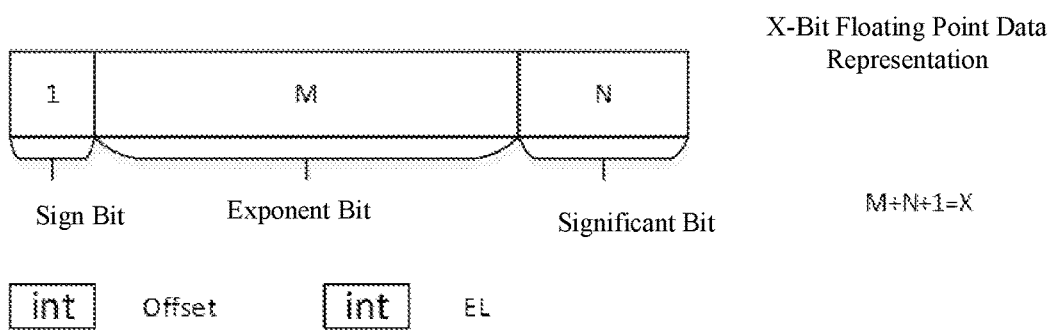
FIG. 59 illustrates a specific representation method of a short-bit floating-point data structure for storing data according to an example of the present disclosure.

The application further provides a device for performing a forward operation of artificial neural network. In an optional example, the device for performing a forward operation of artificial neural network may be the computing device as shown in FIG. 6A. The computing device may further include a fixed-point data conversion module and a corresponding fixed-point data operating module, where the fixed-point data conversion module includes a floating-point data statistics module and a data conversion unit. The computing device shown in FIG. 6A may further add units or modules as shown in FIG. 59 or FIG. 60. The floating-point data statistics module is used for statistics and computations to obtain required exponent bit offset and number of bits required for exponent bit for storing various types of data in the forward operation of the artificial neural network; the data conversion unit is configured to convert the long bit floating-point data type to the short-bit floating-point data type, such as 32-bit floating-point data type conversion; the floating-point operating module is used to complete various types of forward operation that are required for short bit floating-point data.

Among them, "long-bit floating-point data" represents original floating-point data, such as 32-bit floating-point data, but it may be a standard 64-bit or 16-bit floating-point number etc., here, only 32 bits are used as a specific example for description; "less-bit floating-point data", also known as "short-bit floating-point data", means that floating-point data is represented by fewer bits than the original floating-point data.

The forward operation for multi-layer artificial neural network according to the examples of the present disclosure includes two or more layers of neurons. The short-bit floating-point data type is used to represent all the input, weight, and/or biased data required in the forward operation, and the input, weight, and/or biased data are used to participate in the operation between layers.

FIG. 59 illustrates a specific representation method of the short-bit floating-point data structure used for data storage, according to examples of the present disclosure. Among them, 1-bit is used to represent sign bit, M-bit is used to represent exponent bit, and N-bit is used to represent significant bit; since floating-point representation requires that the first significant bit cannot be 0, it can only be 1 for binary, so the most significant bit 1 of the significant bit can be used as a hidden bit and not written to the memory, the significant bit number of floating-point data actually is (N+1) bits; compared with the representation form of 32-bit floating-point data, the representation form of short-bit floating-point data sets two flag bits (the offset and EL) for the data of same layer, same type in the neural network such as all weight data in the first convolutional layer in addition to occupying fewer bits, where the flag bit (offset) is used to record the initial offset of the exponent bit, actual exponent bit representation=exponent bit representation data+offset, the flag bit (EL) is used to record the number of bits occupied by the exponent bits, then the number of bits occupied by the significant bit is N=X−1−M.

Figure 60A:
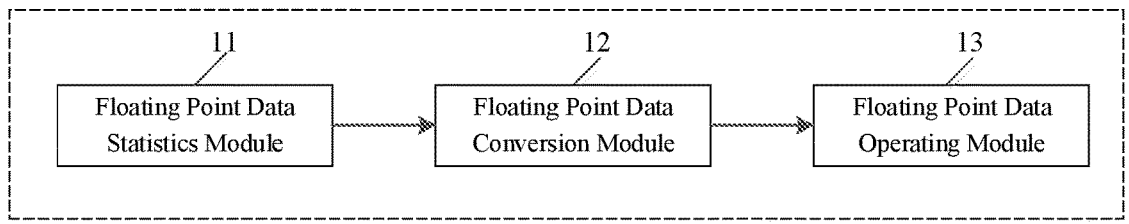
FIG. 60A is an exemplary block diagram of a device for performing a forward operation of an artificial network according to an example of the present disclosure.
Figure 60B:
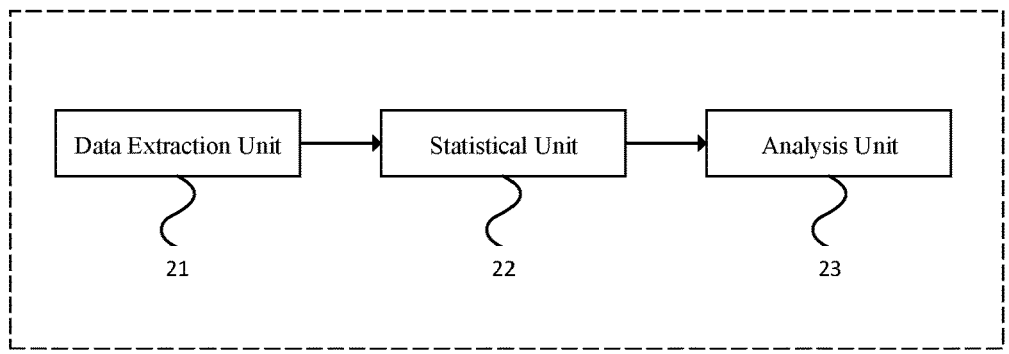
FIG. 60B is an exemplary block diagram of a floating-point data statistics module in a device for performing a forward operation of an artificial neural network according to an example of the present disclosure.

FIG. 60A is a schematic block view of the device for performing the forward operation of the artificial neural network. As shown in FIG. 60A, the device includes:

a floating-point data statistics module 11 configured to perform data analysis on input neurons, weights, and/or biased data in the forward operation of the neural network to obtain the offset of the exponent bit (offset) and the length of the exponent bit (EL);

a floating-point data statistics module 12 configured to convert the input neurons, weights, and/or biased data from the long-bit floating-point data type to the short-bit floating-point data type according to the offset of the exponent bit (offset) and the length of the exponent bit (EL) of the floating-point data; and a floating-point data statistics module 13 configured to perform a forward operation of an artificial neural network according to the input neurons, weights, and/or biased data converted to short-bit floating-point data type.

FIG. 60 illustrates an exemplary block view of the floating data statistics module, which includes a data extraction unit 21, a statistical unit 22, and an analysis unit 23. The purpose of this module is that through extracting all long-bit floating-point data (for instance, input neurons, weights, and/or biased data) represented by the long-bit floating-point data type in a neural network and analyzing the long-bit floating-point data to obtain the offset of the exponent bit (offset) and the length of the exponent bit (EL) that is used for each different type of data in a neural network with short-bit floating-points, the subsequent forward operation of short-bit floating-point results in a better effect.

The data extraction unit 21 is used for extracting various different types of data in the forward operation of long-bit floating-point; the statistical unit 22 is configured to count a data range for the same type of data and a data distribution of each data segment; the analysis unit 23 obtains the offset of the exponent bit (offset) and the length of the exponent bit (EL) that should be set for each type of data with a short-bit floating-point according to the results counted by the statistical unit 23, the exponential bit length (EL) is set such that the representable data range contains as much data as possible for this type.

In an optional example, the device for performing the forward operation of artificial neural network obtains, from other units or devices, such as a CPU, various types of data (the input neurons, weights, and biased data) represented by the long-bit floating-point data type during the forward operation, and statistics the data range of the same type of data and the distribution of each data segment. Based on the statistical results, the device for performing the forward operation of artificial neural network obtains the exponent bit length EL and exponent bit offset that should be set when using short-bit floating-point data to represent each type of data or each type of data in each layer; or the device for performing the forward operation of artificial neural network obtains, from other units or devices, such as a CPU, the exponent bit length EL and exponent bit bias that should be set when using short-bit floating-point data to represent each type of data or each type of data in each layer in the artificial neural network.

Figure 61:
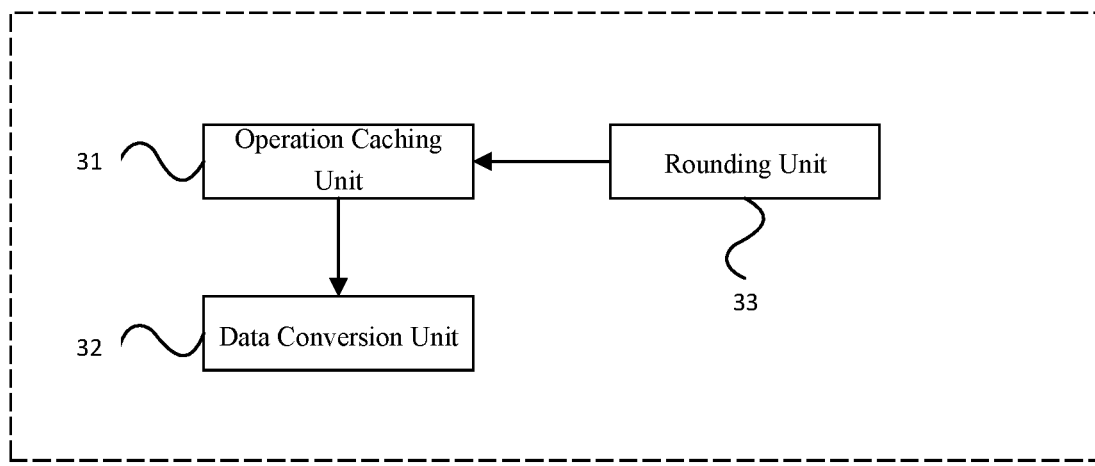
FIG. 61 is an exemplary block diagram of a short-digit floating-point computation part of a forward operation module in a device for performing a forward operation of an artificial network according to an example of the present disclosure.

FIG. 61 is a schematic block view of the short-bit floating-point computation part of the forward operating module according to an example of the present disclosure. The forward operating module includes an operation caching unit 31, a data conversion unit 32, and a rounding unit 33. As addition and multiplication operations may cause the data range to expand during the forward operation, the caching unit stores an intermediate result of the forward operation using the data type with high precision; a rounding operation is performed on the data exceeding the short-bit floating-point precision range after the operation is completed and then the data in caching area is converted to a short-bit floating-point data by the data conversion unit 32.

The rounding unit 33 can perform a rounding operation on the data exceeding the short-bit floating-point precision range. This rounding unit may be a random rounding unit, a rounding to the nearest integer unit, a round up unit, a round down unit, and a round off unit. Different rounding units can be used to perform different rounding operations on data beyond the short-bit floating-point precision range.

The random rounding unit performs the following operations:

$$y = \begin{cases} \lfloor x \rfloor & w.p. 1 - \frac{x - \lfloor x \rfloor}{\varepsilon} \\ \lfloor x \rfloor + \varepsilon & w.p. \frac{x - \lfloor x \rfloor}{\varepsilon} \end{cases}$$

where y represents the short-bit floating-point data after random rounding, x represents the long-bit floating-point data before random rounding, ε is the smallest positive integer that the current short-bit floating-point data representation type can represent, i.e. $2^{offset-(x-1-EL)}$, $\lfloor x \rfloor$ short-bit floating-point data obtained by directly intercepting the original data X (equivalent to performing a round down operation on the decimal); w.p. represents a probability, i.e. the probability that the randomly rounded data Y is $\lfloor x \rfloor$ is $$1 - \frac{x - \lfloor x \rfloor}{\varepsilon},$$

the probability that the randomly rounded data y is $\lfloor x \rfloor + \varepsilon$ is $$\frac{x - \lfloor x \rfloor}{\varepsilon}.$$

The rounding to the nearest integer unit performs the following operations:

$$y = \begin{cases} \lfloor x \rfloor & \text{if } \lfloor x \rfloor \leq x \leq \lfloor x \rfloor + \frac{\varepsilon}{2} \\ \lfloor x \rfloor + \varepsilon & \text{if } \lfloor x \rfloor + \frac{\varepsilon}{2} \leq x \leq \lfloor x \rfloor + \varepsilon \end{cases}$$

where y represents the short-bit floating-point data after rounding to the nearest integer, x represents the long-bit floating-point data before rounding to the nearest integer, and ε is the smallest positive integer that the current short-bit floating-point data representation type can represent, i.e. $2^{offset-(X-1-EL)}$, $\lfloor x \rfloor$ is an integer multiple of ε, of which the value is the maximum number less than or equal to x.

The round up unit performs the following operations:

$$y = \lceil x \rceil$$

where y represents the short-bit floating-point data after round up, x represents the long-bit floating-point data before round up, $\lceil x \rceil$ is an integer multiple of ε, of which the value is the minimum number more than or equal to x; and ε is the smallest positive integer that the current short-bit floating-point data representation type can represent, i.e. $2^{offset-(X-1-EL)}$.

The round down unit performs the following operations:

$$y = \lfloor x \rfloor$$

where y represents the short-bit floating-point data after round down, x represents the long-bit floating-point data before round down, $\lfloor x \rfloor$ is an integer multiple of ε, of which the value is the maximum number less than or equal to x; and ε is the smallest positive integer that the current short-bit floating-point data representation type can represent, i.e. $2^{offset-(x-1-EL)}$.

The round off unit performs the following operations:

$$Y = [x]$$

where y represents the short-bit floating-point data after round off, x represents the long-bit floating-point data before round off, and [x] represents the number obtained by directly rounding off the short-bit floating-point data for the original data x.

The present disclosure further discloses a method of performing a forward operation of artificial neural network. The method includes specific steps of:

obtaining data represented by the long-bit floating-point data type of each layer of the neural network through a trained long-bit floating-point model of the neural network, including the weights, biased data, input neurons, output values, and other data parameters of each layer; and performing statistics analysis respectively on the data of different layers and different types to obtain the various parameters required with short-bit floating-point data representation type, where the parameters include the bit width of the exponent bit, the bit width of the significant bit, and the data range to be represented by exponent bits, etc.

The short-bit floating-point representation obtained by statistics is used for forward operation of the neural network, that is, all data in the forward operation of the neural network is represented by a short-bit floating-point format, and at the same time, a copy represented by long-bit floating-point data is reserved for the weight and biased data of the neural network, and then a forward operation is performed. For the forward operation, some operations will cause the data range to expand, such as addition, multiplication, and so on. It is necessary to use the cache space to store the intermediate computation results, which are stored in long-bit floating-point format, and after computation is completed, the intermediate computation results are returned to the corresponding short-bit floating-point format. The process of converting long-bit floating-point to short-bit floating-point requires rounding, which includes random rounding, rounding to the nearest integer, and the like, which are expressed as follows:

The random rounding operation is as follows:

$$y = \begin{cases} \lfloor x \rfloor & w.p. 1 - \frac{x - \lfloor x \rfloor}{\varepsilon} \\ \lfloor x \rfloor + \varepsilon & w.p. \frac{x - \lfloor x \rfloor}{\varepsilon} \end{cases}$$

where y represents the short-bit floating-point data after random rounding, x represents the long-bit floating-point data before random rounding, ε is the smallest positive integer that the current short-bit floating-point data representation type can represent, i.e. $2^{offset-(x-1-EL)} \lfloor x \rfloor$ represents the short-bit floating-point data obtained by directly intercepting the original data X (equivalent to performing a round down operation on the decimal); w.p. represents a probability, i.e. the probability that the randomly rounded data y is $\lfloor x \rfloor$ is $$1 - \frac{x - \lfloor x \rfloor}{\varepsilon},$$

the probability that the randomly rounded data y is $\lfloor x \rfloor + 1$ is $$\frac{x - \lfloor x \rfloor}{\varepsilon}.$$

The rounding to the nearest integer operation is as follows:

$$y = \begin{cases} \lfloor x \rfloor & \text{if } \lfloor x \rfloor \leq x \leq \lfloor x \rfloor + \frac{\varepsilon}{2} \\ \lfloor x \rfloor + \varepsilon & \text{if } \lfloor x \rfloor + \frac{\varepsilon}{2} \leq x \leq \lfloor x \rfloor + \varepsilon \end{cases}$$

where y represents the short-bit floating-point data after rounding to the nearest integer, x represents the long-bit floating-point data before rounding to the nearest integer, and ε is the smallest positive integer that the current short-bit floating-point data representation type can represent, i.e. $2^{offset-(x-1-EL)}\lfloor x \rfloor$ is an integer multiple of ε, of which the value is the maximum number less than or equal to x.

The round up operation is as follows:

$$y = \lceil x \rceil;$$

where y represents the short-bit floating-point data after round up, x represents the long-bit floating-point data before round up, $\lceil x \rceil$ is an integer multiple of ε, of which the value is the minimum number more than or equal to x; and ε is the smallest positive integer that the current short-bit floating-point data representation type can represent, i.e. $2^{offset-(x-1-EL)}$.

The round down operation is as follows:

$$y = \lfloor x \rfloor$$

where y represents the short-bit floating-point data after round down, x represents the long-bit floating-point data before round down, $\lfloor x \rfloor$ is an integer multiple of ε, of which the value is the maximum number less than or equal to x; and ε is the smallest positive integer that the current short-bit floating-point data representation format can represent, i.e. $2^{offset-(x-1-EL)}$.

The round off operation is as follows:

$$y = [x]$$

where y represents the short-bit floating-point data after round off, x represents the long-bit floating-point data before round off, and [x] represents the number obtained by directly rounding off the short-bit floating-point data for the original data x.

After the forward operation is completed, when the backward operation is performed, the data represented by the short-bit floating-point data in the forward operation needs to be converted into the data represented by the long-bit floating-point to participate in the backward operation, where the weights and biased data involved in the backward operation uses a copy of the long-bit floating-point data retained in the forward operation. After the end of the backward operation, the data represented by the long-bit floating-point data in the forward operation is converted into the data represented by the short-bit floating-point to participate in the subsequent forward operation. At the same time, during the forward operation, a copy of the long-bit floating-point data representation is still reserved for the weights and biased data of the neural network. The rounding operation has to be performed during the conversion process, and the operation is the same as the rounding operation in the forward operation.

The forward and backward operations as described above are repeated until the neural network training is completed.

Figure 62:
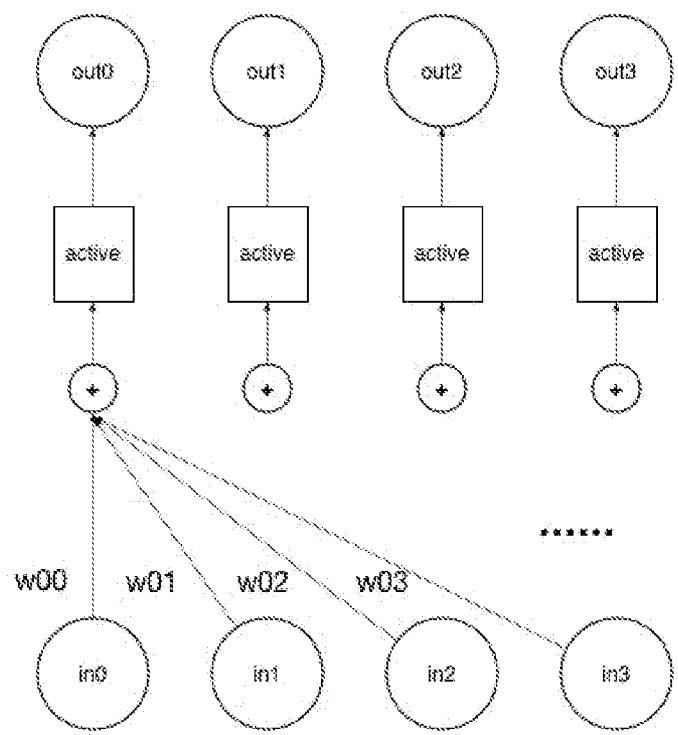
FIG. 62 is an exemplary block diagram of a forward operation process of a neural network according to an example of the present disclosure.

FIG. 62 is a flowchart of a forward operation process of a single-layer artificial neural network according to an example of the present disclosure. The flowchart describes the process of achieving a forward operation for a single-layer artificial neural network using the device and instruction set of the present disclosure. The operation process is implemented in the computing devices as shown in FIG. 2, FIG. 5, or FIG. 6A. For each layer, an intermediate result vector of the layer is first computed by weighted summation of the input neuron vector. The intermediate result vector is biased and activated to obtain an output neuron vector. The output neuron vector is the input neuron vector of the next layer.

Figure 63:
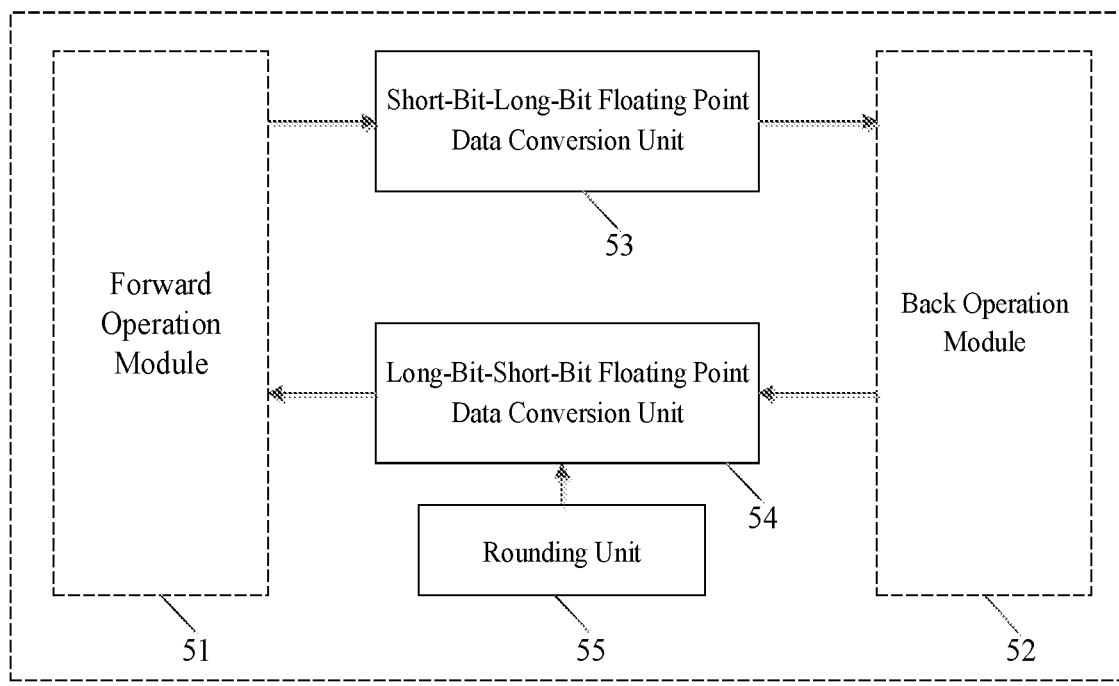
FIG. 63 is an exemplary block diagram of an operation process of a device for performing a forward operation of an artificial neural network according to an example of the present disclosure.

FIG. 63 is an exemplary block view of the operation flow according to an example of the present disclosure. The data represented by the short-bit floating-point other than weights and biased data obtained by a forward operating module 51 during the forward operation process must first be converted to the long-bit floating-point data through a short-bit-long-bit floating-point data conversion unit 53 for a backward operation. After the back operation performed by a back operating module 52 is completed, the data represented by the long-bit floating-point must be converted to a short-bit floating-point through a long-bit-short-bit floating-point data conversion unit 54. During the conversion process, a rounding operation should be performed on the data exceeding the short-bit floating-point precision range by a rounding unit 55, where the process is the same as the rounding operation performed by the rounding unit in FIG. 62.

It should be noted that the forward operation may also use input neurons, weights, and/or biased data represented by long-bit floating-point data type, and the backward training may also use input neurons, weights, and/or biased data represented by short-bit floating-point data type.

It should be noted that the short-bit floating-point data type is relative to the long-bit floating-point data type. When the short-bit floating-point data type is a 16-bit floating-point data type, the long-bit floating-point data type can be a 32-bit floating-point data type or a 64-bit floating-point data type; when the short-bit floating-point data type is a 32-bit floating-point data type, the long-bit floating-point data type is a 64-bit floating-point data type.

Through the use of short-bit floating-point representations of data for forward operation, the data range space of short-bit floating-point data type is fully utilized. Compared with the long-bit floating-point data representation, the space required for storage of network parameters is greatly reduced and the area-to-power ratio of the hardware is optimized.

The disclosure provides a device for performing a forward operation of artificial neural network. In an optional example, the device for performing a forward operation of artificial neural network may be the computing device as shown in FIG. 6A, which includes a fixed-point data conversion module and a corresponding fixed-point data operating module, where the fixed-point data conversion module includes a floating-point data statistics module and a data conversion unit. The computing device shown in FIG. 6A may further include modules or units of the device shown in FIG. 64, FIG. 65, and FIG. 66. The floating-point data statistics module is configured to perform a statistical analysis and computation on various types of data required for the forward operation of artificial neural network to obtain a decimal point location; the data conversion unit is configured to convert the long-bit floating-point data type to the short-bit fixed-point data type according to the decimal point location; and the fixed-point operating module is configured to complete various forward operations required for short-bit fixed-point data.

The "long-bit floating-point data" represents original floating-point data such as 32-bit floating-point data, or may be a standard 64-bit or 16-bit floating-point number etc. Only the 32-bit is used as a specific example for description herein; and "less-bit fixed-point data", also known as "short-bit fixed-point data", means that fixed-point data is represented by fewer bits than the original floating-point data.

The forward operation for multi-layer artificial neural network according to the examples of the present application includes two or more layers of neurons. The short-bit fixed-point data type is used to represent all input neurons, weights, and/or biased data required in the forward operation and is configured to participate in the operation between layers.

Figure 64:
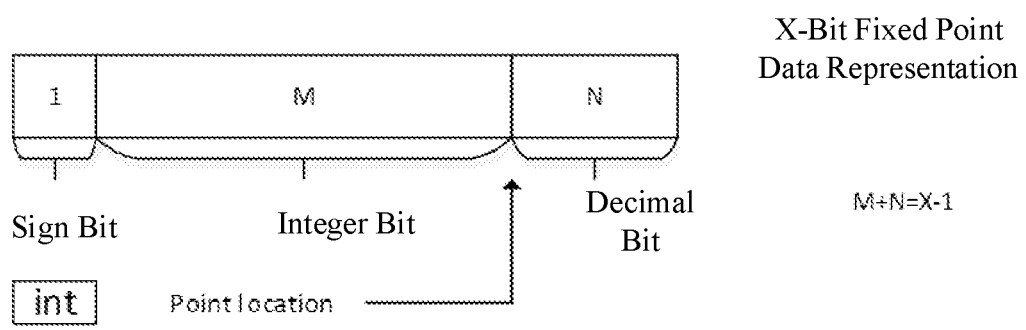
FIG. 64 illustrates a specific representation method of a fixed-point data structure for storing data according to an example of the present disclosure.

FIG. 64 illustrates a specific representation method of the short-bit fixed-point data structure used for data storage according to an example of the present application, where 1-bit is used to represent symbols, M-bit is used to represent integer parts, and N-bit is used to represent fractional parts. Compared with the representation form of 32-bit floating-point data, the representation form of short-bit fixed-point data sets a symbol bit Point location to record the location of decimal point for the data of same layer, same type in the neural network such as all weight data in the first convolutional layer in addition to occupying fewer bits, thereby adjusting the precision and representable data range of the data representation according to actual distribution of data.

Figure 65A:
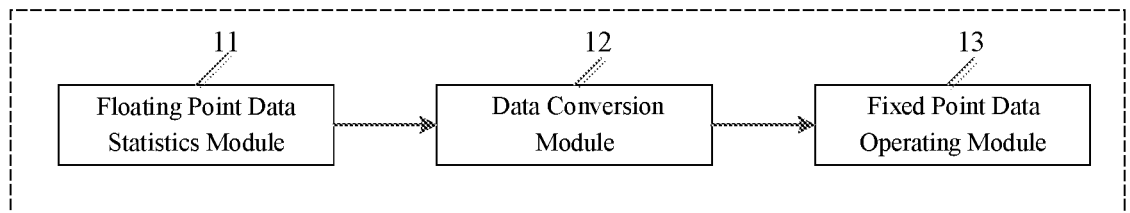
FIG. 65A is an exemplary block diagram of a device for performing a forward operation of an artificial network according to an example of the present disclosure.

FIG. 65A is a schematic block view of the device for performing the forward operation of the artificial neural network. As shown in FIG. 65A, the device includes:

a floating-point data statistics module 11 configured to perform data analysis on input neurons, weights, and/or biased data in the forward operation of the artificial neural network to obtain a decimal point location of the fixed-point data;

a floating-point data statistics module 12 configured to convert the input neurons, weights, and/or biased data from the long-bit floating-point data type to the short-bit floating-point data type according to the decimal point location of the fixed-point data type; and a floating-point data statistics module 13 configured to perform a forward operation of an artificial neural network according to the input neurons, weights, and/or biased data converted to short-bit floating-point data type.

Figure 65B:
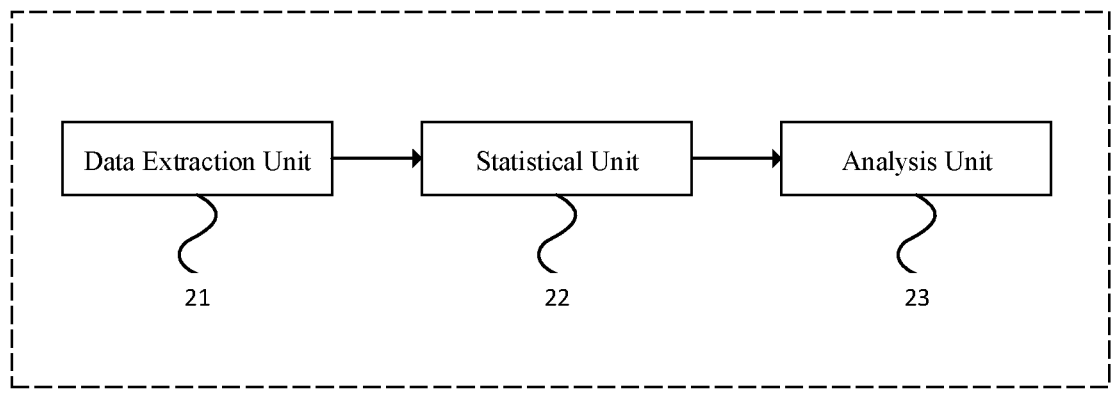
FIG. 65B is an exemplary block diagram of a floating-point data statistics module in a device for performing a forward operation of an artificial neural network according to an example of the present disclosure.

FIG. 65 illustrates an exemplary block view of the floating data statistics module. The floating data statistics module 11 includes a data extraction unit 21, a statistical unit 22, and an analysis unit 23. The purpose of this module is that through extracting all long-bit floating-point data (for instance, input neurons, weights, and/or biased data) in a neural network represented by the long-bit floating-point data type and analyzing these long-bit floating-point data to obtain the decimal point location that is used for each different type of data (for instance, input neurons, weights, and/or biased data) in a neural network with short-bit floating-points, the subsequent forward operation of short-bit fixed-point results in a better effect.

The data extraction unit 21 is used for extracting various different types of data in the forward operation of long-bit floating-point; the statistical unit 22 is configured to count a data range for the same type of data and a data distribution of each data segment; the analysis unit 23 obtains the decimal point location that should be set for each type of data with a short-bit fixed-point according to the results counted by the statistical unit 23.

In an optional example, the device for performing the forward operation of artificial neural network obtains, from other units or devices such as a CPU, various types of data (the input neurons, weights, and biased data) represented by the long-bit floating-point data type during the forward operation, and analysis the data range of the same type of data and the distribution of each data segment. Based on the statistical results, the device for performing the forward operation of artificial neural network obtains the decimal point location that should be set when using short-bit fixed-point data to represent each type of data or each type of data in each layer; or the device for performing the forward operation of artificial neural network obtains, from other units or devices, such as a CPU, the exponent bit length EL and exponent bit bias that should be set when using short-bit floating-point data to represent each type of data or each type of data in each layer in the artificial neural network.

Figure 66:
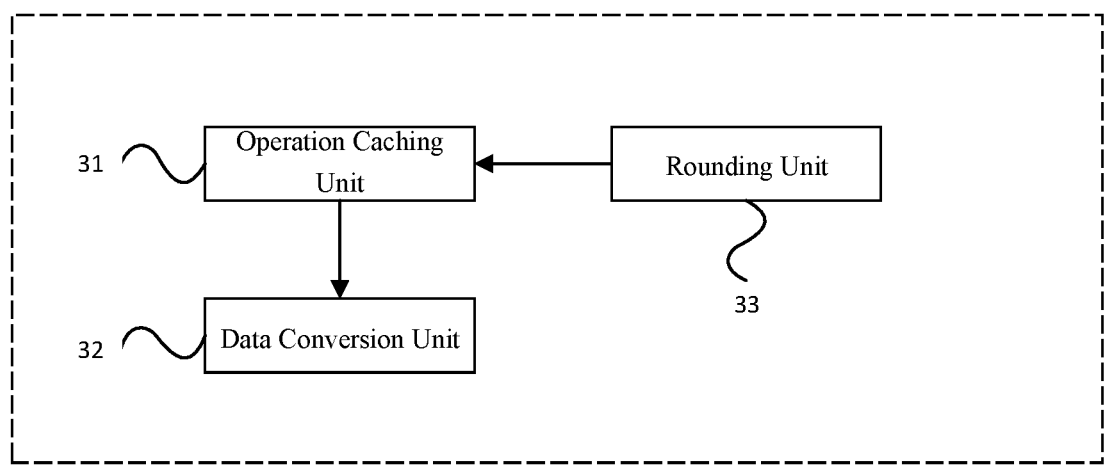
FIG. 66 is an exemplary block diagram of a short-bit fixed-point computation part of a forward operation module in a device for performing a forward operation of an artificial network according to an example of the present disclosure.

FIG. 66 is a schematic block view of the short-bit fixed-point computation part of the forward operating module according to an example of the present disclosure. The forward operating module includes an operation caching unit 31, a data conversion unit 32 and a rounding unit 33. As addition and multiplication operations may cause the data range to expand during the forward operation, the caching unit stores an intermediate result of the forward operation using the data type with high precision; a rounding operation is performed on the data exceeding the short-bit floating-point precision range after the operation is completed and then the data in caching area is converted to a short-bit fixed-point data by the data conversion unit 32.

The rounding unit 33 can perform a rounding operation on the data exceeding the short-bit fixed-point precision range. This rounding unit may be a random rounding unit, a rounding to the nearest integer unit, a round up unit, a round down unit, and a round off unit. Different rounding units can be used to perform different rounding operations on data beyond the short-bit fixed-point precision range.

The random rounding unit performs the following operations:

$$y = \begin{cases} \lfloor x \rfloor & w \cdot p \cdot 1 - \frac{x - \lfloor x \rfloor}{\varepsilon} \\ \lfloor x \rfloor + \varepsilon & w \cdot p \cdot \frac{x - \lfloor x \rfloor}{\varepsilon} \end{cases}$$

where y represents the short-bit fixed-point data after random rounding, x represents the long-bit floating-point data before random rounding, $\varepsilon$ is the smallest positive integer that the current short-bit fixed-point data representation type can represent, i.e. $2^{-Point\_location}$, $\lfloor x \rfloor$ represents the short-bit fixed-point data obtained by directly intercepting the original data x (equivalent to performing a round down operation on the decimal); w.p. represents a probability, i.e. the probability that the randomly rounded data y is $\lfloor x \rfloor$ is $$1 - \frac{x - \lfloor x \rfloor}{\varepsilon},$$

the probability that the randomly rounded data y is $\lfloor x \rfloor$ is $$\frac{x - \lfloor x \rfloor}{\varepsilon}.$$

The rounding to the nearest integer unit performs the following operations:

$$y = \begin{cases} \lfloor x \rfloor & \text{if } \lfloor x \rfloor \leq x \leq \lfloor x \rfloor + \frac{\varepsilon}{2} \\ \lfloor x \rfloor + \varepsilon & \text{if } \lfloor x \rfloor + \frac{\varepsilon}{2} \leq x \leq \lfloor x \rfloor + \varepsilon \end{cases}$$

where y represents the short-bit fixed-point data after rounding to the nearest integer, x represents the long-bit floating-point data before rounding to the nearest integer, and $\varepsilon$ is the smallest positive integer that the current short-bit fixed-point data representation type can represent, i.e. $2^{-Point\_location}$, $\lfloor x \rfloor$ is an integer multiple of $\varepsilon$, of which the value is the maximum number less than or equal to x.

The round up unit performs the following operations:

$$y = \lceil x \rceil$$

where y represents the short-bit fixed-point data after round up, x represents the long-bit floating-point data before round up, $\lceil x \rceil$ is an integer multiple of $\varepsilon$, of which the value is the minimum number more than or equal to x; and $\varepsilon$ is the smallest positive integer that the current short-bit fixed-point data representation type can represent, i.e. $2^{-Point\_location}$.

The round down unit performs the following operations:

$$y = \lfloor x \rfloor$$

where y represents the short-bit fixed-point data after round down, x represents the long-bit floating-point data before round down, $\lfloor x \rfloor$ is an integer multiple of $\varepsilon$, of which the value is the maximum number less than or equal to x; and $\varepsilon$ is the smallest positive integer that the current short-bit fixed-point data representation type can represent, i.e. $2^{-Point\_location}$.

The round off unit performs the following operations:

$$y = [x]$$

where y represents the short-bit fixed-point data after round off, x represents the long-bit floating-point data before round off, and [x] represents the number obtained by directly rounding off the short-bit fixed-point data for the original data x.

The present disclosure further discloses a method of performing a forward operation of artificial neural network, the method includes specific steps of:

obtaining data represented by the 32-bit floating-point data type of each layer of the neural network through a trained 32-bit floating-point model of the neural network, including the weights, biased data, input and output values, and other data parameters of each layer; and extracting input data of a same type in each layer of a multi-layer network model; making statistics and then obtaining a distribution ratio of the input data of the same type in each layer of the multi-layer network model in a preset interval; and obtaining the decimal point location of the input data of the same type in each layer of the multi-layer network model according to the distribution ratio.

The preset interval may be $[-2^{x-1-i}, 2^{x-1-i}-2^{-i}]$, i=0, 1, 2, ..., n, where n is a preset positive integer, and X is the number of bits occupied by the fixed-point data. The preset interval $[-2^{x-1-i}, 2^{x-1-i}-2^{-i}]$ includes n+1 sub-intervals. Statistics is made for the distribution information of the input data of the same type in each layer of the multi-layer network model in the n+1 sub-intervals, and a first distribution ratio can be obtained according to the distribution information. The first distribution ratio is $p_0, p_1, p_2, \ldots, p_n$, and the n+1 values are distribution ratios of the input data of the same type in each layer of the multi-layer network model in the n+1 sub-intervals. An overflow rate EPL is set in advance, and then the largest value i is obtained from 0, 1, 2, ..., n, so that $p_i \geq 1-EPL$, where the largest value i is the decimal point location of the input data of the same type in each layer of the multi-layer network model. In other words, the formula of taking the decimal point location of the input data of the same type in each layer of the multi-layer network model is: $\max\{i/p_i \geq 1-EPL, i \in \{0, 1, 2, \ldots, n\}\}$, that is, among the $p_i$ greater than or equal to 1-EPL, the largest subscript value i is selected as the decimal point location of the input data of the same type in each layer of the multi-layer network model.

It should be noted that the $p_i$ is a ratio of the number of input data of the same type in each layer of the multi-layer network model in the interval $[-2^{x-1-i}, 2^{x-1-i}-2^{-i}]$ to the total number of input data of the same type in each layer of the multi-layer network model. For instance, if there are m1 input data of the same type in each layer of the multi-layer network model, among them, there are m2 input data with the value within the interval $[-2^{x-1-i}, 2^{x-1-i}-2^{-i}]$, $p_i$=m2/m1.

According to the decimal point location, all data represented by the long-bit floating-point data type are represented by the short-bit fixed-point data type.

The short-bit fixed-point representation obtained by statistics is used for forward operation of the neural network, that is, all data in the forward operation of the neural network is represented by a short-bit fixed-point format, and at the same time, a copy represented by long-bit floating-point data is reserved for the weight and biased data of the neural network, and then a forward operation is performed. For the forward operation, some operations will cause the data range to expand, such as addition, multiplication, and so on. It is necessary to use the cache space to store the intermediate computation results, which are stored in long-bit floating-point format, and after computation is completed, the intermediate computation results are returned to the corresponding short-bit fixed-point format. The process of converting long-bit floating-point to short-bit fixed-point requires rounding that includes random rounding, rounding to the nearest integer, and the like, which are expressed as follows:

The random rounding operation is as follows:

$$y = \begin{cases} \lfloor X \rfloor & w.p. \ 1 - \frac{x - \lfloor x \rfloor}{\varepsilon} \\ \lfloor X \rfloor + \varepsilon & w.p. \ \frac{x - \lfloor x \rfloor}{\varepsilon} \end{cases}$$

where y represents the short-bit floating-point data after random rounding, x represents the long-bit floating-point data before random rounding, $\varepsilon$ is the smallest positive integer that the current short-bit fixed-point data representation type can represent, i.e. $2^{-Point\_location}$, $\lfloor x \rfloor$ represents the short-bit fixed-point data obtained by directly intercepting the original data x (equivalent to performing a round down operation on the decimal); w.p. represents a probability, i.e. the probability that the randomly rounded data y is $\lfloor x \rfloor$ is $$1 - \frac{x - \lfloor x \rfloor}{\varepsilon},$$

the probability that the randomly rounded data y is $\lfloor x \rfloor + \varepsilon$ is $$\frac{x - \lfloor x \rfloor}{\varepsilon}.$$

The rounding to the nearest integer unit performs the following operations:

$$y = \begin{cases} \lfloor x \rfloor & \text{if } \lfloor x \rfloor \le x \le \lfloor x \rfloor + \frac{\varepsilon}{2} \\ \lfloor x \rfloor + \varepsilon & \text{if } \lfloor x \rfloor + \frac{\varepsilon}{2} \le x \le \lfloor x \rfloor + \varepsilon \end{cases}$$

where y represents the short-bit fixed-point data after rounding to the nearest integer, x represents the long-bit floating-point data before rounding to the nearest integer, and ε is the smallest positive integer that the current short-bit fixed-point data representation type can represent, i.e. $2^{-Point\_location}$, $\lfloor x \rfloor$ is an integer multiple of ε, of which the value is the maximum number less than or equal to x.

The round up unit performs the following operations:

$$y = \lceil x \rceil;$$

where y represents the short-bit fixed-point data after round up, x represents the long-bit floating-point data before round up, $\lceil x \rceil$ is an integer multiple of ε, of which the value is the minimum number more than or equal to x; and ε is the smallest positive integer that the current short-bit fixed-point data representation type can represent, i.e. $2^{-Point\_location}$.

The round down unit performs the following operations:

$$y = \lfloor x \rfloor;$$

where y represents the short-bit fixed-point data after round down, x represents the long-bit floating-point data before round down, $\lfloor x \rfloor$ is an integer multiple of ε, of which the value is the maximum number less than or equal to x; and ε is the smallest positive integer that the current short-bit fixed-point data representation type can represent, i.e. $2^{-Point\_location}$.

The round off unit performs the following operations:

$$y = [x];$$

where y represents the short-bit fixed-point data after round off, x represents the long-bit floating-point data before round off, and [x] represents the number obtained by directly rounding off the short-bit fixed-point data for the original data x.

After the forward operation is completed, when the backward operation is performed, the data represented by the short-bit fixed-point data in the forward operation needs to be converted into the data represented by the long-bit floating-point to participate in the backward operation, where the weights and biased data involved in the backward operation uses a copy of the long-bit floating-point data retained in the forward operation. After the end of the backward operation, the data represented by the long-bit floating-point data in the forward operation is converted into the data represented by the short-bit fixed-point to participate in the subsequent forward operation. At the same time, during the forward operation, a copy of the long-bit floating-point data representation is still reserved for the weights and biased data of the neural network. The rounding operation has to be performed during the conversion process, and the operation is the same as the rounding operation in the forward operation.

The forward and backward operations as described above are repeated until the neural network training is completed.

Figure 67:
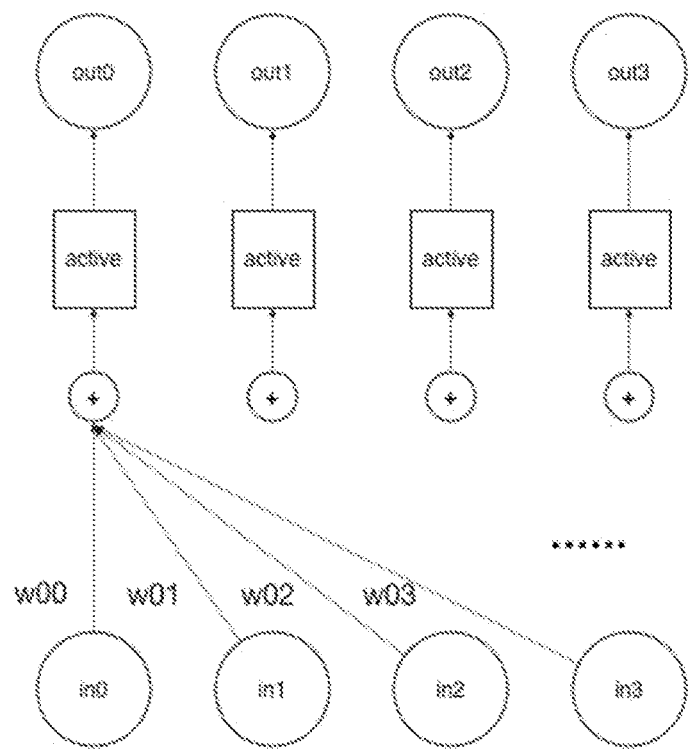
FIG. 67 is an exemplary block diagram of a forward operation process of a neural network according to an example of the present disclosure.

FIG. 67 is a flowchart of the process of the forward operation of single-layer artificial neural network, according to an example of the present disclosure. The operation process is implemented in the computing devices as shown in FIG. 2, FIG. 5 or FIG. 6A. The flowchart describes the process of achieving a forward operation for single-layer artificial neural network using the device and instruction set of the present disclosure. For each layer, an intermediate result vector of the layer is first computed by weighted summation of the input neuron vector. The intermediate result vector is biased and activated to obtain an output neuron vector. The output neuron vector is the input neuron vector of the next layer.

Figure 68:
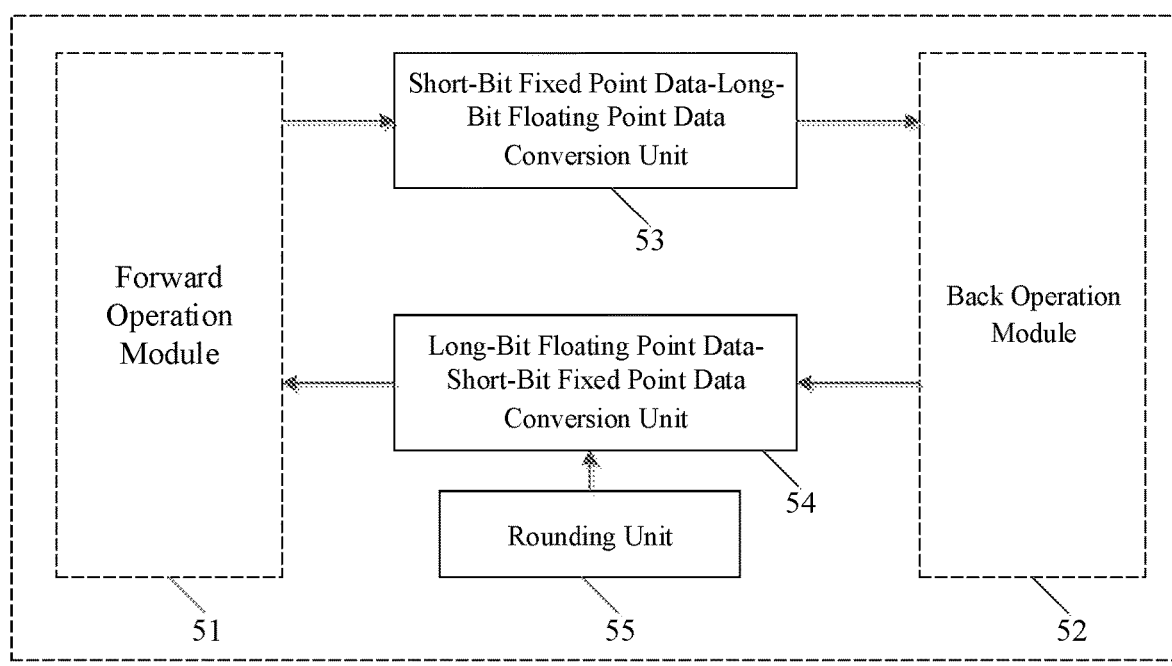
FIG. 68 is an exemplary block diagram of an operation process of a device for performing a forward operation of an artificial neural network according to an example of the present disclosure.

FIG. 68 is an exemplary block view of the operation flow according to an example of the present disclosure. The operation process is implemented in the computing devices as shown in FIG. 2, FIG. 5 or FIG. 6A. The data represented by the short-bit fixed-point type other than weights and biased data obtained by a forward operating module 51 during the forward operation process must first be converted to a long-bit floating-point through a short-bit fixed-point data-long-bit floating-point data conversion unit 53 for a backward operation. After the back operation performed by a back operating module 52 is completed, the data represented by the long-bit floating-point must be converted to a short-bit fixed-point through a long-bit floating-point data-short-bit fixed-point data conversion unit 54. During the conversion process, a rounding operation should be performed on the data exceeding the short-bit fixed-point precision range by a rounding unit 55, where the process is the same as the rounding operation performed by the rounding unit in FIG. 62.

Figure 69:
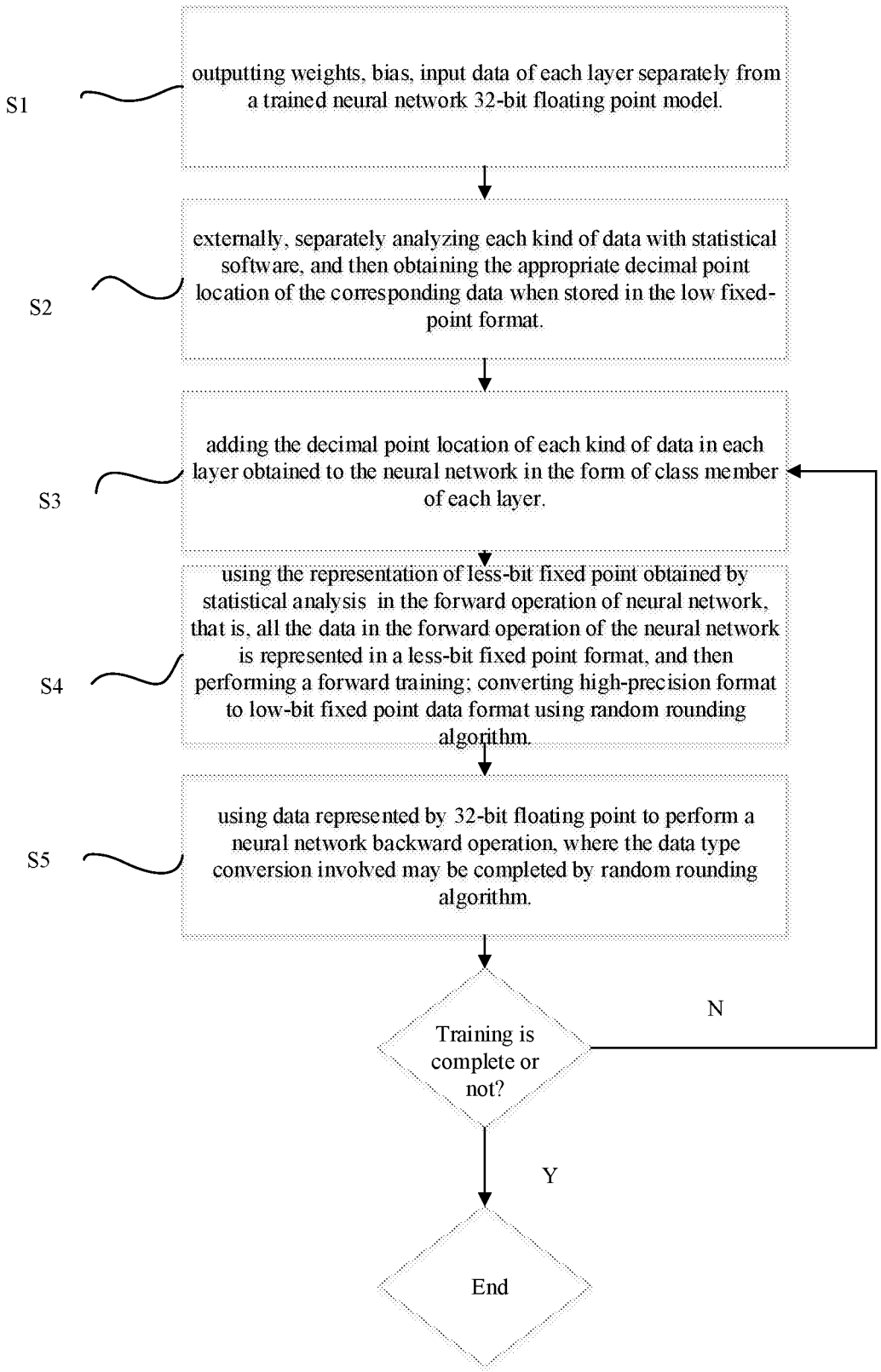
FIG. 69 is a general flowchart of algorithm implementation according to an example of the present disclosure.

FIG. 69 illustrates a flowchart of overall example for the algorithm according to an example of the present application. The operation process is implemented in the computing devices as shown in FIG. 2, FIG. 5, or FIG. 6A. Details of operations have been given in the description of FIG. 1 to FIG. 5, and detailed steps and specific example steps in the content of the disclosure are completely the same and will not be described herein.

It should be noted that the forward operation may also use input neurons, weights, and/or biased data represented by long-bit floating-point data type, and the backward training may also use input neurons, weights, and/or biased data represented by short-bit fixed-point data type.

It should be noted that the short-bit floating-point data type is relative to the long-bit floating-point data type. When the short-bit floating-point data type is a 16-bit floating-point data type, the long-bit floating-point data type can be a 32-bit floating-point data type or a 64-bit floating-point data type; when the short-bit floating-point data type is a 32-bit floating-point data type, the long-bit floating-point data type is a 64-bit floating-point data type.

Through the use of short-bit fixed-point representations of data for forward operation, the data range space of short-bit fixed-point data type is fully utilized. Compared with long-bit floating-point data representation, the space required for storage of network parameters is greatly reduced and the area-to-power ratio of the hardware is optimized.

The present disclosure includes a device for on-chip repetitive data addressing and a method for scheduling and using the device. In the computing device shown in FIG. 6A, if the storage medium is a memory, the data scheduling method between a data access unit and the memory may adopt the device for on-chip repetitive data addressing and the method for scheduling and using the device. The method may also be applied to the devices shown in FIG. 26, FIG. 28, and FIG. 30. In the device shown in the Figure, the method includes efficiently reading and writing the repetitive data, such that on-chip repetitive addressing can be effectively achieved while on-chip and off-chip data exchange are supported. By means of data and address partitioning, a space for the on-chip data repetitive addressing can be expanded to an off-chip address space. The present disclosure may reduce memory access bandwidth requirements while providing good flexibility, thus reducing the on-chip storage overhead. Moreover, the present disclosure can be adapted to different scenarios, and is not merely limited to machine learning processors.

Meanwhile, the present disclosure can cut on-chip cache overhead by reasonably scheduling data, so as to provide a support for the design of more efficient processors. Reasonably scheduling data not only refers to a data replacement strategy, but also includes partitioning computation and rearranging a computation order, such that centralized access data can be arranged in a same data block. The present disclosure utilizes on-chip repetitive addressing to reduce memory access bandwidth in the heterogeneous environment, and relates to implementation and scheduling of a storage unit and an addressing unit.

Figure 70:
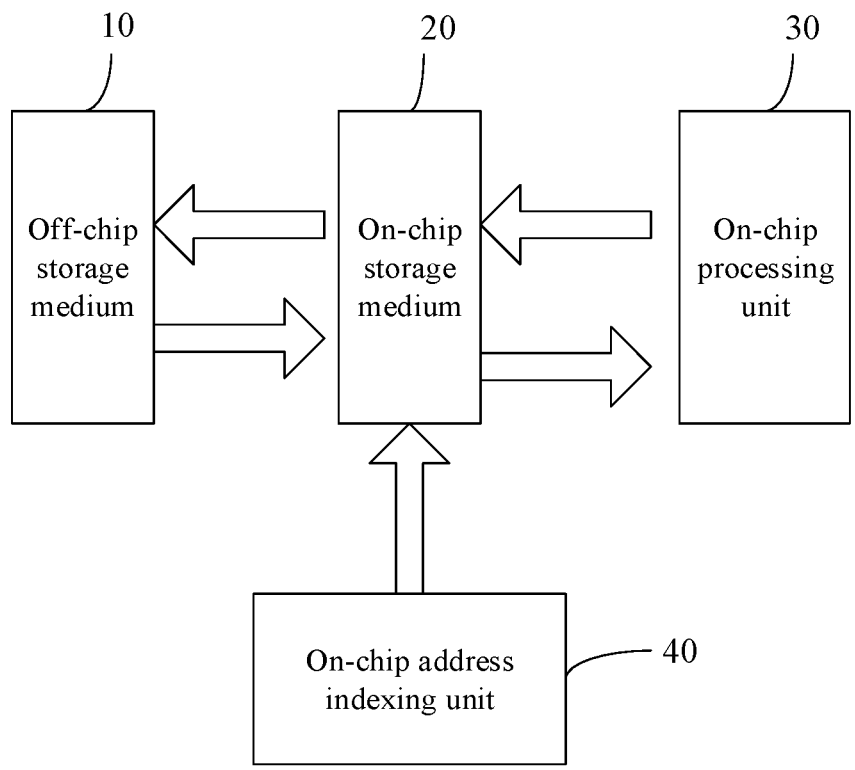
FIG. 70 is an exemplary block diagram of an overall structure of a device for on-chip repetitive addressing according to a preferable example of the present disclosure.

FIG. 70 is an exemplary block diagram of an overall structure of a preferable example. In practical applications, the example shown in FIG. 70 may include the interconnection module and the operating unit shown in FIG. 6A, where the operating unit includes a plurality of computing elements. For the overall structure shown in FIG. 70, for instance, in a heterogeneous platform, data which can be stored in an on-chip storage medium 20 of a processor is limited, and generally, limited resources on a chip limit a possibility of storing all data on the chip. Therefore, a large storage medium (cheap, slow speed) is placed off the chip, while a small storage medium (expensive, fast speed) is integrated on the chip. All data needs to be partitioned into a data block that can be stored in the on-chip storage medium 20. A required data block is read or written through data exchange between an off-chip storage medium 10 with a large storage capacity and the on-chip storage medium 20 with a small storage capacity. Meanwhile, an on-chip address indexing unit 40 provides an on-chip data address to an on-chip processing unit 30 as required. The memory of the present disclosure is not limited, and may be a common storage medium such as a Static Random Access Memory (SRAM), a Dynamic Random Access Memory (DRAM), an Enhanced Dynamic Random Access Memory (eDRAM), a Register file (RF), and the like, or may be a novel storage device such as a Non-Volatile Memory (NVM), or a 3D storage device.

The present disclosure provides a method for on-chip repetitive addressing, where the method is a data management strategy adopted when a size of total data is larger than the storage capacity of the on-chip storage medium 20. The off-chip data can be read into the chip for rapid repetitive addressing by using the method, and off-chip repetitive addressing can also be achieved. However, an efficient method is to put centralized access data together, carry the centralized access data into the chip once, and then directly perform on-chip rapid addressing. The method includes:

a data partitioning step for partitioning data on an on-chip storage medium and/or an off-chip storage medium into different data blocks according to a preset data partitioning principle, where the data partitioning principle includes partitioning data with a reuse distance less than a preset distance threshold value into the same data block. The reuse distance refers to a distance between two times of using a piece of data, and the distance refers to a number of memory accesses. Data with a short reuse distance is accessed in a short time of running, which can be viewed as having a strong correlation in time. The data partitioned into the same data block can be loaded on a chip once for storage, and is then used as many times as possible, so that the memory access is more efficient. In each data block, the data is stored in the medium according to a preset principle such as an ordinal storage.

Figure 71:
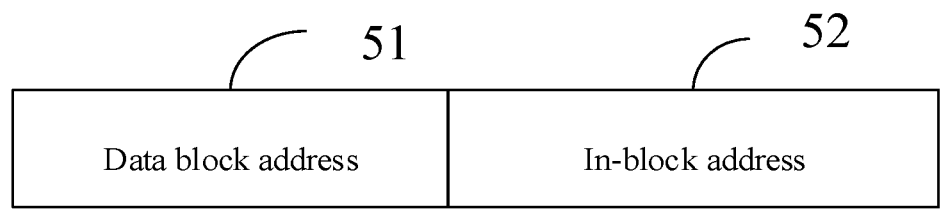
FIG. 71 is a diagram of data address partitioning of a method for on-chip repetitive addressing according to a preferable example of the present disclosure.

The method further includes:

a data indexing step for successively loading the different data blocks to at least one on-chip processing unit according a preset ordinal relation of a replacement strategy, where repetitive data in a loaded data block is subjected to on-chip repetitive addressing. The data in a data block may be subjected to direct repetitive addressing on the chip, which avoids storing off the chip, or several times of reading and writing (slow speed, high power consumption) of the IO. The effective data partitioning principle enables times of replacement to be as less as possible (the effective data partitioning principle may reduce replacement times, and on such basis, an effective data replacement strategy may further reduce the replacement times). Preferably, FIG. 71 is a diagram of data address partitioning. An index address 50 for the data includes a data block address 51 and an in-block address 52; in other words, the address for each piece of data is spliced by the current data block address 51 and the in-block address 52. After the data is partitioned into reasonable data blocks, the on-chip repetitive addressing is more efficient by partitioning the address into data block address and in-block addresses. The technology used by address indexing is not limited to simple data indexing, and also includes partitioning solutions such as codebook and the like.

The data indexing step include: successively loading different data blocks to the at least one on-chip processing unit 30 according to the ordinal relation of the replacement strategy and the data block address 51, where the repetitive data in a loaded data block is subjected to on-chip repetitive addressing; and when all indexing of the in-block address 52 of the data block is completed, loading a new data block until no data block needs to be loaded. During indexing in the data block, if the in-block address 52 of the data is useful, an indexed hardware unit does not need to use the data block address 51, but the data block address 51 still needs to be recorded for subsequent use.

Preferably, the on-chip storage medium 20 exchanges data with the on-chip processing unit 30 through an on-chip data path; the on-chip storage medium 20 exchanges data with the off-chip storage medium 10 through an on-chip and off-chip data path; and the on-chip storage medium 20 or the off-chip storage medium 10 performs at least one reading and writing from inside or outside; and the data is carried between the on-chip storage medium 20, the off-chip storage medium 10, and/or the on-chip processing unit 30 in a unit of data block.

Preferably, a data size of the data block is smaller than a capacity of the on-chip storage medium 20, and is divisible by the capacity of the on-chip storage medium 20.

Preferably, the on-chip storage medium 20 adopts a design in which a read port is separated from a write port, such that reading and writing of the data are independent from each other, and can be performed simultaneously.

Preferably, the method is applied to a learning processor.

Preferably, the method is applied to a heterogeneous environment.

Preferably, the on-chip processing unit 30 is an on-chip operation module. The data is selected according to a preset condition, and the data satisfying the preset condition is partitioned into the same data block. Specifically, the preset condition includes a simple partitioning condition, a condition with an average preset number of data blocks, a condition associated with different output neurons, or a condition satisfying a preset mathematics relation, which are specific data partitioning principles under different circumstances and are still within the range defined by the data partitioning principle.

Figure 72:
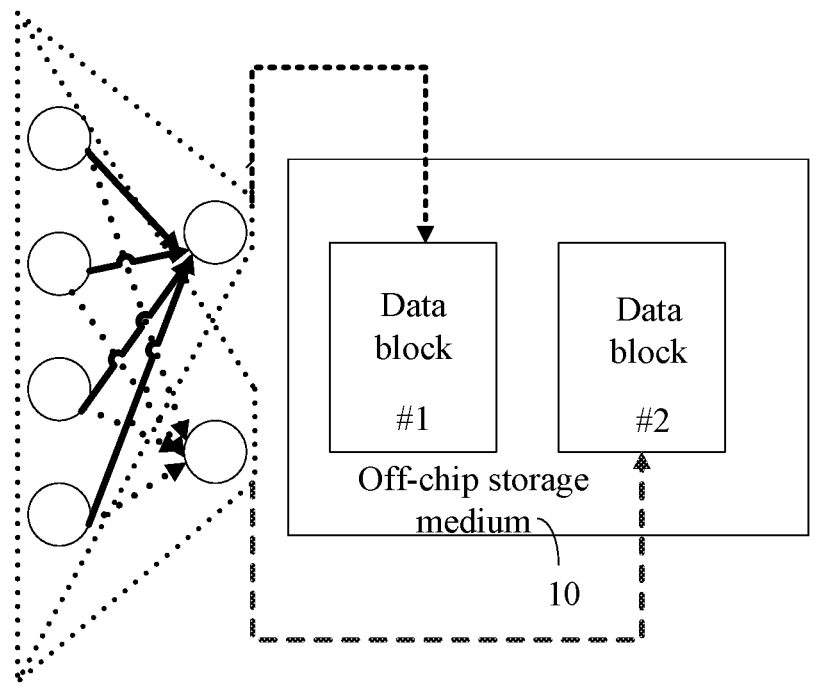
FIG. 72 is a diagram of data partitioning of a method for on-chip repetitive addressing according to a preferrable example of the present disclosure.

FIG. 72 is a schematic diagram of data partitioning according to an example of the present disclosure. For instance, in a common neural network (a vector operation), weight data required for different output neurons is stored in different data blocks, and during operation, the weight data is loaded to different data blocks at different times for indexing. Values of input neurons are reused, and a same input is used to compute the two output neurons. During the computation of the output neurons, an associated weight is loaded, and after computation, the part of weight is completely not required; and during the computation of the output neurons, the associated weight is loaded. The value of the same input neuron is only stored for one portion, in other words, repetitive addressing is required in computation. The same weight is also only stored for one portion, and also needs to be obtained by repetitive addressing.

Figure 73:
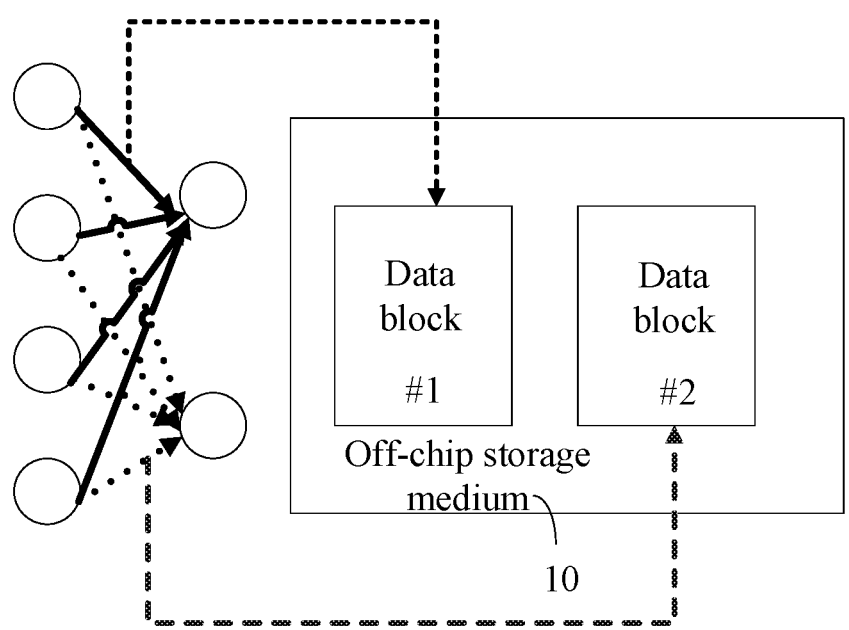
FIG. 73 is another schematic diagram of data partitioning of a method for on-chip repetitive addressing according to an example of the present disclosure.

FIG. 73 is a schematic diagram of data partitioning according to an example of the present disclosure. For instance, in the common neural network (the vector operation), a weight connection that satisfies a specified condition is partitioned and stored in the same data block, such as a full line weight connection and an imaginary line weight connection. At different times, different data blocks are loaded, and the operating unit selects data according to the specified condition. For instance, all output neurons first perform an associated computation of the full line weight connection, and then perform an associated computation of the imaginary line weight connection after replacement of the data block.

Figure 74:
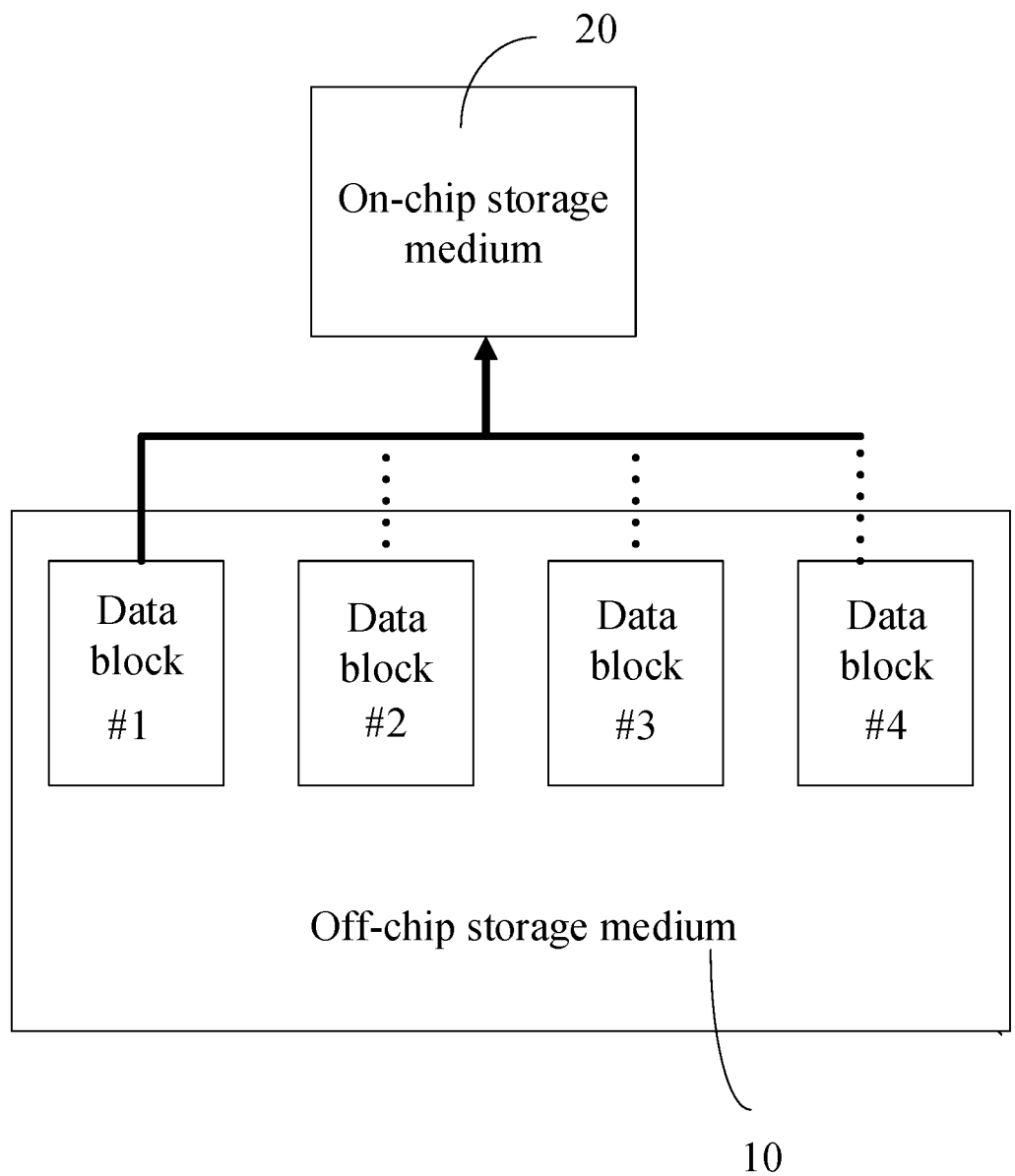
FIG. 74 is a schematic diagram of a replacement strategy of a method for on-chip repetitive addressing according to a preferable example of the present disclosure.

Preferably, the replacement strategy includes an ordinal replacement, a reversed replacement, or an unordered replacement. FIG. 74 is a schematic diagram of the replacement strategy according to an example of the present disclosure. The data is partitioned into different data blocks, and at different times, different data blocks are loaded according to different replacement strategies. For instance, in the ordinal replacement, the data blocks are loaded according to an order of #1, #2, #3, and the like; in the reversed replacement, the data blocks are loaded according to an order of #N, #(N−1), #(N−2); and in the unordered replacement, the data blocks are read according to a specified order. Alternatively, the replacement strategy includes data writing back, which writes a final result or an intermediate result back to the on-chip storage medium, the off-chip storage medium and/or the on-chip processing unit after the data is processed. Different replacement policies shall consider consistency of the data.

The present disclosure further provides a device which implements the method for on-chip repetitive addressing. The device includes:

a data partitioning module configured to partition data on an on-chip storage medium and/or an off-chip storage medium into different data blocks according to a preset data partitioning principle, where the preset data partitioning principle includes partitioning data with a reuse distance less than a preset distance threshold value into a same data block; and a data indexing module configured to successively load different data blocks to at least one on-chip processing unit according to a preset ordinal relation of a replacement strategy, where repetitive data in a loaded data block is subjected to on-chip repetitive addressing.

Preferably, an index address for the data is composed of a data block address and an in-block address.

The data indexing module is configured to successively load the different data blocks to the at least one on-chip processing unit according to the preset ordinal relation of the replacement strategy and the data block address, where the repetitive data in the loaded data block is subjected to on-chip repetitive addressing. When all indexing of the in-block address of the data block is completed, a new data block is loaded until no data block needs to be loaded.

Preferably, the on-chip storage medium exchanges data with the on-chip processing unit through an on-chip data path.

The on-chip storage medium exchanges data with the off-chip storage medium through an on-chip and off-chip data path, and the on-chip storage medium or the off-chip storage medium performs at least one reading and writing from inside or outside; and the data is carried between the on-chip storage medium, the off-chip storage medium, and/or the on-chip processing unit in a unit of data block.

Preferably, a data size of the data block is smaller than a capacity of the on-chip storage medium.

Preferably, the on-chip storage medium adopts a design in which a read port is separated from a write port.

Preferably, the device is applied to a learning processor.

Preferably, the device is applied to a heterogeneous environment.

Preferably, the on-chip processing unit is an on-chip operation module. Data is selected according to a preset condition, and the data satisfying the preset condition is partitioned into the same data block.

Preferably, the preset condition includes a simple partitioning condition, a condition with an average preset number of data blocks, a condition associated with different output neurons, or a condition satisfying a preset mathematics relation.

Preferably, the replacement strategy includes an ordinal replacement, a reversed replacement, or an unordered replacement; or the replacement strategy includes data writing back, that is, writing a final result or an intermediate result back to the on-chip storage medium, the off-chip storage medium, and/or the on-chip processing unit after the data is processed.

Figure 75:
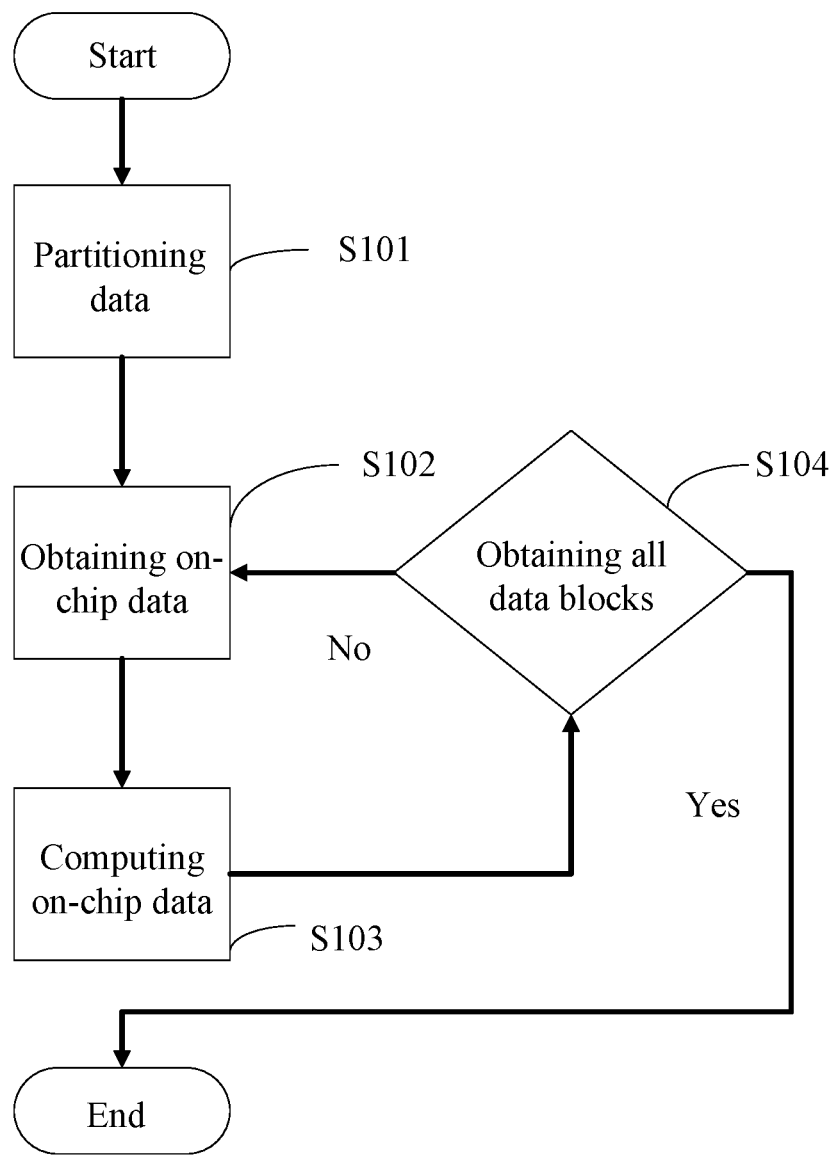
FIG. 75 is a flowchart of a method for on-chip repetitive addressing according to a specific example of the present disclosure.

FIG. 75 is a flowchart of a device utilizing on-chip data repetitive addressing to reduce memory access bandwidth requirements according to an example of the present disclosure. After the computation starts, the process includes:

a step S101, partitioning data into different data blocks according to a preset data partitioning principle, a step S102, loading the different data blocks to the on-chip storage medium 20; at a certain time, only loading one data block to the on-chip storage medium 20 for on-chip computation; and according to different replacement strategies, loading different data blocks for computation according to different orders;

a step S103, performing the on-chip computation on obtained data; and a step S104, determining whether all computations are completed and no data block needs to be loaded; if all computations are completed and no data block needs to be loaded, all computations end; otherwise, returning to the step S102.

Figure 76:
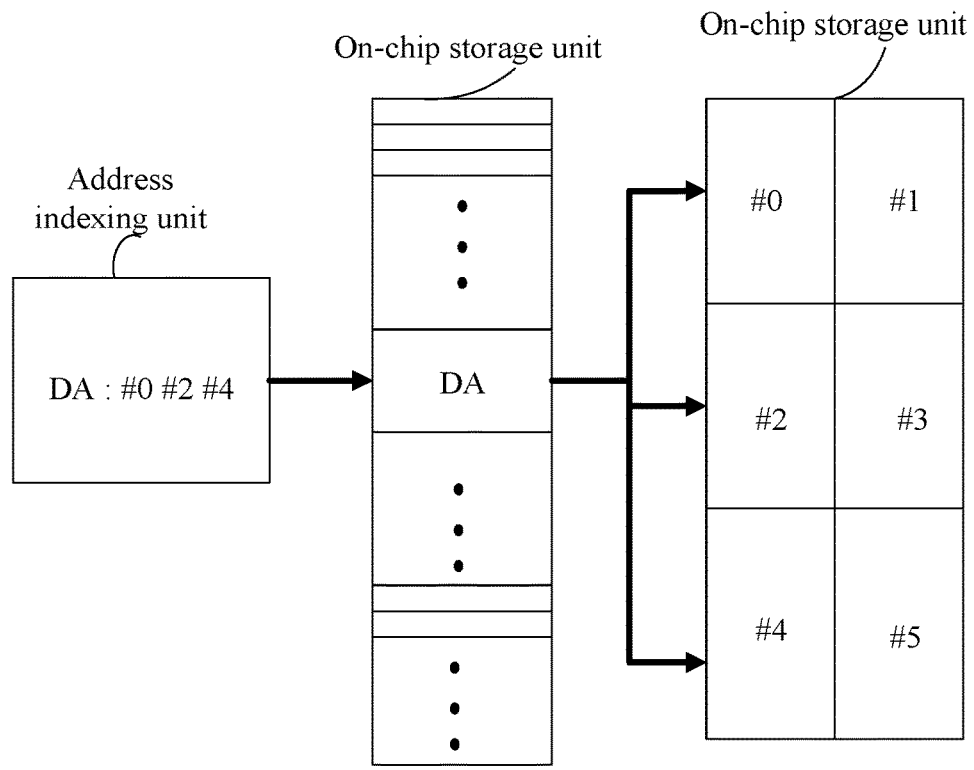
FIG. 76 is a schematic diagram of on-chip repetitive indexing of a method for on-chip repetitive addressing according to a preferable example of the present disclosure.

FIG. 76 is a block diagram of repetitive addressing performed by a computing unit based on addresses according to an example of the present disclosure. According to address indexing, data stored at an address DA is required by computing units #0, #2, and #4, so the example is indexed to the address DA, and data in the DA is propagated to required computing units including #0, #2, and #4. In this example, since data required for the three computing units are identical, only one portion is stored on the chip. In other words, repetitive addressing needs to be performed on one piece of data for three times. The way of transferring the data to the on-chip computing units in FIG. 76 is not limited to a connection way of BUS, and also includes other connection ways such as a Crossbar structure, a FAT-TREE, an H-TREE, and the like.

In conclusion, the present disclosure partitions data with a reuse distance less than a preset distance threshold value into the same data block, where the reuse distance refers to a distance between two times of using a piece of data, and the distance refers to a number of memory accesses. The data with a short reuse distance is accessed in a short time of running, which can be viewed as having a strong correlation in time. The data partitioned on the same data block can be loaded on a chip once for storage, and is then used as many times as possible, so that the memory access is more efficient. The present disclosure aims to utilize on-chip repetitive addressing to reduce memory access bandwidth. The device and the related method for using the device in the present disclosure can effectively satisfy requirements of data reusability and flexible addressing, can be adapted to different scenes, and are not merely limited to machine learning processors.

For current heterogeneous platforms, data which can be stored on a chip of a processor is limited. Therefore, all data needs to be partitioned into data blocks that can be stored on the chip, and a required data block is read in or written out through data interaction on an off-chip large storage medium and an on-chip small storage medium.

Figure 77:
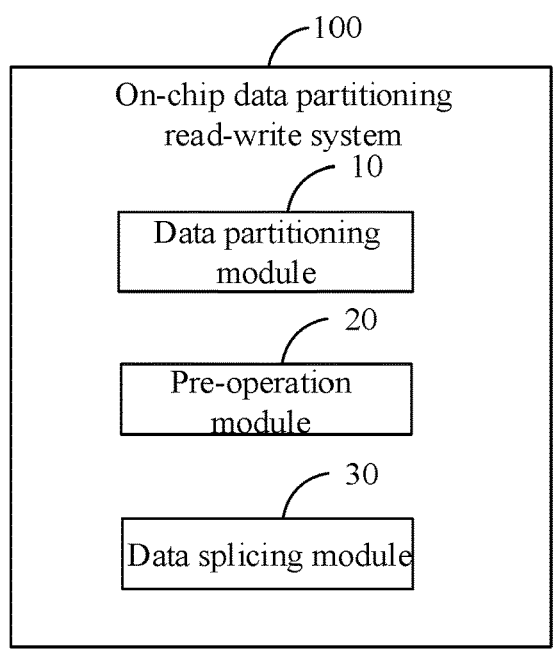
FIG. 77 is a schematic structural diagram of an on-chip data partitioning read-write system according to an example of the present disclosure.

In order to achieve the above purpose, FIG. 77 illustrates an on-chip data partitioning read-write system 100 according to the present disclosure. The on-chip data partitioning read-write system shown in FIG. 77 can be applied to the devices shown in FIG. 6A, FIG. 26, FIG. 28, and FIG. 30. The memory of the computing device shown in FIG. 6A is an off-chip storage system, and the computing device shown in FIG. 6A may include the on-chip data partitioning read-write system as shown in FIG. 77. The system includes:

a data partitioning module 10 configured to, according to a data partitioning strategy, partition on-chip storage data into different areas, and store the on-chip data in an on-chip storage medium and an off-chip storage medium respectively;

a pre-operation module 20 configured to perform an operation on an on-chip address index of the on-chip storage data in advance when implementing data splicing; and a data splicing module 30 configured to splice the on-chip storage data and off-chip input data to obtain a representation of the original data according to a data splicing strategy.

Figure 78:
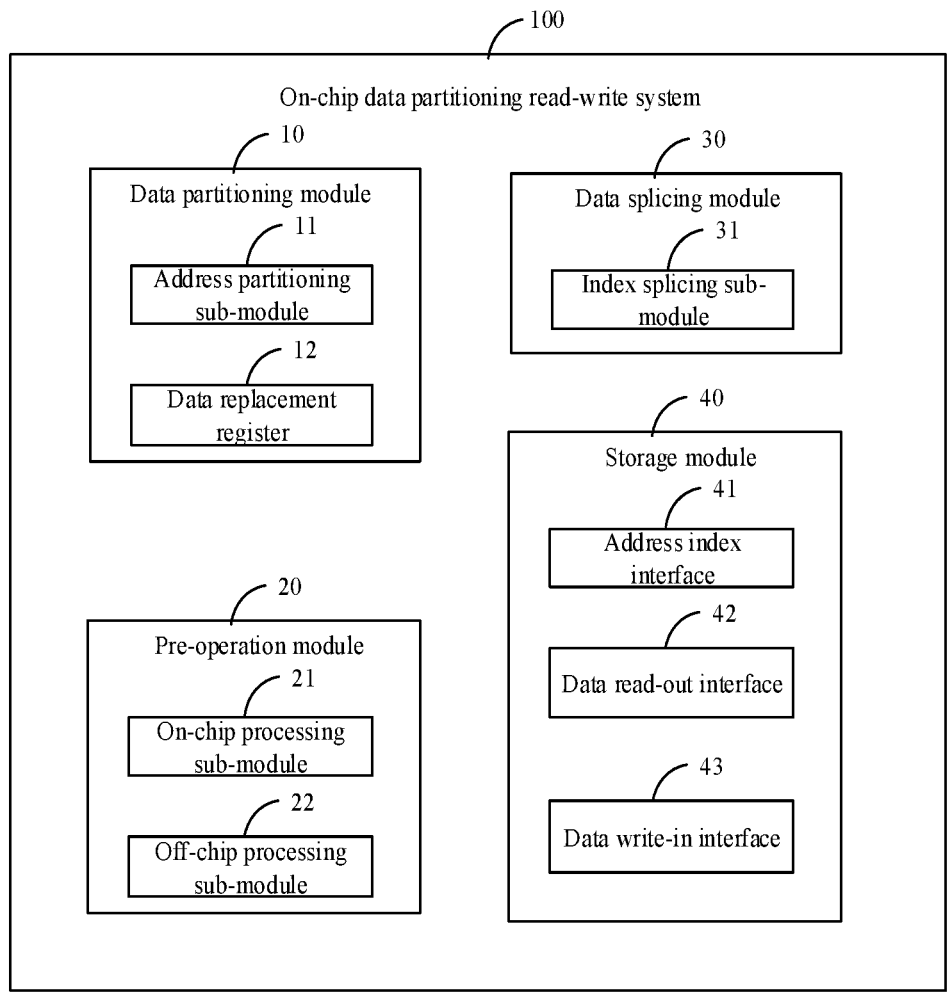
FIG. 78 is a schematic structural diagram of the on-chip data partitioning read-write system according to a preferrable example of the present disclosure.
Figure 79A:
FIG. 79A is a diagram of an implementation of the on-chip data partitioning strategy according to an example of the present disclosure.
Figure 79B:
FIG. 79B is another diagram of an implementation of the on-chip data partitioning strategy according to an example of the present disclosure.

For the heterogeneous platform, the data which can be stored on a chip of a processor is limited. Therefore, all data needs to be partitioned into data blocks that can be stored on the chip, and the required data block is read in or written out through data interaction on the off-chip large storage medium and the on-chip small storage medium. Meanwhile, an on-chip data address is provided to an on-chip computing unit (the operating unit as shown in FIG. 6A) based on the on-chip address index depending on requirements, and a physical frame is illustrated as shown FIG. 81. Partitioning in examples of FIG. 78, FIG. 79A, and FIG. 79B is only for typical circumstances of the present disclosure. The present disclosure is not limited to specific data partitioning. For instance, extreme circumstances in which all data is partitioned on the chip, or all data is partitioned off the chip are also within the range of implementing the present disclosure.

Furthermore, the on-chip data partitioning read-write system 100 of the present disclosure further includes:

a storage module 40 configured to store and carry the on-chip storage data of the on-chip storage medium and the off-chip input data from the off-chip storage medium.

The pre-operation module 20 further includes:

an on-chip processing sub-module 21 configured to perform an operation on the on-chip storage data; and an off-chip processing sub-module 22 configured to operate external input data; where the external input data includes the off-chip input data and data directly read from the read-write ports.

Further, the storage module 40 further includes:

an address index interface 41 configured to index the on-chip storage data according to the on-chip address index;

a data read-out interface 42 configured to output the indexed on-chip storage data to an exit; and a data write-in interface 43 configured to write data to be stored into a corresponding storage position according to a writing address.

In the on-chip data partitioning read-write system 100, preferably, the data partitioning module 10 further includes:

an address partitioning sub-module 11 configured to partition an address space into an off-chip data space and an on-chip data space; and a data replacement sub-module 12 configured to perform data replacement between the on-chip storage medium and the off-chip storage medium according to a data replacement strategy, where the data replacement strategy includes an ordinal replacement, a reversed replacement, and a random replacement.

The data partitioning strategy includes fixed-point number partitioning and floating-point number partitioning. As a typical example, FIG. 79A illustrates exemplary data partitioning of fixed-point data, where the fixed-point data is partitioned into an integer part and a fractional part; and FIG. 79B illustrates exemplary data partitioning of floating-point data, where the floating-point data is partitioned into an exponent part and a mantissa part. Partitioning in examples of FIG. 79A, and FIG. 79B is only for typical circumstances of the present disclosure. The present disclosure is not limited to specific data partitioning. For instance, extreme circumstances in which all data is partitioned on the chip, or all data is partitioned off the chip are also within the range of implementing the present disclosure. The address partitioning sub-module 11 partitions the indexed address space into the corresponding off-chip data space and on-chip data space, and if required, the data replacement sub-module 12 performs data exchange to transfer the data to be accelerated into the chip. The data partitioning module 10 is implemented based on one or more on-chip computing units in the chip, and the on-chip computing units initiate a reading and writing request, and process the original data obtained by splicing.

The data splicing module 30 further includes:

an index splicing sub-module 31 configured to convert an on-chip and off-chip data transfer form from a representation of the original data into all or partial data index, so as to splice results of the all or partial data index on a chip to obtain the representation of the original data.

The reading and writing of the data splicing module 30 are implemented through an on-chip and off-chip data path, or an on-chip data path. The on-chip and off-chip data path includes a Peripheral Component Interconnect (PCI), a Peripheral Component Interface Express (PCIE), and a Hyper Transport (HT, which is a new interconnection bus technology having a novel end-to-end integrated circuit with upgradability, high speed, and high performance) interconnection technology. The on-chip data path includes a FAT-TREE and an H-TREE (hierarchy tree) interconnection technology, while the on-chip and off-chip connection way includes a multi-chip interconnection structure. The on-chip and off-chip data connection illustrated in FIG. 77 may include a multi-chip interconnection structure such as an on-chip network other than the PCIE bus connection. The data path of the on-chip computing units and the on-chip storage medium illustrated in FIG. 77 are not limited to the interconnection technologies of H-TREE, or FAT-TREE. By means of the on-chip and off-chip data path, off-chip addressing can be performed, such that the on-chip data partitioning read-write system 100 can accurately restore various data to be spliced to the original data, and different data partitioning strategies can be effectively supported, thereby reducing exchange of the on-chip and off-chip data.

The data in the on-chip storage medium or the off-chip storage medium is read and written once or for many times, and the data is read into one or more on-chip computing units; the on-chip storage medium or the off-chip storage medium is read and written from outside once or for many times, and the on-chip medium is read and written from inside once or for many times.

Figure 80:
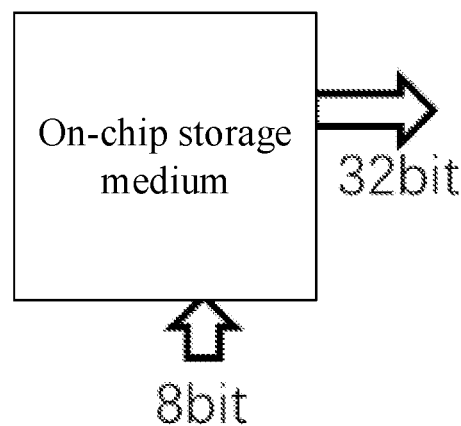
FIG. 80 is a schematic diagram of an indexing example of on-chip data of the on-chip data partitioning read-write system according to an example of the present disclosure.
Figure 83:
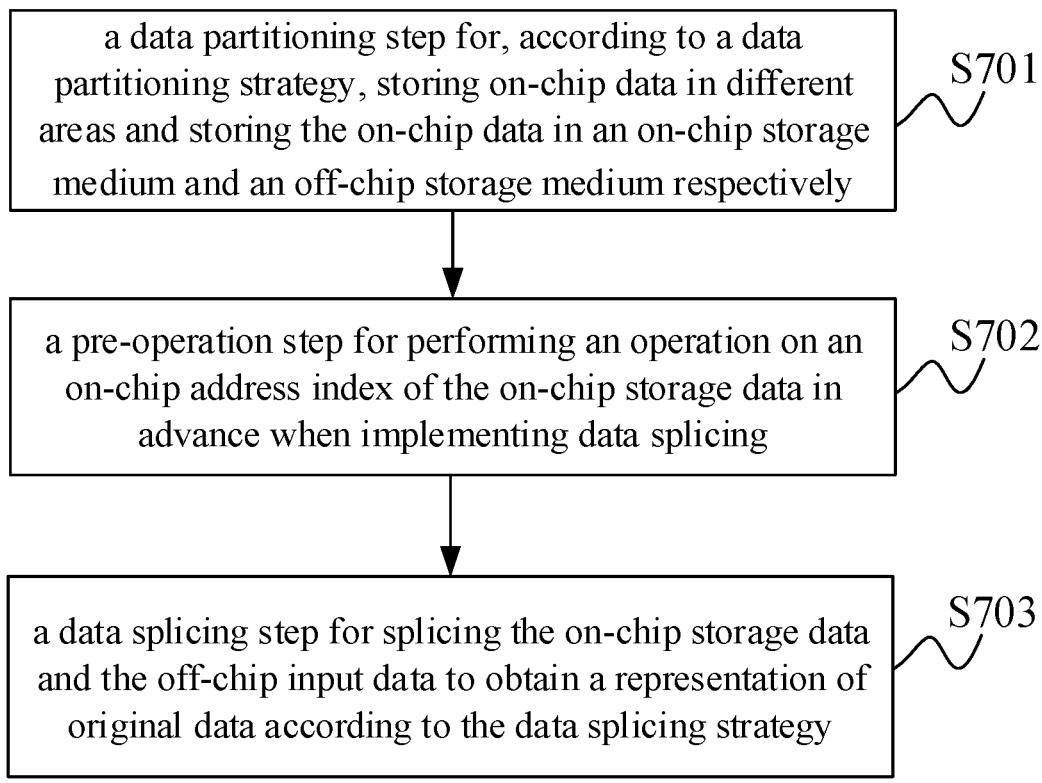
FIG. 83 is a schematic flowchart of the on-chip data partitioning read-write method according to an example of the present disclosure.

FIG. 80 is a flowchart of a specific example of the on-chip data partitioning read-write method according to the present disclosure. The specific example can be implemented by the on-chip data partitioning read-write system 100 of the present disclosure. As shown in FIG. 83, the on-chip data partitioning read-write method includes:

a step S701, a data partitioning step for, according to a data partitioning strategy, storing on-chip data in different areas and storing the on-chip data in an on-chip storage medium and an off-chip storage medium respectively;

a step S702, a pre-operation step for performing an operation on an on-chip address index of the on-chip storage data in advance when implementing data splicing; and a step S703, a data splicing step for splicing the on-chip storage data and the off-chip input data to obtain a representation of the original data according to the data splicing strategy.

The above steps are implemented by the data partitioning module 10, the pre-operation module 20, and the data splicing module 30 respectively, and the original data is restored on the chip without loss.

Preferably, the on-chip data partitioning read-write method of the present disclosure requires storage management, and the splicing process is supported by the storage module 40. The data partitioning read-write method further includes:

a step of storing data, specifically, storing and carrying the on-chip storage data of the on-chip storage medium and the off-chip input data from the off-chip storage medium; where a reading port is separated from a writing port, and the reading and writing of the data are independent from each other in the data storing step. Specifically, the step of storing data further includes:

firstly, indexing the on-chip storage data according to the on-chip address index;

secondly, outputting indexed data to an exit; and thirdly, writing data to be stored into a corresponding storage positions according to a writing address.

During reading and writing of the data, support is provided by the address index interface 41, the data read-out interface 42 and the data write-in interface 43 to cooperate with the on-chip and off-chip data path, and the on-chip data path, so as to achieve data communication in and out of the module, and independent read-write ports can achieve reading and writing simultaneously. The on-chip data searches the on-chip storage data stored in the chip and obtains final complete data after splicing operation with data input from outside into the chip according to the on-chip address index that may go through a certain operation (such as address offset computation) of the pre-operation module 20.

Figure 84:
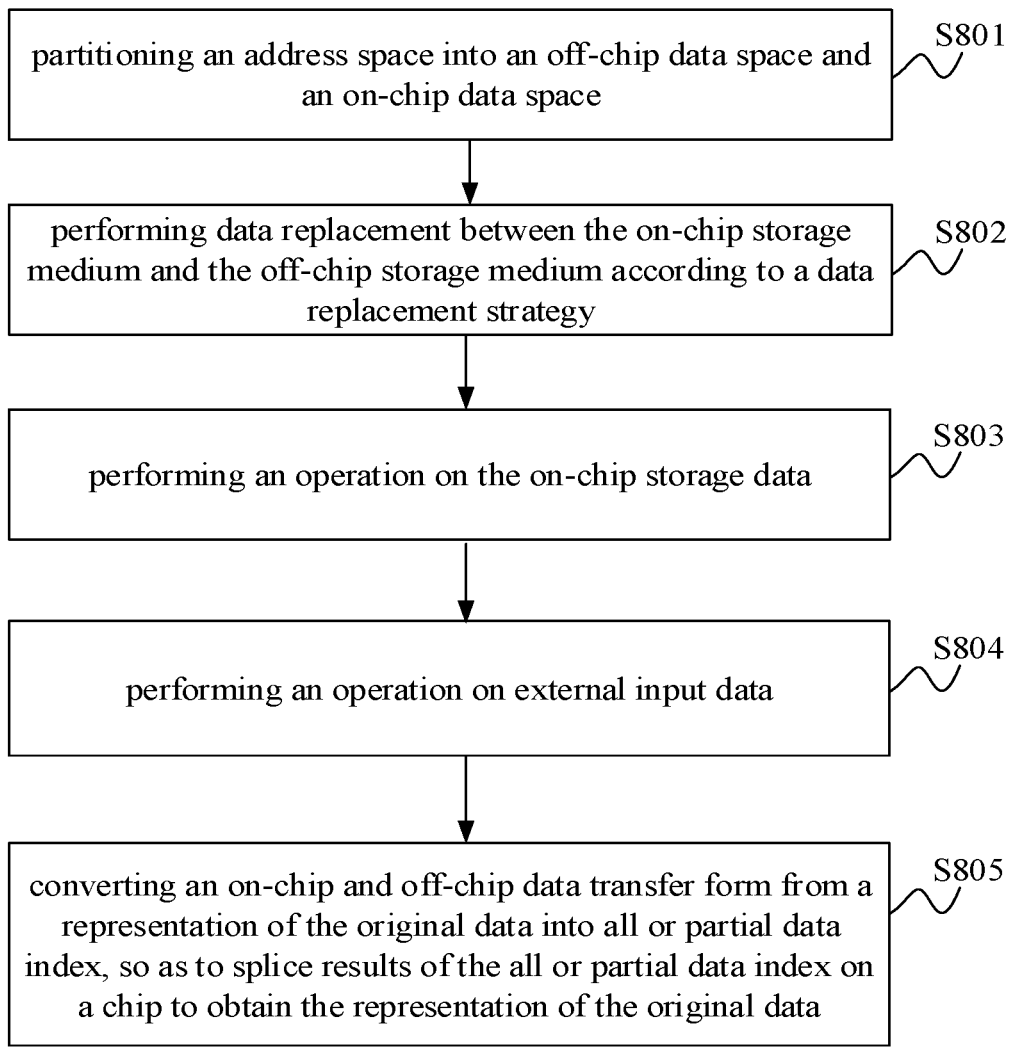
FIG. 84 is a schematic flowchart of a specific example of the on-chip data partitioning read-write method of the present disclosure.

In a specific example, FIG. 84 is a flowchart of a preferable example of the preferable on-chip data partitioning read-write method of the present disclosure. The on-chip data partitioning read-write method includes:

a step S801, partitioning an address space into an off-chip data space and an on-chip data space;

a step S802, performing data replacement between the on-chip storage medium and the off-chip storage medium according to a data replacement strategy, where the data replacement strategy includes an ordinal replacement, a reversed replacement, and a random replacement; and the data partitioning strategy includes partitioning of fixed-point data and floating-point data;

a step S803, performing an operation on the on-chip storage data;

a step S804, performing an operation on external input data, where the external input data includes the off-chip input data and data directly read from the read-write ports; and a step S805, converting an on-chip and off-chip data transfer form from a representation of the original data into all or partial data index, so as to splice results of the all or partial data index on a chip to obtain the representation of the original data.

Only if processed on-chip storage data and off-chip input data are spliced together, the original data can be processed by subsequent modules to achieve the function of the processor.

Figure 81:
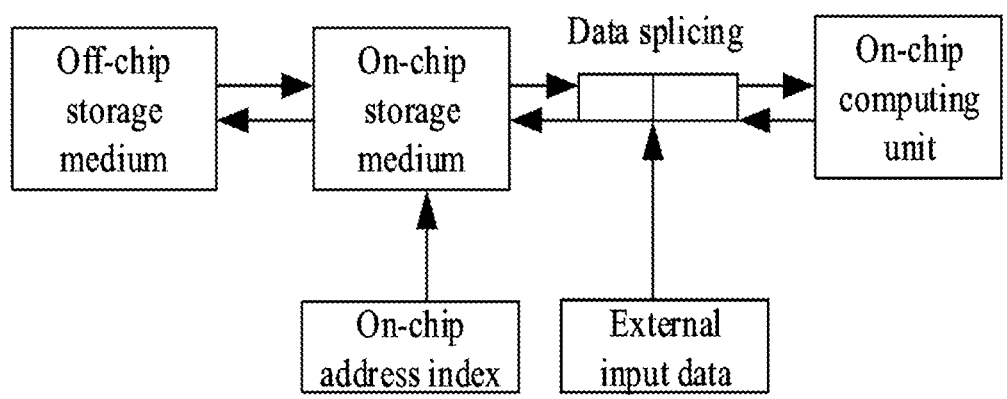
FIG. 81 is a schematic diagram of a physical framework for the on-chip data partitioning read-write method according to an example of the present disclosure.
Figure 82:
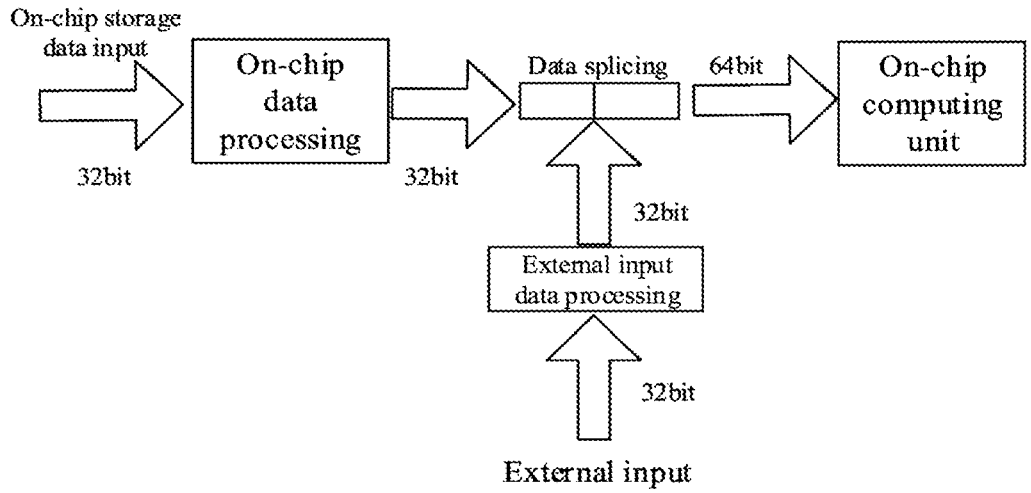
FIG. 82 is a diagram of a physical design framework for a data splicing operation of the on-chip data partitioning read-write method according to an example of the present disclosure.

Furthermore, to facilitate understanding, a physical design frame diagram of a specific example illustrated in FIGS. 80-82 is explained below.

For the heterogeneous platform, the data which can be stored on a chip of an accelerator is limited. Therefore, all the data needs to be partitioned into data blocks that can be stored on the chip. A required data block is read in or written out through data interaction on an off-chip large storage medium (the off-chip storage medium) and an on-chip small storage medium (the on-chip storage medium). Sizes of the data blocks are different, so the data blocks are partitioned and stored in different areas, and the off-chip storage medium is added according to different requirements of capacity. Meanwhile, an on-chip data address is provided to on-chip computing units through the on-chip address index depending on requirements. As shown in FIG. 82, an index and data corresponding to the index are obtained through the address index interface 41. FIG. 80 illustrates an on-chip data indexing process according to an example, where a device indexes 256 storage positions to obtain 32-bit data according to an 8-bit address, and the device is not limited to a bit width of the address index and a bit width of the on-chip data storage illustrated in the Figures. Implementation of the flow further depends on intercommunication between the on-chip storage medium, the off-chip storage medium, the on-chip and off-chip data path, and the on-chip data path in hardware.

FIG. 82 is a data splicing process according to an example of the present disclosure. The process includes: processing, by an on-chip data processing sub-module 31 that is 32-bit in the Figure, the on-chip storage data that is 32-bit in the Figure, where the on-chip data processing sub-module 31 may implement other operations such as arithmetic calculation other than an addressing operation; processing, by an off-chip data processing sub-module 32 that is 32-bit in the Figure, the off-chip input data that is 32-bit in the Figure; splicing processed on-chip storage data and the off-chip input data into 64-bit data as shown in the Figure; and transferring the 64-bit data to subsequent modules such as an on-chip computing unit for processing. The bit widths of the processed on-chip storage data and off-chip input data are not limited to that shown in the figure, and the data bit width of the data block is not limited to a specific data bit width. The data processing may include complex operations other than the simple splicing operation.

Specifically, the data splicing step is implemented through an on-chip and off-chip data path, or an on-chip data path. Specifically, the on-chip and off-chip data path includes the PCI, PCIE and HT interconnection technologies to achieve a data flow on and off the chip; the on-chip data path includes the FAT-TREE and H-TREE interconnection technologies; and the on-chip and off-chip connection way includes a multi-chip interconnection structure such as an on-chip network.

The data in the on-chip storage medium or the off-chip storage medium can be read and written once or for many times, and the data can be read into one or more on-chip computing units; the on-chip storage medium or the off-chip storage medium can be read and written from outside once or for many times, and the medium can be read and written from inside once or for many times.

The present disclosure provides an on-chip read-write device including the on-chip data partitioning read-write system 100. The on-chip read-write device includes an on-chip storage medium, an off-chip storage medium, an on-chip and off-chip data path, and an on-chip data path. Preferably, the on-chip read-write device further includes common storage mediums, such as a Static Random Access Memory (SRAM), a Dynamic Random Access Memory (DRAM), an Enhanced Dynamic Random Access Memory (eDRAM), a Register file (RF) and the like, and may also be a novel storage device, such as a Non-Volatile Memory (NVM), a 3D storage device, and the like.

The present disclosure converts a representation of data into an index, which may efficiently perform repetitive addressing in the on-chip address space, and perform addressing in the off-chip address. The device for on-chip repetitive addressing and a strategy used by the device in the heterogeneous environment are different from directly accelerating cache of the data itself, and the hardware support includes the on-chip storage medium, the off-chip storage medium, the address indexing device, the on-chip and off-chip data path, and the on-chip data path.

Finally, the present disclosure is intended for different data partitioning strategies, devices, and methods. According to different partitioning strategies, data is partitioned into different parts, and the devices in the present disclosure support devices of different partitioning strategies.

In conclusion, the devices and related use methods provided in the present disclosure can effectively satisfy requirements of data reusability and flexible addressing, and effectively reduce memory access bandwidth requirements. The devices and related use methods can be adapted to different scenes, and are not merely limited to machine learning processors. Meanwhile, the present disclosure can cut on-chip cache overhead by reasonably scheduling data, so as to provide a support for the design of more efficient processors.

Figure 85:
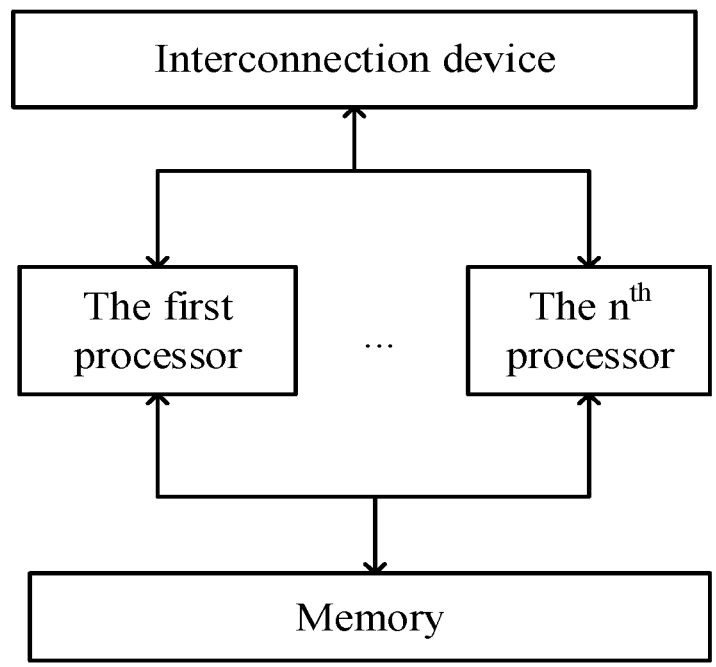
FIG. 85 is a schematic structural diagram of a neural network computing system according to an example of the present disclosure.

FIG. 85 illustrates a computing system for inference and training of a neural network algorithm based on multiprocessor cooperation. The system may include n processors (n is an integer greater than or equal to 2), an interconnected device, and a memory. The n processors may be any device with a computing part of a neural network algorithm, such as a neural network processor, a GPU, a CPU, an FPGA, and a DSP. In practical applications, the above neural network processor may also be a special-purpose processor, a computing device, and the like in the present disclosure. For details, please refer to the descriptions of the examples shown in FIGS. 6-84. The interconnection device is configured to connect the processors and is responsible for communication and data transfer among the processors. The processors may be connected through various on-chip interconnection technologies (such as a bus, an optical interconnection, etc.), SoC integration, or other ways. The storage module is configured to store input data, output data, model parameters for training, intermediate data generated during the operation process, and computation instructions required by each of the processors of a neural network.

The interconnection module may use a topology including, but not limited to, ring, tree, crossbar, mesh, or torus, etc.

A connection mode and a storage mode between different processors are not limited to one type. In other words, there may be more than one type of interconnection devices or memories in the system.

Referring to FIG. 85, the processor in FIG. 85 may be a device for performing a forward operation of an artificial neural network. The specific structure of the device for performing a forward operation of the artificial neural network may be a specific structure of the computing device shown in FIG. 6A. In practical applications, the device may further include an instruction caching unit, a controller unit, a direct memory access unit, a tree module, a primary operation module, and a plurality of secondary operation modules. The instruction caching unit is configured to read an instruction and cache a read training instruction through the memory access unit; the controller unit is configured to read an instruction from the instruction caching unit and decode the instruction into microinstructions of behavior of a control tree module, the primary operation module, and the secondary operation modules; the direct memory access unit is configured to write data from an external address space to corresponding data caching units of the primary operation module and each pf the secondary operation modules, or read data from the data caching unit to the external address space; the tree module is configured to: at a stage where the neural network of each layer starts to perform a backward operation, transfer input neuron vectors of this layer to all secondary operation modules through the tree module, and after the operation of the secondary operation modules is completed, splice values of output neurons of each secondary operation module into an intermediate result vector; and the primary operation module is configured to complete subsequent computations by using the intermediate result vector.

As a computing processor, the device for performing a forward operation of the artificial neural network can be combined with other types of processors (such as GPU and CPU) to form a new neural network task processing system.

Figure 86A:
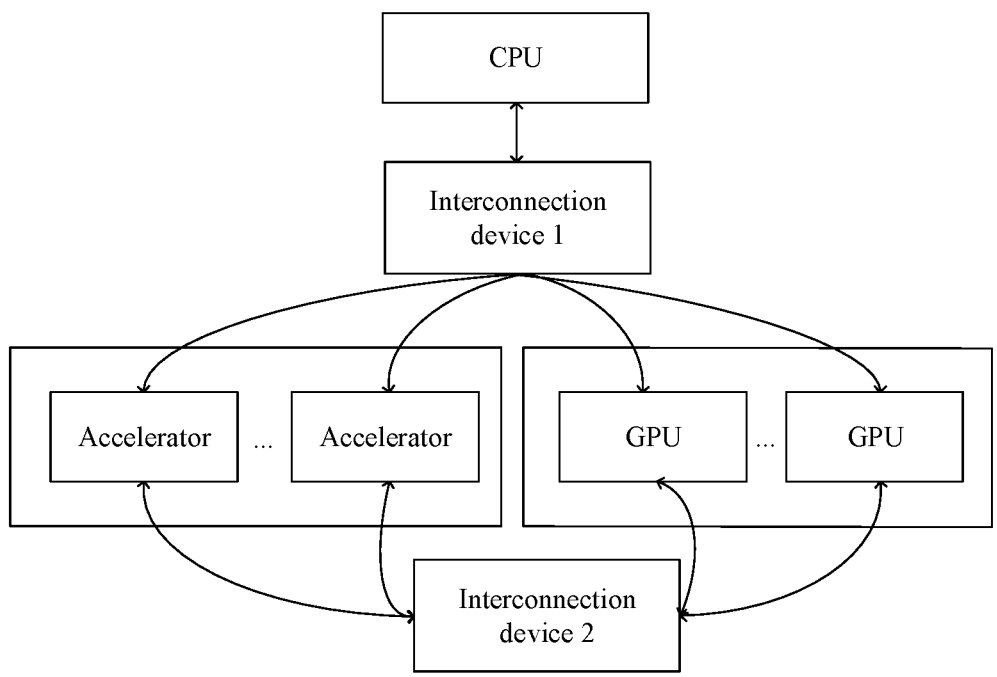
FIG. 86A is a schematic diagram of a multiprocessor according to an example of the present disclosure.
Figure 86B:
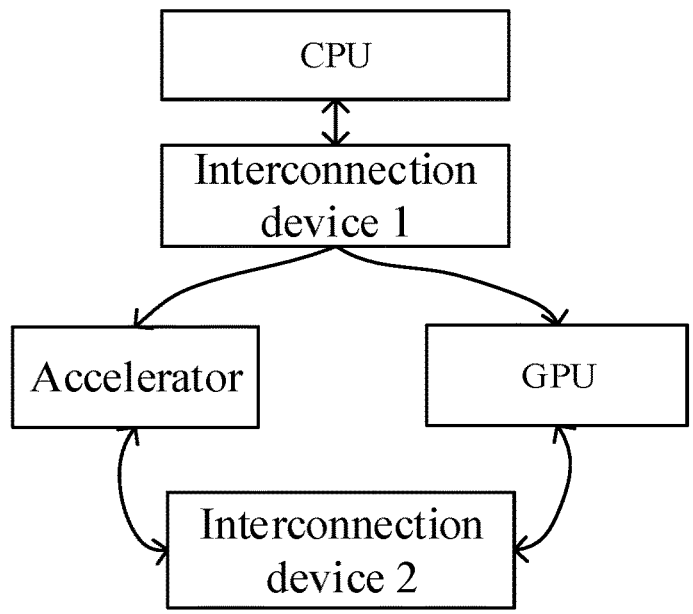
FIG. 86B is a diagram of a multiprocessor according to another example of the present disclosure.

FIG. 86A and FIG. 86B illustrate a possible implementation. FIG. 86A includes three modules: a control module configured to perform logic control, generate an instruction, and call other processors, and the module includes a control processor such as a CPU; a forward processing module configured to perform a neural network forward operation, and the module includes n (n is greater than or equal to 1) forward operation modules (special-purpose forward operation devices of the artificial neural network); and m (m is greater than or equal to 1) backward operation modules (using a general-purpose processor such as a GPU/DSP/FPGA, etc.) configured to perform a neural network backward operation. The control module is connected and communicated with the operation modules through an interconnection device 1, and the forward operation module is connected and communicated with the backward operation module through an interconnection device 2.

Optionally, the forward operation module and the backward operation module use a special-purpose processor of the artificial neural network, and weights are updated by using a general-purpose processor such as a GPU, a DSP, or an FPGA.

FIG. 86B illustrates a multiprocessor coordination device when n=1 and m=1. The device includes a CPU, a neural network processor, and a GPU, and can be used for inference and training of a neural network.

Figure 87:
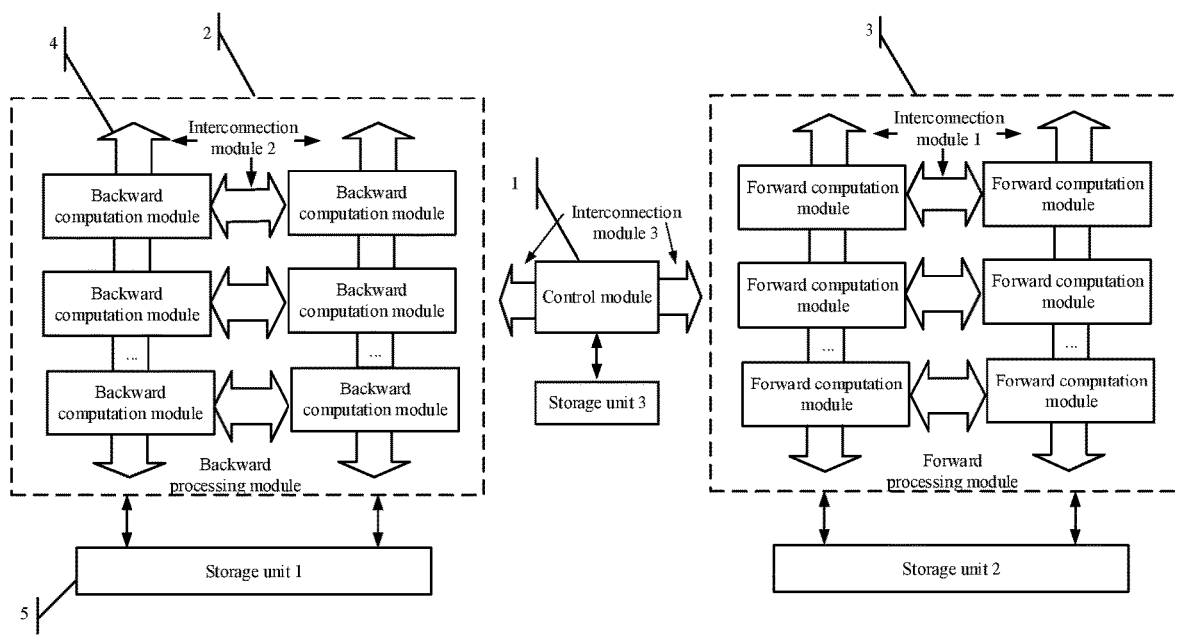
FIG. 87 is a schematic structural diagram of a neural network computing system for training and inference according to an example of the present disclosure.

FIG. 87 illustrates a more specific multiprocessor coordination device for training and inference of a neural network. 1 is a control module configured to control an entire execution process, and includes a control processor, which is usually a CPU; 3 is a forward processing module configured to perform an operation on forward neurons during the training and inference process, and includes n forward processing modules for the forward operation, which are usually forward operation devices of the artificial neural network; 2 is a backward processing module configured to perform backward gradient transfer and weight update operations during the training process, and includes m backward training modules and backward processors, which are usually GPU/FPGA/DSP; and 5 is memory. The forward processing module obtains data such as neurons, weights, and the like from a storage unit 1; the control processor obtains data such as instructions, network models, and the like from a storage unit 3; and the backward processor obtains data such as target labels, weights, gradients, and the like from a storage unit 2.

The forward operation modules are connected with each other through an interconnection module 1. The backward operation modules are connected with each other through an interconnection module 2. The control module is connected with the forward processing module and the backward processing module through an interconnection module 3 for communication.

Figure 88:
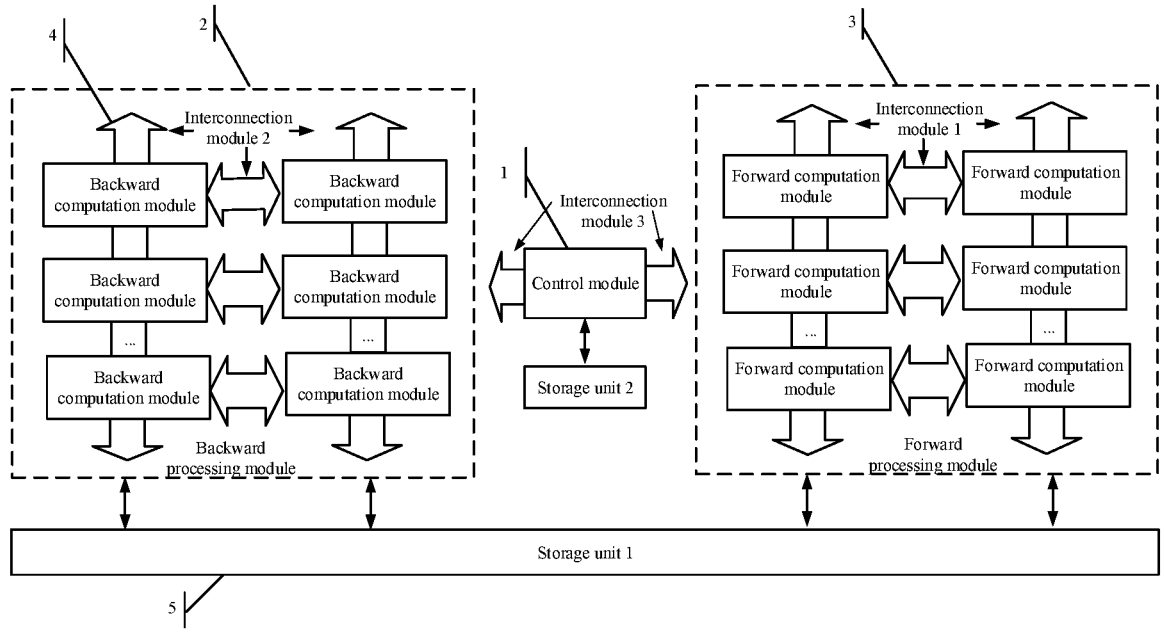

FIG. 88 is a transformation of the device in FIG. 87. Since in a neural network algorithm, neurons, synapses, and bias data that are required for the backward operation are operated in the forward process, sparate storage of forward data and backward data may lead to additional data transfer overhead. In other words, before the backward operation starts, the data needs to be transferred from the forward processing module to a storage unit which is accessible by the backward processing module, which may result in a decrease in the overall processing speed and an increase in power. Therefore, a device in which the forward processing module and the backward processing module share a same storage unit is designed, where the data (including original input data, neurons, synapses, gradients, labels, etc.) required by the forward processing module and the backward processing module during the operation are stored in the storage unit 1. The medium of the storage unit 1 may be of the type previously described.

Figure 89:
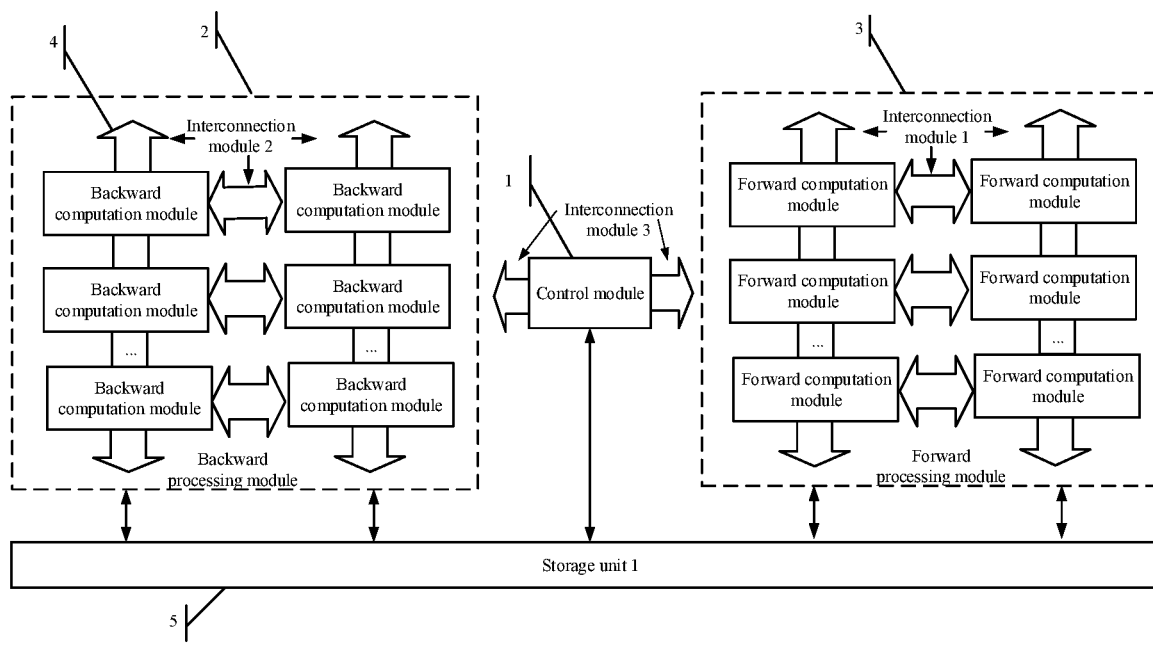

FIG. 89 illustrates another memory organization structure. In this structure, the control module, the forward processing module, and the backward processing module share a same storage unit 1, which reduces a process of moving data from the control processor (CPU) memory to other processor memories.

FIG. 89 is an exemplary block diagram of an overall structure of an artificial neural network forward processing module according to the present disclosure. As shown in FIG. 89, the device includes an instruction caching unit 1, a controller unit 2, a direct memory access unit 3, a tree module 4, a primary operation module 5, and a plurality of secondary computing operation modules 6. The instruction caching unit 1, the controller unit 2, the direct memory access unit 3, the tree module 4, the primary operation module 5, and the secondary operation modules 6 may all be implemented by a hardware circuit such as an application specific integrated circuit (ASIC).

The instruction caching unit 1 reads an instruction through the direct memory access unit 3 and caches a read instruction.

The controller unit 2 reads the instruction from the instruction caching unit 1 and decodes the instruction into a microinstruction that controls behavior of other modules such as the direct memory access unit 3, the primary operation module 5, and the secondary operation modules 6, etc.

The direct memory access unit 3 can access an external address space, directly read and write data to various caching units inside the device, and complete data loading and storage.

Figure 90:
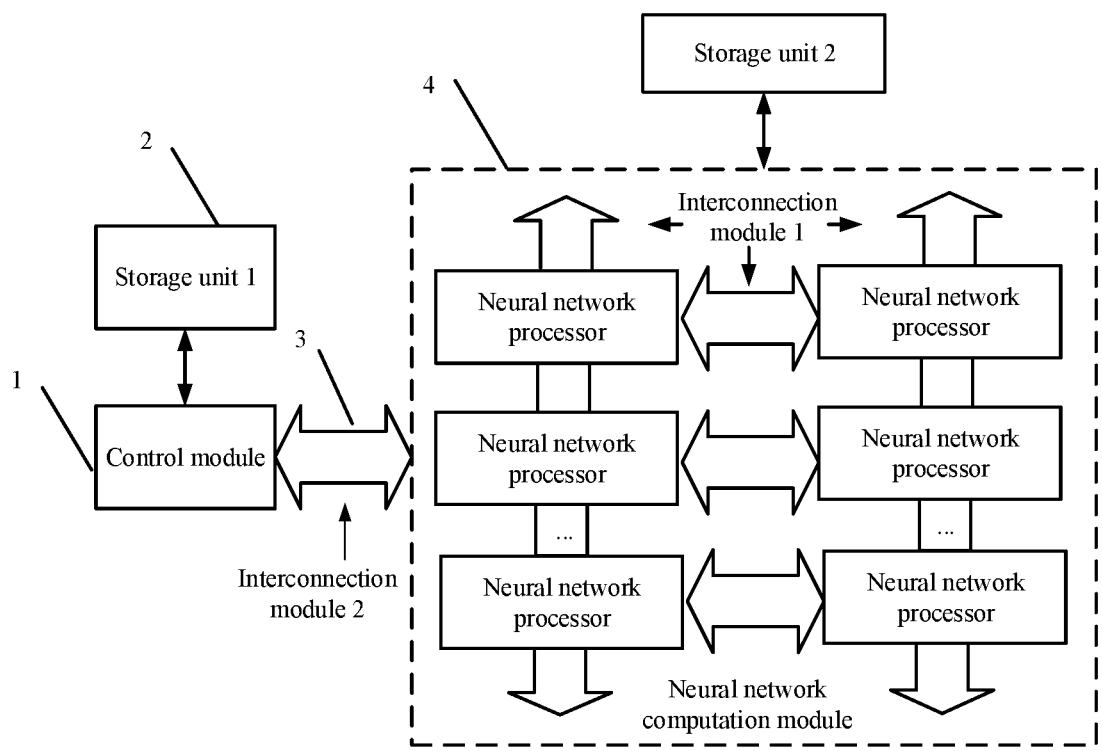

A system shown in FIG. 90 may include: a control module 1, a storage unit module 2, an interconnection module 3, and a neural network operation module 4. The control module is generally a CPU, and the storage unit 1 is a memory of the CPU; and the neural network computation module is a computation module composed of several neural network processors, and is configured to perform computations of the neural network algorithm in a task, such as convolution, pooling, one or more of the above neural network specific instructions, and the like. The control processor is connected and communicated with the neural network computation module through the interconnect module 2. The processors in the neural network computation module are connected and communicated with each other through the interconnect module 1. The neural network computation module reads data required for computation, such as weights, input data, and the like, from the storage unit 2.

The present disclosure guarantees flexibility, efficiency, and scalability of a neural network processing device by setting multiple classes and multiple processors. In other words, a simple neural network algorithm can be efficiently executed by the neural network processing device, and through multi-processor writing, complex tasks such as target recognition can also be implemented. By allocating computing tasks with different characteristics to different processors, the maximum efficiency of the neural network processor can be exerted while the scalability, compatibility, computing precision, and computing efficiency of the device are guaranteed. The above structures shown in FIG. 85, FIG. 86A, FIG. 86B, FIG. 87, FIG. 88, FIG. 89, and FIG. 90 can be applied to any computations of neural network computation instructions or neural network applications. Application scenarios of the structures shown in FIG. 85, FIG. 86A, FIG. 87, FIG. 88, and FIG. 89 are not limited in the present disclosure. In addition, the execution of different neural network computation instructions may need to add or extend other functional modules, and specific forms of other added or extended functional modules are not limited in the present disclosure. For instance, an extended functional module may be a module or a unit as shown in FIG. 6A.

Some examples of the present disclosure disclose an accelerating device including a memory configured to store an executable instruction; a processor configured to execute the executable instruction in a storage unit, where the instruction is executed according to the above processing method.

The processor may be a single processing unit, or may include two or more processing units. In addition, the processor may include a general-purpose processor (CPU) or a graphics processor (GPU); or may include a field programmable logic gate array (FPGA) or an application-specific integrated circuit (ASIC) to set and compute the neural network. The processor may also include an on-chip memory for caching (including memory in the processing device).

In some examples, the disclosure further provides a chip including the above neural network processor.

In some examples, the disclosure further provides a chip package structure including the above chip.

In some examples, the disclosure further provides a board card including the above chip package structure.

In some examples, the disclosure further provides an electronic device including the above board card.

The electronic device includes a data processing device, a robot, a computer, a printer, a scanner, a tablet computer, an intelligent terminal, a mobile phone, a drive recorder, a navigator, a sensor, a webcam, a cloud server, a camera, a video camera, a projector, a watch, an earphone, a mobile storage, a wearable device, a transportation means, a household electrical appliance, and/or a medical device.

The transportation means includes an airplane, a ship, and/or a vehicle. The household electrical appliance includes a television, an air conditioner, a microwave oven, a refrigerator, an electric rice cooker, a humidifier, a washing machine, an electric lamp, a gas cooker, and a range hood. The medical device includes a nuclear magnetic resonance spectrometer, a B-ultrasonic scanner, and/or an electrocardiograph.

It should be noted that, for the sake of simple description, the above method examples are all described as a series of action combinations. However, those skilled in the art should be aware that the present disclosure is not limited by the described action order, because according to the present disclosure, certain steps may be executed in another order or executed simultaneously. Those skilled in the art should also be aware that the examples described in the specification are alternative examples and that the actions and modules involved are not necessary in the present disclosure.

In the examples, the description of each example has different emphasis. For the parts not described in detail in one example, reference may be made to related descriptions in other examples.

In the examples of the disclosure, it should be understood that the device disclosed may be implemented in other manners. For instance, the described device examples are merely illustrative; for instance, division of the unit is only a logical function division and can be divided in other manners during actual implementations; for instance, a plurality of units or components may be combined or integrated into another system, or some features may be ignored, or not performed. In addition, coupling or direct coupling or communication connection between each illustrated or discussed component may be indirect coupling or communication connection through some interfaces, devices or units, and may be electrical connection or other forms of connection.

The units described as separate components may or may not be physically separated and the components illustrated as units may or may not be physical units. In other words, the units or the components may be in the same place or may be distributed to a plurality of network units. All or part of the units may be selected according to actual needs to achieve the purpose of the technical solutions of the examples.

In addition, functional units in various examples of the present disclosure may be integrated into one processing unit, or each unit may be physically present, or two or more units may be integrated into one unit. The above integrated unit can be implemented in the form of hardware or a software program module.

The integrated unit may be stored in a computer readable memory when it is implemented in the form of a software program module and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for enabling a computer device (which may be a personal computer, a server, or a network device and so on) to perform all or part of the steps described in the various examples of the present disclosure. The memory includes various medium capable of storing program codes, such as a USB (universal serial bus) flash disk, a read-only memory (ROM), a random access memory (RAM), a removable hard disk, Disk, compact disc (CD), or the like.

It will be understood by those of ordinary skill in the art that all or a part of the various methods of the examples described above may be accomplished by means of a program to instruct associated hardware, and the program may be stored in a computer-readable memory, which may include a flash memory, a read-only memory (ROM), a random-access memory (RAM), a disk, or a compact disc (CD), and the like.

The examples of the present disclosure are described in detail above and specific examples are used herein to describe the principle and implementation manners of the present disclosure. The description of the above examples is merely used to help understand the method and the core idea of the present disclosure. Meanwhile, those skilled in the art may make modifications to the specific implementation manners and the application scope according to the idea of the present disclosure. In summary, the contents of the specification should not be construed as limiting the present disclosure.

What is claimed is:

1. A computing method applied to a computing device, wherein the computing device comprises: a memory, a register unit, and a computing unit; comprising:

controlling, by the computing device, the computing unit to obtain a first operation instruction, wherein the first operation instruction comprises a matrix reading instruction for retrieving at least one matrix required for executing the instruction, and the required at least one matrix comprises matrices of different lengths;

controlling, by the computing device, the computing unit to send a reading command to the memory according to the matrix reading instruction; and in response to the matrix reading instruction, reading batch by batch, by the computing unit, one or more batches of data of the required at least one matrix till the entire required at least one matrix is retrieved, wherein each of the one or more batches of data includes multiple pieces of data of the at least one matrix, and executing the first operation instruction on the matrix.

2. The method of claim 1, wherein the matrix reading instruction includes: a storage address of a matrix required by the instruction or an identifier of a matrix required by the instruction.

3. The method of claim 2, wherein, when the matrix reading instruction is the identifier of the matrix required by the instruction, the controlling the computing unit to send a reading command to the memory by the computing device according to the matrix reading instruction includes:

controlling, by the computing device, the computing unit to read a storage address corresponding to the identifier from the register unit according to the identifier in a unit reading manner; and controlling, by the computing device, the computing unit to send a reading command of reading the storage address to the memory and obtain the matrix in a batch reading manner.

4. The method of claim 1, wherein, the executing the first operation instruction on the matrix includes:

controlling, by the computing device, the computing unit to perform a first pipeline stage computation on the matrix to obtain a first result, input the first result to a second pipeline stage for computation to obtain a second result, input the second result to a third pipeline stage for computation to obtain a third result, and input the third result to the memory for storage.

5. The method of claim 1, wherein, the computing device further includes a caching unit, and the method further includes:

caching, by the computing device, an operation instruction to be executed in the caching unit.

6. The method of claim 5, wherein, before the computing device controls the computing unit to obtain the first operation instruction, the method further includes:

determining, by the computing device, whether there is an association relationship between the first operation instruction and a second operation instruction before the first operation instruction; if there is an association relationship, caching the first operation instruction in the caching unit, and after the second operation instruction is executed, extracting the first operation instruction from the caching unit and sending the first operation instruction to the computing unit, the determining whether there is an association relationship between the first operation instruction and the second operation instruction before the first operation instruction includes: extracting a first storage address interval of a matrix required by the first operation instruction according to the first operation instruction, and extracting a second storage address interval of a matrix required by the second operation instruction according to the second operation instruction; if the first storage address interval and the second storage address interval have an overlapped area, determining that there is an association relationship between the first operation instruction and the second operation instruction; and if the first storage address interval and the second storage address interval have no overlapped area, determining that there is no association relationship between the first operation instruction and the second operation instruction.

7. The method of claim 1, wherein the matrix is an m*n matrix, a 1*n matrix, or an m*1 matrix, and m and n are integers greater than or equal to 2.

8. A computing device, comprising: a memory, a register unit, a computing unit, and a control unit; wherein the memory is configured to store a matrix;

the register unit is configured to store scalar data, wherein the scalar data comprises at least: a storage address of the matrix in the memory;

the control unit is configured to control the computing unit to obtain a first operation instruction, wherein the first operation instruction comprises a matrix reading instruction for a matrix required for executing the instruction, and the required at least one matrix comprises matrices of different lengths; and the computing unit is configured to:

send a reading command to the memory according to the matrix reading instruction;

read, batch by batch, one or more batches of data of the required at least one matrix till the entire required at least one matrix is retrieved, wherein each of the one or more batches of data includes multiple pieces of data of the at least one matrix, and execute the first operation instruction on the matrix.

9. The computing device of claim 8, wherein the matrix reading instruction includes: a storage address of a matrix required by the instruction or an identifier of a matrix required by the instruction.

10. The computing device of claim 8, wherein, when the matrix reading instruction is the identifier of the matrix required by the instruction, the control unit is configured to control the computing unit to read a storage address corresponding to the identifier from the register unit according to the identifier in a unit reading manner, and control the computing unit to send a reading command of reading the storage address to the memory and obtain the matrix in a batch reading manner.

11. The computing device of claim 8, wherein, the computing unit is configured to perform a first pipeline stage computation on the matrix to obtain a first result, input the first result to a second pipeline stage for computation to obtain a second result, input the second result to a third pipeline stage for computation to obtain a third result, and input the third result to the memory for storage.

12. The computing device of claim 8, wherein the computing device further includes:

a caching unit configured to cache an operation instruction to be executed; and the control unit configured to cache the operation instruction to be executed in the caching unit.

13. The computing device of claim 12, wherein the control unit is configured to determine whether there is an association relationship between the first operation instruction and a second operation instruction before the first operation instruction; if there is an association relationship between the first operation instruction and the second operation instruction, the control unit is configured to cache the first operation instruction in the caching unit, and after the second operation instruction is executed, extract the first operation instruction from the caching unit and send the first operation instruction to the computing unit, the determining whether there is an association relationship between the first operation instruction and the second operation instruction before the first operation instruction includes: extracting a first storage address interval of a matrix required by the first operation instruction according to the first operation instruction, and extracting a second storage address interval of a matrix required by the second operation instruction according to the second operation instruction; if the first storage address space and the second storage address space have an overlapped area, determining that there is an association relationship between the first operation instruction and the second operation instruction; and if the first storage address space and the second storage address space have no overlapped area, determining that there is no association relationship between the first operation instruction and the second operation instruction.

14. The computing device of claim 8, wherein the matrix is an m*n matrix, a 1*n matrix, or an m*1 matrix, and m and n are integers greater than or equal to 2.

* * * * *